(12) United States Patent
Sundstrom et al.

(10) Patent No.: US 12,524,977 B2
(45) Date of Patent: Jan. 13, 2026

(54) METHODS FOR DISPLAYING, SELECTING AND MOVING OBJECTS AND CONTAINERS IN AN ENVIRONMENT

(71) Applicant: Apple Inc., Cupertino, CA (US)

(72) Inventors: Matthew J. Sundstrom, Campbell, CA (US); Evgenii Krivoruchko, San Francisco, CA (US); Matan Stauber, Brooklyn, NY (US); Zoey C. Taylor, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 171 days.

(21) Appl. No.: 18/153,943

(22) Filed: Jan. 12, 2023

(65) Prior Publication Data

US 2023/0334808 A1    Oct. 19, 2023

Related U.S. Application Data

(60) Provisional application No. 63/266,726, filed on Jan. 12, 2022.

(51) Int. Cl.
*G06T 19/20* (2011.01)
*G06F 3/01* (2006.01)
*G06T 7/70* (2017.01)

(52) U.S. Cl.
CPC .............. *G06T 19/20* (2013.01); *G06F 3/017* (2013.01); *G06T 7/70* (2017.01); *G06T 2219/2004* (2013.01)

(58) Field of Classification Search
CPC ... G06T 19/20; G06T 7/70; G06T 2219/2004; G06F 3/017; G06F 2203/0381; G06F 3/04815; G06F 3/0482; G06F 3/0484; G06F 3/04842; G06F 3/04883; G06F 3/013
See application file for complete search history.

(56) References Cited

U.S. PATENT DOCUMENTS

| | | |
|---|---|---|
| 1,173,824 A | 2/1916 | Mckee |
| 5,015,188 A | 5/1991 | Pellosie et al. |
| 5,422,812 A | 6/1995 | Knoll et al. |
| 5,515,488 A | 5/1996 | Hoppe et al. |
| 5,524,195 A | 6/1996 | Clanton et al. |

(Continued)

FOREIGN PATENT DOCUMENTS

| | | |
|---|---|---|
| CA | 3033344 A1 | 2/2018 |
| CN | 102298493 A | 12/2011 |

(Continued)

OTHER PUBLICATIONS

AquaSnap Window Manager: dock, snap, tile, organize [online], Nurgo Software, Available online at: <https://www.nurgo-software.com/products/aquasnap>, [retrieved on Jun. 27, 2023], 5 pages.

(Continued)

*Primary Examiner* — Xiao M Wu
*Assistant Examiner* — Latrell Anthony Creary
(74) *Attorney, Agent, or Firm* — Kubota & Basol LLP

(57) ABSTRACT

In some embodiments, a computer system performs different object selection-related operations. In some embodiments, a computer system places objects at locations in a displayed region based on attention of a user. In some embodiments, a computer system displays a container virtual object with curvature in a three-dimensional environment.

45 Claims, 59 Drawing Sheets

(56) References Cited

U.S. PATENT DOCUMENTS

| | | |
|---|---|---|
| 5,610,828 A | 3/1997 | Kodosky et al. |
| 5,731,805 A | 3/1998 | Tognazzini et al. |
| 5,737,553 A | 4/1998 | Bartok |
| 5,740,440 A | 4/1998 | West |
| 5,751,287 A | 5/1998 | Hahn et al. |
| 5,758,122 A | 5/1998 | Corda et al. |
| 5,794,178 A | 8/1998 | Caid et al. |
| 5,809,267 A | 9/1998 | Moran et al. |
| 5,877,766 A | 3/1999 | Bates et al. |
| 5,900,849 A | 5/1999 | Gallery |
| 5,933,143 A | 8/1999 | Kobayashi |
| 5,990,886 A | 11/1999 | Serdy et al. |
| 6,061,060 A | 5/2000 | Berry et al. |
| 6,078,310 A | 6/2000 | Tognazzini |
| 6,108,004 A | 8/2000 | Medl |
| 6,112,015 A | 8/2000 | Planas et al. |
| 6,154,559 A | 11/2000 | Beardsley |
| 6,167,433 A | 12/2000 | Maples et al. |
| 6,295,069 B1 | 9/2001 | Shirur |
| 6,323,846 B1 | 11/2001 | Westerman et al. |
| 6,426,745 B1 | 7/2002 | Isaacs et al. |
| 6,456,296 B1 | 9/2002 | Cataudella et al. |
| 6,570,557 B1 | 5/2003 | Westerman et al. |
| 6,584,465 B1 | 6/2003 | Zhu et al. |
| 6,677,932 B1 | 1/2004 | Westerman |
| 6,714,201 B1 | 3/2004 | Grinstein et al. |
| 6,750,873 B1 | 6/2004 | Bernardini et al. |
| 6,756,997 B1 | 6/2004 | Ward et al. |
| 7,035,903 B1 | 4/2006 | Baldonado |
| 7,096,120 B2 | 8/2006 | Hull |
| 7,134,130 B1 | 11/2006 | Thomas |
| 7,137,074 B1 | 11/2006 | Newton et al. |
| 7,230,629 B2 | 6/2007 | Reynolds et al. |
| 7,298,370 B1 | 11/2007 | Middler et al. |
| 7,580,576 B2 | 8/2009 | Wang et al. |
| 7,614,008 B2 | 11/2009 | Ording |
| 7,633,076 B2 | 12/2009 | Huppi et al. |
| 7,634,718 B2 | 12/2009 | Nakajima |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,706,579 B2 | 4/2010 | Oijer |
| 7,721,226 B2 | 5/2010 | Barabe et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,341,541 B2 | 12/2012 | Holecek et al. |
| 8,381,135 B2 | 2/2013 | Hotelling et al. |
| 8,436,872 B2 | 5/2013 | Wright et al. |
| 8,479,122 B2 | 7/2013 | Hotelling et al. |
| 8,593,558 B2 | 11/2013 | Gardiner et al. |
| 8,724,856 B1 | 5/2014 | King |
| 8,730,156 B2 | 5/2014 | Weising et al. |
| 8,767,045 B2 | 7/2014 | Kitazato et al. |
| 8,793,620 B2 | 7/2014 | Stafford |
| 8,793,729 B2 | 7/2014 | Adimatyam et al. |
| 8,803,873 B2 | 8/2014 | Yoo et al. |
| 8,866,880 B2 | 10/2014 | Tan et al. |
| 8,896,632 B2 | 11/2014 | Macdougall et al. |
| 8,947,323 B1 | 2/2015 | Raffle et al. |
| 8,970,478 B2 | 3/2015 | Johansson |
| 8,970,629 B2 | 3/2015 | Kim et al. |
| 8,994,718 B2 | 3/2015 | Latta et al. |
| 9,007,301 B1 | 4/2015 | Raffle et al. |
| 9,108,109 B2 | 8/2015 | Pare et al. |
| 9,158,115 B1 | 10/2015 | Worley et al. |
| 9,164,975 B2 | 10/2015 | Milewski et al. |
| 9,183,672 B1 | 11/2015 | Hickman et al. |
| 9,185,062 B1 | 11/2015 | Yang et al. |
| 9,189,611 B2 | 11/2015 | Wssingbo |
| 9,196,072 B2 | 11/2015 | Oh et al. |
| 9,201,500 B2 | 12/2015 | Srinivasan et al. |
| 9,214,137 B2 | 12/2015 | Bala et al. |
| 9,222,787 B2 | 12/2015 | Blumenberg et al. |
| 9,230,368 B2 | 1/2016 | Keane et al. |
| 9,237,334 B2 | 1/2016 | Cheng et al. |
| 9,241,149 B2 | 1/2016 | Redmann |
| 9,245,388 B2 | 1/2016 | Poulos et al. |
| 9,256,785 B2 | 2/2016 | Qvarfordt |
| 9,293,118 B2 | 3/2016 | Matsui |
| 9,294,757 B1 | 3/2016 | Lewis et al. |
| 9,298,334 B1 | 3/2016 | Zimmerman et al. |
| 9,316,827 B2 | 4/2016 | Lindley et al. |
| 9,348,458 B2 | 5/2016 | Hotelling et al. |
| 9,383,189 B2 | 7/2016 | Bridges et al. |
| 9,384,594 B2 | 7/2016 | Maciocci et al. |
| 9,396,580 B1 | 7/2016 | Nowrouzezahrai et al. |
| 9,400,559 B2 | 7/2016 | Latta et al. |
| 9,426,193 B2 | 8/2016 | Goodman |
| 9,436,357 B2 | 9/2016 | Pallakoff et al. |
| 9,437,047 B2 | 9/2016 | Chang et al. |
| 9,448,635 B2 | 9/2016 | Macdougall et al. |
| 9,448,687 B1 | 9/2016 | Mckenzie et al. |
| 9,465,479 B2 | 10/2016 | Cho et al. |
| 9,519,371 B2 | 12/2016 | Nishida |
| 9,526,127 B1 | 12/2016 | Taubman et al. |
| 9,544,257 B2 | 1/2017 | Ogundokun et al. |
| 9,563,331 B2 | 2/2017 | Poulos et al. |
| 9,575,559 B2 | 2/2017 | Andrysco |
| 9,588,651 B1 | 3/2017 | Buchanan et al. |
| 9,612,722 B2 | 4/2017 | Miller et al. |
| 9,619,105 B1 | 4/2017 | Dal Mutto |
| 9,619,519 B1 | 4/2017 | Dorner |
| 9,672,588 B1 | 6/2017 | Doucette et al. |
| 9,681,112 B2 | 6/2017 | Son |
| 9,684,372 B2 | 6/2017 | Xun et al. |
| 9,704,230 B2 | 7/2017 | Hofmann et al. |
| 9,734,402 B2 | 8/2017 | Jang et al. |
| 9,778,814 B2 | 10/2017 | Ambrus et al. |
| 9,779,512 B2 | 10/2017 | Tomlin et al. |
| 9,829,708 B1 | 11/2017 | Asada |
| 9,851,866 B2 | 12/2017 | Goossens et al. |
| 9,864,498 B2 | 1/2018 | Olsson et al. |
| 9,870,130 B2 | 1/2018 | Schubert et al. |
| 9,886,087 B1 | 2/2018 | Wald et al. |
| 9,911,232 B2 | 3/2018 | Shapira et al. |
| 9,933,833 B2 | 4/2018 | Tu et al. |
| 9,933,937 B2 | 4/2018 | Lemay et al. |
| 9,934,614 B2 | 4/2018 | Ramsby et al. |
| 9,952,042 B2 | 4/2018 | Abovitz et al. |
| 10,026,209 B1 | 7/2018 | Dagley et al. |
| 10,049,460 B2 | 8/2018 | Romano et al. |
| 10,101,803 B2 * | 10/2018 | Faaborg .................. G06F 3/013 |
| 10,139,985 B2 | 11/2018 | Mildrew et al. |
| 10,163,198 B2 | 12/2018 | Rochford et al. |
| 10,175,483 B2 | 1/2019 | Salter et al. |
| 10,186,086 B2 | 1/2019 | Giraldi et al. |
| 10,192,347 B2 | 1/2019 | Bui et al. |
| 10,203,764 B2 | 2/2019 | Katz et al. |
| 10,210,664 B1 | 2/2019 | Chaturvedi |
| 10,303,427 B2 | 5/2019 | Shintani et al. |
| 10,307,671 B2 | 6/2019 | Barney et al. |
| 10,318,034 B1 | 6/2019 | Hauenstein et al. |
| 10,331,205 B2 | 6/2019 | Kim et al. |
| 10,339,721 B1 | 7/2019 | Dascola et al. |
| 10,353,532 B1 | 7/2019 | Holz et al. |
| 10,373,381 B2 | 8/2019 | Nuernberger et al. |
| 10,394,320 B2 | 8/2019 | George-svahn et al. |
| 10,401,958 B2 | 9/2019 | Peana et al. |
| 10,424,124 B2 | 9/2019 | Takahashi |
| 10,448,189 B2 | 10/2019 | Link |
| 10,484,641 B2 | 11/2019 | Zhou et al. |
| 10,488,941 B2 | 11/2019 | Lam et al. |
| 10,499,044 B1 | 12/2019 | Giokaris et al. |
| 10,534,439 B2 | 1/2020 | Raffa et al. |
| 10,540,005 B2 | 1/2020 | Yoon et al. |
| 10,545,584 B2 | 1/2020 | Tome et al. |
| 10,564,714 B2 | 2/2020 | Marggraff et al. |
| 10,565,448 B2 | 2/2020 | Bell et al. |
| 10,565,761 B2 | 2/2020 | Deluca et al. |
| 10,573,067 B1 | 2/2020 | Naik et al. |
| 10,630,803 B2 | 4/2020 | Hwang et al. |

(56) References Cited

U.S. PATENT DOCUMENTS

| | | |
|---|---|---|
| 10,642,368 B2 | 5/2020 | Chen |
| 10,645,332 B2 | 5/2020 | Zhang |
| 10,664,043 B2 | 5/2020 | Ikuta et al. |
| 10,664,048 B2 | 5/2020 | Cieplinski et al. |
| 10,664,050 B2 | 5/2020 | Alcaide et al. |
| 10,671,241 B1 | 6/2020 | Jia et al. |
| 10,671,243 B2 | 6/2020 | Ryu et al. |
| 10,678,403 B2 | 6/2020 | Duarte et al. |
| 10,691,216 B2 | 6/2020 | Geisner et al. |
| 10,698,562 B1 | 6/2020 | Zhou et al. |
| 10,699,488 B1 | 6/2020 | Terrano |
| 10,708,965 B1 | 7/2020 | Subramanian et al. |
| 10,712,900 B2 | 7/2020 | Osman et al. |
| 10,732,721 B1 | 8/2020 | Clements |
| 10,754,434 B2 | 8/2020 | Hall et al. |
| 10,762,716 B1 | 9/2020 | Paul et al. |
| 10,768,421 B1 | 9/2020 | Rosenberg et al. |
| 10,768,693 B2 | 9/2020 | Powderly et al. |
| 10,776,933 B2 | 9/2020 | Faulkner |
| 10,846,864 B2 | 11/2020 | Kim et al. |
| 10,861,242 B2 | 12/2020 | Lacey et al. |
| 10,877,645 B2 | 12/2020 | Lee et al. |
| 10,885,701 B1 | 1/2021 | Patel |
| 10,890,967 B2 | 1/2021 | Stellmach et al. |
| 10,922,744 B1 | 2/2021 | Mahajan |
| 10,929,099 B2 | 2/2021 | Querze et al. |
| 10,936,148 B1 | 3/2021 | Merkl et al. |
| 10,956,724 B1 | 3/2021 | Terrano |
| 10,983,663 B2 | 4/2021 | Iglesias |
| 11,003,308 B1 | 5/2021 | Dryer et al. |
| 11,017,611 B1 | 5/2021 | Mount et al. |
| 11,023,035 B1 | 6/2021 | Atlas et al. |
| 11,055,920 B1 | 7/2021 | Bramwell et al. |
| 11,079,995 B1 | 8/2021 | Hulbert et al. |
| 11,082,463 B2 | 8/2021 | Felman |
| 11,095,857 B1 | 8/2021 | Krol et al. |
| 11,112,875 B1 | 9/2021 | Zhou et al. |
| 11,126,850 B1 | 9/2021 | Ichim et al. |
| 11,132,840 B2 | 9/2021 | Sarangdhar et al. |
| 11,138,798 B2 | 10/2021 | Paul et al. |
| 11,146,909 B1 | 10/2021 | Pinto et al. |
| 11,175,791 B1 | 11/2021 | Patnaikuni et al. |
| 11,176,755 B1 | 11/2021 | Tichenor et al. |
| 11,199,898 B2 | 12/2021 | Blume et al. |
| 11,200,742 B1 | 12/2021 | Post et al. |
| 11,204,678 B1 | 12/2021 | Baker et al. |
| 11,232,643 B1 | 1/2022 | Stevens et al. |
| 11,243,734 B2 | 2/2022 | Boissière et al. |
| 11,249,556 B1 | 2/2022 | Schwarz et al. |
| 11,262,885 B1 | 3/2022 | Burckel |
| 11,266,919 B2 | 3/2022 | Bear et al. |
| 11,294,472 B2 | 4/2022 | Tang et al. |
| 11,294,475 B1 | 4/2022 | Pinchon et al. |
| 11,307,653 B2 | 4/2022 | Qian et al. |
| 11,340,756 B2 | 5/2022 | Faulkner et al. |
| 11,347,319 B2 | 5/2022 | Goel et al. |
| 11,348,300 B2 | 5/2022 | Zimmermann et al. |
| 11,379,033 B2 | 7/2022 | O'hern et al. |
| 11,380,323 B2 | 7/2022 | Shin et al. |
| 11,406,896 B1 | 8/2022 | Cheung et al. |
| 11,409,363 B2 | 8/2022 | Chen et al. |
| 11,416,080 B2 | 8/2022 | Heo et al. |
| 11,432,095 B1 | 8/2022 | Satongar et al. |
| 11,461,973 B2 | 10/2022 | Pinchon |
| 11,496,571 B2 | 11/2022 | Berliner et al. |
| 11,500,510 B2 | 11/2022 | Tokuchi et al. |
| 11,531,402 B1 | 12/2022 | Stolzenberg |
| 11,531,459 B2 | 12/2022 | Poupyrev et al. |
| 11,557,102 B2 | 1/2023 | Palangie et al. |
| 11,567,625 B2 | 1/2023 | Faulkner et al. |
| 11,573,363 B2 | 2/2023 | Zou et al. |
| 11,574,452 B2 | 2/2023 | Berliner et al. |
| 11,599,239 B2 | 3/2023 | Rockel et al. |
| 11,604,080 B2 | 3/2023 | Paoletti et al. |
| 11,615,596 B2 | 3/2023 | Faulkner et al. |
| 11,641,460 B1 | 5/2023 | Geusz et al. |
| 11,669,155 B2 | 6/2023 | Bowman et al. |
| 11,689,632 B2 | 6/2023 | Raisher et al. |
| 11,720,171 B2 | 8/2023 | Pastrana Vicente et al. |
| 11,726,577 B2 | 8/2023 | Katz |
| 11,730,226 B2 | 8/2023 | Stolarz et al. |
| 11,733,824 B2 | 8/2023 | Iskandar et al. |
| 11,743,215 B1 | 8/2023 | Murillo et al. |
| 11,762,457 B1 | 9/2023 | Ikkai et al. |
| 11,762,473 B2 | 9/2023 | Cipoletta et al. |
| 11,768,544 B2 | 9/2023 | Schwarz et al. |
| 11,842,454 B1 | 12/2023 | Lin et al. |
| 11,847,748 B2 | 12/2023 | Liu et al. |
| 11,861,056 B2 | 1/2024 | Burns et al. |
| 11,861,136 B1 | 1/2024 | Faulkner et al. |
| 11,868,582 B2 | 1/2024 | Kim et al. |
| 11,875,013 B2 | 1/2024 | Lemay et al. |
| 11,875,162 B2 | 1/2024 | Garstenauer et al. |
| 11,886,643 B2 | 1/2024 | Irie et al. |
| 11,899,845 B2 | 2/2024 | Chung et al. |
| 11,909,453 B2 | 2/2024 | Javaudin et al. |
| 11,914,759 B2 | 2/2024 | Klein et al. |
| 11,922,588 B2 | 3/2024 | Fillhardt et al. |
| 11,928,263 B2 | 3/2024 | Jung et al. |
| 11,934,569 B2 | 3/2024 | Pastrana Vicente et al. |
| 11,948,263 B1 | 4/2024 | Rudman et al. |
| 11,954,242 B2 | 4/2024 | Dascola et al. |
| 11,972,092 B2 | 4/2024 | Zurmoehle et al. |
| 11,983,326 B2 | 5/2024 | Lacey |
| 11,988,832 B2 | 5/2024 | Singh et al. |
| 11,989,965 B2 | 5/2024 | Tarighat Mehrabani |
| 12,020,387 B2 | 6/2024 | Maharaja |
| 12,032,803 B2 | 7/2024 | Pastrana Vicente et al. |
| 12,099,653 B2 | 9/2024 | Chawda et al. |
| 12,099,695 B1 | 9/2024 | Smith et al. |
| 12,112,011 B2 | 10/2024 | Smith et al. |
| 12,113,948 B1 | 10/2024 | Smith et al. |
| 12,118,200 B1 | 10/2024 | Shutzberg et al. |
| 12,154,236 B1 | 11/2024 | Herman et al. |
| 12,182,325 B2 | 12/2024 | Calderone et al. |
| 12,236,546 B1 | 2/2025 | Lipton |
| 12,254,127 B2 | 3/2025 | Burns et al. |
| 12,321,515 B2 | 6/2025 | Calderone et al. |
| 12,394,167 B1 | 8/2025 | Scully et al. |
| 12,408,804 B2 | 9/2025 | Schneider et al. |
| 2001/0047250 A1 | 11/2001 | Schuller et al. |
| 2002/0015024 A1 | 2/2002 | Westerman et al. |
| 2002/0030692 A1 | 3/2002 | Griesert |
| 2002/0044152 A1 | 4/2002 | Abbott et al. |
| 2002/0065778 A1 | 5/2002 | Bouet et al. |
| 2003/0038754 A1 | 2/2003 | Goldstein et al. |
| 2003/0151611 A1 | 8/2003 | Turpin et al. |
| 2003/0222924 A1 | 12/2003 | Baron |
| 2004/0059784 A1 | 3/2004 | Caughey |
| 2004/0104806 A1 | 6/2004 | Yui et al. |
| 2004/0230912 A1 | 11/2004 | Clow et al. |
| 2004/0243926 A1 | 12/2004 | Trenbeath et al. |
| 2005/0044510 A1 | 2/2005 | Yi |
| 2005/0062738 A1 | 3/2005 | Handley et al. |
| 2005/0100210 A1 | 5/2005 | Rice et al. |
| 2005/0138572 A1 | 6/2005 | Good et al. |
| 2005/0144570 A1 | 6/2005 | Loverin et al. |
| 2005/0144571 A1 | 6/2005 | Loverin et al. |
| 2005/0175218 A1 | 8/2005 | Vertegaal et al. |
| 2005/0190059 A1 | 9/2005 | Wehrenberg |
| 2005/0198143 A1 | 9/2005 | Moody et al. |
| 2005/0216866 A1 | 9/2005 | Rosen et al. |
| 2005/0231532 A1 | 10/2005 | Suzuki et al. |
| 2005/0248299 A1 | 11/2005 | Chemel et al. |
| 2006/0017692 A1 | 1/2006 | Wehrenberg et al. |
| 2006/0028400 A1 | 2/2006 | Lapstun et al. |
| 2006/0033724 A1 | 2/2006 | Chaudhri et al. |
| 2006/0034590 A1 | 2/2006 | Teramoto |
| 2006/0080702 A1 | 4/2006 | Diez et al. |
| 2006/0156228 A1 | 7/2006 | Gallo et al. |
| 2006/0197753 A1 | 9/2006 | Hotelling |
| 2006/0256083 A1 | 11/2006 | Rosenberg |
| 2006/0283214 A1 | 12/2006 | Donadon et al. |
| 2007/0172112 A1 | 7/2007 | Paley et al. |

(56) References Cited

U.S. PATENT DOCUMENTS

| | | |
|---|---|---|
| 2007/0259716 A1 | 11/2007 | Mattice et al. |
| 2008/0132249 A1 | 6/2008 | Hamilton |
| 2008/0181502 A1 | 7/2008 | Yang |
| 2008/0186255 A1 | 8/2008 | Cohen et al. |
| 2008/0211771 A1 | 9/2008 | Richardson |
| 2008/0222710 A1 | 9/2008 | Blagsvedt et al. |
| 2008/0310707 A1 | 12/2008 | Kansal et al. |
| 2009/0037844 A1 | 2/2009 | Kim et al. |
| 2009/0049408 A1 | 2/2009 | Naaman et al. |
| 2009/0064035 A1 | 3/2009 | Shibata et al. |
| 2009/0146779 A1 | 6/2009 | Kumar et al. |
| 2009/0146961 A1 | 6/2009 | Cheung et al. |
| 2009/0231356 A1 | 9/2009 | Barnes et al. |
| 2009/0254843 A1 | 10/2009 | Van et al. |
| 2009/0319181 A1 | 12/2009 | Khosravy et al. |
| 2009/0326810 A1 | 12/2009 | Callaghan et al. |
| 2010/0097375 A1 | 4/2010 | Tadaishi et al. |
| 2010/0115459 A1 | 5/2010 | Kinnunen et al. |
| 2010/0177049 A1 | 7/2010 | Levy et al. |
| 2010/0185949 A1 | 7/2010 | Jaeger |
| 2010/0188503 A1 | 7/2010 | Tsai et al. |
| 2010/0188572 A1 | 7/2010 | Card |
| 2010/0269145 A1 | 10/2010 | Ingrassia et al. |
| 2010/0293504 A1 | 11/2010 | Hachiya |
| 2010/0302245 A1 | 12/2010 | Best |
| 2010/0328432 A1 | 12/2010 | Tanaka |
| 2010/0332196 A1 | 12/2010 | Fisker et al. |
| 2011/0018895 A1 | 1/2011 | Buzyn et al. |
| 2011/0018896 A1 | 1/2011 | Buzyn et al. |
| 2011/0029185 A1 | 2/2011 | Aoki et al. |
| 2011/0032365 A1 | 2/2011 | Yett |
| 2011/0066981 A1 | 3/2011 | Chmielewski et al. |
| 2011/0098029 A1 | 4/2011 | Rhoads et al. |
| 2011/0142321 A1 | 6/2011 | Huffman |
| 2011/0156879 A1 | 6/2011 | Matsushita et al. |
| 2011/0164163 A1 | 7/2011 | Bilbrey et al. |
| 2011/0169927 A1 | 7/2011 | Mages et al. |
| 2011/0175932 A1 | 7/2011 | Yu et al. |
| 2011/0216060 A1 | 9/2011 | Weising et al. |
| 2011/0243448 A1 | 10/2011 | Kawabuchi et al. |
| 2011/0254865 A1 | 10/2011 | Yee et al. |
| 2011/0289691 A1 | 12/2011 | Laflèche et al. |
| 2011/0304557 A1 | 12/2011 | Wilburn et al. |
| 2011/0310001 A1 | 12/2011 | Madau et al. |
| 2011/0320969 A1 | 12/2011 | Hwang et al. |
| 2012/0038751 A1 | 2/2012 | Yuan et al. |
| 2012/0066638 A1 | 3/2012 | Ohri |
| 2012/0075496 A1 | 3/2012 | Akifusa et al. |
| 2012/0086624 A1 | 4/2012 | Thompson et al. |
| 2012/0124525 A1 | 5/2012 | Kang |
| 2012/0131631 A1 | 5/2012 | Bhogal et al. |
| 2012/0170089 A1 | 7/2012 | Kim et al. |
| 2012/0170840 A1 | 7/2012 | Caruso et al. |
| 2012/0184372 A1 | 7/2012 | Laarakkers et al. |
| 2012/0194547 A1 | 8/2012 | Johnson et al. |
| 2012/0223885 A1 | 9/2012 | Perez |
| 2012/0249416 A1 | 10/2012 | Maciocci et al. |
| 2012/0249741 A1 | 10/2012 | Maciocci et al. |
| 2012/0256956 A1 | 10/2012 | Kasahara |
| 2012/0256967 A1 | 10/2012 | Baldwin et al. |
| 2012/0257035 A1 | 10/2012 | Larsen |
| 2012/0272179 A1 | 10/2012 | Stafford |
| 2012/0304087 A1 | 11/2012 | Walkin et al. |
| 2013/0010062 A1 | 1/2013 | Redmann |
| 2013/0027860 A1 | 1/2013 | Masaki et al. |
| 2013/0088516 A1 | 4/2013 | Ota et al. |
| 2013/0093727 A1 | 4/2013 | Eriksson et al. |
| 2013/0127850 A1 | 5/2013 | Bindon |
| 2013/0147820 A1 | 6/2013 | Kalai et al. |
| 2013/0148850 A1 | 6/2013 | Matsuda et al. |
| 2013/0169533 A1 | 7/2013 | Jahnke |
| 2013/0190044 A1 | 7/2013 | Kulas |
| 2013/0191160 A1 | 7/2013 | Oran |
| 2013/0207963 A1 | 8/2013 | Stirbu et al. |
| 2013/0211843 A1 | 8/2013 | Clarkson |
| 2013/0212470 A1 | 8/2013 | Karunamuni et al. |
| 2013/0222227 A1 | 8/2013 | Johansson et al. |
| 2013/0229345 A1 | 9/2013 | Day et al. |
| 2013/0232430 A1 | 9/2013 | Reitan |
| 2013/0246955 A1 | 9/2013 | Schwesig et al. |
| 2013/0249922 A1 | 9/2013 | Hachiya |
| 2013/0263016 A1 | 10/2013 | Lehtiniemi et al. |
| 2013/0265227 A1 | 10/2013 | Julian |
| 2013/0271397 A1 | 10/2013 | Hildreth et al. |
| 2013/0278501 A1 | 10/2013 | Bulzacki |
| 2013/0286004 A1 | 10/2013 | Mcculloch et al. |
| 2013/0293456 A1 | 11/2013 | Son et al. |
| 2013/0300648 A1 | 11/2013 | Kim et al. |
| 2013/0300654 A1 | 11/2013 | Seki |
| 2013/0307945 A1 | 11/2013 | Cheng et al. |
| 2013/0321462 A1 | 12/2013 | Salter et al. |
| 2013/0325326 A1 | 12/2013 | Blumenberg et al. |
| 2013/0326341 A1 | 12/2013 | Nonaka |
| 2013/0326364 A1 | 12/2013 | Latta et al. |
| 2013/0328925 A1 | 12/2013 | Latta et al. |
| 2013/0332890 A1 | 12/2013 | Ramic et al. |
| 2013/0342564 A1 | 12/2013 | Kinnebrew et al. |
| 2013/0342570 A1 | 12/2013 | Kinnebrew et al. |
| 2013/0345975 A1 | 12/2013 | Vulcano et al. |
| 2014/0002338 A1 | 1/2014 | Raffa et al. |
| 2014/0002444 A1 | 1/2014 | Bennett et al. |
| 2014/0028548 A1 | 1/2014 | Bychkov et al. |
| 2014/0040832 A1 | 2/2014 | Regelous |
| 2014/0049462 A1 | 2/2014 | Weinberger et al. |
| 2014/0063058 A1 | 3/2014 | Fialho et al. |
| 2014/0068692 A1 | 3/2014 | Archibong et al. |
| 2014/0071241 A1 | 3/2014 | Yang et al. |
| 2014/0075361 A1 | 3/2014 | Reynolds et al. |
| 2014/0078176 A1 | 3/2014 | Kim et al. |
| 2014/0092018 A1 | 4/2014 | Geithner |
| 2014/0104206 A1 | 4/2014 | Anderson |
| 2014/0108942 A1 | 4/2014 | Freeman et al. |
| 2014/0125584 A1 | 5/2014 | Xun et al. |
| 2014/0126782 A1 | 5/2014 | Takai et al. |
| 2014/0129990 A1 | 5/2014 | Xin et al. |
| 2014/0132499 A1 | 5/2014 | Schwesinger et al. |
| 2014/0132633 A1 | 5/2014 | Fekete et al. |
| 2014/0139426 A1 | 5/2014 | Kryze et al. |
| 2014/0164928 A1 | 6/2014 | Kim |
| 2014/0168453 A1 | 6/2014 | Shoemake et al. |
| 2014/0181683 A1 | 6/2014 | Lim et al. |
| 2014/0198017 A1 | 7/2014 | Lamb et al. |
| 2014/0232639 A1 | 8/2014 | Hayashi et al. |
| 2014/0237366 A1 | 8/2014 | Poulos et al. |
| 2014/0247210 A1 | 9/2014 | Henderek et al. |
| 2014/0258942 A1 | 9/2014 | Kutliroff et al. |
| 2014/0267046 A1 | 9/2014 | Ellsworth et al. |
| 2014/0267400 A1 | 9/2014 | Mabbutt et al. |
| 2014/0268054 A1 | 9/2014 | Olsson et al. |
| 2014/0282272 A1 | 9/2014 | Kies et al. |
| 2014/0285641 A1 | 9/2014 | Kato et al. |
| 2014/0298273 A1 | 10/2014 | Blackstone et al. |
| 2014/0304612 A1 | 10/2014 | Collin |
| 2014/0320404 A1 | 10/2014 | Kasahara |
| 2014/0331187 A1* | 11/2014 | Hicks .................. G06F 3/0488 715/845 |
| 2014/0333666 A1 | 11/2014 | Poulos et al. |
| 2014/0347391 A1 | 11/2014 | Keane et al. |
| 2014/0351727 A1 | 11/2014 | Danton et al. |
| 2014/0351753 A1 | 11/2014 | Shin et al. |
| 2014/0362111 A1 | 12/2014 | Kim |
| 2014/0363074 A1 | 12/2014 | Dolfing et al. |
| 2014/0368537 A1 | 12/2014 | Salter et al. |
| 2014/0368620 A1 | 12/2014 | Li et al. |
| 2014/0372957 A1 | 12/2014 | Keane et al. |
| 2014/0375683 A1 | 12/2014 | Salter et al. |
| 2015/0009118 A1 | 1/2015 | Thomas et al. |
| 2015/0035822 A1 | 2/2015 | Arsan et al. |
| 2015/0058718 A1 | 2/2015 | Kim et al. |
| 2015/0067580 A1 | 3/2015 | Um et al. |
| 2015/0077335 A1 | 3/2015 | Taguchi et al. |
| 2015/0082180 A1 | 3/2015 | Ames et al. |
| 2015/0095844 A1 | 4/2015 | Cho et al. |
| 2015/0121466 A1 | 4/2015 | Brands et al. |

(56) References Cited

U.S. PATENT DOCUMENTS

| | | |
|---|---|---|
| 2015/0123890 A1 | 5/2015 | Kapur et al. |
| 2015/0123901 A1 | 5/2015 | Schwesinger et al. |
| 2015/0128075 A1 | 5/2015 | Kempinski |
| 2015/0131850 A1 | 5/2015 | Qvarfordt |
| 2015/0135108 A1 | 5/2015 | Pope et al. |
| 2015/0145887 A1 | 5/2015 | Forutanpour et al. |
| 2015/0149961 A1 | 5/2015 | Karakotsios |
| 2015/0153833 A1 | 6/2015 | Pinault et al. |
| 2015/0177937 A1 | 6/2015 | Poletto et al. |
| 2015/0193982 A1 | 7/2015 | Mihelich et al. |
| 2015/0199081 A1 | 7/2015 | Wheeler |
| 2015/0205106 A1 | 7/2015 | Norden |
| 2015/0212576 A1 | 7/2015 | Ambrus et al. |
| 2015/0220152 A1 | 8/2015 | Tait et al. |
| 2015/0221132 A1 | 8/2015 | Kruglick |
| 2015/0242095 A1 | 8/2015 | Sonnenberg |
| 2015/0253957 A1 | 9/2015 | Crocker |
| 2015/0254905 A1 | 9/2015 | Ramsby et al. |
| 2015/0262428 A1 | 9/2015 | Tatzgern et al. |
| 2015/0312561 A1 | 10/2015 | Hoof et al. |
| 2015/0317831 A1 | 11/2015 | Ebstyne et al. |
| 2015/0317832 A1 | 11/2015 | Ebstyne et al. |
| 2015/0331240 A1 | 11/2015 | Poulos et al. |
| 2015/0331576 A1 | 11/2015 | Piya et al. |
| 2015/0332091 A1 | 11/2015 | Kim et al. |
| 2015/0370323 A1 | 12/2015 | Cieplinski et al. |
| 2015/0370404 A1 | 12/2015 | Hu et al. |
| 2015/0381974 A1 | 12/2015 | Hoffman et al. |
| 2016/0015470 A1 | 1/2016 | Border |
| 2016/0018898 A1 | 1/2016 | Tu et al. |
| 2016/0018900 A1 | 1/2016 | Tu et al. |
| 2016/0025971 A1 | 1/2016 | Crow et al. |
| 2016/0026242 A1 | 1/2016 | Burns et al. |
| 2016/0026243 A1 | 1/2016 | Bertram et al. |
| 2016/0026253 A1 | 1/2016 | Bradski et al. |
| 2016/0028961 A1 | 1/2016 | Thurairatnam |
| 2016/0050642 A1 | 2/2016 | Brown et al. |
| 2016/0062636 A1 | 3/2016 | Jung et al. |
| 2016/0085301 A1 | 3/2016 | Lopez |
| 2016/0093108 A1 | 3/2016 | Mao et al. |
| 2016/0098093 A1 | 4/2016 | Cheon et al. |
| 2016/0098094 A1 | 4/2016 | Minkkinen |
| 2016/0098972 A1 | 4/2016 | Feit et al. |
| 2016/0127690 A1 | 5/2016 | Kaehler et al. |
| 2016/0133044 A1 | 5/2016 | Lynch |
| 2016/0133052 A1 | 5/2016 | Choi et al. |
| 2016/0171304 A1 | 6/2016 | Golding et al. |
| 2016/0179191 A1 | 6/2016 | Kim et al. |
| 2016/0179336 A1 | 6/2016 | Ambrus et al. |
| 2016/0189426 A1 | 6/2016 | Thomas et al. |
| 2016/0196692 A1 | 7/2016 | Kjallstrom et al. |
| 2016/0210784 A1 | 7/2016 | Ramsby et al. |
| 2016/0216768 A1 | 7/2016 | Goetz et al. |
| 2016/0224122 A1 | 8/2016 | Dietz et al. |
| 2016/0225012 A1 | 8/2016 | Ha et al. |
| 2016/0225164 A1 | 8/2016 | Tomlin et al. |
| 2016/0227267 A1 | 8/2016 | Tsurutani et al. |
| 2016/0253063 A1 | 9/2016 | Critchlow |
| 2016/0253821 A1 | 9/2016 | Romano et al. |
| 2016/0275702 A1 | 9/2016 | Reynolds et al. |
| 2016/0291922 A1 | 10/2016 | Montgomerie et al. |
| 2016/0306434 A1 | 10/2016 | Ferrin |
| 2016/0313890 A1 | 10/2016 | Walline et al. |
| 2016/0334940 A1 | 11/2016 | Kandadai et al. |
| 2016/0349063 A1 | 12/2016 | Maurer et al. |
| 2016/0350973 A1 | 12/2016 | Shapira et al. |
| 2016/0357266 A1 | 12/2016 | Patel et al. |
| 2016/0363774 A1 | 12/2016 | Kawasima |
| 2016/0370858 A1 | 12/2016 | Leppänen et al. |
| 2016/0373647 A1 | 12/2016 | García Morate et al. |
| 2016/0373714 A1 | 12/2016 | Lee et al. |
| 2016/0379409 A1 | 12/2016 | Gavriliuc et al. |
| 2017/0032568 A1 | 2/2017 | Gharpure et al. |
| 2017/0038829 A1 | 2/2017 | Lanier et al. |
| 2017/0038837 A1 | 2/2017 | Faaborg et al. |
| 2017/0038849 A1 | 2/2017 | Hwang |
| 2017/0039770 A1 | 2/2017 | Lanier et al. |
| 2017/0052393 A1 | 2/2017 | Kweon |
| 2017/0052595 A1 | 2/2017 | Poulos et al. |
| 2017/0053383 A1 | 2/2017 | Heo |
| 2017/0060230 A1 | 3/2017 | Faaborg et al. |
| 2017/0061694 A1 | 3/2017 | Giraldi et al. |
| 2017/0090566 A1 | 3/2017 | George-Svahn et al. |
| 2017/0109930 A1 | 4/2017 | Holzer et al. |
| 2017/0115728 A1 | 4/2017 | Park et al. |
| 2017/0123487 A1 | 5/2017 | Hazra et al. |
| 2017/0131964 A1 | 5/2017 | Baek et al. |
| 2017/0132694 A1 | 5/2017 | Damy |
| 2017/0132822 A1 | 5/2017 | Marschke et al. |
| 2017/0147180 A1 | 5/2017 | Yoon et al. |
| 2017/0153866 A1 | 6/2017 | Grinberg et al. |
| 2017/0154326 A1 | 6/2017 | Jo et al. |
| 2017/0162177 A1 | 6/2017 | Lebeck et al. |
| 2017/0169616 A1 | 6/2017 | Wiley et al. |
| 2017/0178392 A1 | 6/2017 | Zuccarino et al. |
| 2017/0206691 A1 | 7/2017 | Harrises et al. |
| 2017/0206692 A1 | 7/2017 | Sheaffer et al. |
| 2017/0212583 A1 | 7/2017 | Krasadakis |
| 2017/0213388 A1 | 7/2017 | Margolis et al. |
| 2017/0214782 A1 | 7/2017 | Brinda |
| 2017/0221264 A1 | 8/2017 | Perry |
| 2017/0228130 A1 | 8/2017 | Palmaro |
| 2017/0236332 A1 | 8/2017 | Kipman et al. |
| 2017/0243352 A1 | 8/2017 | Kutliroff et al. |
| 2017/0251143 A1 | 8/2017 | Peruch et al. |
| 2017/0256096 A1 | 9/2017 | Faaborg et al. |
| 2017/0270715 A1 | 9/2017 | Lindsay et al. |
| 2017/0285737 A1 | 10/2017 | Khalid et al. |
| 2017/0287215 A1 | 10/2017 | Lalonde et al. |
| 2017/0302903 A1 | 10/2017 | Ng et al. |
| 2017/0308163 A1 | 10/2017 | Cieplinski et al. |
| 2017/0315715 A1 | 11/2017 | Fujita et al. |
| 2017/0326457 A1 | 11/2017 | Tilton et al. |
| 2017/0344223 A1 | 11/2017 | Holzer et al. |
| 2017/0351094 A1 | 12/2017 | Poulos et al. |
| 2017/0357389 A1 | 12/2017 | Fleizach et al. |
| 2017/0358141 A1 | 12/2017 | Stafford et al. |
| 2017/0364198 A1 | 12/2017 | Yoganandan et al. |
| 2018/0005433 A1 | 1/2018 | Kohler et al. |
| 2018/0045963 A1 | 2/2018 | Hoover et al. |
| 2018/0046363 A1 | 2/2018 | Miller et al. |
| 2018/0075658 A1 | 3/2018 | Lanier et al. |
| 2018/0077383 A1 | 3/2018 | Akao et al. |
| 2018/0081519 A1 | 3/2018 | Kim |
| 2018/0084287 A1 | 3/2018 | Shimura |
| 2018/0088787 A1 | 3/2018 | Bereza et al. |
| 2018/0095542 A1 | 4/2018 | Mallinson |
| 2018/0095634 A1 | 4/2018 | Alexander |
| 2018/0095636 A1 | 4/2018 | Valdivia et al. |
| 2018/0101223 A1 | 4/2018 | Ishihara et al. |
| 2018/0103209 A1 | 4/2018 | Fischler et al. |
| 2018/0114364 A1 | 4/2018 | Mcphee et al. |
| 2018/0120944 A1 | 5/2018 | Wang et al. |
| 2018/0122043 A1 | 5/2018 | Energin et al. |
| 2018/0122138 A1 | 5/2018 | Piya et al. |
| 2018/0130255 A1 | 5/2018 | Hazeghi et al. |
| 2018/0136815 A1 | 5/2018 | Tomizuka et al. |
| 2018/0143693 A1 | 5/2018 | Calabrese et al. |
| 2018/0150204 A1 | 5/2018 | Macgillivray |
| 2018/0150997 A1 | 5/2018 | Austin |
| 2018/0157332 A1 | 6/2018 | Nie |
| 2018/0158222 A1 | 6/2018 | Hayashi |
| 2018/0165853 A1 | 6/2018 | Inagi et al. |
| 2018/0173404 A1 | 6/2018 | Smith |
| 2018/0181199 A1 | 6/2018 | Harvey et al. |
| 2018/0181272 A1 | 6/2018 | Olsson et al. |
| 2018/0183986 A1 | 6/2018 | Smith et al. |
| 2018/0188048 A1 | 7/2018 | Ding et al. |
| 2018/0188802 A1 | 7/2018 | Okumura |
| 2018/0190003 A1 | 7/2018 | Upadhyay et al. |
| 2018/0197336 A1 | 7/2018 | Rochford et al. |
| 2018/0197341 A1 | 7/2018 | Loberg et al. |
| 2018/0210628 A1 | 7/2018 | Mcphee et al. |
| 2018/0218214 A1 | 8/2018 | Pestun et al. |

(56) References Cited

U.S. PATENT DOCUMENTS

| | | |
|---|---|---|
| 2018/0220195 A1 | 8/2018 | Panchaksharaiah et al. |
| 2018/0239144 A1 | 8/2018 | Woods et al. |
| 2018/0247449 A1 | 8/2018 | Park et al. |
| 2018/0275753 A1 | 9/2018 | Publicover et al. |
| 2018/0286126 A1 | 10/2018 | Schwarz et al. |
| 2018/0300023 A1 | 10/2018 | Hein |
| 2018/0300952 A1 | 10/2018 | Evans et al. |
| 2018/0302687 A1 | 10/2018 | Bhattacharjee et al. |
| 2018/0315248 A1 | 11/2018 | Bastov et al. |
| 2018/0322701 A1 | 11/2018 | Pahud et al. |
| 2018/0330544 A1 | 11/2018 | Corso et al. |
| 2018/0330550 A1 | 11/2018 | Takahashi |
| 2018/0348010 A1 | 12/2018 | Coleman et al. |
| 2018/0348861 A1 | 12/2018 | Uscinski et al. |
| 2018/0348986 A1 | 12/2018 | Sawaki |
| 2018/0350099 A1 | 12/2018 | Yerkes et al. |
| 2018/0350119 A1 | 12/2018 | Kocharlakota et al. |
| 2018/0352374 A1 | 12/2018 | Ball et al. |
| 2019/0005055 A1 | 1/2019 | Andrew et al. |
| 2019/0018479 A1 | 1/2019 | Minami |
| 2019/0018498 A1 | 1/2019 | West et al. |
| 2019/0034076 A1 | 1/2019 | Vinayak et al. |
| 2019/0043259 A1 | 2/2019 | Wang et al. |
| 2019/0050062 A1 | 2/2019 | Chen et al. |
| 2019/0056785 A1 | 2/2019 | Suk |
| 2019/0065027 A1 | 2/2019 | Hauenstein et al. |
| 2019/0073109 A1 | 3/2019 | Zhang et al. |
| 2019/0080572 A1 | 3/2019 | Kim et al. |
| 2019/0088149 A1 | 3/2019 | Fink et al. |
| 2019/0094963 A1 | 3/2019 | Nijs |
| 2019/0094979 A1 | 3/2019 | Hall et al. |
| 2019/0096134 A1 | 3/2019 | Amacker et al. |
| 2019/0101991 A1 | 4/2019 | Brennan |
| 2019/0102953 A1 | 4/2019 | Lindsay et al. |
| 2019/0130622 A1 | 5/2019 | Hoover et al. |
| 2019/0130633 A1 | 5/2019 | Haddad et al. |
| 2019/0138183 A1 | 5/2019 | Rosas et al. |
| 2019/0146128 A1 | 5/2019 | Cao et al. |
| 2019/0155495 A1 | 5/2019 | Klein et al. |
| 2019/0164340 A1 | 5/2019 | Pejic et al. |
| 2019/0172261 A1 | 6/2019 | Alt et al. |
| 2019/0172262 A1 | 6/2019 | Mchugh et al. |
| 2019/0180504 A1 | 6/2019 | Pomerantz et al. |
| 2019/0188895 A1 | 6/2019 | Miller et al. |
| 2019/0188918 A1 | 6/2019 | Brewer et al. |
| 2019/0204906 A1 | 7/2019 | Ross et al. |
| 2019/0212827 A1 | 7/2019 | Kin et al. |
| 2019/0213389 A1 | 7/2019 | Peruch et al. |
| 2019/0227763 A1 | 7/2019 | Kaufthal |
| 2019/0228503 A1 | 7/2019 | Tokuchi |
| 2019/0228589 A1 | 7/2019 | Dascola et al. |
| 2019/0238818 A1 | 8/2019 | Held et al. |
| 2019/0244434 A1 | 8/2019 | Pahud et al. |
| 2019/0251884 A1 | 8/2019 | Burns et al. |
| 2019/0258365 A1 | 8/2019 | Zurmoehle et al. |
| 2019/0265828 A1 | 8/2019 | Hauenstein et al. |
| 2019/0266774 A1 | 8/2019 | Sommerlade et al. |
| 2019/0277651 A1 | 9/2019 | Ruikar |
| 2019/0278432 A1 | 9/2019 | Bennett et al. |
| 2019/0279407 A1 | 9/2019 | Mchugh et al. |
| 2019/0287307 A1 | 9/2019 | Rogers et al. |
| 2019/0294312 A1 | 9/2019 | Rohrbacher |
| 2019/0302977 A1 | 10/2019 | Pendergast et al. |
| 2019/0310757 A1 | 10/2019 | Lee et al. |
| 2019/0311547 A1 | 10/2019 | Ohmori |
| 2019/0324529 A1 | 10/2019 | Stellmach et al. |
| 2019/0325654 A1 | 10/2019 | Stisser et al. |
| 2019/0332244 A1 | 10/2019 | Beszteri et al. |
| 2019/0332250 A1 | 10/2019 | Lee et al. |
| 2019/0339770 A1 | 11/2019 | Kurlethimar et al. |
| 2019/0340816 A1 | 11/2019 | Rogers |
| 2019/0340832 A1 | 11/2019 | Srinivasan et al. |
| 2019/0346678 A1 | 11/2019 | Nocham |
| 2019/0346922 A1 | 11/2019 | Young et al. |
| 2019/0349575 A1 | 11/2019 | Knepper et al. |
| 2019/0354259 A1 | 11/2019 | Park |
| 2019/0361521 A1 | 11/2019 | Stellmach et al. |
| 2019/0362557 A1 | 11/2019 | Lacey et al. |
| 2019/0362560 A1 | 11/2019 | Choi et al. |
| 2019/0369569 A1 | 12/2019 | Olsen et al. |
| 2019/0370492 A1 | 12/2019 | Falchuk et al. |
| 2019/0371072 A1 | 12/2019 | Lindberg et al. |
| 2019/0377487 A1* | 12/2019 | Bailey .................. G06F 1/163 |
| 2019/0379765 A1 | 12/2019 | Fajt et al. |
| 2019/0384406 A1 | 12/2019 | Smith et al. |
| 2019/0392830 A1 | 12/2019 | Abdollahian |
| 2020/0004401 A1 | 1/2020 | Hwang et al. |
| 2020/0005539 A1 | 1/2020 | Hwang et al. |
| 2020/0012341 A1 | 1/2020 | Stellmach et al. |
| 2020/0020157 A1 | 1/2020 | Powers et al. |
| 2020/0026349 A1 | 1/2020 | Fontanel et al. |
| 2020/0026922 A1 | 1/2020 | Pekelny et al. |
| 2020/0038120 A1 | 2/2020 | Ziraknejad et al. |
| 2020/0043243 A1 | 2/2020 | Bhushan et al. |
| 2020/0045249 A1 | 2/2020 | Francois et al. |
| 2020/0048825 A1 | 2/2020 | Schultz et al. |
| 2020/0051527 A1 | 2/2020 | Ngo |
| 2020/0073521 A1 | 3/2020 | Peebler et al. |
| 2020/0081526 A1 | 3/2020 | Walker et al. |
| 2020/0082602 A1 | 3/2020 | Jones |
| 2020/0089314 A1 | 3/2020 | Poupyrev et al. |
| 2020/0092537 A1 | 3/2020 | Sutter et al. |
| 2020/0097077 A1 | 3/2020 | Nguyen et al. |
| 2020/0098140 A1 | 3/2020 | Jagnow et al. |
| 2020/0098173 A1 | 3/2020 | Mccall |
| 2020/0099989 A1 | 3/2020 | Niemirska et al. |
| 2020/0106965 A1 | 4/2020 | Malia et al. |
| 2020/0112711 A1 | 4/2020 | Enriquez et al. |
| 2020/0117213 A1 | 4/2020 | Tian et al. |
| 2020/0128227 A1 | 4/2020 | Chavez et al. |
| 2020/0128232 A1 | 4/2020 | Hwang et al. |
| 2020/0129850 A1 | 4/2020 | Ohashi |
| 2020/0135141 A1 | 4/2020 | Day et al. |
| 2020/0159017 A1 | 5/2020 | Lin et al. |
| 2020/0201444 A1 | 6/2020 | Stoyles et al. |
| 2020/0214682 A1 | 7/2020 | Zaslavsky et al. |
| 2020/0218074 A1 | 7/2020 | Hoover et al. |
| 2020/0225735 A1 | 7/2020 | Schwarz |
| 2020/0225746 A1 | 7/2020 | Bar-zeev et al. |
| 2020/0225747 A1 | 7/2020 | Bar-zeev et al. |
| 2020/0225830 A1 | 7/2020 | Tang et al. |
| 2020/0226814 A1 | 7/2020 | Tang et al. |
| 2020/0226823 A1 | 7/2020 | Stachniak et al. |
| 2020/0242844 A1 | 7/2020 | Bae et al. |
| 2020/0257245 A1 | 8/2020 | Linville et al. |
| 2020/0257484 A1 | 8/2020 | Qian et al. |
| 2020/0267326 A1 | 8/2020 | Yim |
| 2020/0272303 A1 | 8/2020 | Jia et al. |
| 2020/0285314 A1 | 9/2020 | Cieplinski et al. |
| 2020/0286299 A1 | 9/2020 | Wang et al. |
| 2020/0318955 A1 | 10/2020 | Sharapov et al. |
| 2020/0319704 A1 | 10/2020 | Kathuria et al. |
| 2020/0328913 A1 | 10/2020 | Wyas et al. |
| 2020/0356221 A1 | 11/2020 | Behzadi et al. |
| 2020/0357184 A1 | 11/2020 | Paul et al. |
| 2020/0357374 A1 | 11/2020 | Verweij et al. |
| 2020/0363867 A1 | 11/2020 | Azimi et al. |
| 2020/0371602 A1 | 11/2020 | Kanda |
| 2020/0371673 A1 | 11/2020 | Faulkner |
| 2020/0379626 A1 | 12/2020 | Guyomard et al. |
| 2020/0387214 A1 | 12/2020 | Ravasz et al. |
| 2020/0387228 A1 | 12/2020 | Ravasz et al. |
| 2020/0387287 A1 | 12/2020 | Ravasz et al. |
| 2020/0401687 A1 | 12/2020 | Mak |
| 2020/0412862 A1 | 12/2020 | Oh et al. |
| 2021/0011556 A1 | 1/2021 | Atlas et al. |
| 2021/0019036 A1 | 1/2021 | Wang et al. |
| 2021/0034163 A1 | 2/2021 | Goel et al. |
| 2021/0034319 A1 | 2/2021 | Wang et al. |
| 2021/0049826 A1 | 2/2021 | Takahashi |
| 2021/0055789 A1 | 2/2021 | Tsai et al. |
| 2021/0056748 A1 | 2/2021 | Pritchett |
| 2021/0067418 A1 | 3/2021 | Ely et al. |
| 2021/0074062 A1 | 3/2021 | Madonna et al. |

(56) References Cited

U.S. PATENT DOCUMENTS

| | | |
|---|---|---|
| 2021/0090222 A1 | 3/2021 | Lee et al. |
| 2021/0090337 A1 | 3/2021 | Ravasz et al. |
| 2021/0090348 A1 | 3/2021 | Croxford et al. |
| 2021/0096726 A1 | 4/2021 | Faulkner et al. |
| 2021/0097766 A1 | 4/2021 | Palangie et al. |
| 2021/0102820 A1 | 4/2021 | Le et al. |
| 2021/0103333 A1 | 4/2021 | Cieplinski et al. |
| 2021/0125414 A1 | 4/2021 | Berkebile |
| 2021/0132687 A1 | 5/2021 | Luo et al. |
| 2021/0134069 A1 | 5/2021 | Sorrento |
| 2021/0134248 A1 | 5/2021 | Wan et al. |
| 2021/0142552 A1 | 5/2021 | Kimura et al. |
| 2021/0158624 A1 | 5/2021 | Moon et al. |
| 2021/0165484 A1 | 6/2021 | Suguhara et al. |
| 2021/0165923 A1 | 6/2021 | Johnston |
| 2021/0173340 A1 | 6/2021 | Kim |
| 2021/0173536 A1 | 6/2021 | Kondo |
| 2021/0225043 A1 | 7/2021 | Tang et al. |
| 2021/0227601 A1 | 7/2021 | Eom et al. |
| 2021/0241483 A1 | 8/2021 | Dryer et al. |
| 2021/0248674 A1 | 8/2021 | Ogunbunmi |
| 2021/0272367 A1 | 9/2021 | Richter |
| 2021/0272537 A1 | 9/2021 | Mak |
| 2021/0279957 A1 | 9/2021 | Eder et al. |
| 2021/0279967 A1 | 9/2021 | Gernoth et al. |
| 2021/0287439 A1 | 9/2021 | Goodrich et al. |
| 2021/0295592 A1 | 9/2021 | Von Cramon |
| 2021/0295602 A1 | 9/2021 | Scapel et al. |
| 2021/0303074 A1 | 9/2021 | Vanblon et al. |
| 2021/0303107 A1 | 9/2021 | Pla I Conesa et al. |
| 2021/0312713 A1 | 10/2021 | Peri et al. |
| 2021/0312717 A1 | 10/2021 | Mao |
| 2021/0326094 A1 | 10/2021 | Buerli et al. |
| 2021/0327140 A1 | 10/2021 | Rothkopf et al. |
| 2021/0331069 A1 | 10/2021 | Gustafson et al. |
| 2021/0333864 A1 | 10/2021 | Harvey et al. |
| 2021/0350564 A1 | 11/2021 | Peuhkurinen et al. |
| 2021/0350604 A1 | 11/2021 | Pejsa et al. |
| 2021/0350634 A1 | 11/2021 | Major et al. |
| 2021/0358294 A1 | 11/2021 | Parashar et al. |
| 2021/0366440 A1 | 11/2021 | Burns et al. |
| 2021/0368136 A1 | 11/2021 | Chalmers et al. |
| 2021/0374221 A1 | 12/2021 | Markhasin et al. |
| 2021/0375022 A1 | 12/2021 | Lee et al. |
| 2021/0383097 A1 | 12/2021 | Guerard et al. |
| 2021/0400744 A1 | 12/2021 | Chen et al. |
| 2021/0402306 A1* | 12/2021 | Huang ................ A63F 13/795 |
| 2021/0405760 A1 | 12/2021 | Schoen |
| 2022/0011577 A1 | 1/2022 | Lawver et al. |
| 2022/0011855 A1 | 1/2022 | Hazra et al. |
| 2022/0012002 A1 | 1/2022 | Bar-zeev et al. |
| 2022/0027115 A1 | 1/2022 | Haapoja et al. |
| 2022/0028108 A1 | 1/2022 | Haapoja et al. |
| 2022/0030197 A1 | 1/2022 | Ishimoto |
| 2022/0070241 A1 | 3/2022 | Yerli |
| 2022/0076496 A1 | 3/2022 | Palangie et al. |
| 2022/0083145 A1 | 3/2022 | Matsunaga et al. |
| 2022/0083197 A1 | 3/2022 | Rockel et al. |
| 2022/0084279 A1 | 3/2022 | Lindmeier et al. |
| 2022/0086203 A1 | 3/2022 | Morris et al. |
| 2022/0086205 A1 | 3/2022 | Lebeau et al. |
| 2022/0091722 A1 | 3/2022 | Faulkner et al. |
| 2022/0091723 A1 | 3/2022 | Faulkner et al. |
| 2022/0092862 A1 | 3/2022 | Faulkner et al. |
| 2022/0100265 A1 | 3/2022 | Kies et al. |
| 2022/0100270 A1 | 3/2022 | Pastrana Vicente et al. |
| 2022/0101593 A1 | 3/2022 | Rockel et al. |
| 2022/0101612 A1 | 3/2022 | Palangie et al. |
| 2022/0104910 A1 | 4/2022 | Shelton et al. |
| 2022/0121344 A1 | 4/2022 | Pastrana Vicente et al. |
| 2022/0122303 A1 | 4/2022 | Sasikumar et al. |
| 2022/0124286 A1 | 4/2022 | Punwani et al. |
| 2022/0130107 A1 | 4/2022 | Lindh |
| 2022/0130126 A1 | 4/2022 | Delgado et al. |
| 2022/0137701 A1* | 5/2022 | Bowman ................ G06F 3/013 345/156 |
| 2022/0137705 A1 | 5/2022 | Hashimoto et al. |
| 2022/0148257 A1 | 5/2022 | Boubekeur et al. |
| 2022/0155863 A1 | 5/2022 | Wang et al. |
| 2022/0155909 A1 | 5/2022 | Kawashima et al. |
| 2022/0157029 A1 | 5/2022 | Horita et al. |
| 2022/0157083 A1 | 5/2022 | Jandhyala et al. |
| 2022/0165013 A1 | 5/2022 | Velez et al. |
| 2022/0179503 A1 | 6/2022 | Timonen et al. |
| 2022/0187907 A1 | 6/2022 | Lee et al. |
| 2022/0191570 A1 | 6/2022 | Reid et al. |
| 2022/0197403 A1 | 6/2022 | Hughes et al. |
| 2022/0198755 A1* | 6/2022 | Pinchon ................ G06T 19/003 |
| 2022/0206298 A1 | 6/2022 | Goodman |
| 2022/0207840 A1 | 6/2022 | Cansizoglu et al. |
| 2022/0214743 A1 | 7/2022 | Dascola et al. |
| 2022/0221976 A1 | 7/2022 | Agarwal et al. |
| 2022/0229524 A1 | 7/2022 | Mckenzie et al. |
| 2022/0229534 A1 | 7/2022 | Terre et al. |
| 2022/0232191 A1 | 7/2022 | Kawakami et al. |
| 2022/0236801 A1 | 7/2022 | Serbanati et al. |
| 2022/0239718 A1 | 7/2022 | Song et al. |
| 2022/0244536 A1 | 8/2022 | Sha et al. |
| 2022/0245888 A1 | 8/2022 | Singh et al. |
| 2022/0253125 A1 | 8/2022 | Wallen et al. |
| 2022/0253149 A1 | 8/2022 | Berliner et al. |
| 2022/0253194 A1 | 8/2022 | Berliner et al. |
| 2022/0255995 A1 | 8/2022 | Berliner et al. |
| 2022/0276720 A1 | 9/2022 | Yasui |
| 2022/0277533 A1 | 9/2022 | Park |
| 2022/0279303 A1 | 9/2022 | Marculescu et al. |
| 2022/0287676 A1 | 9/2022 | Steines et al. |
| 2022/0291808 A1 | 9/2022 | Stevens et al. |
| 2022/0292783 A1 | 9/2022 | Jayaram et al. |
| 2022/0292784 A1 | 9/2022 | Jayaram et al. |
| 2022/0292785 A1 | 9/2022 | Jayaram et al. |
| 2022/0295032 A1 | 9/2022 | Jayaram et al. |
| 2022/0295040 A1 | 9/2022 | Jayaram et al. |
| 2022/0295139 A1 | 9/2022 | Jayaram et al. |
| 2022/0301264 A1 | 9/2022 | O'Leary et al. |
| 2022/0303680 A1 | 9/2022 | Ahmed et al. |
| 2022/0311950 A1 | 9/2022 | Ith et al. |
| 2022/0319134 A1 | 10/2022 | Rodrigues et al. |
| 2022/0326837 A1 | 10/2022 | Dessero et al. |
| 2022/0335697 A1 | 10/2022 | Harding et al. |
| 2022/0365595 A1 | 11/2022 | Cieplinski et al. |
| 2022/0365740 A1 | 11/2022 | Chang et al. |
| 2022/0374136 A1 | 11/2022 | Chang et al. |
| 2022/0382385 A1 | 12/2022 | Chen et al. |
| 2022/0383592 A1 | 12/2022 | Hare et al. |
| 2022/0391158 A1 | 12/2022 | Lemmens et al. |
| 2022/0392169 A1 | 12/2022 | Simpson et al. |
| 2022/0397962 A1 | 12/2022 | Goel et al. |
| 2022/0408164 A1 | 12/2022 | Lee et al. |
| 2022/0413691 A1 | 12/2022 | Becker et al. |
| 2022/0414975 A1 | 12/2022 | Becker et al. |
| 2022/0414999 A1 | 12/2022 | Ravasz et al. |
| 2022/0415094 A1 | 12/2022 | Kim et al. |
| 2023/0004216 A1 | 1/2023 | Rodgers et al. |
| 2023/0007335 A1 | 1/2023 | Gupta et al. |
| 2023/0008537 A1 | 1/2023 | Henderson et al. |
| 2023/0009683 A1 | 1/2023 | Biran et al. |
| 2023/0021861 A1 | 1/2023 | Fujiwara et al. |
| 2023/0027040 A1 | 1/2023 | Wang et al. |
| 2023/0030699 A1 | 2/2023 | Zion et al. |
| 2023/0031832 A1 | 2/2023 | Lipton et al. |
| 2023/0032545 A1 | 2/2023 | Mindlin et al. |
| 2023/0032771 A1 | 2/2023 | Zion et al. |
| 2023/0068660 A1 | 3/2023 | Brent et al. |
| 2023/0069764 A1 | 3/2023 | Jonker et al. |
| 2023/0074080 A1 | 3/2023 | Miller et al. |
| 2023/0076326 A1 | 3/2023 | Xu et al. |
| 2023/0092282 A1 | 3/2023 | Boesel et al. |
| 2023/0092874 A1 | 3/2023 | Krivoruchko et al. |
| 2023/0100610 A1 | 3/2023 | Pastrana Vicente et al. |
| 2023/0100689 A1 | 3/2023 | Chiu et al. |
| 2023/0103161 A1 | 3/2023 | Li et al. |
| 2023/0114080 A1 | 4/2023 | Yang et al. |

(56) References Cited

U.S. PATENT DOCUMENTS

| | | |
|---|---|---|
| 2023/0119162 A1 | 4/2023 | Lipton et al. |
| 2023/0120052 A1 | 4/2023 | Wallen et al. |
| 2023/0130520 A1 | 4/2023 | Kaptelinin |
| 2023/0133579 A1 | 5/2023 | Chang et al. |
| 2023/0152889 A1 | 5/2023 | Cieplinski et al. |
| 2023/0152935 A1 | 5/2023 | Mckenzie et al. |
| 2023/0154122 A1 | 5/2023 | Dascola et al. |
| 2023/0163987 A1 | 5/2023 | Young et al. |
| 2023/0168745 A1 | 6/2023 | Yoda |
| 2023/0168788 A1 | 6/2023 | Faulkner et al. |
| 2023/0176806 A1 | 6/2023 | Chen et al. |
| 2023/0185426 A1 | 6/2023 | Rockel et al. |
| 2023/0186577 A1 | 6/2023 | Rockel et al. |
| 2023/0206572 A1 | 6/2023 | Pazmino et al. |
| 2023/0221833 A1 | 7/2023 | Holder et al. |
| 2023/0236660 A1 | 7/2023 | Kundu |
| 2023/0244857 A1 | 8/2023 | Weiss et al. |
| 2023/0259265 A1 | 8/2023 | Krivoruchko et al. |
| 2023/0260240 A1 | 8/2023 | Jayaram et al. |
| 2023/0266859 A1 | 8/2023 | Day et al. |
| 2023/0273706 A1 | 8/2023 | Smith et al. |
| 2023/0274504 A1 | 8/2023 | Ren et al. |
| 2023/0290042 A1 | 9/2023 | Casella et al. |
| 2023/0308610 A1 | 9/2023 | Henderson et al. |
| 2023/0308630 A1 | 9/2023 | Delgado |
| 2023/0314801 A1 | 10/2023 | Bove et al. |
| 2023/0316634 A1 | 10/2023 | Chiu et al. |
| 2023/0325004 A1 | 10/2023 | Burns et al. |
| 2023/0325046 A1 | 10/2023 | De Almeida E De Vincenzo et al. |
| 2023/0333646 A1 | 10/2023 | Pastrana Vicente et al. |
| 2023/0341932 A1 | 10/2023 | Silva et al. |
| 2023/0343049 A1 | 10/2023 | Boesel et al. |
| 2023/0351702 A1 | 11/2023 | Tan et al. |
| 2023/0353398 A1 | 11/2023 | White |
| 2023/0359199 A1 | 11/2023 | Adachi et al. |
| 2023/0368475 A1 | 11/2023 | Chan et al. |
| 2023/0377259 A1 | 11/2023 | Becker et al. |
| 2023/0377268 A1 | 11/2023 | Hopkins et al. |
| 2023/0377295 A1 | 11/2023 | Angevine et al. |
| 2023/0377299 A1 | 11/2023 | Becker et al. |
| 2023/0377300 A1 | 11/2023 | Becker et al. |
| 2023/0384907 A1 | 11/2023 | Boesel et al. |
| 2023/0385532 A1 | 11/2023 | Mcveigh et al. |
| 2023/0388357 A1 | 11/2023 | Faulkner et al. |
| 2023/0394755 A1 | 12/2023 | Negoita et al. |
| 2023/0396854 A1 | 12/2023 | Sanders et al. |
| 2023/0400958 A1 | 12/2023 | Morrison et al. |
| 2024/0012530 A1 | 1/2024 | Lin et al. |
| 2024/0037886 A1 | 2/2024 | Chiu et al. |
| 2024/0062279 A1 | 2/2024 | Scully et al. |
| 2024/0070948 A1 | 2/2024 | Bradley et al. |
| 2024/0086031 A1 | 3/2024 | Palangie et al. |
| 2024/0086032 A1 | 3/2024 | Palangie et al. |
| 2024/0087256 A1 | 3/2024 | Hylak et al. |
| 2024/0094863 A1 | 3/2024 | Smith et al. |
| 2024/0094866 A1 | 3/2024 | Lemay et al. |
| 2024/0094882 A1 | 3/2024 | Brewer et al. |
| 2024/0095984 A1 | 3/2024 | Ren et al. |
| 2024/0102821 A1 | 3/2024 | Vallet et al. |
| 2024/0103613 A1 | 3/2024 | Chawda et al. |
| 2024/0103616 A1 | 3/2024 | Yerkes et al. |
| 2024/0103636 A1 | 3/2024 | Lindmeier et al. |
| 2024/0103676 A1 | 3/2024 | Pastrana Vicente et al. |
| 2024/0103681 A1 | 3/2024 | Broughton et al. |
| 2024/0103684 A1 | 3/2024 | Yu et al. |
| 2024/0103685 A1 | 3/2024 | Pazmino et al. |
| 2024/0103686 A1 | 3/2024 | Pazmino et al. |
| 2024/0103687 A1 | 3/2024 | Pastrana Vicente et al. |
| 2024/0103701 A1 | 3/2024 | Pastrana Vicente et al. |
| 2024/0103704 A1 | 3/2024 | Pastrana Vicente et al. |
| 2024/0103707 A1 | 3/2024 | Henderson et al. |
| 2024/0103716 A1 | 3/2024 | Pastrana Vicente et al. |
| 2024/0103803 A1 | 3/2024 | Krivoruchko et al. |
| 2024/0104836 A1 | 3/2024 | Dessero et al. |
| 2024/0104843 A1 | 3/2024 | Mckenzie et al. |
| 2024/0104870 A1 | 3/2024 | Fuste Lleixa et al. |
| 2024/0104873 A1 | 3/2024 | Pastrana Vicente et al. |
| 2024/0104875 A1 | 3/2024 | Couche et al. |
| 2024/0104876 A1 | 3/2024 | Couche et al. |
| 2024/0104877 A1 | 3/2024 | Henderson et al. |
| 2024/0119682 A1 | 4/2024 | Rudman et al. |
| 2024/0126362 A1 | 4/2024 | Burns et al. |
| 2024/0135612 A1 | 4/2024 | Hold-Geoffroy et al. |
| 2024/0152245 A1 | 5/2024 | Broughton et al. |
| 2024/0152256 A1 | 5/2024 | Dascola et al. |
| 2024/0185514 A1 | 6/2024 | Singh et al. |
| 2024/0192764 A1 | 6/2024 | Dascola et al. |
| 2024/0193892 A1 | 6/2024 | Lutter et al. |
| 2024/0200967 A1 | 6/2024 | Arroyo et al. |
| 2024/0203066 A1 | 6/2024 | Kawashima et al. |
| 2024/0205509 A1 | 6/2024 | Kim et al. |
| 2024/0221273 A1 | 7/2024 | Dusseau et al. |
| 2024/0221291 A1 | 7/2024 | Henderson et al. |
| 2024/0233097 A1 | 7/2024 | Ngo et al. |
| 2024/0233288 A1 | 7/2024 | Stauber et al. |
| 2024/0265656 A1 | 8/2024 | Victor-Faichney et al. |
| 2024/0272722 A1 | 8/2024 | Gitter et al. |
| 2024/0272782 A1 | 8/2024 | Pastrana Vicente et al. |
| 2024/0273838 A1 | 8/2024 | Palangie et al. |
| 2024/0281108 A1 | 8/2024 | Krivoruchko et al. |
| 2024/0281109 A1 | 8/2024 | Manjunath et al. |
| 2024/0291953 A1 | 8/2024 | Cerra et al. |
| 2024/0297919 A1 | 9/2024 | Berliner et al. |
| 2024/0310971 A1 | 9/2024 | Kawashima et al. |
| 2024/0338104 A1 | 10/2024 | Salter et al. |
| 2024/0338921 A1 | 10/2024 | Burgner et al. |
| 2024/0361832 A1 | 10/2024 | Calderone et al. |
| 2024/0361833 A1 | 10/2024 | Calderone et al. |
| 2024/0361835 A1 | 10/2024 | Hylak et al. |
| 2024/0393876 A1 | 11/2024 | Chawda et al. |
| 2024/0402800 A1 | 12/2024 | Shutzberg et al. |
| 2024/0402821 A1 | 12/2024 | Meyer et al. |
| 2024/0403080 A1 | 12/2024 | Laurita et al. |
| 2024/0404206 A1 | 12/2024 | Chiu et al. |
| 2024/0404207 A1 | 12/2024 | Laurita et al. |
| 2024/0404232 A1 | 12/2024 | Rockwell et al. |
| 2024/0404233 A1 | 12/2024 | Boesel et al. |
| 2024/0411444 A1 | 12/2024 | Shutzberg et al. |
| 2024/0420435 A1 | 12/2024 | Gitter et al. |
| 2024/0428488 A1 | 12/2024 | Ren et al. |
| 2025/0005855 A1 | 1/2025 | Holder et al. |
| 2025/0005864 A1 | 1/2025 | Dessero et al. |
| 2025/0008057 A1 | 1/2025 | Chiu et al. |
| 2025/0013343 A1 | 1/2025 | Smith et al. |
| 2025/0013344 A1 | 1/2025 | Smith et al. |
| 2025/0024008 A1 | 1/2025 | Cerra et al. |
| 2025/0028423 A1 | 1/2025 | Dessero et al. |
| 2025/0029319 A1 | 1/2025 | Boesel et al. |
| 2025/0029328 A1 | 1/2025 | Smith et al. |
| 2025/0031002 A1 | 1/2025 | Hawkins et al. |
| 2025/0036255 A1 | 1/2025 | Pastrana Vicente et al. |
| 2025/0069328 A1 | 2/2025 | Herscher et al. |
| 2025/0077060 A1 | 3/2025 | Becker et al. |
| 2025/0077066 A1 | 3/2025 | Lutter |
| 2025/0078420 A1 | 3/2025 | Dessero et al. |
| 2025/0078429 A1 | 3/2025 | Dascola et al. |
| 2025/0103132 A1 | 3/2025 | Rickwald et al. |
| 2025/0104335 A1 | 3/2025 | Huang et al. |
| 2025/0104367 A1 | 3/2025 | Huang et al. |
| 2025/0106581 A1 | 3/2025 | Lutter et al. |
| 2025/0106582 A1 | 3/2025 | Lutter et al. |
| 2025/0110605 A1 | 4/2025 | Huang et al. |
| 2025/0111472 A1 | 4/2025 | Lutter et al. |
| 2025/0111605 A1 | 4/2025 | Huang et al. |
| 2025/0111622 A1 | 4/2025 | Stern et al. |
| 2025/0111626 A1 | 4/2025 | Deliz Centeno et al. |
| 2025/0117079 A1 | 4/2025 | Chiu et al. |
| 2025/0118038 A1 | 4/2025 | Sorrentino et al. |
| 2025/0130707 A1 | 4/2025 | Stauber et al. |
| 2025/0156031 A1 | 5/2025 | Holder et al. |
| 2025/0157136 A1 | 5/2025 | Lindmeier et al. |
| 2025/0165069 A1 | 5/2025 | Calderone et al. |
| 2025/0199656 A1 | 6/2025 | Lipton et al. |

(56) References Cited

U.S. PATENT DOCUMENTS

| | | |
|---|---|---|
| 2025/0200901 A1 | 6/2025 | Ren et al. |
| 2025/0209744 A1 | 6/2025 | Piemonte et al. |
| 2025/0209753 A1 | 6/2025 | Piemonte et al. |
| 2025/0224811 A1 | 7/2025 | Lindmeier et al. |
| 2025/0232541 A1 | 7/2025 | Chand et al. |
| 2025/0258577 A1 | 8/2025 | Palangie et al. |
| 2025/0278134 A1 | 9/2025 | Pastrana Vicente et al. |
| 2025/0278166 A1 | 9/2025 | Mckenzie et al. |
| 2025/0278907 A1 | 9/2025 | Pazmino et al. |
| 2025/0284344 A1 | 9/2025 | Sundstrom et al. |

FOREIGN PATENT DOCUMENTS

| | | |
|---|---|---|
| CN | 104714771 A | 6/2015 |
| CN | 104981681 A | 10/2015 |
| CN | 105264461 A | 1/2016 |
| CN | 105264478 A | 1/2016 |
| CN | 106990838 A | 7/2017 |
| CN | 108519818 A | 9/2018 |
| CN | 108563335 A | 9/2018 |
| CN | 108633307 A | 10/2018 |
| CN | 110413171 A | 11/2019 |
| CN | 110476142 A | 11/2019 |
| CN | 110673718 A | 1/2020 |
| CN | 110830786 A | 2/2020 |
| CN | 111033572 A | 4/2020 |
| CN | 111213183 A | 5/2020 |
| CN | 111488056 A | 8/2020 |
| CN | 111580652 A | 8/2020 |
| CN | 111913565 A | 11/2020 |
| CN | 112068757 A | 12/2020 |
| CN | 113168737 A | 7/2021 |
| CN | 109491508 B | 8/2022 |
| CN | 115309271 A | 11/2022 |
| CN | 116132905 A | 5/2023 |
| CN | 117043722 A | 11/2023 |
| CN | 117857981 A | 4/2024 |
| CN | 118102204 A | 5/2024 |
| DE | 102016125811 A1 | 11/2017 |
| DE | 102020101675 A1 | 7/2020 |
| DE | 102020128536 A1 | 5/2021 |
| EP | 0816983 A2 | 1/1998 |
| EP | 1530115 A2 | 5/2005 |
| EP | 1562021 A1 | 8/2005 |
| EP | 2393056 A1 | 12/2011 |
| EP | 2458486 A1 | 5/2012 |
| EP | 2551763 A1 | 1/2013 |
| EP | 2741175 A2 | 6/2014 |
| EP | 2893297 A1 | 7/2015 |
| EP | 2947545 A1 | 11/2015 |
| EP | 3088997 A1 | 11/2016 |
| EP | 3118722 A1 | 1/2017 |
| EP | 3249497 A1 | 11/2017 |
| EP | 3306444 A1 | 4/2018 |
| EP | 3316075 A1 | 5/2018 |
| EP | 3336805 A1 | 6/2018 |
| EP | 3451135 A1 | 3/2019 |
| EP | 3503101 A1 | 6/2019 |
| EP | 3506151 A1 | 7/2019 |
| EP | 3570144 A1 | 11/2019 |
| EP | 3588255 A1 | 1/2020 |
| EP | 3654147 A1 | 5/2020 |
| EP | 4155867 A1 | 3/2023 |
| EP | 3688726 B1 | 8/2023 |
| GB | 2540791 A | 2/2017 |
| JP | H06-4596 A | 1/1994 |
| JP | H10-51711 A | 2/1998 |
| JP | H10-78845 A | 3/1998 |
| JP | H11-289555 A | 10/1999 |
| JP | 2004-510239 A | 4/2004 |
| JP | 2005-215144 A | 8/2005 |
| JP | 2005-333524 A | 12/2005 |
| JP | 2006-4093 A | 1/2006 |
| JP | 2006-107048 A | 4/2006 |
| JP | 2006-146803 A | 6/2006 |
| JP | 2006-295236 A | 10/2006 |
| JP | 2011-203880 A | 10/2011 |
| JP | 2012-234550 A | 11/2012 |
| JP | 2013-178639 A | 9/2013 |
| JP | 2013-196158 A | 9/2013 |
| JP | 2013-254358 A | 12/2013 |
| JP | 2013-257716 A | 12/2013 |
| JP | 2014-21565 A | 2/2014 |
| JP | 2014-59840 A | 4/2014 |
| JP | 2014-71663 A | 4/2014 |
| JP | 2014-99184 A | 5/2014 |
| JP | 2014-514652 A | 6/2014 |
| JP | 2014-514653 A | 6/2014 |
| JP | 2015-56173 A | 3/2015 |
| JP | 2015-515040 A | 5/2015 |
| JP | 2015-118332 A | 6/2015 |
| JP | 2015-222565 A | 12/2015 |
| JP | 2016-96513 A | 5/2016 |
| JP | 2016-194744 A | 11/2016 |
| JP | 2017-27206 A | 2/2017 |
| JP | 2017-58528 A | 3/2017 |
| JP | 2017-126009 A | 7/2017 |
| JP | 2017-525002 A | 8/2017 |
| JP | 2017-531221 A | 10/2017 |
| JP | 2018-5516 A | 1/2018 |
| JP | 2018-5517 A | 1/2018 |
| JP | 2018-41477 A | 3/2018 |
| JP | 2018-514005 A | 5/2018 |
| JP | 2018-88118 A | 6/2018 |
| JP | 2018-101019 A | 6/2018 |
| JP | 2018-106499 A | 7/2018 |
| JP | 2019-40333 A | 3/2019 |
| JP | 2019-515361 A | 6/2019 |
| JP | 2019-169154 A | 10/2019 |
| JP | 2019-175449 A | 10/2019 |
| JP | 2019-527881 A | 10/2019 |
| JP | 2019-532382 A | 11/2019 |
| JP | 2019-536131 A | 12/2019 |
| JP | 2020-503595 A | 1/2020 |
| JP | 2020-86913 A | 6/2020 |
| JP | 2022-53334 A | 4/2022 |
| JP | 2022-175629 A | 11/2022 |
| JP | 2023-52278 A | 4/2023 |
| KR | 10-2011-0017236 A | 2/2011 |
| KR | 10-2011-0128487 A | 11/2011 |
| KR | 10-2014-0097654 A | 8/2014 |
| KR | 10-2016-0012139 A | 2/2016 |
| KR | 10-2017-0027240 A | 3/2017 |
| KR | 10-2018-0102171 A | 9/2018 |
| KR | 10-2019-0100957 A | 8/2019 |
| KR | 10-2020-0010296 A | 1/2020 |
| KR | 10-2020-0035103 A | 4/2020 |
| KR | 10-2020-0110788 A | 9/2020 |
| KR | 10-2020-0135496 A | 12/2020 |
| KR | 10-2021-0083016 A | 7/2021 |
| KR | 10-2021-0123530 A | 10/2021 |
| WO | 2010/026519 A1 | 3/2010 |
| WO | 2011/008638 A1 | 1/2011 |
| WO | 2012/145180 A1 | 10/2012 |
| WO | 2013/169849 A2 | 11/2013 |
| WO | 2013/184447 A2 | 12/2013 |
| WO | 2014/105276 A1 | 7/2014 |
| WO | 2014/190106 A1 | 11/2014 |
| WO | 2014/203301 A1 | 12/2014 |
| WO | 2015/195216 A1 | 12/2015 |
| WO | 2016/014877 A1 | 1/2016 |
| WO | 2016/118344 A1 | 7/2016 |
| WO | 2016/126522 A1 | 8/2016 |
| WO | 2017/024142 A1 | 2/2017 |
| WO | 2017/088487 A1 | 6/2017 |
| WO | 2018/005557 A1 | 1/2018 |
| WO | 2018/046957 A2 | 3/2018 |
| WO | 2018/090060 A1 | 5/2018 |
| WO | 2018/106299 A1 | 6/2018 |
| WO | 2018/116556 A1 | 6/2018 |
| WO | 2018/125428 A1 | 7/2018 |
| WO | 2018/175735 A1 | 9/2018 |
| WO | 2018/213801 A1 | 11/2018 |
| WO | 2019/074771 A1 | 4/2019 |

(56) References Cited

FOREIGN PATENT DOCUMENTS

| | | |
|---|---|---|
| WO | 2019/142560 A1 | 7/2019 |
| WO | 2019/152286 A2 | 8/2019 |
| WO | 2019/172678 A1 | 9/2019 |
| WO | 2019/213111 A1 | 11/2019 |
| WO | 2019/217163 A1 | 11/2019 |
| WO | 2020/066682 A1 | 4/2020 |
| WO | 2020/105349 A1 | 5/2020 |
| WO | 2020/121483 A1 | 6/2020 |
| WO | 2020/179027 A1 | 9/2020 |
| WO | 2021/061349 A1 | 4/2021 |
| WO | 2021/061351 A1 | 4/2021 |
| WO | 2021/133053 A1 | 7/2021 |
| WO | 2021/173839 A1 | 9/2021 |
| WO | 2021/202783 A1 | 10/2021 |
| WO | 2021/203856 A1 | 10/2021 |
| WO | 2022/046340 A1 | 3/2022 |
| WO | 2022/055821 A1 | 3/2022 |
| WO | 2022/055822 A1 | 3/2022 |
| WO | 2022/066399 A1 | 3/2022 |
| WO | 2022/066535 A2 | 3/2022 |
| WO | 2022/067075 A1 | 3/2022 |
| WO | 2022/067343 A2 | 3/2022 |
| WO | 2022/072187 A2 | 4/2022 |
| WO | 2022/146936 A1 | 7/2022 |
| WO | 2022/146938 A1 | 7/2022 |
| WO | 2022/147146 A1 | 7/2022 |
| WO | 2022/164881 A1 | 8/2022 |
| WO | 2022/192040 A1 | 9/2022 |
| WO | 2022/204664 A1 | 9/2022 |
| WO | 2022/208797 A1 | 10/2022 |
| WO | 2023/043646 A1 | 3/2023 |
| WO | 2023/096940 A2 | 6/2023 |
| WO | 2023/141535 A1 | 7/2023 |
| WO | 2024/064373 A1 | 3/2024 |

OTHER PUBLICATIONS

Corrected Notice of Allowability received for U.S. Appl. No. 17/448,875, mailed on Apr. 24, 2024, 4 pages.
Corrected Notice of Allowability received for U.S. Appl. No. 17/479,791, mailed on May 19, 2023, 2 pages.
Corrected Notice of Allowability received for U.S. Appl. No. 17/659,147, mailed on Feb. 14, 2024, 6 pages.
Corrected Notice of Allowability received for U.S. Appl. No. 17/932,655, mailed on Oct. 12, 2023, 2 pages.
Corrected Notice of Allowability received for U.S. Appl. No. 17/932,999, mailed on Feb. 20, 2025, 2 pages.
Corrected Notice of Allowability received for U.S. Appl. No. 17/932,999, mailed on Jan. 23, 2025, 9 pages.
Corrected Notice of Allowability received for U.S. Appl. No. 17/935,095, mailed on Oct. 18, 2024, 3 pages.
Corrected Notice of Allowability received for U.S. Appl. No. 18/154,757, mailed on Aug. 30, 2024, 2 pages.
Corrected Notice of Allowability received for U.S. Appl. No. 18/174,337, mailed on Jan. 15, 2025, 2 pages.
Corrected Notice of Allowability received for U.S. Appl. No. 18/421,827, mailed on Aug. 29, 2024, 2 pages.
Corrected Notice of Allowability received for U.S. Appl. No. 18/463,739, mailed on Oct. 4, 2024, 2 pages.
Corrected Notice of Allowability received for U.S. Appl. No. 18/465,098, mailed on Mar. 13, 2024, 3 pages.
Corrected Notice of Allowance received for U.S. Appl. No. 17/478,593, mailed on Dec. 21, 2022, 2 pages.
European Search Report received for European Patent Application No. 21791153.6, mailed on Mar. 22, 2024, 5 pages.
European Search Report received for European Patent Application No. 21801378.7, mailed on Jul. 10, 2024, 5 pages.
European Search Report received for European Patent Application No. 22703771.0, mailed on Feb. 26, 2025, 4 pages.
Extended European Search Report received for European Patent Application No. 23158818.7, mailed on Jul. 3, 2023, 12 pages.
Extended European Search Report received for European Patent Application No. 23158929.2, mailed on Jun. 27, 2023, 12 pages.
Extended European Search Report received for European Patent Application No. 23197572.3, mailed on Feb. 19, 2024, 7 pages.
Extended European Search Report received for European Patent Application No. 24159868.9, mailed on Oct. 9, 2024, 13 pages.
Extended European Search Report received for European Patent Application No. 24178730.8, mailed on Oct. 14, 2024, 8 pages.
Extended European Search Report received for European Patent Application No. 24178752.2, mailed on Oct. 4, 2024, 8 pages.
Extended European Search Report received for European Patent Application No. 24179233.2, mailed on Oct. 2, 2024, 10 pages.
Extended European Search Report received for European Patent Application No. 24179830.5, mailed on Nov. 5, 2024, 11 pages.
Extended European Search Report received for European Patent Application No. 24190323.6, mailed on Dec. 12, 2024, 9 pages.
Extended European Search Report received for European Patent Application No. 24217335.9, mailed on Feb. 24, 2025, 8 pages.
Final Office Action received for U.S. Appl. No. 14/531,874, mailed on Nov. 4, 2016, 10 pages.
Final Office Action received for U.S. Appl. No. 15/644,639, mailed on Sep. 19, 2019, 12 pages.
Final Office Action received for U.S. Appl. No. 17/202,034, mailed on May 4, 2023, 41 pages.
Final Office Action received for U.S. Appl. No. 17/202,034, mailed on Nov. 4, 2024, 50 pages.
Final Office Action received for U.S. Appl. No. 17/448,875, mailed on Mar. 16, 2023, 24 pages.
Final Office Action received for U.S. Appl. No. 17/580,495, mailed on Feb. 12, 2025, 29 pages.
Final Office Action received for U.S. Appl. No. 17/580,495, mailed on May 13, 2024, 29 pages.
Final Office Action received for U.S. Appl. No. 17/659,147, mailed on Oct. 4, 2023, 17 pages.
Final Office Action received for U.S. Appl. No. 17/816,314, mailed on Jan. 20, 2023, 11 pages.
Final Office Action received for U.S. Appl. No. 17/935,095, mailed on Dec. 29, 2023, 15 pages.
Final Office Action received for U.S. Appl. No. 18/157,040, mailed on Dec. 2, 2024, 25 pages.
Final Office Action received for U.S. Appl. No. 18/182,300, mailed on Feb. 16, 2024, 32 pages.
Final Office Action received for U.S. Appl. No. 18/182,300, mailed on Oct. 31, 2024, 34 pages.
Final Office Action received for U.S. Appl. No. 18/375,280, mailed on Jul. 12, 2024, 19 pages.
Final Office Action received for U.S. Appl. No. 18/473,196, mailed on Dec. 6, 2024, 22 pages.
Home | Virtual Desktop [online], Virtual Desktop, Available online at: <https://www.vrdesktop.net>, [retrieved on Jun. 29, 2023], 4 pages.
International Search Report received for PCT Application No. PCT/US2022/076603, mailed on Jan. 9, 2023, 4 pages.
International Search Report received for PCT Application No. PCT/US2023/018213, mailed on Jul. 26, 2023, 6 pages.
International Search Report received for PCT Application No. PCT/US2023/060052, mailed on May 24, 2023, 6 pages.
International Search Report received for PCT Application No. PCT/US2023/060943, mailed on Jun. 6, 2023, 7 pages.
International Search Report received for PCT Application No. PCT/US2023/074962, mailed on Jan. 19, 2024, 9 pages.
International Search Report received for PCT Application No. PCT/US2024/030107, mailed on Oct. 23, 2024, 9 pages.
International Search Report received for PCT Application No. PCT/US2024/032314, mailed on Nov. 11, 2024, 6 pages.
International Search Report received for PCT Application No. PCT/US2024/032451, mailed on Nov. 15, 2024, 6 pages.
International Search Report received for PCT Application No. PCT/US2024/032456, mailed on Nov. 14, 2024, 6 pages.
International Search Report received for PCT Patent Application No. PCT/US2015/029727, mailed on Nov. 2, 2015, 6 pages.
International Search Report received for PCT Patent Application No. PCT/US2021/022413, mailed on Aug. 13, 2021, 7 pages.

(56) References Cited

OTHER PUBLICATIONS

Yamada Yoshihiro, "How to Generate a Modal Window with ModalPopup Control", Available online at: <http://web.archive.org/web/20210920015801/https://atmarkit.itmedia.co.jp/fdotnet/dotnettips/580aspajaxmodalpopup/aspajaxmodalpopup.html>[Search Date Aug. 22, 2023], Sep. 20, 2021, 8 pages (1 page of English Abstract and 7 pages of Official Copy).
International Search Report received for PCT Patent Application No. PCT/US2021/050948, mailed on Mar. 4, 2022, 6 pages.
Simple Modal Window With Background Blur Effect, Available online at: <http://web.archive.org/web/20160313233427/https://www.cssscript.com/simple-modal-window-with-background-blur-effect/>, Mar. 13, 2016, 5 pages.
Schenk et al., "SPOCK: A Smooth Pursuit Oculomotor Control Kit", CHI'16 Extended Abstracts, San Jose, CA, USA, ACM, May 7-12, 2016, pp. 2681-2687.
International Search Report received for PCT Patent Application No. PCT/US2021/071518, mailed on Feb. 25, 2022, 7 pages.
International Search Report received for PCT Patent Application No. PCT/US2021/071595, mailed on Mar. 17, 2022, 7 pages.
International Search Report received for PCT Patent Application No. PCT/US2021/071596, mailed on Apr. 8, 2022, 7 pages.
International Search Report received for PCT Patent Application No. PCT/US2022/013208, mailed on Apr. 26, 2022, 7 pages.
International Search Report received for PCT Patent Application No. PCT/US2022/071704, mailed on Aug. 26, 2022, 6 pages.
International Search Report received for PCT Patent Application No. PCT/US2022/076985, mailed on Feb. 20, 2023, 5 pages.
International Search Report received for PCT Patent Application No. PCT/US2023/060592, mailed on Jun. 14, 2023, 7 pages.
International Search Report received for PCT Patent Application No. PCT/US2023/074257, mailed on Nov. 21, 2023, 5 pages.
International Search Report received for PCT Patent Application No. PCT/US2023/074793, mailed on Feb. 6, 2024, 6 pages.
International Search Report received for PCT Patent Application No. PCT/US2023/074950, mailed on Jan. 3, 2024, 9 pages.
International Search Report received for PCT Patent Application No. PCT/US2023/074979, mailed on Feb. 26, 2024, 6 pages.
International Search Report received for PCT Patent Application No. PCT/US2024/026102, mailed on Aug. 26, 2024, 5 pages.
International Search Report received for PCT Patent Application No. PCT/US2024/039190, mailed on Nov. 22, 2024, 5 pages.
Letter Restarting Period for Response received for U.S. Appl. No. 15/644,639, mailed on Sep. 28, 2018, 8 pages.
Non-Final Office Action received for U.S. Appl. No. 14/531,874, mailed on May 18, 2016, 11 pages.
Non-Final Office Action received for U.S. Appl. No. 15/644,639, mailed on Apr. 12, 2019, 11 pages.
Non-Final Office Action received for U.S. Appl. No. 15/644,639, mailed on Sep. 10, 2018, 9 pages.
Non-Final Office Action received for U.S. Appl. No. 16/881,599, mailed on Apr. 28, 2021, 8 pages.
Non-Final Office Action received for U.S. Appl. No. 17/123,000, mailed on Nov. 12, 2021, 8 pages.
Non-Final Office Action received for U.S. Appl. No. 17/202,034, mailed on Jan. 19, 2024, 44 pages.
Non-Final Office Action received for U.S. Appl. No. 17/202,034, mailed on Jul. 20, 2022, 38 pages.
Non-Final Office Action received for U.S. Appl. No. 17/448,875, mailed on Oct. 6, 2022, 25 pages.
Non-Final Office Action received for U.S. Appl. No. 17/448,875, mailed on Sep. 29, 2023, 30 pages.
Non-Final Office Action received for U.S. Appl. No. 17/479,791, mailed on May 11, 2022, 18 pages.
Non-Final Office Action received for U.S. Appl. No. 17/580,495, mailed on Aug. 15, 2024, 28 pages.
Non-Final Office Action received for U.S. Appl. No. 17/580,495, mailed on Dec. 11, 2023, 27 pages.
Non-Final Office Action received for U.S. Appl. No. 17/659,147, mailed on Mar. 16, 2023, 19 pages.
Non-Final Office Action received for U.S. Appl. No. 17/816,314, mailed on Jul. 6, 2023, 10 pages.
Non-Final Office Action received for U.S. Appl. No. 17/816,314, mailed on Sep. 23, 2022, 10 pages.
Non-Final Office Action received for U.S. Appl. No. 17/932,655, mailed on Apr. 20, 2023, 10 pages.
Non-Final Office Action received for U.S. Appl. No. 17/932,999, mailed on Feb. 23, 2024, 22 pages.
Non-Final Office Action received for U.S. Appl. No. 17/935,095, mailed on Jun. 22, 2023, 15 pages.
Non-Final Office Action received for U.S. Appl. No. 18/149,640, mailed on Jan. 15, 2025, 17 pages.
Non-Final Office Action received for U.S. Appl. No. 18/154,697, mailed on Nov. 24, 2023, 10 pages.
Non-Final Office Action received for U.S. Appl. No. 18/157,040, mailed on May 2, 2024, 25 pages.
Non-Final Office Action received for U.S. Appl. No. 18/182,300, mailed on May 29, 2024, 33 pages.
Non-Final Office Action received for U.S. Appl. No. 18/182,300, mailed on Oct. 26, 2023, 29 pages.
Non-Final Office Action received for U.S. Appl. No. 18/298,994, mailed on Mar. 7, 2025, 26 pages.
Non-Final Office Action received for U.S. Appl. No. 18/322,469, mailed on Nov. 15, 2024, 34 pages.
Non-Final Office Action received for U.S. Appl. No. 18/336,770, mailed on Jun. 5, 2024, 12 pages.
Non-Final Office Action received for U.S. Appl. No. 18/375,280, mailed on Nov. 27, 2024, 17 pages.
Non-Final Office Action received for U.S. Appl. No. 18/473,196, mailed on Aug. 16, 2024, 21 pages.
Non-Final Office Action received for U.S. Appl. No. 18/473,196, mailed on Feb. 28, 2025, 20 pages.
Non-Final Office Action received for U.S. Appl. No. 18/645,292, mailed on Feb. 21, 2025, 39 pages.
Non-Final Office Action received for U.S. Appl. No. 18/988,115, mailed on Feb. 24, 2025, 40 pages.
Notice of Allowance received for U.S. Appl. No. 18/154,757, mailed on Aug. 26, 2024, 12 pages.
Notice of Allowance received for U.S. Appl. No. 14/531,874, mailed on Mar. 28, 2017, 9 pages.
Notice of Allowance received for U.S. Appl. No. 15/644,639, mailed on Jan. 16, 2020, 16 pages.
Notice of Allowance received for U.S. Appl. No. 16/881,599, mailed on Dec. 17, 2021, 7 pages.
Notice of Allowance received for U.S. Appl. No. 17/123,000, mailed on May 27, 2022, 8 pages.
Notice of Allowance received for U.S. Appl. No. 17/123,000, mailed on Sep. 19, 2022, 7 pages.
Notice of Allowance received for U.S. Appl. No. 17/448,875, mailed on Apr. 17, 2024, 8 pages.
Notice of Allowance received for U.S. Appl. No. 17/448,875, mailed on Jul. 12, 2024, 8 pages.
Notice of Allowance received for U.S. Appl. No. 17/448,876, mailed on Apr. 7, 2022, 9 pages.
Notice of Allowance received for U.S. Appl. No. 17/448,876, mailed on Jul. 20, 2022, 8 pages.
Notice of Allowance received for U.S. Appl. No. 17/478,593, mailed on Aug. 31, 2022, 10 pages.
Notice of Allowance received for U.S. Appl. No. 17/479,791, mailed on Mar. 13, 2023, 9 pages.
Notice of Allowance received for U.S. Appl. No. 17/479,791, mailed on Nov. 17, 2022, 9 pages.
Notice of Allowance received for U.S. Appl. No. 17/580,495, mailed on Jun. 6, 2023, 6 pages.
Notice of Allowance received for U.S. Appl. No. 17/580,495, mailed on Nov. 30, 2022, 12 pages.
Notice of Allowance received for U.S. Appl. No. 17/659,147, mailed on Jan. 26, 2024, 13 pages.
Notice of Allowance received for U.S. Appl. No. 17/659,147, mailed on May 29, 2024, 13 pages.
Notice of Allowance received for U.S. Appl. No. 17/816,314, mailed on Jan. 4, 2024, 6 pages.

(56) References Cited

OTHER PUBLICATIONS

Notice of Allowance received for U.S. Appl. No. 17/932,655, mailed on Jan. 24, 2024, 7 pages.
Notice of Allowance received for U.S. Appl. No. 17/932,655, mailed on Sep. 29, 2023, 7 pages.
Notice of Allowance received for U.S. Appl. No. 17/932,999, mailed on Sep. 12, 2024, 9 pages.
Notice of Allowance received for U.S. Appl. No. 17/935,095, mailed on Jul. 3, 2024, 9 pages.
Notice of Allowance received for U.S. Appl. No. 18/154,697, mailed on Aug. 6, 2024, 8 pages.
Notice of Allowance received for U.S. Appl. No. 18/154,697, mailed on Dec. 3, 2024, 7 pages.
Notice of Allowance received for U.S. Appl. No. 18/154,757, mailed on Jan. 23, 2024, 10 pages.
Notice of Allowance received for U.S. Appl. No. 18/154,757, mailed on Jan. 23, 2025, 12 pages.
Notice of Allowance received for U.S. Appl. No. 18/154,757, mailed on May 10, 2024, 12 pages.
Notice of Allowance received for U.S. Appl. No. 18/174,337, mailed on Jan. 2, 2025, 8 pages.
Notice of Allowance received for U.S. Appl. No. 18/336,770, mailed on Nov. 29, 2024, 9 pages.
Notice of Allowance received for U.S. Appl. No. 18/421,675, mailed on Apr. 11, 2024, 9 pages.
Notice of Allowance received for U.S. Appl. No. 18/421,675, mailed on Jul. 31, 2024, 8 pages.
Notice of Allowance received for U.S. Appl. No. 18/421,827, mailed on Aug. 14, 2024, 10 pages.
Notice of Allowance received for U.S. Appl. No. 18/423,187, mailed on Jun. 5, 2024, 9 pages.
Notice of Allowance received for U.S. Appl. No. 18/463,739, mailed on Feb. 1, 2024, 10 pages.
Notice of Allowance received for U.S. Appl. No. 18/463,739, mailed on Jun. 17, 2024, 9 pages.
Notice of Allowance received for U.S. Appl. No. 18/463,739, mailed on Oct. 30, 2023, 11 pages.
Notice of Allowance received for U.S. Appl. No. 18/465,098, mailed on Jun. 20, 2024, 8 pages.
Notice of Allowance received for U.S. Appl. No. 18/465,098, mailed on Mar. 4, 2024, 6 pages.
Notice of Allowance received for U.S. Appl. No. 18/465,098, mailed on Nov. 17, 2023, 8 pages.
Notice of Allowance received for U.S. Appl. No. 18/515,188, mailed on Nov. 27, 2024, 9 pages.
Notice of Allowance received for U.S. Appl. No. 18/671,936, mailed on Jan. 15, 2025, 9 pages.
Notice of Allowance received for U.S. Appl. No. 18/671,936, mailed on Mar. 5, 2025, 7 pages.
Restriction Requirement received for U.S. Appl. No. 17/932,999, mailed on Oct. 3, 2023, 6 pages.
Restriction Requirement received for U.S. Appl. No. 18/473,187, mailed on Dec. 30, 2024, 5 pages.
Search Report received for Chinese Patent Application No. 202310873465.7, mailed on Feb. 1, 2024, 5 pages (2 pages of English Translation and 3 pages of Official Copy).
Supplemental Notice of Allowance received for U.S. Appl. No. 14/531,874, mailed on Jul. 26, 2017, 5 pages.
Supplemental Notice of Allowance received for U.S. Appl. No. 18/515,188, mailed on Dec. 12, 2024, 2 pages.
Bhowmick Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.
Bohn Dieter, "Rebooting WebOS: How LG Rethought The Smart TV", The Verge, Available online at: <http://www.theverge.com/2014/1/6/5279220/rebooting-webos-how-lg-rethought-the-smart-tv>, [Retrieved Aug. 26, 2019], Jan. 6, 2014, 5 pages.

Bolt et al., "Two-Handed Gesture in Multi-Modal Natural Dialog", Uist '92, 5th Annual Symposium on User Interface Software And Technology. Proceedings Of the ACM Symposium on User Interface Software And Technology, Monterey, Nov. 15-18, 1992, pp. 7-14.
Brennan Dominic, "4 Virtual Reality Desktops for Vive, Rift, and Windows VR Compared", [online]. Road to VR, Available online at: <https://www.roadtovr.com/virtual-reality-desktop-compared-oculus-rift-htc-vive/>, [retrieved on Jun. 29, 2023], Jan. 3, 2018, 4 pages.
Chatterjee et al., "Gaze+Gesture: Expressive, Precise and Targeted Free-Space Interactions", ICMI '15, Nov. 9-13, 2015, 8 pages.
Fatima et al., "Eye Movement Based Human Computer Interaction", 3rd International Conference On Recent Advances In Information Technology (RAIT), Mar. 3, 2016, pp. 489-494.
Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.
Lin et al., "Towards Naturally Grabbing and Moving Objects in VR", IS&T International Symposium on Electronic Imaging and The Engineering Reality of Virtual Reality, 2016, 6 pages.
Macmostvideo, "A Beginner's Guide to Selecting Items On Your Mac (#1566)", Bibliographic Information, Jan. 4, 2018, Retrieved from <URL:https://www.youtube.com/watch?v=a6MDAuh7M0Q&ab_channel=macmostvideo/>, [retrieved on Feb. 19, 2025], Most relevant passage of the video is 00:10 to 00:30, 2 pages.
McGill et al., "Expanding The Bounds Of Seated Virtual Workspaces", University of Glasgow, Available online at: <https://core.ac.uk/download/pdf/323988271.pdf>, [retrieved on Jun. 27, 2023], Jun. 5, 2020, 44 pages.
Pfeuffer et al., "Gaze + Pinch Interaction in Virtual Reality", In Proceedings of SUI '17, Brighton, United Kingdom, Oct. 16-17, 2017, pp. 99-108.
Pfeuffer et al., "Gaze and Touch Interaction on Tablets", UIST '16, Tokyo, Japan, ACM, Oct. 16-19, 2016, pp. 301-311.
Non-Final Office Action received for U.S. Appl. No. 18/587,739, mailed on Sep. 16, 2025, 34 pages.
Extended European Search Report received for European Patent Application No. 25179367.5, mailed on Jul. 1, 2025, 10 pages.
Extended European Search Report received for European Patent Application No. 25169060.8, mailed on May 12, 2025, 10 pages.
Extended European Search Report received for European Patent Application No. 25169059.0, mailed on May 12, 2025, 11 pages.
Extended European Search Report received for European Patent Application No. 25174955.2, mailed on Jun. 25, 2025, 12 pages.
Non-Final Office Action received for U.S. Appl. No. 18/473,198, mailed on Jul. 15, 2025, 13 pages.
Notice of Allowance received for U.S. Appl. No. 18/174,403, mailed on Aug. 21, 2025, 13 pages.
Notice of Allowance received for U.S. Appl. No. 18/894,997, mailed on Aug. 12, 2025, 13 pages.
Non-Final Office Action received for U.S. Appl. No. 18/473,197, mailed on May 1, 2025, 14 pages.
Non-Final Office Action received for U.S. Appl. No. 18/896,227, mailed on May 29, 2025, 14 pages.
Notice of Allowance received for U.S. Appl. No. 18/322,469, mailed on Jul. 7, 2025, 14 pages.
Notice of Allowance received for U.S. Appl. No. 18/322,469, mailed on Mar. 19, 2025, 14 pages.
Non-Final Office Action received for U.S. Appl. No. 18/473,187, mailed on May 16, 2025, 15 pages.
Non-Final Office Action received for U.S. Appl. No. 18/473,195, mailed on Jun. 27, 2025, 16 pages.
Non-Final Office Action received for U.S. Appl. No. 18/473,242, mailed on Sep. 5, 2025, 17 pages.
Non-Final Office Action received for U.S. Appl. No. 18/467,523, mailed on Jun. 17, 2025, 19 pages.
Non-Final Office Action received for U.S. Appl. No. 18/471,729, mailed on Jun. 17, 2025, 19 pages.
Corrected Notice of Allowability received for U.S. Appl. No. 18/146,234, mailed on Mar. 20, 2025, 2 pages.

(56) References Cited

OTHER PUBLICATIONS

Corrected Notice of Allowability received for U.S. Appl. No. 18/152,656, mailed on Jul. 22, 2025, 2 pages.
Corrected Notice of Allowability received for U.S. Appl. No. 18/473,180, mailed on Apr. 1, 2025, 2 pages.
Corrected Notice of Allowability received for U.S. Appl. No. 18/988,115, mailed on Jul. 15, 2025, 2 pages.
Corrected Notice of Allowance received for U.S. Appl. No. 18/424,644, mailed on Jun. 24, 2025, 2 pages.
Final Office Action received for U.S. Appl. No. 18/473,196, mailed on Jul. 16, 2025, 20 pages.
Non-Final Office Action received for U.S. Appl. No. 17/905,483, mailed on Jul. 15, 2025, 20 pages.
Non-Final Office Action received for U.S. Appl. No. 18/518,340, mailed on Jul. 22, 2025, 20 pages.
Final Office Action received for U.S. Appl. No. 18/317,890, mailed on Sep. 3, 2025, 22 pages.
Non-Final Office Action received for U.S. Appl. No. 18/473,176, mailed on May 14, 2025, 23 pages.
Final Office Action received for U.S. Appl. No. 18/149,640, mailed on May 21, 2025, 24 pages.
Non-Final Office Action received for U.S. Appl. No. 18/174,403, mailed on Mar. 20, 2025, 26 pages.
Non-Final Office Action received for U.S. Appl. No. 18/317,890, mailed on Apr. 17, 2025, 26 pages.
Non-Final Office Action received for U.S. Appl. No. 18/327,844, mailed on Mar. 24, 2025, 27 pages.
Final Office Action received for U.S. Appl. No. 17/933,020, mailed on May 21, 2025, 28 pages.
Non-Final Office Action received for U.S. Appl. No. 18/317,886, mailed on Apr. 30, 2025, 34 pages.
Non-Final Office Action received for U.S. Appl. No. 18/473,260, mailed on Jun. 27, 2025, 35 pages.
Non-Final Office Action received for U.S. Appl. No. 18/473,239, mailed on Sep. 10, 2025, 38 pages.
European Search Report received for European Patent Application No. 22723527.2, mailed on May 12, 2025, 4 pages.
International Search Report received for PCT Patent Application No. PCT/US2023/074978, mailed on Apr. 4, 2024, 4 pages.
International Search Report received for PCT Patent Application No. PCT/US2024/012828, mailed on May 6, 2024, 4 pages.
International Search Report received for PCT Patent Application No. PCT/US2024/032109, mailed on Sep. 13, 2024, 4 pages.
International Search Report received for PCT Patent Application No. PCT/US2024/043470, mailed on Oct. 29, 2024, 4 pages.
International Search Report received for PCT Patent Application No. PCT/US2025/011189, mailed on Apr. 23, 2025, 4 pages.
Non-Final Office Action received for U.S. Appl. No. 17/202,034, mailed on Jun. 4, 2025, 40 pages.
Non-Final Office Action received for U.S. Appl. No. 18/473,184, mailed on Jul. 25, 2025, 40 pages.
Final Office Action received for U.S. Appl. No. 18/645,292, mailed on Jun. 2, 2025, 41 pages.
Non-Final Office Action received for U.S. Appl. No. 18/473,155, mailed on Jul. 10, 2025, 47 pages.
International Search Report received for PCT Patent Application No. PCT/US2023/074960, mailed on Feb. 12, 2024, 6 pages.
International Search Report received for PCT Patent Application No. PCT/US2024/032153, mailed on Nov. 11, 2024, 6 pages.
Notice of Allowance received for U.S. Appl. No. 18/152,656, mailed on Jun. 25, 2025, 6 pages.
Notice of Allowance received for U.S. Appl. No. 18/424,644, mailed on Jun. 11, 2025, 6 pages.
Extended European Search Report received for European Patent Application No. 24221722.2, mailed on Apr. 17, 2025, 7 pages.
International Search Report received for PCT Patent Application No. PCT/US2023/074973, mailed on Mar. 7, 2024, 7 pages.
Notice of Allowance received for U.S. Appl. No. 18/304,290, mailed on Aug. 20, 2025, 7 pages.
Notice of Allowance received for U.S. Appl. No. 18/988,115, mailed on Jun. 30, 2025, 7 pages.
Non-Final Office Action received for U.S. Appl. No. 18/882,622, mailed on May 22, 2025, 8 pages.
Notice of Allowance received for U.S Appl. No. 18/473,182, mailed on Apr. 23, 2025, 8 pages.
Notice of Allowance received for U.S. Appl. No. 17/655,521, mailed on Apr. 16, 2025, 8 pages.
Notice of Allowance received for U.S. Appl. No. 18/882,622, mailed on Aug. 27, 2025, 8 pages.
Notice of Allowance received for U.S. Appl. No. 18/896,227, mailed on Jul. 11, 2025, 8 pages.
Notice of Allowance received for U.S. Appl. No. 18/919,095, mailed on Jul. 22, 2025, 8 pages.
Notice of Allowance received for U.S. Appl. No. 18/157,040, mailed on Jun. 24, 2025, 9 pages.
Notice of Allowance received for U.S. Appl. No. 18/427,434, mailed on Apr. 17, 2025, 9 pages.
Notice of Allowance received for U.S. Appl. No. 18/471,850, mailed on Jun. 10, 2025, 9 pages.
Notice of Allowance received for U.S. Appl. No. 18/473,179, mailed on May 8, 2025, 9 pages.
Notice of Allowance received for U.S. Appl. No. 18/473,262, mailed on Jun. 10, 2025, 9 pages.
Notice of Allowance received for U.S. Appl. No. 18/515,188, mailed on Mar. 20, 2025, 9 pages.
Adding Environments, Available online at: https://manual.keyshot.com/manual/environments/adding-environments/, [retrieved on Jun. 9, 2023], 2 pages.
Applicant-Initiated Interview Summary received for U.S. Appl. No. 18/119,219, mailed on May 21, 2024, 3 pages.
Area Light, Available online at: https://manual.keyshot.com/manual/materials/material-types/light-sources/area-light/, [retrieved on Jun. 9, 2023], 24 pages.
Artec Leo, Artec 3D [online], 2018 [retrieved on Apr. 25, 2024]. Retrieved from the Internet: <URL: https://artec3d.com/portable-3d-scanners/artec-leo>, 39 pages.
Artec Leo Full 3D Scanning Demo w/ Sample Data, Digitize Designs, LLC, Available online at: < https://www.youtube.com/watch?v=ecBKo_h3Pug>, [retrieved on Sep. 1, 2022], Feb. 22, 2019, 3 pages.
Corrected Notice of Allowability received for U.S. Appl. No. 17/469,788, mailed on Feb. 12, 2025, 2 pages.
Corrected Notice of Allowability received for U.S. Appl. No. 18/146,234, mailed on Feb. 6, 2025, 2 pages.
Corrected Notice of Allowance received for U.S. Appl. No. 17/407,675, mailed on Dec. 24, 2024, 2 pages.
Corrected Notice of Allowance received for U.S. Appl. No. 18/119,219, mailed on Sep. 11, 2024, 2 pages.
Corrected Notice of Allowance received for U.S. Appl. No. 18/152,656, mailed on Dec. 20, 2024, 5 pages.
Curious Blocks Alternatives 12, progsoft [online]. Profsoft, Available Online at: <URL: https://progsoft.net/en/software/curious-blocks>, [retrieved on Apr. 25, 2024], 2024, 7 pages.
Ex Parte Quayle Action received for U.S. Appl. No. 17/655,347, mailed on Jul. 8, 2024, 6 pages.
Extended European Search Report received for European Patent Application No. 24158036.4, mailed on Jul. 18, 2024, 12 pages.
Extended European Search Report received for European Patent Application No. 24171800.6, mailed on Sep. 5, 2024, 15 pages.
Extended European Search Report received for European Patent Application No. 24171804.8, mailed on Sep. 5, 2024, 13 pages.
Eye-supported target positioning in MRTK, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/EyeTracking/EyeTracking_Positioning.html>, 2 pages.
Feature Highlights, Available online at: https://manual.keyshot.com/manual/whats-new/feature-highlights/, [retrieved on Jun. 9, 2023], 28 pages.
Final Office Action received for U.S. Appl. No. 17/407,675, mailed on May 22, 2024, 18 pages.

(56) References Cited

OTHER PUBLICATIONS

Final Office Action received for U.S. Appl. No. 17/469,788, mailed on Nov. 16, 2023, 24 pages.
Final Office Action received for U.S. Appl. No. 17/655,521, mailed on Apr. 10, 2024, 18 pages.
Final Office Action received for U.S. Appl. No. 17/807,226, mailed on Nov. 30, 2023, 23 pages.
Final Office Action received for U.S. Appl. No. 17/812,965, mailed on Jan. 31, 2024, 9 pages.
Final Office Action received for U.S. Appl. No. 17/814,462, mailed on Nov. 1, 2024, 44 pages.
Final Office Action received for U.S. Appl. No. 17/905,483, mailed on Jan. 8, 2025, 19 pages.
Final Office Action received for U.S. Appl. No. 17/934,104, mailed on Oct. 18, 2024, 28 pages.
Final Office Action received for U.S. Appl. No. 18/327,844, mailed on Nov. 29, 2024, 25 pages.
How to Use Your Phone or Tablet in VR! | iOS and Android, YouTube [online]. YouTube, Dec. 20, 2017, Available online at <https://www.youtube.com/watch?v=QhfZjbVUxZE>, [Retrieved from Internet on Dec. 23, 2022], 4 pages.
International Search Report received for PCT Patent Application No. PCT/US2021/049520, mailed on Apr. 8, 2022, 8 pages.
International Search Report received for PCT Patent Application No. PCT/US2022/071208, mailed on Aug. 18, 2022, 9 pages.
International Search Report received for PCT Patent Application No. PCT/US2022/071228, mailed on Aug. 25, 2022, 6 pages.
International Search Report received for PCT Patent Application No. PCT/US2022/076808, mailed on Mar. 28, 2023, 6 pages.
International Search Report received for PCT Patent Application No. PCT/US2022/082379, mailed on May 30, 2023, 7 pages.
International Search Report received for PCT Patent Application No. PCT/US2023/019309, mailed on Sep. 1, 2023, 6 pages.
International Search Report received for PCT Patent Application No. PCT/US2023/060429, mailed on Jun. 28, 2023, 7 pages.
International Search Report received for PCT Patent Application No. PCT/US2023/074955, mailed on Feb. 1, 2024, 6 pages.
International Search Report received for PCT Patent Application No. PCT/US2023/074957, mailed on Jan. 30, 2024, 7 pages.
International Search Report received for PCT Patent Application No. PCT/US2023/074968, mailed on Feb. 26, 2024, 7 pages.
International Search Report received for PCT Patent Application No. PCT/US2024/030661, mailed on Nov. 4, 2024, 5 pages.
International Search Report received for PCT Patent Application No. PCT/US2024/032140, mailed on Sep. 10, 2024, 4 pages.
International Search Report received for PCT Patent Application No. PCT/US2024/032423, mailed on Sep. 25, 2024, 5 pages.
International Search Report received for PCT Patent Application No. PCT/US2024/032455, mailed on Sep. 25, 2024, 4 pages.
International Search Report received for PCT Patent Application No. PCT/US2024/039204, mailed on Nov. 14, 2024, 4 pages.
Kitasenju Design, X [online], X Corp., Available Online at: <URL: https://twitter.com/kitasenjudesign/status/1282665402812608513>, [retrieved on Apr. 25, 2024], 2024, 1 page.
Light Manager, Available online at: https://manual.keyshot.com/manual/lighting/lighting-manager/, [retrieved on Jun. 9, 2023], 3 pages.
MagicaVoxel 0.99.5 Review, YouTube [online], Google LLC, Available Online at: <URL: https://www.youtube.com/watch?v=WPPFnHQWwFk>, [retrieved on Apr. 25, 2024], 2024, 2 pages.
Non-Final Office Action received for U.S. Appl. No. 17/407,675, mailed on Sep. 11, 2023, 16 pages.
Non-Final Office Action received for U.S. Appl. No. 17/469,788, mailed on Mar. 2, 2023, 22 pages.
Non-Final Office Action received for U.S. Appl. No. 17/469,788, mailed on Mar. 21, 2024, 24 pages.
Non-Final Office Action received for U.S. Appl. No. 17/655,521, mailed on Aug. 23, 2023, 13 pages.
Non-Final Office Action received for U.S. Appl. No. 17/655,521, mailed on Nov. 27, 2024, 17 pages.
Non-Final Office Action received for U.S. Appl. No. 17/807,226, mailed on Jun. 26, 2023, 21 pages.
Non-Final Office Action received for U.S. Appl. No. 17/812,965, mailed on Jun. 8, 2023, 8 pages.
Non-Final Office Action received for U.S. Appl. No. 17/814,455, mailed on Feb. 16, 2024, 24 pages.
Non-Final Office Action received for U.S. Appl. No. 17/814,462, mailed on Feb. 1, 2024, 30 pages.
Non-Final Office Action received for U.S. Appl. No. 17/905,483, mailed on Mar. 27, 2024, 16 pages.
Non-Final Office Action received for U.S. Appl. No. 17/934,104, mailed on Mar. 25, 2024, 26 pages.
Non-Final Office Action received for U.S. Appl. No. 18/119,219, mailed on Mar. 28, 2024, 15 pages.
Non-Final Office Action received for U.S. Appl. No. 18/304,290, mailed on Mar. 5, 2025, 111 pages.
Non-Final Office Action received for U.S. Appl. No. 18/317,893, mailed on Apr. 25, 2024, 18 pages.
Non-Final Office Action received for U.S. Appl. No. 18/327,844, mailed on May 17, 2024, 20 pages.
Non-Final Office Action received for U.S. Appl. No. 18/429,301, mailed on Jun. 12, 2024, 28 pages.
Notice of Allowability received for U.S. Appl. No. 17/812,965, mailed on Jan. 15, 2025, 3 pages.
Notice of Allowability received for U.S. Appl. No. 17/814,455, mailed on Jan. 13, 2025, 7 pages.
Notice of Allowance received for U.S. Appl. No. 17/407,675, mailed on Aug. 20, 2024, 7 pages.
Notice of Allowance received for U.S. Appl. No. 17/407,675, mailed on Dec. 11, 2024, 8 pages.
Notice of Allowance received for U.S. Appl. No. 17/469,788, mailed on Feb. 5, 2025, 5 pages.
Notice of Allowance received for U.S. Appl. No. 17/469,788, mailed on Oct. 15, 2024, 7 pages.
Notice of Allowance received for U.S. Appl. No. 17/655,347, mailed on Feb. 20, 2025, 7 pages.
Notice of Allowance received for U.S. Appl. No. 17/655,347, mailed on Oct. 9, 2024, 7 pages.
Notice of Allowance received for U.S. Appl. No. 17/807,226, mailed on Jul. 3, 2024, 9 pages.
Notice of Allowance received for U.S. Appl. No. 17/807,236, mailed on Feb. 5, 2024, 13 pages.
Notice of Allowance received for U.S. Appl. No. 17/807,236, mailed on Jul. 10, 2024, 9 pages.
Notice of Allowance received for U.S. Appl. No. 17/812,965, mailed on Jul. 26, 2024, 6 pages.
Notice of Allowance received for U.S. Appl. No. 17/812,965, mailed on Nov. 15, 2024, 6 pages.
Notice of Allowance received for U.S. Appl. No. 17/814,455, mailed on Oct. 7, 2024, 10 pages.
Notice of Allowance received for U.S. Appl. No. 17/814,462, mailed on Feb. 26, 2025, 8 pages.
Notice of Allowance received for U.S. Appl. No. 18/119,219, mailed on Jul. 22, 2024, 7 pages.
Notice of Allowance received for U.S. Appl. No. 18/146,234, mailed on Jan. 24, 2025, 12 pages.
Notice of Allowance received for U.S. Appl. No. 18/152,656, mailed on Dec. 17, 2024, 12 pages.
Notice of Allowance received for U.S. Appl. No. 18/317,893, mailed on Jan. 13, 2025, 11 pages.
Notice of Allowance received for U.S. Appl. No. 18/317,893, mailed on Mar. 6, 2024, 8 pages.
Notice of Allowance received for U.S. Appl. No. 18/317,893, mailed on Nov. 22, 2023, 9 pages.
Notice of Allowance received for U.S. Appl. No. 18/429,294, mailed on Jun. 21, 2024, 10 pages.
Notice of Allowance received for U.S. Appl. No. 18/429,294, mailed on Oct. 31, 2024, 10 pages.
Notice of Allowance received for U.S. Appl. No. 18/429,301, mailed on Nov. 22, 2024, 8 pages.
Notice of Allowance received for U.S. Appl. No. 18/473,180, mailed on Aug. 22, 2024, 13 pages.

(56) References Cited

OTHER PUBLICATIONS

Notice of Allowance received for U.S. Appl. No. 18/473,180, mailed on Jan. 2, 2025, 12 pages.
Open Source Voxel Editor for Windows, Mac, Linux, iOS, and Android, GOXEL [online]. Goxel by Guillaume Chereau, Available Online at: <URL: https://goxel.xyz/>, [retrieved on Apr. 25, 2024], 2024, 3 pages.
POP 2 3D Scanner (Infrared Light | Precision 0.05mm), REVPOINT [online]. Revopoint 3D, <URL: https://global.revopoint3d.com/products/face-3d-scanner-pop2 ?_ga=2.182721893.277596832.1650264227-586470518.1640327512&ref=dh0L07OOzRuqo&utm_campaign=pop2_banner&utm_medium=referral&utm_source=Official_Website>, [retrieved on Apr. 25, 2024], 2014, 16 pages.
Restriction Requirement received for U.S. Appl. No. 17/905,483, mailed on Dec. 7, 2023, 7 pages.
Search Report received for United Kingdom Patent Application No. GB2210885.6, mailed on Jan. 27, 2023, 1 page.
Sharevox, PHORIA [online]. Phoria Pty Ltd, Available Online at: <URL: https://www.phoria.com.au/projects/sharevox/>, [retrieved on Apr. 25, 2024], 2024, 2 pages.
Sliders, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/README_Sliders.html>, 3 pages.
Spatial Audio Head Tracking on Apple Tv Automatically Resets when You Get Up from the Couc . . . , AppleInsider [online]. Jun. 10, 2021 [retrieved on Dec. 20, 2024]. Retrieved from the Internet: <https://forums.appleinsider.com/discussion/222259/spatial-audio-head-tracking-on-apple-tv-automatically-resets-when-you-get-up-from-the-couc>, 2024, 6 pages.
Supplemental Notice of Allowability received for U.S. Appl. No. 18/317,893, mailed on Jan. 29, 2025, 3 pages.
VoxEdit Beta Tutorial- Introduction and How To Animate Voxel Creations, YouTube [online], Google LLC, Available Online at: <URL: https://www.youtube.com/watch?v=fqcArJWtyqM>, [retrieved on Apr. 25, 2024], 2024, one page.
Voxel World Lens, Snapchat [online]. Snapchat Inc., Available Online at: <URL: https://www.snapchat.com/lens/689751dd6a7d446280d903d15d79f104?locale=en-US>, [retrieved on Apr. 25, 2024], 2024, 1 page.
Voxelize, Rossiev [online]. Denis Rossiev 2018-2024, Available Online at: <URL: https://www.rossiev.pro/voxelize/>, [retrieved on Apr. 25, 2024], 2024, 16 pages.
VR Design Best Practices, LeapMotion, Aug. 29, 2015, 31 pages.
Your PC in VR, Virtual Desktop [online]. Virtual Desktop, Inc., 2023 [retrieved on Apr. 17, 2024]. Retrieved from the Internet: <URL: https://www.vrdesktop.net/>, 4 pages.
Coloring a Point Cloud Using 3DF Zephyr Pro, Wayback Machine, https://web.archive.org/web/20170522233043/http://www.3dflow.net:80/technology/documents/3df-zephyr-tutorials/point-cloud-coloring-using-3df-zephyr/, May 22, 2017, 1 page.
Apple, "Use Continuity to Connect Your Mac, iPhone, iPad, and Apple Watch", Apple Support, Available online at <https://support.apple.com/en-us/HT204681>, [Retrieved from Internet on Dec. 23, 2022], 4 pages.
Apple, "Use Message Effects with iMessage on Your iPhone, iPad, and iPod Touch", Apple Support, Available online at: <https://support.apple.com/en-us/HT206894>, [retrieved on Feb. 22, 2024], 5 pages.
Banta et al., "A Next-Best-View System for Autonomous 3-D Object Reconstruction", IEEE Transactions on Systems, Man, and Cybernetics—Part A: Systems and Humans vol. 30, No. 5, Sep. 30, 2000, pp. 589-598.
Berard Francois, "A Study on Two-Dimensional Scrolling with Head Motion", CLIPS-IMAG Technical Report. France, Ref: <TR-IMAG-CLIPS-IHM-199901>, Retrieved from: <http://iihm.imag.fr/publs/1999/TR199901_PWindowRate.pdf>, Retrieved on Dec. 26, 2024, Jan. 8, 1999, 7 pages.
Bermejo et al., "Exploring Button Designs for Mid-air Interaction in Virtual Reality: A Hexa-metric Evaluation of Key Representations and Multi-modal Cues", Proceedings of the ACM on Human-Computer Interaction, vol. 5, No. EICS, Article 194, May 27, 2021, 26 pages.
Capturing Reality, "Data Sheet RealityCapture TARASQUE 1.2", Wayback Machine, https://web.archive.org/web/20220327110303/https://www.capturingreality.com/assets/Documents/datasheet_TARASQUE_1.2.pdf, Mar. 27, 2022, 5 pages.
Capturing Reality, "RealityCapture tutorial: Complete model in PPI", Youtube, https://www.youtube.com/watch?v=tw6wNNEbH_M, Oct. 14, 2021, 2 pages.
CAS and CHARY XR, "Oculus Go & Your Phone As 2nd Controller !!—An Inexpensive Way To Play PC VR Games", posted on Mar. 8, 2019, https://www.youtube.com/watch?v=i_iRVa0kemw, 2019, 4 pages.
Choe et al., "Augmented-Reality-Based 3D Emotional Messenger for Dynamic User Communication with Smart Devices", Electronics, vol. 9, No. 1127, Jul. 10, 2020, 15 pages.
Dhakal et al., "SLAM-Share: Visual Simultaneous Localization and Mapping for Real- time Multi-user Augmented Reality", CoNEXT '22, Dec. 6-9, 2022, Roma, Italy, 14 pages.
Didehkhorshid et al., "Text Input in Virtual Reality Using a Tracked Drawing Tablet", HCII 2020, LNCS 12428, 2020, pp. 314-329.
Dudley et al., "Fast and Precise Touch-Based Text Entry for Head-Mounted Augmented Reality with Variable Occlusion", ACM Transactions on Computer-Human Interaction (TOCHI), vol. 25, No. 6, Article 30, Dec. 13, 2018, 40 pages.
Edmiston et al., "Touch-Enabled Input Devices for Controlling Virtual Environments", 12th IFAC Symposium on Analysis, Design and Evaluation of Human-Machine Systems, Las Vegas, NV, USA, Aug. 11-15, 2013, pp. 349-356.
Gamedbharat, "I Want to Rotate a Object on Double Tap, Can Any One Help Me With This?", posted on Jul. 26, 2017, https://discussions.unity.com/t/i-want-to-rotate-a-object-on-double-tap-can-any-one-help-me-with-this/192010, 2017, 3 pages.
Ghosh et al., "NotifiVIR: Exploring Interruptions and Notifications in Virtual Reality", IEEE transactions on visualization and computer graphics, vol. 24, No. 4, Apr. 2018, pp. 1447-1456.
Headmaster Introduction, "If You Can Move Your Head, You Can Move Your World", Retrieved from: <https://www.microsoft.com/buxtoncollection/a/pdf/HeadMaster%20Introduction.pdf)>, Retrieved on Dec. 26, 2024, 4 pages.
Huang et al., "Proxy-Based Security Audit System for Remote Desktop Access", Computer Communications And Networks, ICCCN 2009. Proceedings of 18th International Conference On, IEEE, Piscataway, NJ, USA, Aug. 3, 2009, 5 pages.
Jones et al., "The Future of Virtual Museums: On-Line, Immersive, 3D Environments", ProQuest (Technology Collection Database, Dissertations and Theses Database): Technical Literature Search, Jul. 26, 2002, 12 pages.
Kim et al., "Pseudo-haptic Button for Improving User Experience of Mid-air Interaction in VR", International Journal of Human-Computer Studies, vol. 168, No. 102907, Aug. 9, 2022, 11 pages.
Kim et al., "Virtual Object Sizes for Efficient and Convenient Mid-air Manipulation", The Visual Computer, vol. 38, No. 9, Jul. 1, 2022, pp. 3463-3474.
Lachambre et al., "Unity Photogrammetry Workflow", https://unity3d.com/files/solutions/photogrammetry/Unity-Photogrammetry-Workflow_2017-07_v2.pdf, Jun. 23, 2017, pp. 55-64.
Lee et al., "UbiPoint: Towards Non-intrusive Mid-Air Interaction for Hardware Constrained Smart Glasses", In Proceedings of the 11th ACM Multimedia Systems Conference, May 27, 2020, pp. 190-201.
Lin et al., "Ubii: Physical World Interaction Through Augmented Reality", Publisher: IEEE, vol. 16, No. 3, DOI:10.1109/TMC.2016.2567378, May 13, 2016, pp. 872-885.
Locher et al., "Mobile Phone and Cloud—a Dream Team for 3D Reconstruction", 2016 IEEE Winter Conference on Applications of Computer Vision (WACV), 2016, pp. 1-8.
LOR CAS, "Reality Capture: Exporting Mesh", Youtube, https://www.youtube.com/watch?v=PdvTRa2B_s0, Dec. 10, 2020, 2 pages.
Medeiros et al., "Promoting Reality Awareness in Virtual Reality through Proxemics", IEEE Virtual Reality and 3D User Interfaces (VR), Mar. 27-Apr. 1, 2021, 11 pages.

(56) References Cited

OTHER PUBLICATIONS

Mendes et al., "Mid-Air Interactions Above Stereoscopic Interactive Tables", IEEE Symposium on 3D User Interfaces (3DUI), Mar. 29-30, 2014, pp. 3-10.
Metalnwood, "Using a Tablet for Touch Control, with VR Headset On. (Demo Vid)", Virtual Reality, ED Forums, Jun. 12, 2020, Available online at <https://forum.dcs.world/topic/237992-using-a-tablet-for-touch-control-with-vr-headset-on-demo-vid/>, [Retrieved from Internet on Jan. 2, 2024], 9 pages.
Nunez Angulo et al., "Manual for the Design of Didactic Units in Augmented Reality Using the Cospaces EDU Application", 2020, 75 pages.
Pfeuffer et al., "Gaze+touch vs. Touch: What's the Trade-off When Using Gaze to Extend Touch to Remote Displays?", Advances In Databases And Information Systems, Aug. 30, 2015, pp. 349-367.
Process a 3D Scan With Projection in Reality Capture (RC), Wayback Machine, https://web.archive.org/web/20200116135047/http:/www.pi3dscan.com/index.php/instructions/item/process-a-3d-scan-with-projection-in-reality-capture-rc, Jan. 16, 2020, 1 page.
Qi et al., "PointNet++: Deep Hierarchical Feature Learning on Point Sets in a Metric Space", Stanford University, Jun. 7, 2017, 14 pages.
Ran et al., "Multi-User Augmented Reality with Communication Efficient and Spatially Consistent Virtual Objects", CoNEXT '20, Dec. 1-4, 2020, Barcelona, Spain, 13 pages.
Ro et al., "AR Pointer: Advanced Ray-Casting Interface Using Laser Pointer Metaphor for Object Manipulation in 3D Augmented Reality Environment", Applied Sciences, vol. 9, No. 3078, [retrieved on Jul. 27, 2020], Jul. 30, 2019, 18 pages.
Schubert Martin, "Design Sprints at Leap Motion: A Playground of 3D User Interfaces", Ultraleap For Developers [online]. Nov. 8, 2017 [retrieved on Mar. 21, 2025]. Retrieved from the Internet: <URL: https://blog.leapmotion.com/design-playground-3d-user-interfaces/>, 17 pages.
Schuetz Markus, "Interactive Exploration of Point Clouds", Technische Universitat Wien, reposiTUm, https://doi.org/10.34726/hss.2021.91668, Mar. 8, 2021, 119 pages.
Slambekova Dana, "Gaze and Gesture Based Object Interaction in Virtual World", [retrieved on Dec. 17, 2015]. Retrieved from the Internet: <URL:https://www.cs.rit.edu/~dxs4659/Report.pdf>, May 31, 2012, 54 pages.
Speicher et al., "Pseudo-haptic Controls for Mid-air Finger-based Menu Interaction", CHI'19 Extended Abstracts, May 4-9, 2019, Conference on Human Factors in Computing Systems, May 2, 2019, pp. 1-6.
Strand Robin, "Surface Skeletons in Grids With Non-cubic Voxels", 2004 IEEE Xplore, Available Online at: <DOI: 10.1109/ICPR.2004.1334195>, Sep. 2004, 5 pages.
Sun et al., "MagicHand: Interact with IoT Devices in Augmented Reality Environment", 2019 IEEE Conference on Virtual Reality and 3D User Interfaces, Osaka, Japan, Mar. 23-27, 2019, [retrieved on Dec. 4, 2020], 6 pages.
Tolle et al., "Design of Head Movement Controller System (HEMOCS) for Control Mobile Application through Head Pose Movement Detection", Retrieved from :<https://www.google.com/url?sa=t&source=web&rct=j&opi=89978449&url=https://online-journals.org/index.php/i-jim/article/download/5552/4029/19224&ved=2ahUKEwj-w86vga-HAxUJJDQIHYMNDNw4HhAWegQILhAB&usg=AOWVaw3HR1t7v8Rx7osc1lp0UfOh>, DOI: <httpdx.doi.org/10.3991/ijim.v10i3.5552>, Retrieved on Dec. 26, 2024, 2016, 5 pages.
Wood Tyriel, "The HoloLens 2 Tour!—Discovering a World of Holograms", YouTube [online]. YouTube, Mar. 23, 2021 [retrieved on Dec. 7, 2023], Retrieved from the Internet: <URL: https://www.youtube.com/watch?v=rMks7sMzPxI>, 2 pages.
Writtenhouse Sandy, "How to Use Live View on Google Maps", Available online at <https://www.lifewire.com/use-live-view-google-maps-5323691>, [Retrieved from Internet on 2024-06-27], Jul. 5, 2022, 6 pages.
Yue et al., "Optimal Region Selection for Stereoscopic Video Subtitle Insertion", IEEE Transactions on Circuits and Systems for Video Technology, vol. 28, No. 11, Nov. 2018, 13 pages.
Zhuang et al., "Distributed Architecture for 3D Graphics Rendering in Collaborative System", Computer and Modernization, Issue 4, 2017, 5 pages (1 page of English Abstract and 4 pages of Official Copy).
Final Office Action received for U.S. Appl. No. 18/298,994, mailed on Sep. 12, 2025, 32 pages.

\* cited by examiner

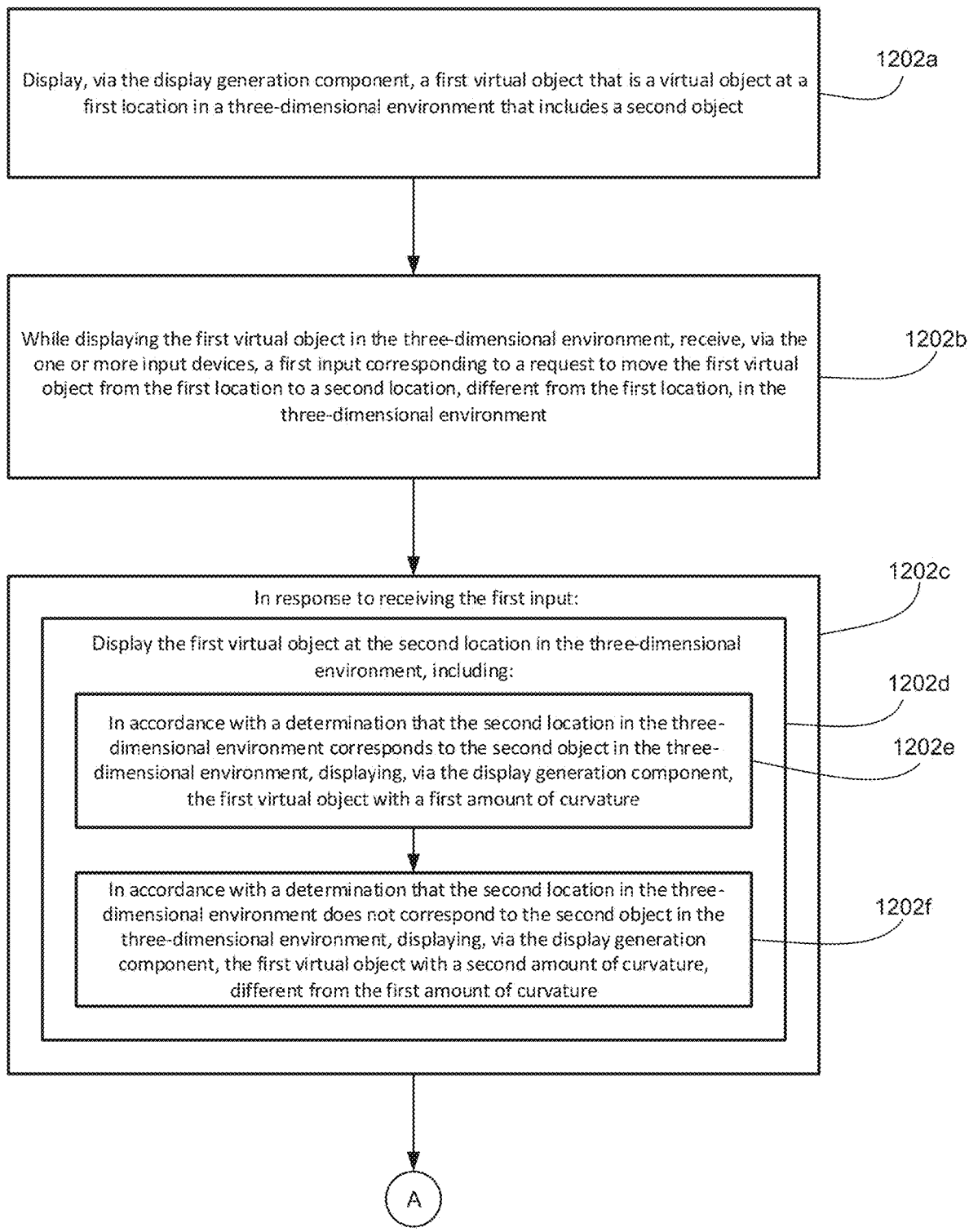

METHODS FOR DISPLAYING, SELECTING AND MOVING OBJECTS AND CONTAINERS IN AN ENVIRONMENT

CROSS-REFERENCE TO RELATED APPLICATIONS

This application claims the benefit of U.S. Provisional Application No. 63/266,726, filed Jan. 12, 2022, the content of which is incorporated herein by reference in its entirety for all purposes.

TECHNICAL FIELD

This relates generally to computer systems that provide computer-generated experiences, including, but no limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with content in a three-dimensional environment. Such methods and interfaces may complement or replace conventional methods for interacting with content in a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a computer system performs different object selection-related operations. In some embodiments, a computer system places objects at locations in a displayed region based on attention of a user. In some embodiments, a computer system displays a container virtual object with curvature in a three-dimensional environment.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 12A-12L is a flowchart illustrating a method of displaying a container virtual object with curvature in a three-dimensional environment in accordance with some embodiments.

DESCRIPTION OF EMBODIMENTS

Figure 1:
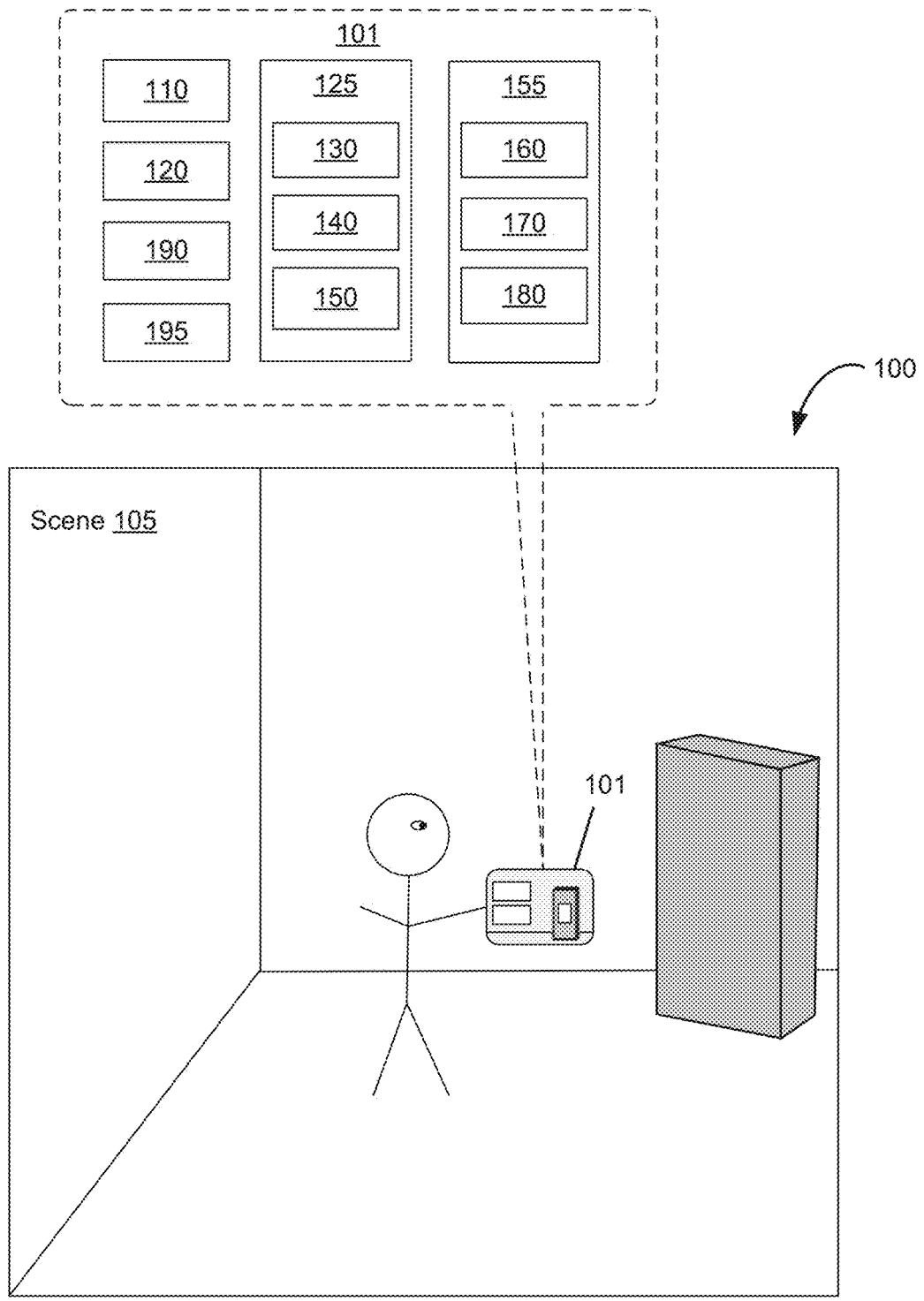
FIG. 1 is a block diagram illustrating an operating environment of a computer system for providing XR experiences in accordance with some embodiments.

The present disclosure relates to user interfaces for providing an extended reality (XR) experience to a user, in accordance with some embodiments.

The systems, methods, and GUIs described herein provide improved ways for an electronic device to facilitate interaction with and manipulate objects in a three-dimensional environment.

In some embodiments, a computer system displays virtual objects in an environment. In some embodiments, one or more of the virtual objects are selected and controlled by a first hand of a user. In some embodiments, an input is detected from a second hand of the user that is directed to a respective object other than the one or more objects. If the input from the second hand has first characteristics, the respective object is added to the one or more objects that are selected and controlled by the first hand. If the input from the second hand has second characteristics, the respective object is controlled by the second hand separately from the control of the one or more objects by the first hand.

In some embodiments, a computer system receives an input to insert a virtual object into a region, such as a region in an environment. In some embodiments, the computer system displays the virtual object at a location in the region based on where attention of the user is directed when the input is received. In some embodiments, if the location of the attention of the user is occupied by another object, the computer system selectively shifts the location at which to display the inserted virtual object.

In some embodiments, a computer system displays a virtual object in an environment. In some embodiments, the computer system receives input to move the virtual object to a particular location in the environment. In some embodiments, if the particular location corresponds to another object (e.g., physical or virtual) in the environment, the computer system displays the virtual object at the particular location with a first curvature. In some embodiments, if the particular location does not correspond to another object in the environment, the computer system displays the virtual object at the particular location with a second curvature. In some embodiments, the curvature of the virtual object is additionally or alternatively based on the distance of the virtual object from one or more viewpoints, how many viewpoints are concurrently sharing the environment and/or the relative locations of one or more viewpoints relative to the virtual object.

FIGS. 1-6 provide a description of example computer systems for providing XR experiences to users (such as described below with respect to methods 800, 1000 and/or 1200). FIGS. 7A-7G illustrate examples of a computer system performing different object selection-related operations in accordance with some embodiments. FIGS. 8A-8K is a flowchart illustrating an exemplary method of performing different object selection-related operations in accordance with some embodiments. The user interfaces in FIGS. 7A-7G are used to illustrate the processes in FIGS. 8A-8K. FIGS. 9A-9F illustrate examples of a computer system placing objects at locations in a displayed region based on attention of a user in accordance with some embodiments. FIGS. 10A-10J is a flowchart illustrating a method of placing objects at locations in a displayed region based on attention of a user in accordance with some embodiments. The user interfaces in FIGS. 9A-9F are used to illustrate the processes in FIGS. 10A-10J. FIGS. 11A-11G illustrate examples of a computer system displaying a container virtual object with curvature in a three-dimensional environment in accordance with some embodiments. FIGS. 12A-12L is a flowchart illustrating a method of displaying a container virtual object with curvature in a three-dimensional environment in accordance with some embodiments. The user interfaces in FIGS. 11A-11G are used to illustrate the processes in FIGS. 12A-12L.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality. Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display.

Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
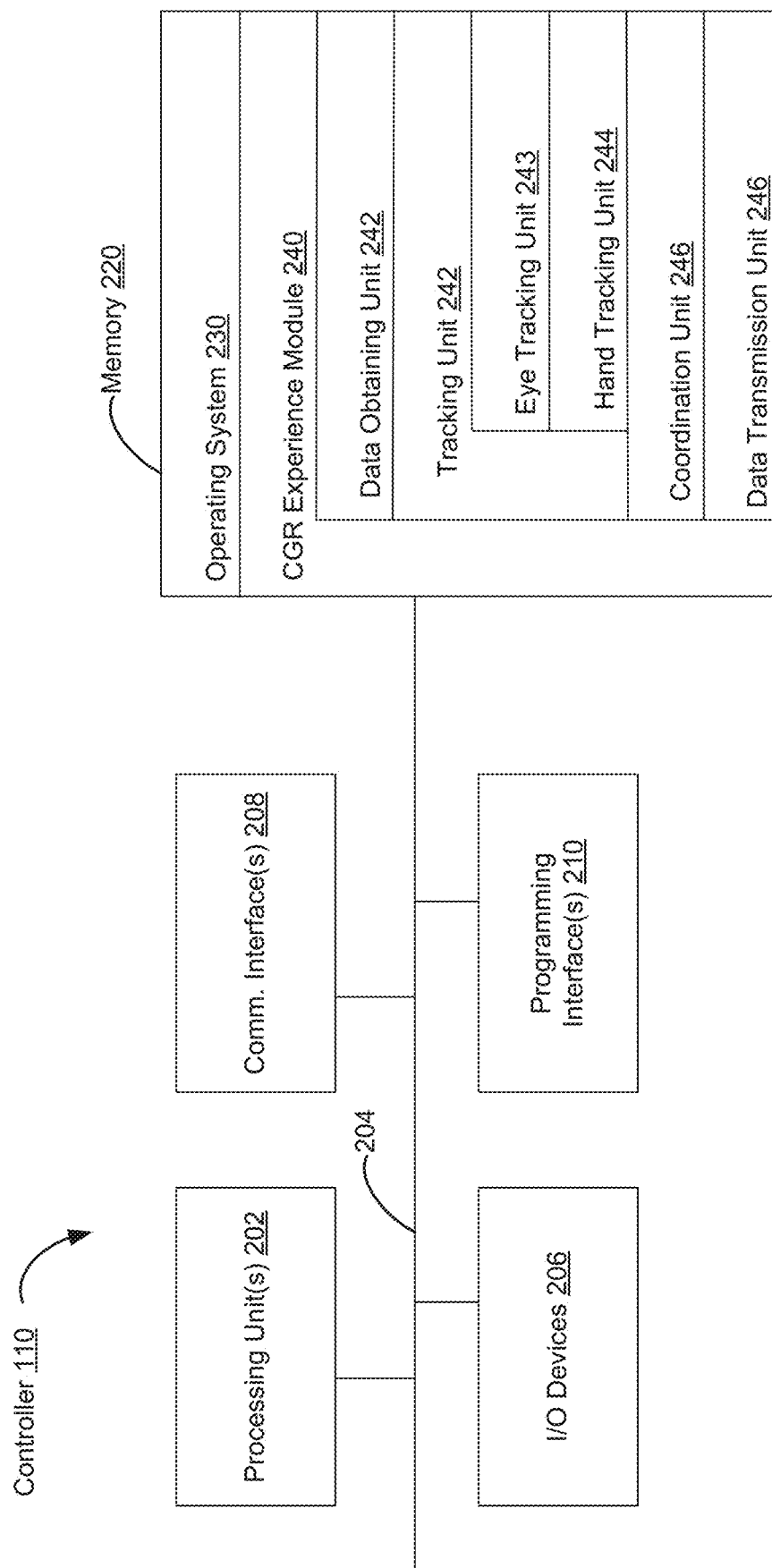
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
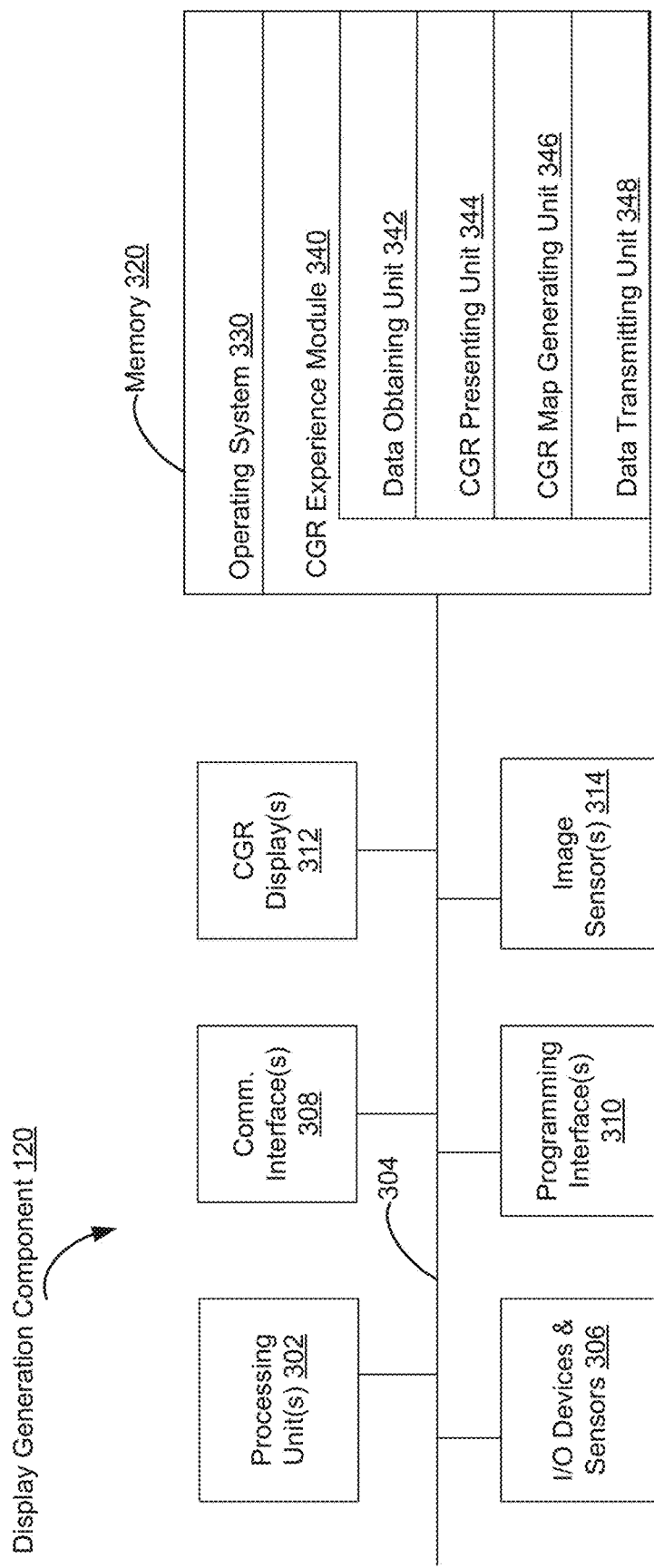
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
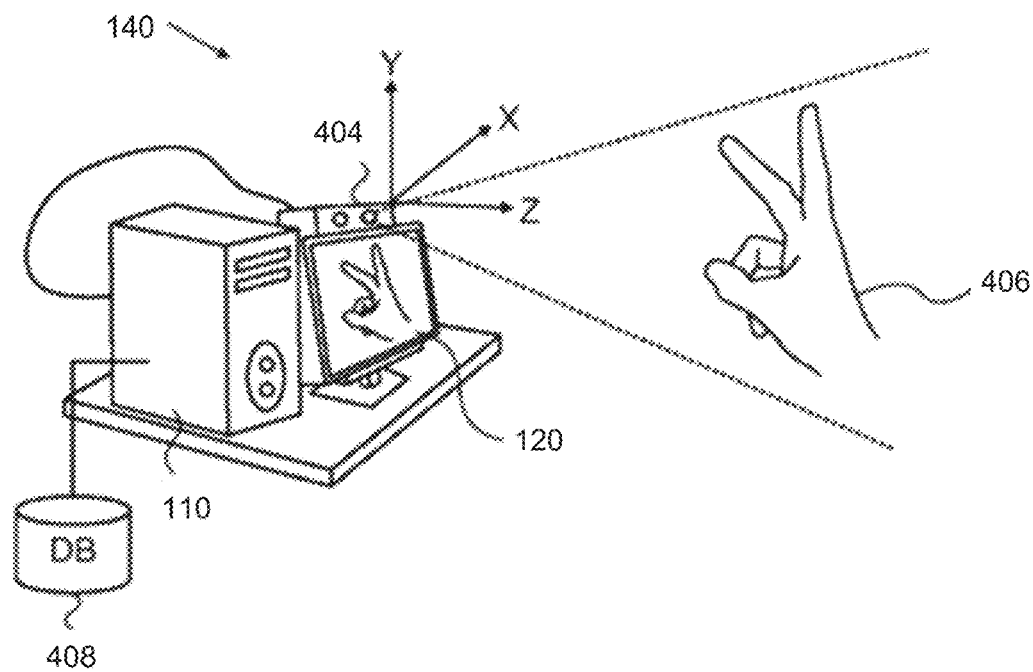
FIG. 4 is a block diagram illustrating a hand tracking unit of a computer system that is configured to capture gesture inputs of the user in accordance with some embodiments.
Figure 4:
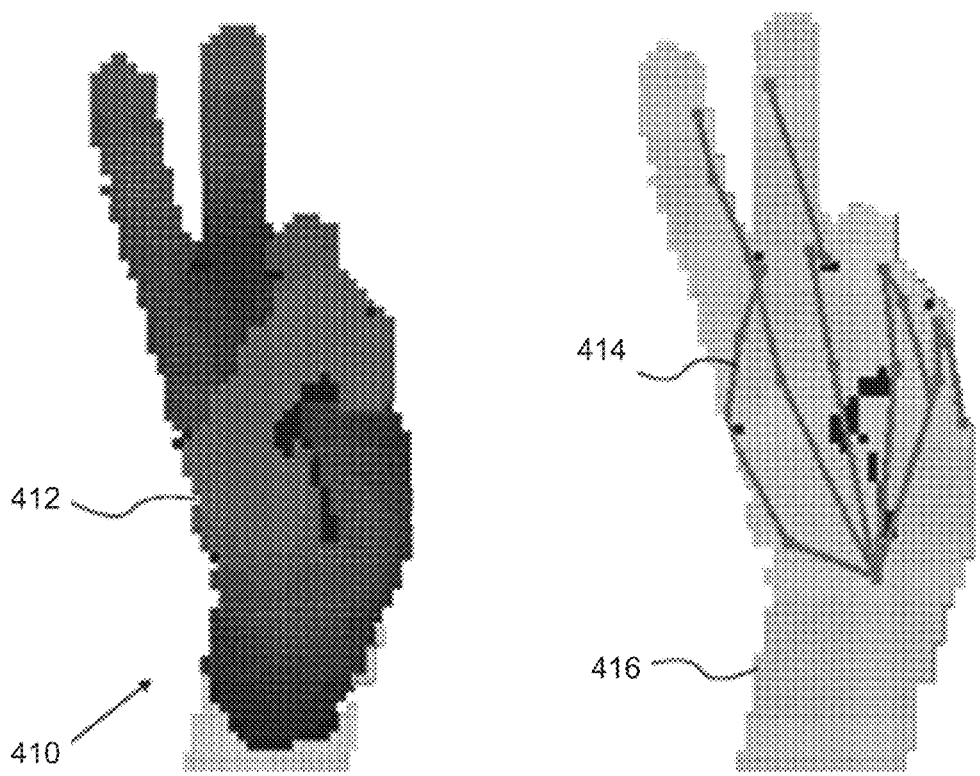

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands)

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
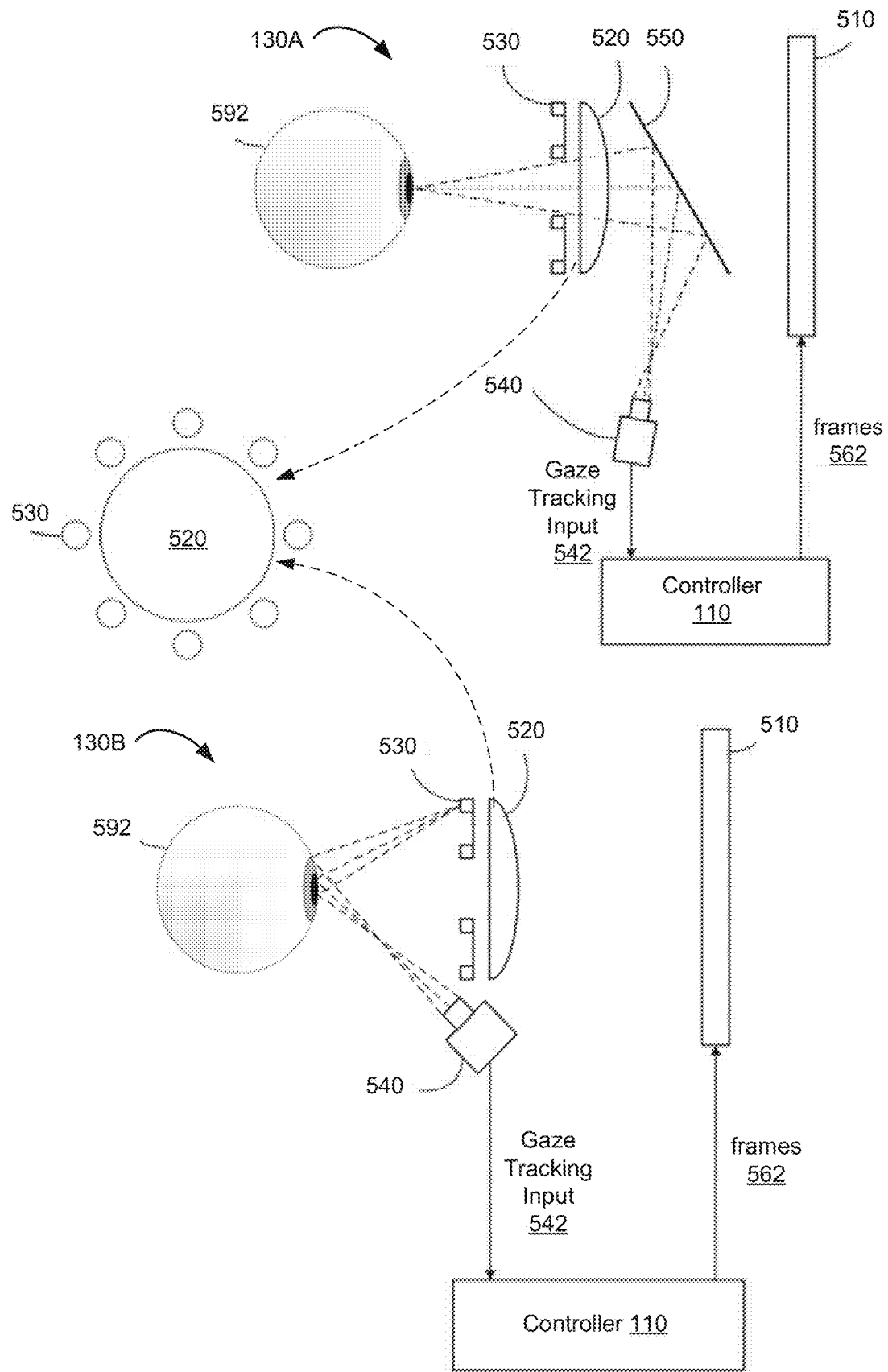
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
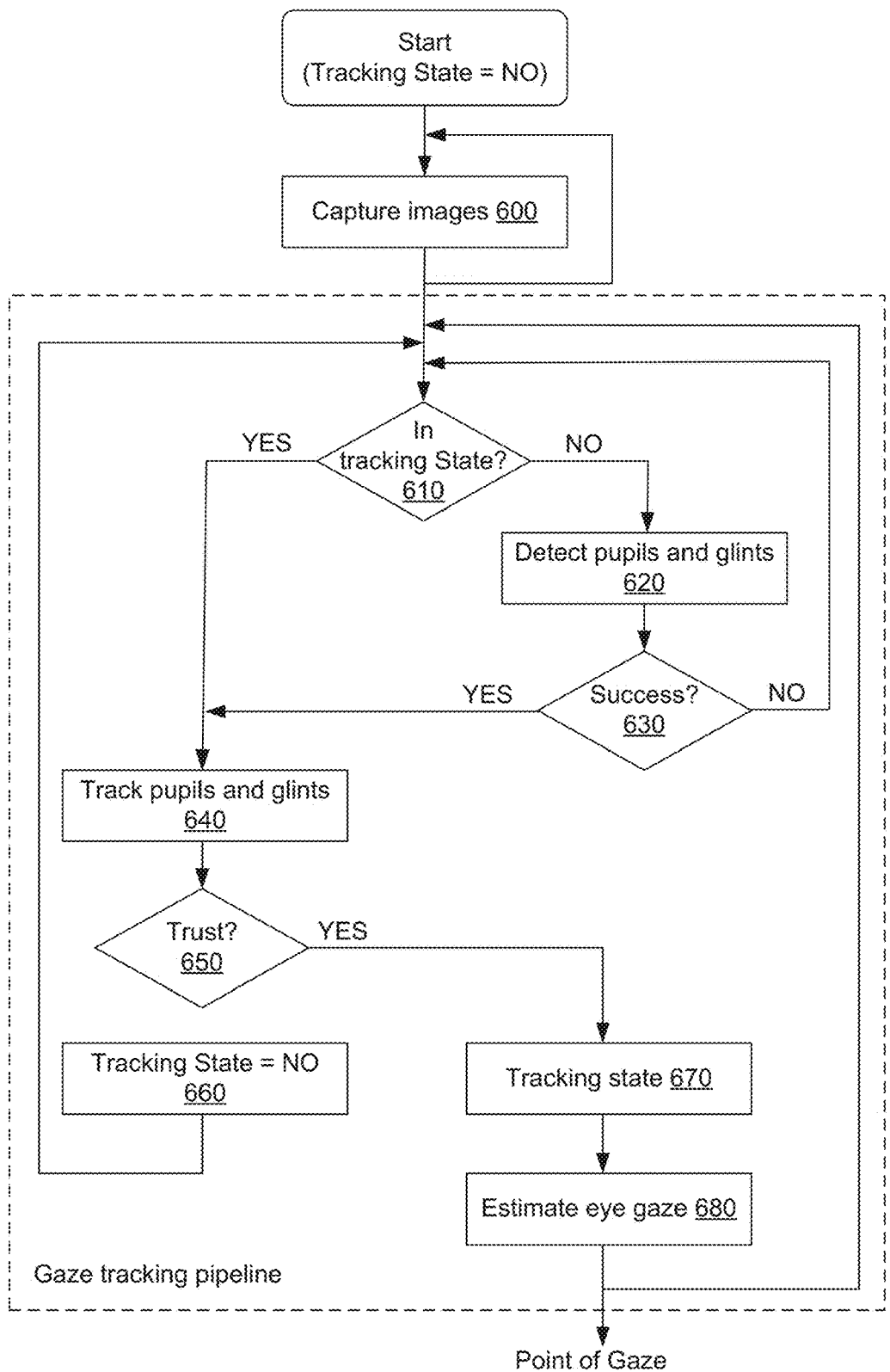
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of an computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

Similarly, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UP") and associated processes that may be implemented on a computer system, such as portable multifunction device or a head-mounted device, with a display generation component, one or more input devices, and (optionally) one or cameras.

FIGS. 7A-7G illustrate examples of a computer system performing different object selection-related operations in accordance with some embodiments.

Figure 7A:
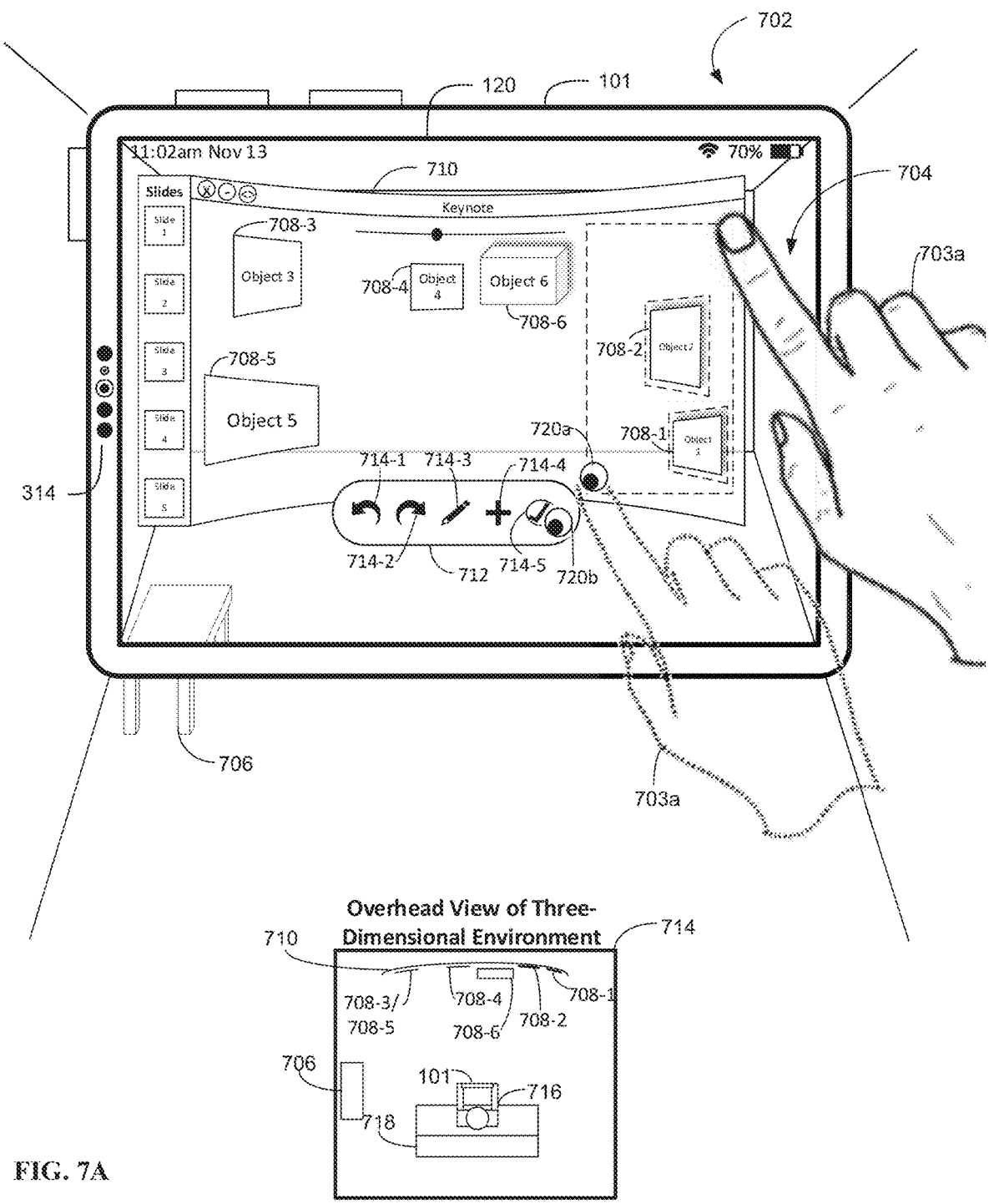
FIGS. 7A-7G illustrate examples of a computer system performing different object selection-related operations in accordance with some embodiments.

FIG. 7A illustrates a three-dimensional environment 704 visible via a display generation component (e.g., display generation component 120 of FIG. 1) of a computer system 101, the three-dimensional environment 704 visible from a viewpoint 716 of a user illustrated in the overhead view 714 (e.g., facing the back wall of the physical environment in which computer system 101 is located, and near the back left corner of the physical environment). As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or gaze of the user (e.g., internal sensors facing inwards towards the face of the user).

As shown in FIG. 7A, computer system 101 captures one or more images of the physical environment 702 around computer system 101 (e.g., operating environment 100), including one or more objects in the physical environment around computer system 101. In some embodiments, computer system 101 displays representations of the physical environment in three-dimensional environment 704 and/or the physical environment 702 is visible in the three-dimensional environment 704 via the display generation component 120. For example, three-dimensional environment 704 visible via display generation component 120 includes representations of the physical floor and back and side walls of the room in which computer system 101 is located. Three-dimensional environment 704 also includes table 706 (shown via display generation component 120 and in the overhead view 714).

In FIG. 7A, three-dimensional environment 704 also includes virtual objects 708-1 through 708-6, virtual object 710 and virtual object 712. Virtual objects 708-1 through 708-6 are optionally one or more of user interfaces of applications (e.g., messaging user interfaces, content browsing user interfaces, etc.), three-dimensional objects (e.g., virtual clocks, virtual balls, virtual cars, etc.) or any other element displayed by computer system 101 that is not included in the physical environment of computer system 101. Virtual object 710 is optionally a container or canvas object that contains virtual objects 708-1 through 708-6, as described in more detail with reference to methods 800, 1000 and/or 1200. Virtual object 712 is optionally a tool palette object for performing operations relating to virtual objects 708-1 through 708-6 and/or 710. For example, element 712 includes selectable option 714-1 that is selectable to undo a last operation that was performed relating to virtual objects 708-1 through 708-6 and/or 710, selectable option 714-2 that is selectable to redo a last operation that was canceled or undone relating to virtual objects 708-1 through 708-6 and/or 710, selectable option 714-3 that is selectable to edit a currently selected object(s) of virtual objects 708-1 through 708-6, selectable option 714-4 that is selectable to add a new virtual object to object 710, and selectable option 714-5 that is selectable to cause computer system 101 and/or object 710 to transition to a selection mode, which will be described in more detail later.

In some embodiments, one or more of objects 708-1 through 708-6 are selectable and/or highlightable to designate those objects as targets for further operations (e.g., movement operations, copy operations or cut operations). In some embodiments, multiple virtual objects are selected in response to a "marquee selection" input performed based on an air pinch gesture as will now be described. For example, in FIG. 7A, while gaze 720a of the user is directed to a portion of object 710 that does not include an object, computer system 101 detects hand 703a perform an air pinch gesture in which the thumb and index finger of hand 703a come together and touch a particular position in the physical environment 702. The location in object 710 to which gaze 720a was directed when the air pinch gesture was detected optionally defines a corner or boundary point of a selection area (e.g., corresponding to the lower left corner of the dashed rectangle in object 710 in FIG. 7A). While the thumb and index finger of hand 703a remain in contact (e.g., hand 703a is holding a pinch hand shape), computer system 101 detects hand 703a move in an upward and rightward direction to the current location of hand 703a in FIG. 7A. The amount and/or direction of movement of hand 703a away from the location of gaze 720a when the air pinch gesture was initiated optionally define the distance and/or direction, respectively, of a second corner or boundary point of the selection area (e.g., corresponding to the upper right corner of the dashed rectangle in object 710 in FIG. 7A).

In some embodiments, any objects that fall within the define selection area become selected themselves. For example, in FIG. 7A, objects 708-1 and 708-2 are selected as indicated by the dashed-line boundaries around them. In some embodiments, objects 708-1 and 708-2 are selected as soon as they fall within the selection area and before computer system 101 detects hand 703a release the hand pinch shape (e.g., the thumb and index finger of hand 703a moving apart). In some embodiments, objects 708-1 and 708-2 are not selected until computer system 101 detects hand 703a release the hand pinch shape, and become selected at that point. Objects that are selected are shown in overhead view 714 with a bold appearance, to differentiate from objects that are not selected, which are shown without the bold appearance. In some embodiments, two-dimensional objects that are selected are separated from object 710 (e.g., indicated by the drop shadow shown for objects 708-1 and 708-2), and two-dimensional objects that are not selected are not separated from object 710 or are separated less from object 710 (e.g., indicated by no drop shadow shown for objects 708-3 to 708-6). In some embodiments, three-dimensional objects are separated from object 710 whether or not they are selected (e.g., indicated by the drop shadow shown for object 708-6). In some embodiments, three-dimensional objects separate more from object 710 when they are selected as compared with when they are not selected; in some embodiments, the separation of three-dimensional objects from object 710 does not change based on whether they are selected.

Figure 7B:
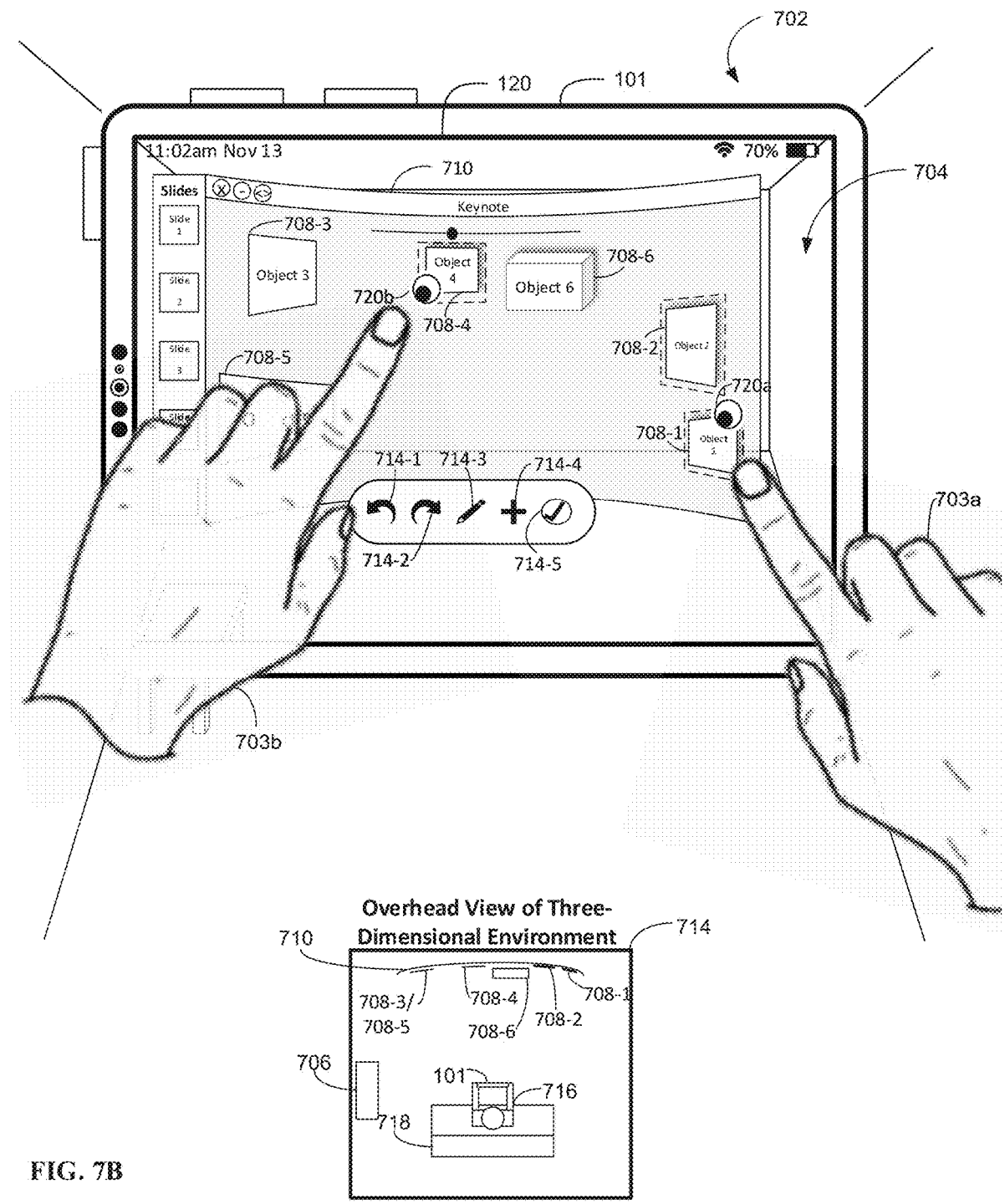

In FIG. 7B, selected objects 708-1 and 708-2 are both being controlled by hand 703a. For example, in response to movement of hand 703a, computer system 101 will move objects 708-1 and 708-2 (e.g., within object 710) in accordance with such movement (e.g., based on the magnitude and/or direction of the movement of hand 703a, as described in more detail with reference to method 800). Objects 708-1 and 708-2 optionally become controlled by hand 703a in response to computer system 101 detecting, while objects 708-1 and 708-2 are selected (e.g., in response to the input of FIG. 7A), gaze 720a of the user directed to at least one of objects 708-1 or 708-2 and while gaze 720a is directed to that object, an air pinch gesture (e.g., as previously described) performed by hand 703a. While hand 703a holds that air pinch gesture in which the thumb and index finger are touching, for example, objects 708-1 and 708-2 will be controlled by hand 703a.

While objects 708-1 and 708-2 are controlled by hand 703a, a second hand of the user—hand 703b—is able to interact with other objects in three-dimensional environment 704. The response of computer system 101 to such interaction depends on the characteristics of the input provided by hand 703b. For example, if hand 703b performs a quick pinch air gesture in which the thumb and index finger of hand 703b come together and touch and then move apart to release the pinch hand shape within a time threshold of touching (e.g., as described in more detail with reference to method 800) while gaze 720b is directed to object 708-4, such as shown in FIG. 7B, object 708-4 is optionally added to the set of objects being controlled by hand 703a (e.g., objects 708-1 and 708-2). In such a scenario, subsequent movement of hand 703a will cause computer system 101 to correspondingly move not only objects 708-1 and 708-2, but also object 708-4. For example, in FIG. 7C, hand 703a moves leftward, and in response computer system moves objects 708-1, 708-2 and 708-4 leftward in accordance with the movement of hand 703a.

In contrast, in FIG. 7B, if computer system 101 had instead detected hand 703b perform a long pinch air gesture in which the thumb and index finger of hand 703b come together and touch and do not move apart to release the pinch hand shape within the time threshold of touching while gaze 720b is directed to object 708-4, followed by movement of hand 703b more than a movement threshold (e.g., as described in more detail with reference to method 800), object 708-4 would be controlled by hand 703b while objects 708-1 and 708-2 would continue to be controlled by hand 703a. For example, from FIG. 7B to 7D, hand 703b has moved downward and computer system 101 has moved object 708-4 downward accordingly, and hand 703a has moved upward and computer system 101 has moved objects 708-1 and 708-2 upward accordingly. In some embodiments, in response to detecting hands 703a and/or 703b release the hand pinch shape, the objects being controlled by those hands remain selected. In some embodiments, in response to detecting hands 703a and/or 703b release the hand pinch shape, the objects being controlled by those hands become unselected.

Figure 7C:
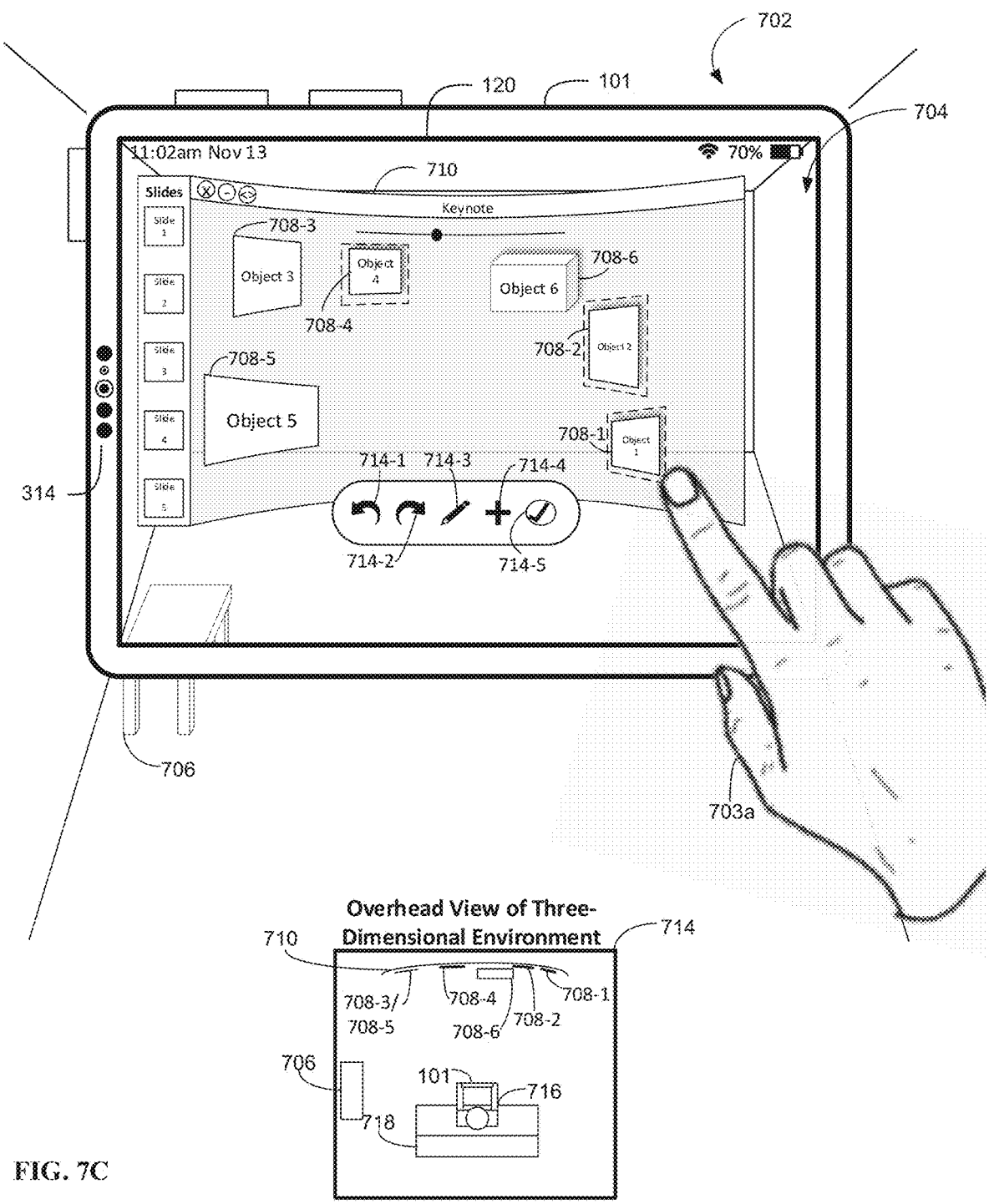

Computer system 101 and/or object 710 also operate in a selection mode with one or more different responses to the types of inputs described above. For example, in FIG. 7A, in response to detecting selection of selectable option 714-5 (e.g., via a quick pinch air gesture performed by hand 703a while gaze 720b is directed to selectable option 714-5), the selection mode is activated, as shown in FIG. 7E. In the selection mode, element 712 is optionally updated to include selectable option 714-6, which is selectable to exit the selection mode. While in the selection mode, a long pinch and drag air gesture (e.g., such as described with reference to FIG. 7A to define the selection area) optionally results in scrolling through object 710 rather than definition of a selection area. For example, in FIG. 7E, computer system 101 detects gaze 720 directed to an empty portion of object 710 and a long pinch and drag air gesture by hand 703a with movement of hand 703a leftward. It should be understood that hand 703a is optionally the same hand as hand 703b, or a different hand. In response, as shown in FIG. 7F, computer system 101 has scrolled through object 710 rightward to hide objects 708-1 through 708-6, and reveal objects 708-7 and 708-8. In some embodiments, even if gaze 720 were directed to an object in FIG. 7E, and even if that object (or objects) were selected, computer system 101 would scroll through object 710 in response to a long pinch and drag air gesture by hand 703a rather than move objects in response to such as drag while in the selection mode.

While in the selection mode, a quick pinch air gesture directed to an object causes that object to become selected. For example, in FIG. 7F, computer system 101 detects hand 703a perform a quick pinch air gesture while gaze 720 is directed to object 708-7. In response, as shown in FIG. 7F, object 708-7 has become selected. Further, in some embodiments, computer system 101 updates selectable option 714-6 to indicate the number of objects within object 710 that are currently selected. For example, in FIG. 7F, computer system 101 has updated selectable option 714-6 to indicate that one object is selected.

Figure 7D:
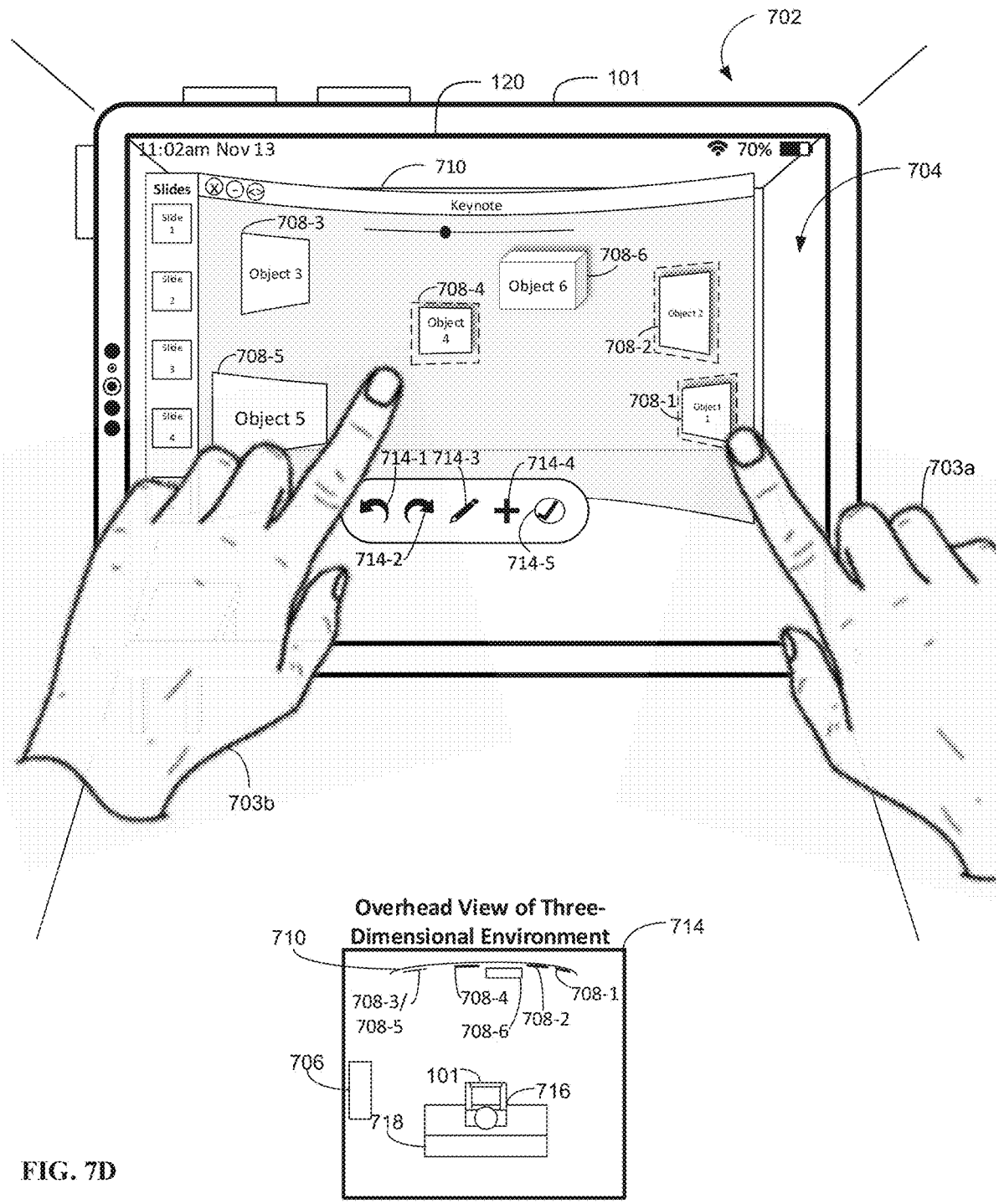
Figure 7E:
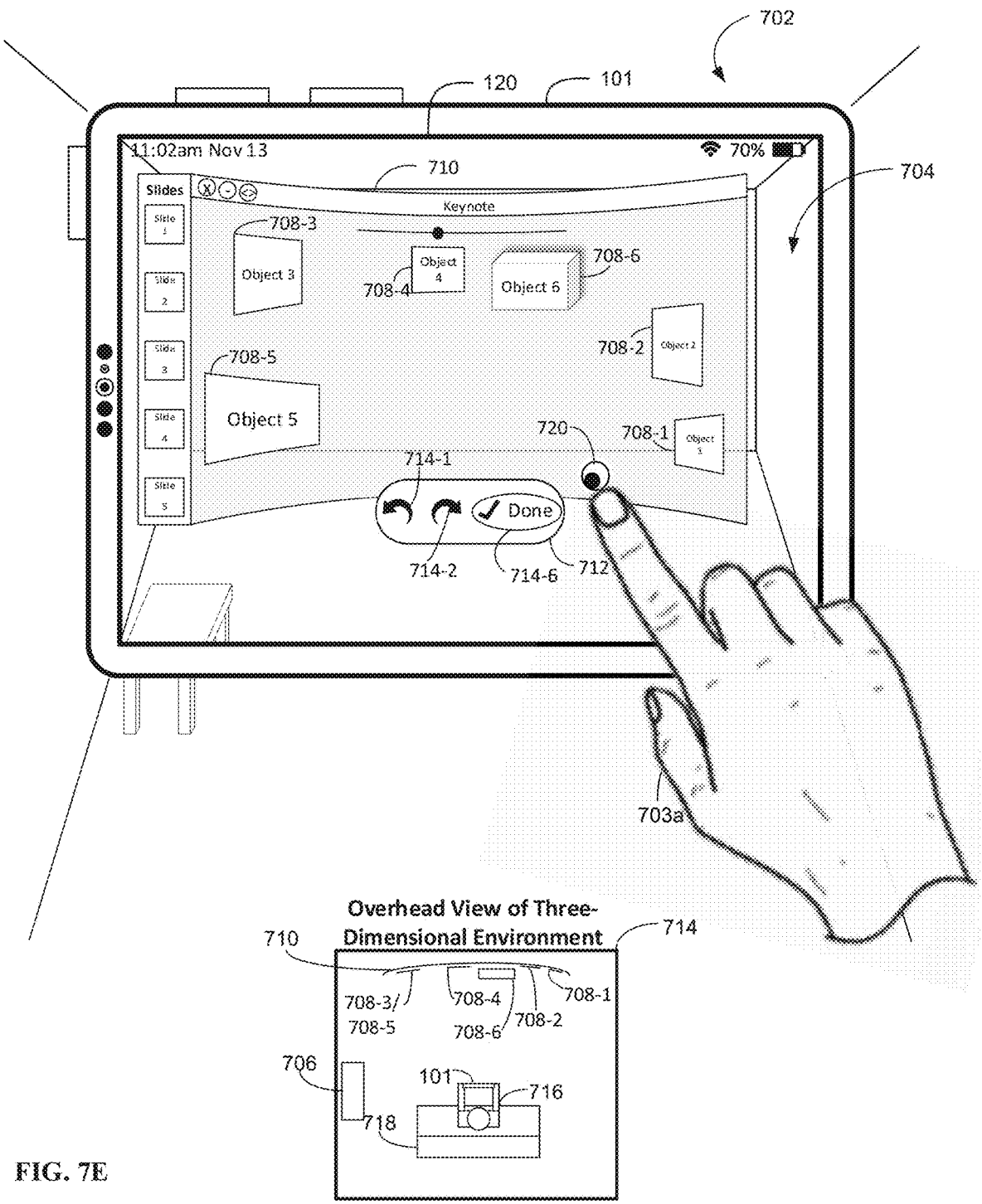
Figure 7F:
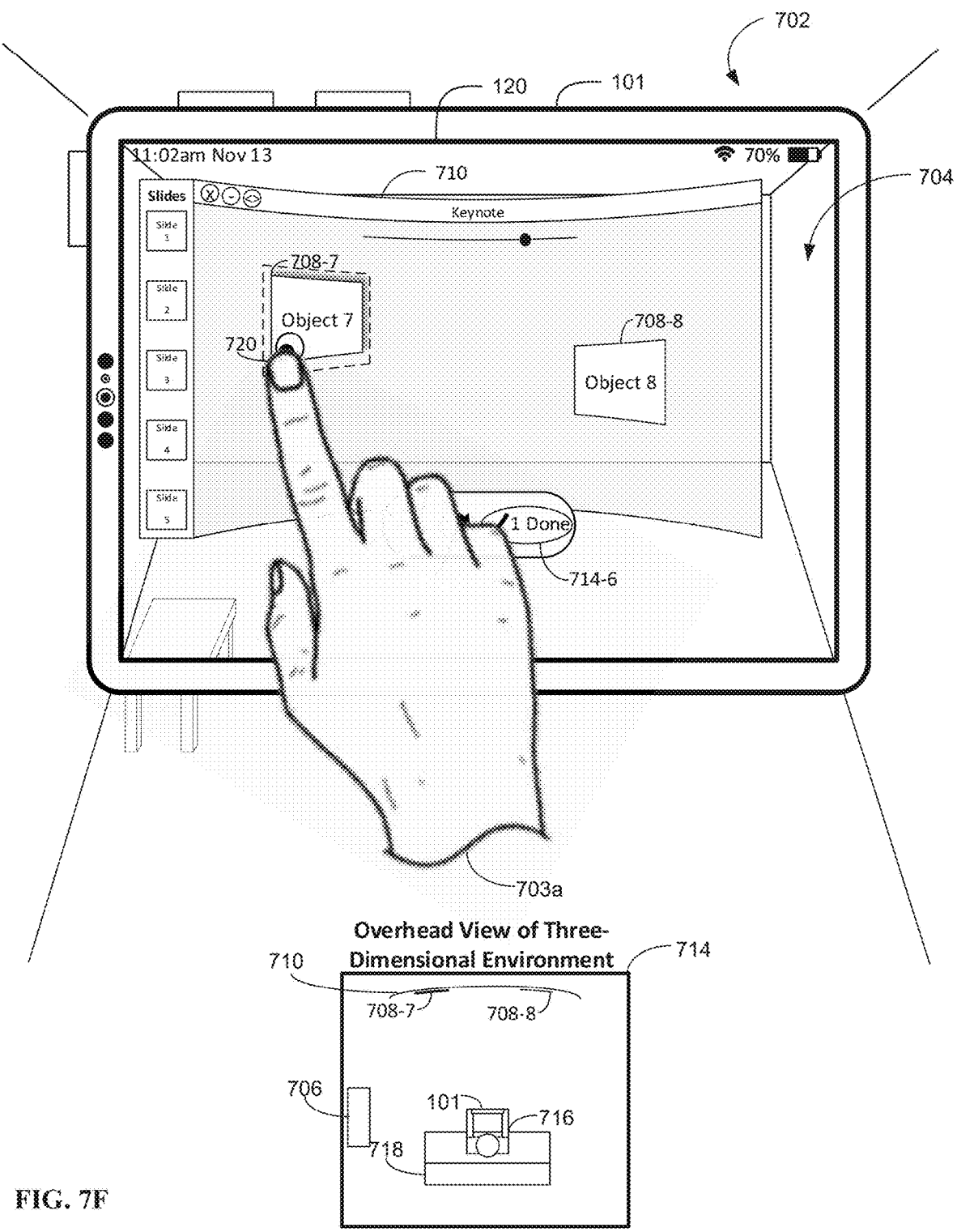
Figure 7G:
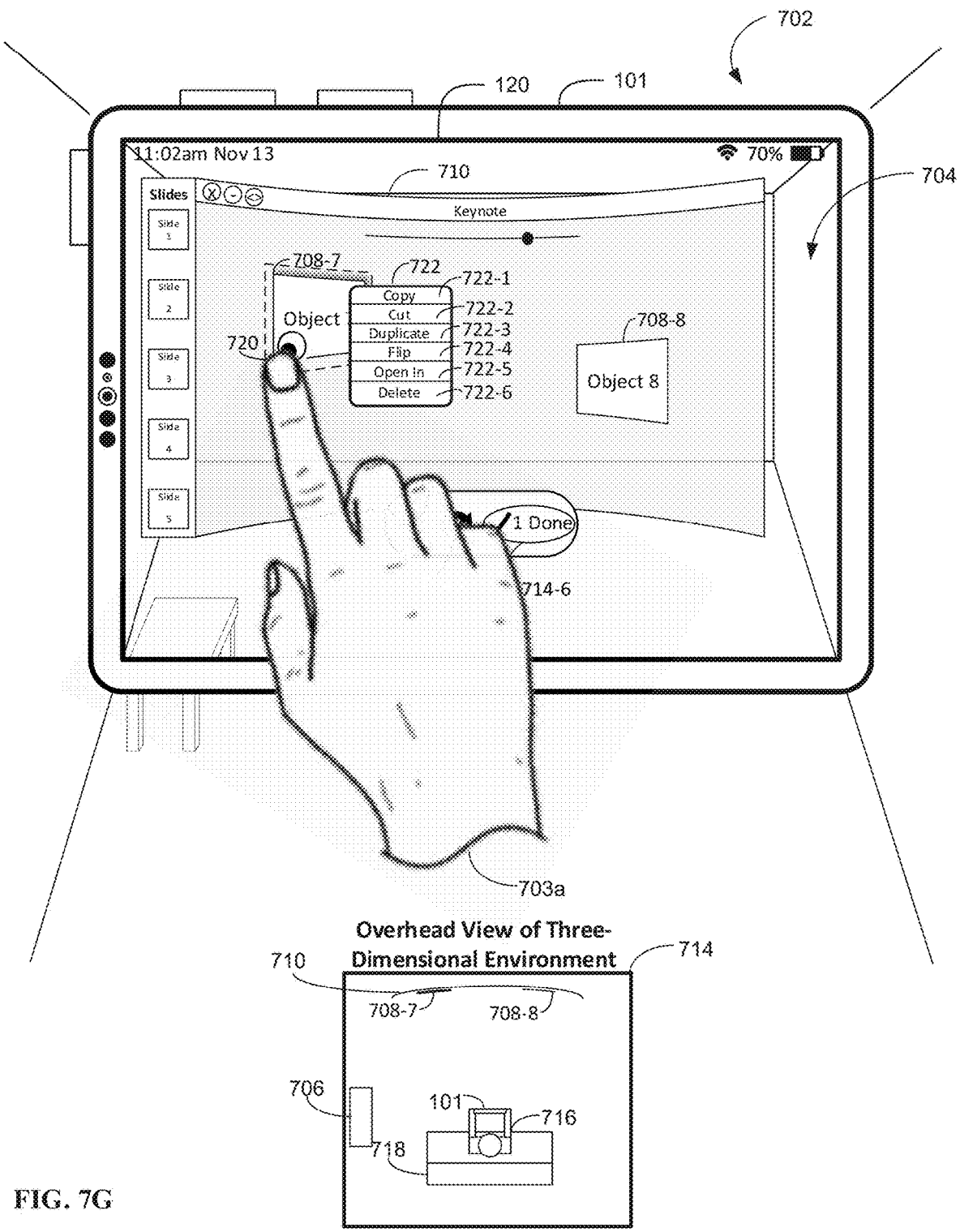
Figure 8A:
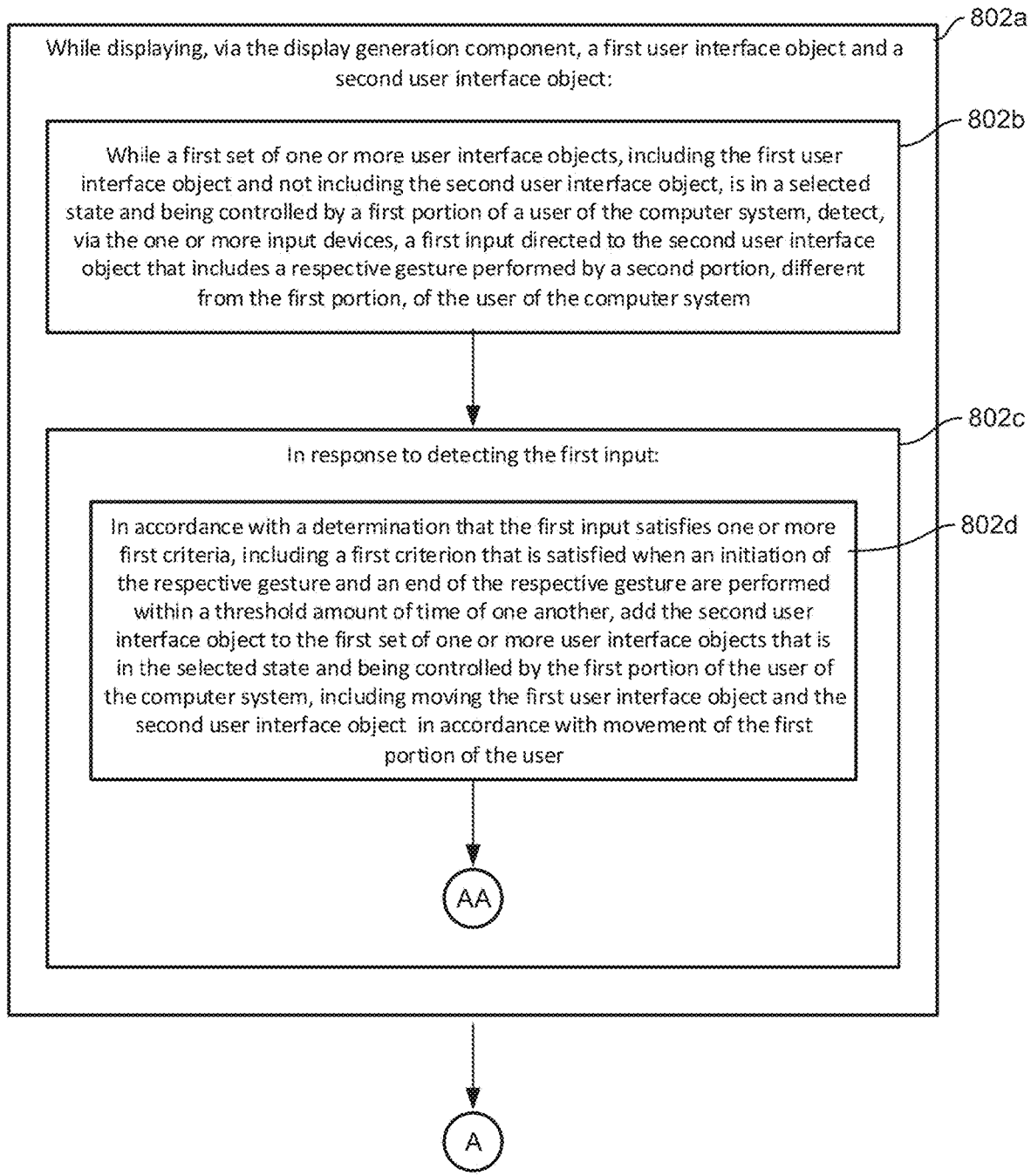
FIGS. 8A-8K is a flowchart illustrating an exemplary method of performing different object selection-related operations in accordance with some embodiments.
Figure 8B:
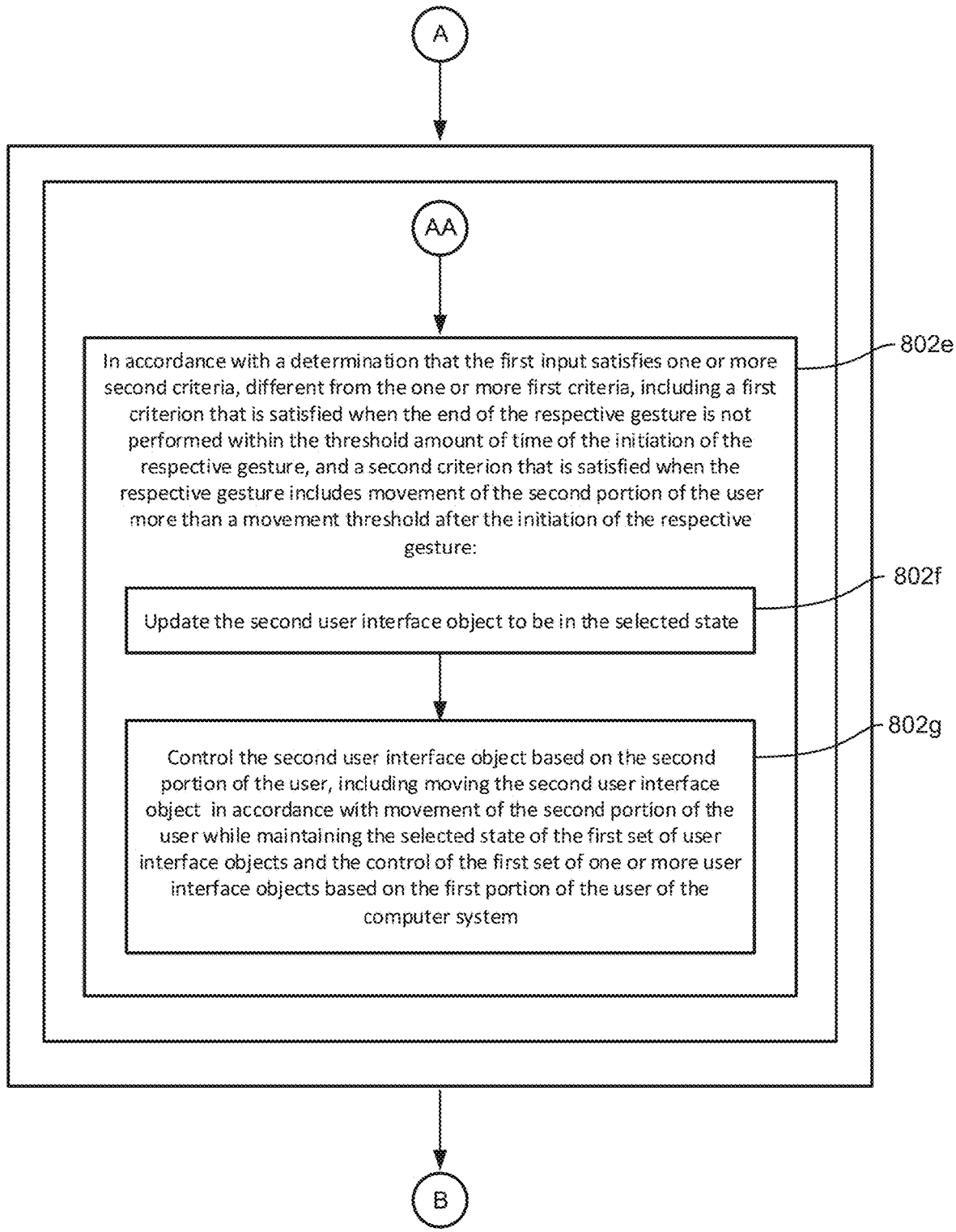
Figure 8C:
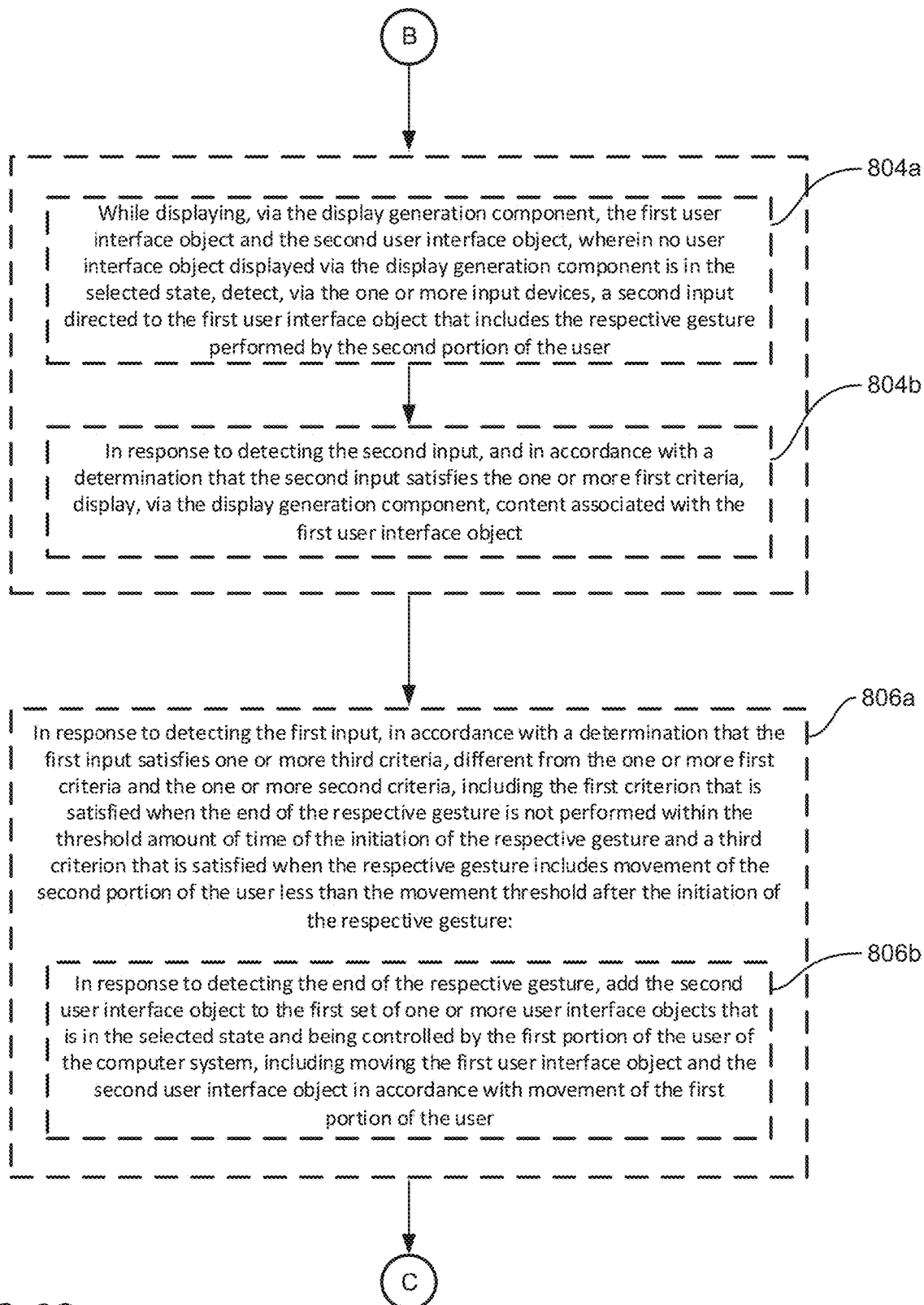
Figure 8D:
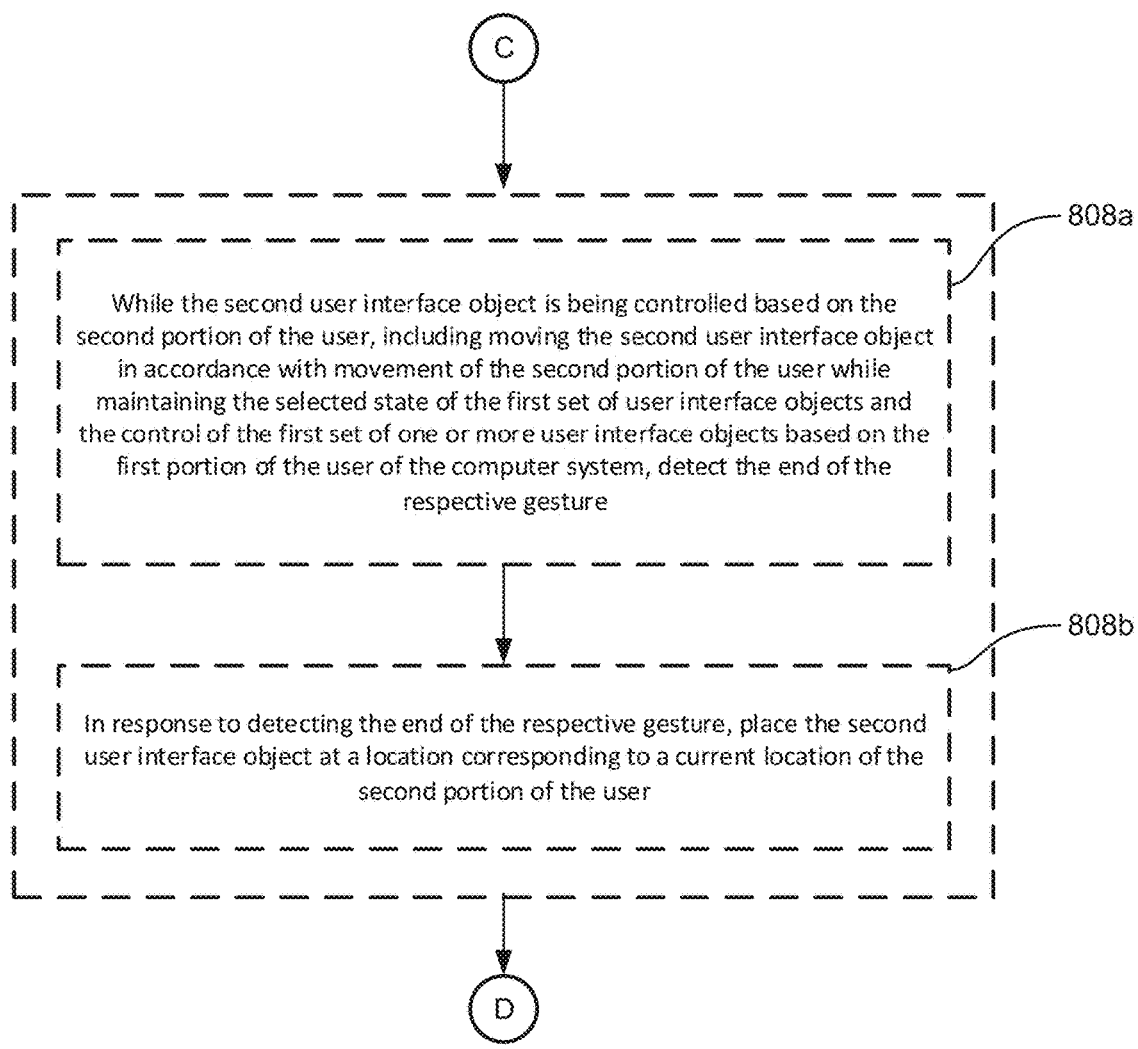
Figure 8E:
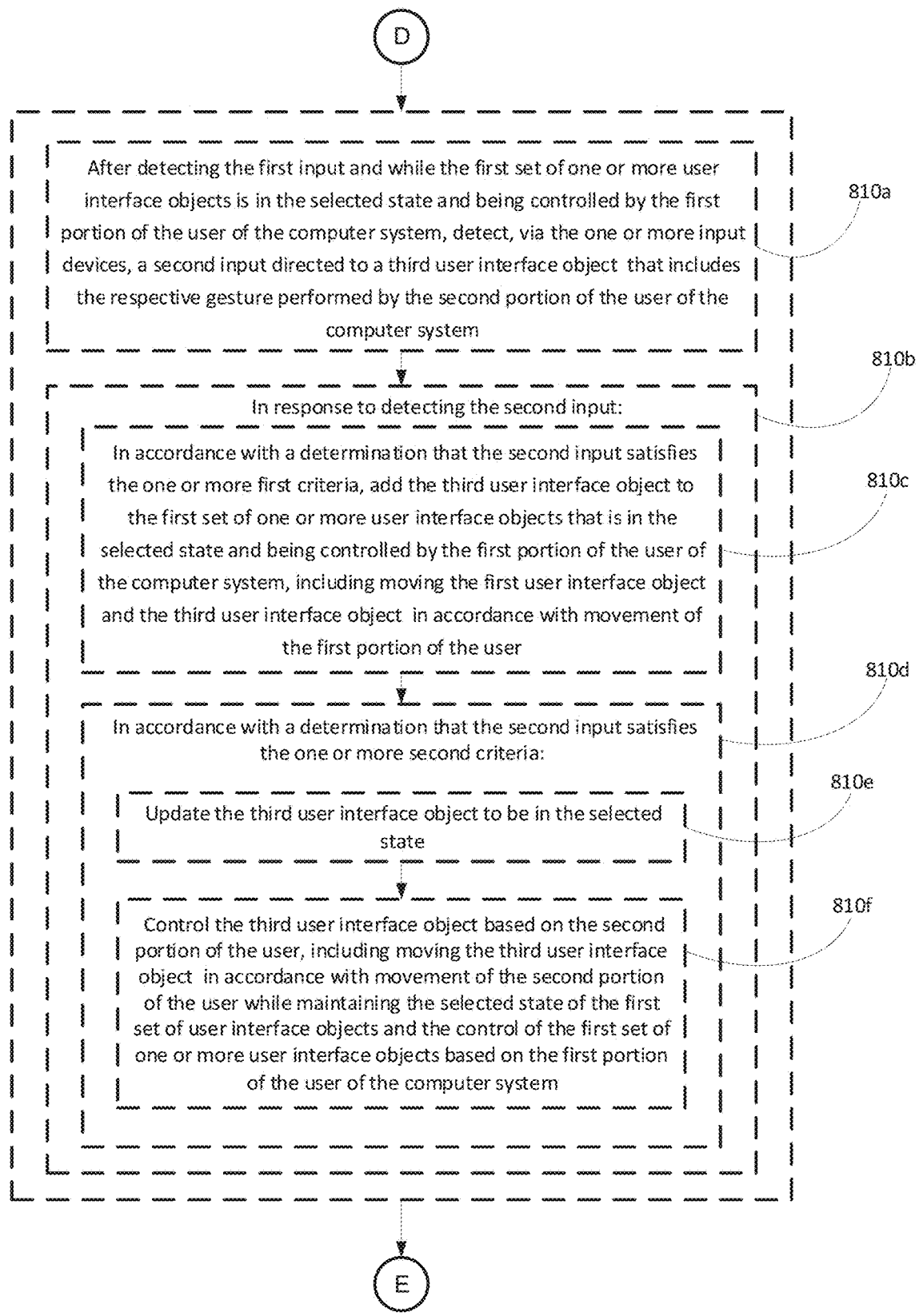
Figure 8F:
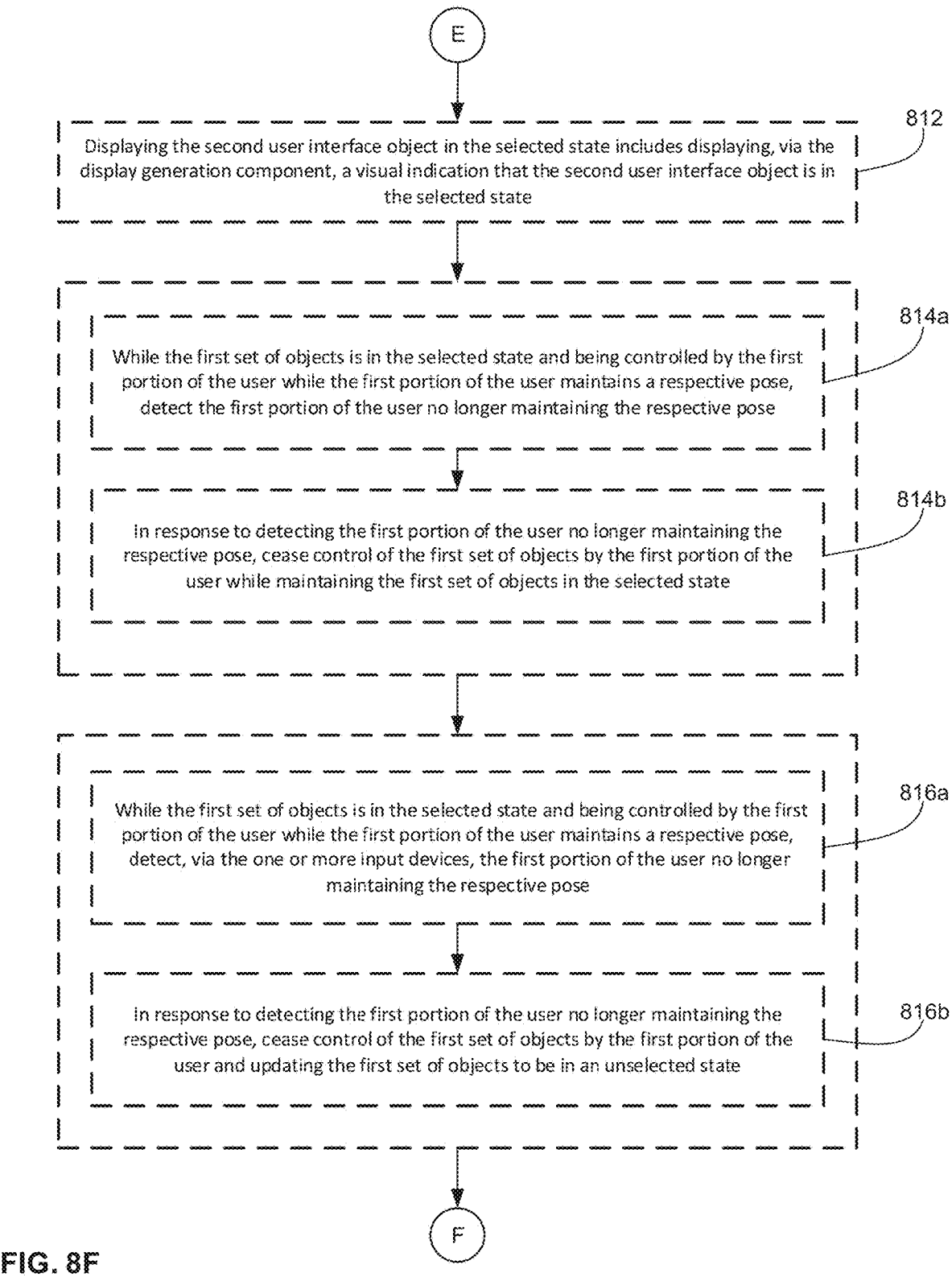
Figure 8G:
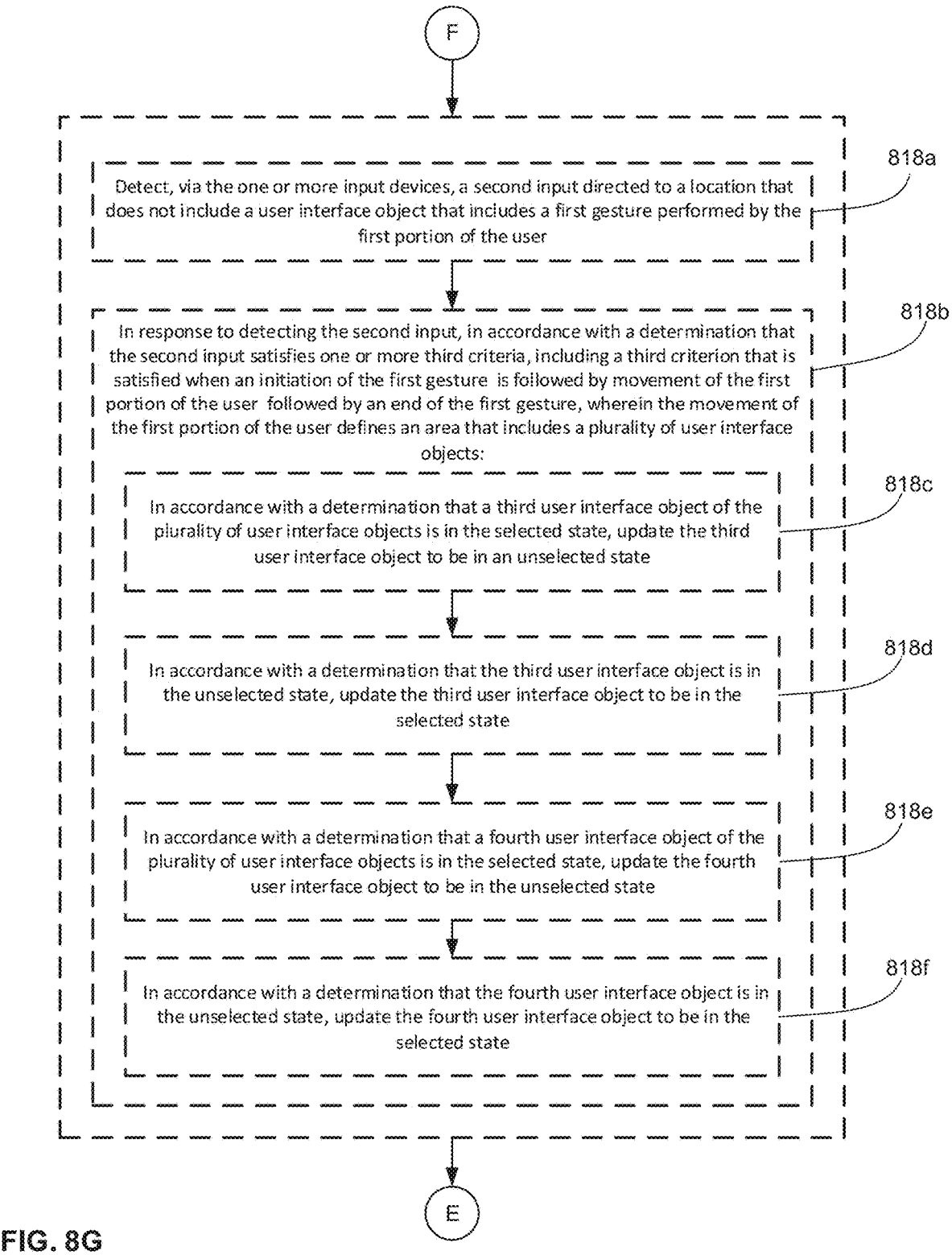
Figure 8H:
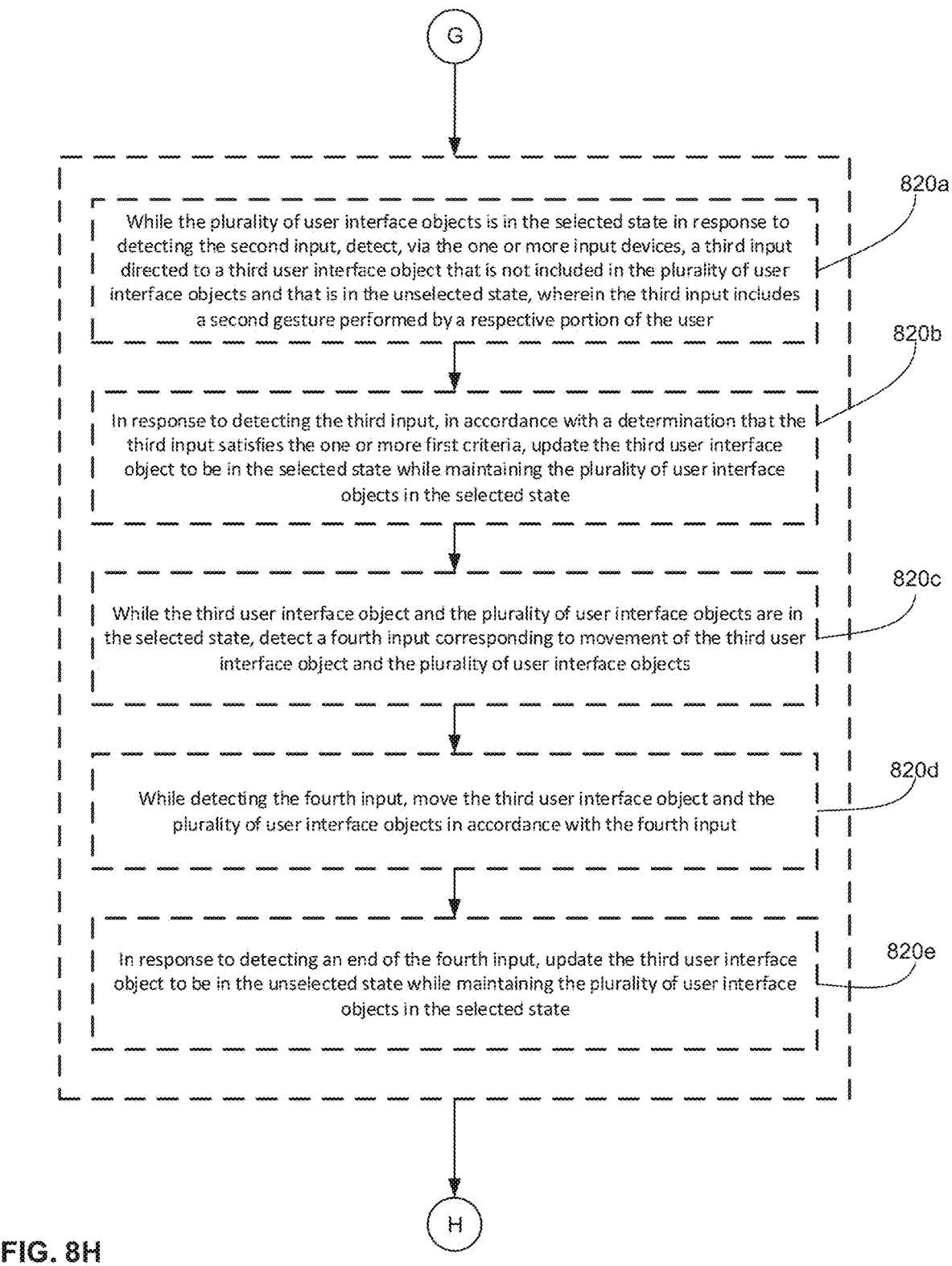
Figure 8I:
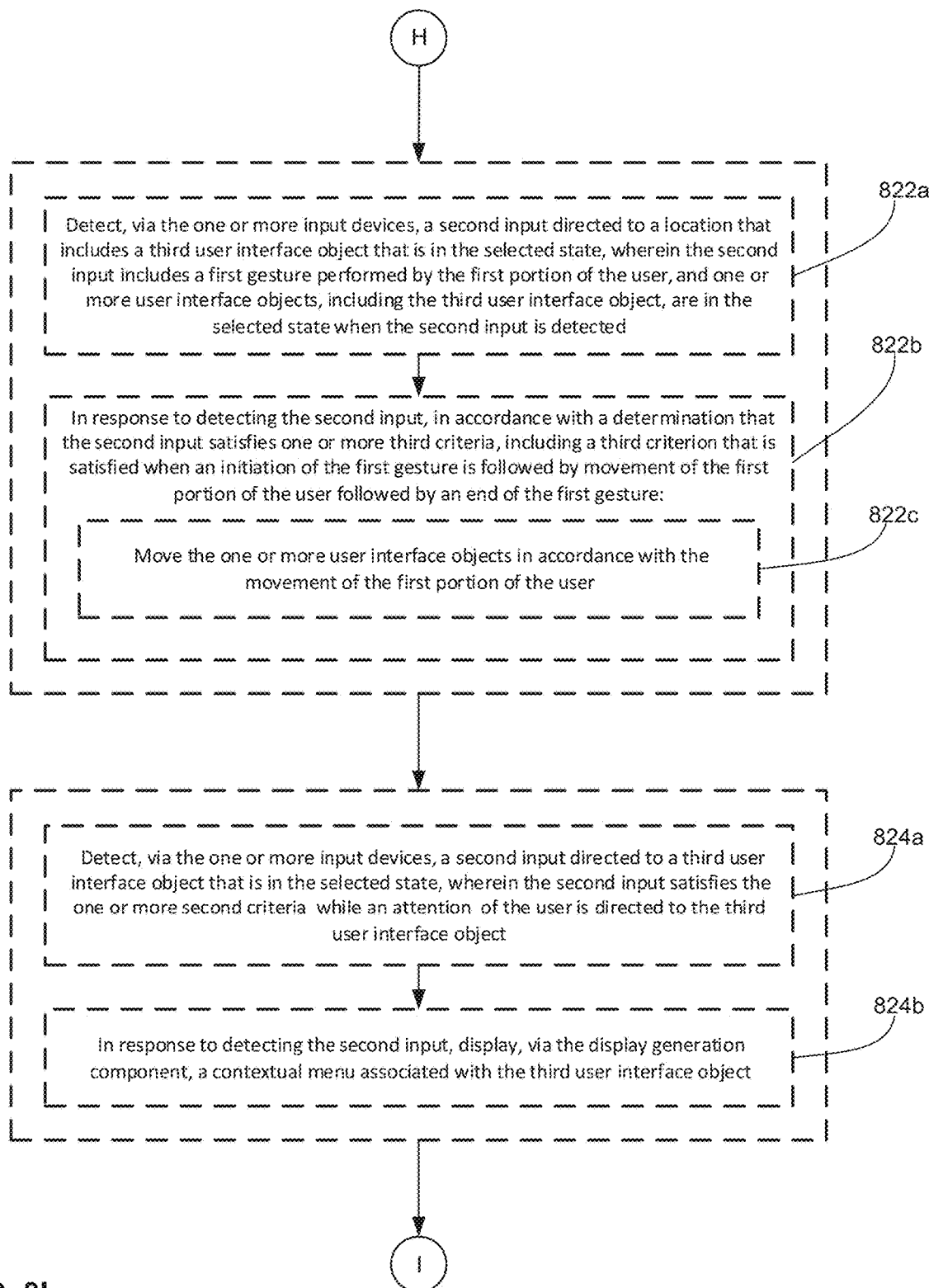
Figure 8J:
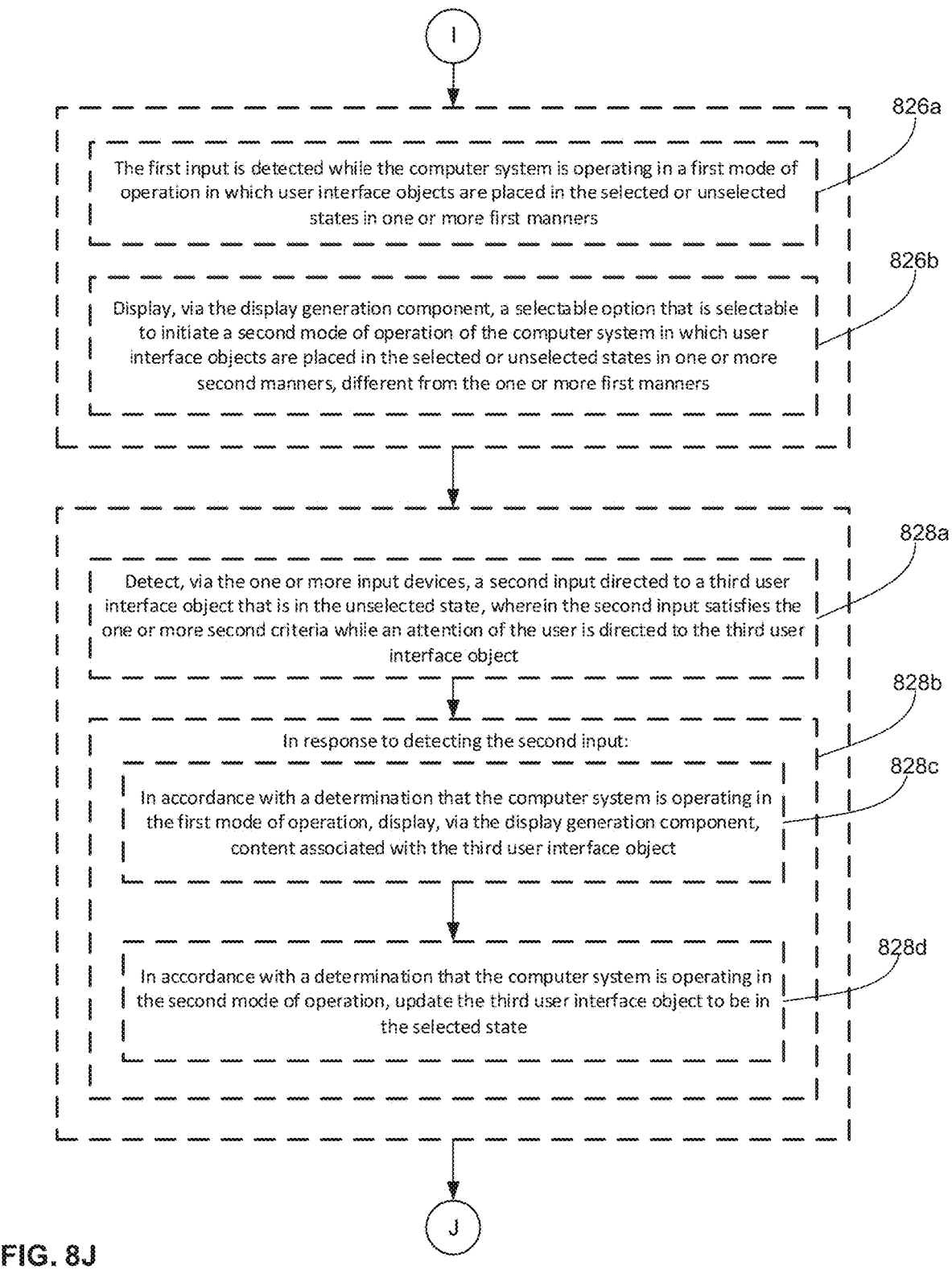
Figure 8K:
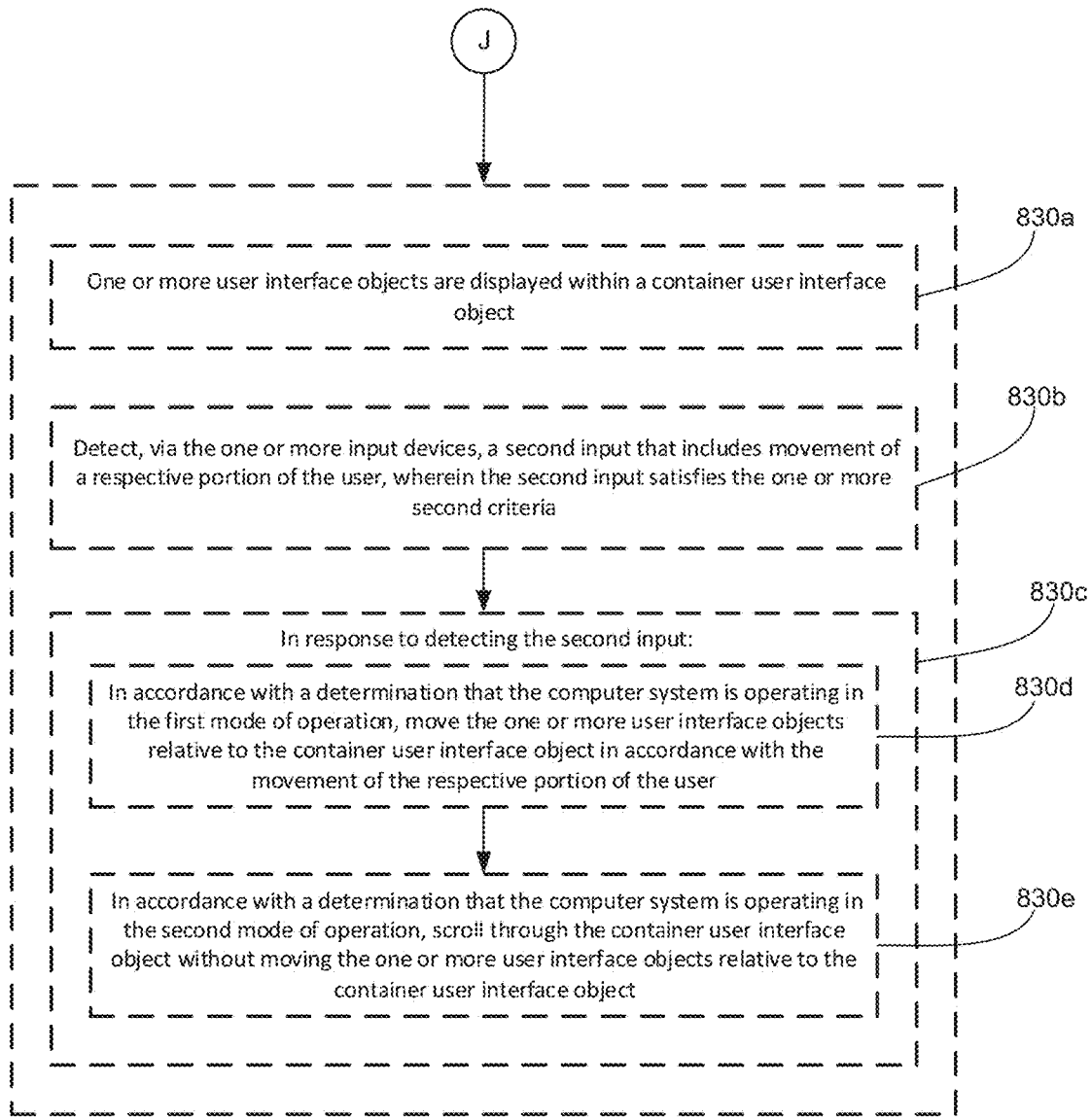

In FIG. 7G, computer system 101 detects hand 703a perform a quick pinch air gesture while gaze 720 is directed to object 708-7 while object 708-7 is selected. In response to the input from hand 703a directed to object 708-7 while object 708-7 is selected, computer system 101 displays contextual menu 722 associated with the currently selected objects (e.g., object 708-7), as shown in FIG. 7G. Contextual menu 722 optionally includes one or more selectable options for performing operations corresponding to the selected options. For example, contextual menu 722 in FIG. 7G includes option 722-1 that is selectable to copy object 708-7 (e.g., for later pasting, as described in more detail with reference to method 1000), option 722-2 that is selectable to cut object 708-7 (e.g., for later pasting, as described in more detail with reference to method 1000), option 722-3 that is selectable to duplicate object 708-7 (e.g., as described in more detail with reference to method 1000), option 722-4 that is selectable to flip (e.g., horizontally and/or vertically) object 708-7, option 722-5 that is selectable to open object 708-7 (e.g., in a designated application to display content associated with object 708-7), and option 722-6 that is selectable to delete object 708-7.

FIGS. 8A-8K is a flowchart illustrating an exemplary method 800 of performing different object selection-related operations in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, method 800 is performed at a computer system (e.g., 101) in communication with a display generation component (e.g., 120) and one or more input devices (e.g., a mobile device (e.g., a tablet, a smartphone, a media player, or a wearable device), or a computer). In some embodiments, the display generation component is a display integrated with the computer system (optionally a touch screen display), external display such as a monitor, projector, television, or a hardware component (optionally integrated or external) for projecting a user interface or causing a user interface to be visible to one or more users, etc. In some embodiments, the one or more input devices include a computer system or component capable of receiving a user input (e.g., capturing a user input, detecting a user input, etc.) and transmitting information associated with the user input to the computer system. Examples of input devices include a touch screen, mouse (e.g., external), trackpad (optionally integrated or external), touchpad (optionally integrated or external), remote control device (e.g., external), another mobile device (e.g., separate from the computer system), a handheld device (e.g., external), a controller (e.g., external), a camera, a depth sensor, an eye tracking device, and/or a motion sensor (e.g., a hand tracking device, a hand motion sensor), etc. In some embodiments, the computer system is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, while displaying, via the display generation component, a first user interface object (e.g., 708-1) and a second user interface object (e.g., 708-4) (802a) (e.g., displaying the first user interface object and the second user interface object on a display or in a three-dimensional environment. In some embodiments, the first user interface object and the second user interface object are user interfaces of an application accessible by the computer system, such as a word processing application, a photo management application, a spreadsheet application, a presentation application, and/or an email application. In some embodiments, the first user interface object and the second user interface object are user interfaces of the same application or correspond to user interfaces of different applications. In some embodiments, the first user interface object and/or the second user interface object are displayed at or in the first virtual object described in method 1200. In some embodiments, the three-dimensional environment is a computer-generated reality (CGR) environment, such as a virtual reality (VR) environment, a mixed reality (MR) environment, or an augmented reality (AR) environment. In some embodiments, the three-dimensional environment includes virtual objects, such as application windows, operating system elements, representations of users other than the user of the computer system, representations of physical objects in the physical environment of the computer system, and/or one or more content items. In some embodiments, the representations of physical objects are views of the physical objects in the physical environment of the computer system that are visible through a transparent portion of the display generation component (e.g., true or real passthrough). In some embodiments, the computer system captures one or more images of the one or more physical objects in the physical environment of the computer system (e.g., via an image sensor of the one or more input devices), and in response, displays corresponding virtual representations (e.g., photorealistic representations, simplified representations, or cartoon representations) of the one or more physical objects in the three-dimensional environment. In some embodiments, the computer system displays the three-dimensional environment from the viewpoint of the user at a location in the three-dimensional environment corresponding to the physical location of the computer system and/or user in the physical environment of the computer system. In some embodiments, displaying the three-dimensional environment from the viewpoint of the user includes displaying the three-dimensional environment from a perspective associated with the location of the viewpoint of the user in the three-dimensional environment.), while a first set of one or more user interface objects, including the first user interface object and not including the second user interface object, is in a selected state and being controlled by a first portion (e.g., first hand) of a user of the computer system, such as objects 708-1 and 708-2 being controlled by hand 703*a* in FIG. 7B (e.g., the first set of one or more user interface objects are selected/managed together such that an action performed by the first portion (e.g., first hand) of the user, such as one of the actions/operations described in method 1000, causes that action to be directed at the user interface objects currently included in the first set of one or more user interface objects (and not directed at user interface objects that are not currently included in the first set of one or more user interface objects). For example, while the first set of one or more user interface objects are being controlled by the first portion of the user, the first set of one or more user interface objects are optionally concurrently moved to one or more new locations in the three-dimensional environment in accordance with the movement of the first portion of the user. Accordingly, if the computer system detects rightward movement of the first portion of the user by 1, 2, 5, 10, 20, or 50 centimeters, the computer system optionally moves the user interface objects included in the first set of one or more user interface objects rightward by 1, 2, 5, 10, 20, or 50 centimeters (or by an amount proportional to those distances). In some embodiments, the first set of one or more user interface objects are selected in analogous ways to the selection of the second user interface object and/or other user interface objects described below. In some embodiments, the first set of one or more user interface objects stop being controlled by the first hand in response to the computer system detecting that the fingers of the first hand are no longer in a pinch hand shape (e.g., when the computer system detects a release of the pinch gesture).), the computer system detects (802*b*), via the one or more input devices, a first input directed to the second user interface object that includes a respective gesture performed by a second portion (e.g., second hand, optionally while a gaze of the user of the computer system is directed at the second user interface object. In some embodiments, the first input and/or other inputs described with reference to method 800 are or include air gesture inputs.), different from the first portion, of the user of the computer system, such as the input directed to object 708-4 from hand 703*b* in FIG. 7B.

In some embodiments, the computer system detects that the second portion of the user performed or is performing a "quick" pinch or "long" pinch gesture while the gaze of the user is directed to the second user interface object. In some embodiments, the computer system detected that the second portion of the user performed the "quick" pinch gesture in response to detecting that the second portion of the user performed a "pinching" handshape/pose (e.g., two or more fingers of a user's hand such as the thumb and index finger moving together and touching each other or within a threshold distance of each other (e.g., 0.1, 0.2, 0.3, 0.5, 1, 2, 3, or 5 centimeters) for less than a threshold amount of time (e.g., 0.5, 1, 2, 5, 10, or 20 seconds), and then moving apart from one another). Conversely, in some embodiments, the computer system detects that the second portion of the user performed or is performing the "long" pinch gesture in response to detecting that the second portion of the user has been (or is currently) in a "pinching" handshape/pose for more than the above threshold amount of time (e.g., 0.5, 1, 2, 5, 10, or 20 seconds). In some embodiments, the first input is detected while the first portion of the user is currently in a "pinching" hand shape and/or is performing the "long" pinch gesture (e.g., the first portion of the user has been in the "pinching" hand shape for more than the above-mentioned threshold amount of time and the fingers used to make the "pinching" shape have not yet moved away from each other). In some embodiments, the first input is detected after the first portion of the user performed a respective gesture that caused the selection of the first set of one or more user interface objects (e.g., the first portion of the user is no longer in a pinching hand shape when the first input is detected) as will be described in more detail below. In some embodiments, the gesture that is directed to second user interface corresponds to a gesture other than the "quick" pinch or "long" pinch gesture, such as a forward pointing gesture (e.g., a forward movement of a user's hand while one or more fingers of the user's hand are extended towards the first user interface object) or a tap gesture with a finger of the user's hand (e.g., a forward movement by a finger of the user's hand such that the finger touches the first user interface object or approaches within a threshold distance of the first user interface object).

In some embodiments, in response to detecting the first input (802*c*), in accordance with a determination that the first input satisfies one or more first criteria, including a first criterion that is satisfied when an initiation of the respective gesture (e.g., when the computer system detects that the second portion of the user is in the "pinch" handshape/pose, as previously described above. In some embodiments, the initiation of the respective gesture is detected when two or more fingers of the second hand of the user moves to make contact with one another.) and an end of the respective gesture are performed (e.g., when the computer system detects that the fingers (e.g., thumb and index finger) of the second portion of the user that were making the "pinching" handshape/pose move away from each other) within a threshold amount of time (e.g., 0.5, 1, 2, 5, 10, or 20 seconds) of one another, the computer system adds (802*d*) the second user interface object to the first set of one or more user interface objects that is in the selected state and being controlled by the first portion of the user of the computer system, including moving the first user interface object and the second user interface object (e.g., in the three-dimensional environment) in accordance with movement of the first portion of the user, such as the control of objects 708-1, 708-2 and 708-3 by hand 703*a* in FIG. 7C (e.g., without controlling the second user interface object based on the second portion of the user, including forgoing moving the second user interface object in the three-dimensional environment in accordance with movement of the second portion of the user).

In some embodiments, moving the first user interface object and the second user interface object in the three-dimensional environment in accordance with movement of the first portion of the user includes moving those objects based on a magnitude and/or direction of the movement of the first portion of the user. For example, if the first portion of the user moves upward and rightward, moving those objects upward and rightward—or if the first portion of the user moves leftward, moving those objects leftward. The amount/magnitude of the movement of those objects is optionally also controlled by the magnitude of the movement of the first portion of the user. For example, if the amount of movement of the first portion of the user is 12 cm, those objects are moved a first amount (e.g., proportional to the movement of the first portion of the user (e.g., 12 cm)), and if the amount of movement of the first portion of the user is 24 cm, those objects are moved a second amount (e.g., proportional to the movement of the first portion of the user (e.g., 24 cm)), greater than the first amount. For example, in response to detecting that the second portion of the user performed a "quick" pinch gesture while a gaze of the user was optionally directed at the second user interface object, the second user interface object is added to the first set of one or more user interface objects. Thus, if a "cut" or "copy" operation was directed to the first set of one or more user interface objects after adding the second user interface object to the first set of one or more user interface objects, the "cut" or "copy" operation would include the "copying of" or "cutting of" the second user interface object because the second user interface object is now part of the first set of one or more user interface objects. Similarly, if the computer system detected a request to move the first set of one or more user interface objects in the three-dimensional environment, moving the first set of one or more user interface objects would include moving the second user interface object along with the other user interface objects in the first set of one or more user interface objects because the second user interface object is now part of the first set of one or more user interface objects. In some embodiments, after adding the second user interface object to the first set of one or more user interface objects via the "quick" pinch gesture, the computer system optionally detects one or more additional "quick" pinch gestures directed to one or more other user interface objects. In response, the computer system also adds the one or more other user interface objects selected via the "quick" pinch gesture to the first set of one or more user interface objects. In some embodiments, as the second user interface object transitions from being in a non-selected state to being in a selected state, the distance of the second user interface object from a user's viewpoint changes. For example, when the second user interface object is in the selected state, the second user interface object is optionally closer to the user's viewpoint as compared to when the second user interface object is in the non-selected state. In some embodiments, user interface objects that are in the selected state have a different visual appearance as compared to when the user interface objects are not in the selected state (e.g., in a non-selected state), as will be described in more detail later.

In some embodiments, in accordance with a determination that the first input satisfies one or more second criteria, different from the one or more first criteria, including a first criterion that is satisfied when the end of the respective gesture is not performed within the threshold amount of time of the initiation of the respective gesture (e.g., while the computer system is detecting that the second portion of the user is in the "pinch" handshape/pose and while the second portion of the user has been in the "pinch" handshape/pose for more than the above-mentioned threshold amount of time), and a second criterion that is satisfied when the respective gesture includes movement of the second portion of the user more than a movement threshold (e.g., 0.1, 5, 10, 15, 20, 30, or 50 centimeters) after the initiation of the respective gesture (802*e*) (e.g., movement of the second portion of the user is detected while the second portion of the user is maintaining the "pinch" handshape/pose. In some embodiments, the one or more second criteria further include a third criterion that is satisfied when the respective gesture includes the movement of the second portion of the user more than the movement threshold after the threshold amount of time), the computer system updates (8020 the second user interface object to be in the selected state, such as shown with object 708-4 in FIG. 7D. For example, because the second user interface object was selected via a "long" pinch gesture, the second user interface object is selected independently from the first set of one or more user interface objects (e.g., actions/operations directed to the first set of one or more user interfaces would not cause those actions/operations to be applied to the second user interface). In some embodiments, when the second user interface object is selected separately from the first set of one or more user interface objects, the computer system visually indicates that the second user interface object and the first set of one or more user interface objects are parts of different selections. In some embodiments, when the computer system updates the second user interface object from being in the non-selected state to being in the selected state, the computer system also updates the visual appearance of the second user interface object as described above.

In some embodiments, the computer system controls (802*g*) the second user interface object based on the second portion of the user, including moving the second user interface object (e.g., in the three-dimensional environment) in accordance with movement of the second portion of the user while maintaining the selected state of the first set of user interface objects and the control of the first set of one or more user interface objects based on the first portion of the user of the computer system, such as moving object 708-4 based on hand 703*b* in FIG. 7D while objects 708-1 and 708-2 remain controlled by hand 703*a* in FIG. 7D (e.g., without controlling the second user interface object based on the first portion of the user, including forgoing moving the second user interface object in the three-dimensional environment in accordance with movement of the first portion of the user).

In some embodiments, moving the second user interface object in the three-dimensional environment in accordance with movement of the second portion of the user includes moving the object based on a magnitude and/or direction of the movement of the second portion of the user. For example, if the second portion of the user moves upward and rightward, moving that object upward and rightward—or if the second portion of the user moves leftward, moving that object leftward. The amount/magnitude of the movement of that object is optionally also controlled by the magnitude of the movement of the second portion of the user. For example, if the amount of movement of the second portion of the user is 12 cm, that object is moved a first amount (e.g., proportional to the movement of the second portion of the user (e.g., 12 cm)), and if the amount of movement of the second portion of the user is 24 cm, that object is moved a second amount (e.g., proportional to the movement of the second portion of the user (e.g., 24 cm)), greater than the first amount. For example, updating the second user interface object to be in the selected state does not modify/change the selection state of the first set of one or more user interface objects (e.g., the first set of one or more user interface objects continues to be selected). Additionally, because the computer system detected movement of the second portion of the user while the second portion of the user was performing a "long" pinch gesture, the second user interface object is moved to a new location in the three-dimensional environment in accordance with the movement of the second portion of the user (e.g., if the computer system detects rightward movement of the second portion of the user by 1, 2, 5, 10, 20, or 50 centimeters, the computer system optionally moves the second user interface object rightward by 1, 2, 5, 10, 20, or 50 centimeters (or an amount proportional to those distances)). In some embodiments, the locations of the first set of one or more user interface objects in the three-dimensional environment do not change in response to detecting the movement of the second portion of the user because the second portion of the user does not control the first set of one or more user interface objects. In some embodiments, while the computer system is detecting movement of the second portion of the user, the computer system also detects movement of the first portion of the user. For example, while the computer system is detecting rightward movement of the second portion of the user by 1, 2, 5, 10, 20, or 50 centimeters, the computer system also detects leftward movement of the first portion of the user by 5, 10, 15, 20, or 25 centimeters. In response, the computer system optionally moves the user interfaces objects being controlled by the first portion of the user—the first set of one or more user interface objects—leftward in the three-dimensional environment by 5, 10, 15, 20, or 25 centimeters (or amounts proportional to those distances), and also moves the user interface object being controlled by the second portion of the user—the second user interface object—rightward in the three-dimensional environment by 1, 2, 5, 10, 20, or 50 centimeters (or amounts proportional to those distances). Adding a respective user interface object to a set of user interface objects that are being selected and controlled by a first portion of the user or selecting the respective user interface object independently from the first set of user interface objects based on a gesture performed by a second portion of the user reduces the number of inputs needed to select user interface objects.

In some embodiments, while displaying, via the display generation component, the first user interface object and the second user interface object, wherein no user interface object displayed via the display generation component is in the selected state, such as in FIG. 7E (e.g., the first and second objects, or no selectable user interface object contained within the container or canvas object described with reference to method 1200, are in a selected state as described herein), the computer system detects (804*a*), via the one or more input devices, a second input directed to the first user interface object that includes the respective gesture performed by the second portion of the user, such as the gesture performed by hand 703*b* in FIG. 7B but in FIG. 7E and directed to object 708-2, for example (e.g., a quick or long pinch air gesture as previously described while the attention of the user is directed to the first user interface object. The second input optionally has one or of the characteristics of the first input, performed by the first or the second portion of the user).

In some embodiments, in response to detecting the second input, and in accordance with a determination that the second input satisfies the one or more first criteria, the computer system displays (804*b*), via the display generation component, content associated with the first user interface object, such as displaying content associated with object 708-2 in response to the above-described input directed to object 708-2 in FIG. 7E (e.g., without putting the first user interface object in the selected state). For example, while no selectable user interface object that is being displayed is in the selected state, a quick pinch directed to a particular user interface object "opens" that user interface object. For example, if the first user interface object is an object corresponding to a photos application, the content displayed in response to the second input is optionally a user interface of the photos application from which photos can be browsed and/or viewed. As another example if the first user interface object is an object corresponding to a messaging application, the content displayed in response to the second input is optionally a user interface of the messaging application from which messaging conversations with other users can be viewed and/or interacted with. Accessing content associated with the first user interface object based on an input that satisfies the one or more first criteria reduces the number of inputs needed to access such content.

In some embodiments, in response to detecting the first input, in accordance with a determination that the first input satisfies one or more third criteria, different from the one or more first criteria and the one or more second criteria, including the first criterion that is satisfied when the end of the respective gesture is not performed within the threshold amount of time (e.g., 0.5, 1, 2, 5, 10, or 20 seconds) of the initiation of the respective gesture and a third criterion that is satisfied when the respective gesture includes movement of the second portion of the user less than the movement threshold (e.g., 0.1, 5, 10, 15, 20, 30, or 50 centimeters) after the initiation of the respective gesture (806*a*), such as such an input directed to object 708-4 in FIG. 7B (e.g., the first input is a long pinch input, as previously described, that does not include movement greater than the movement threshold, while the attention of the user is directed to the second object), in response to detecting the end of the respective gesture (e.g., when the computer system detects that the fingers (e.g., thumb and index finger) of the second portion of the user that were making the "pinching" handshape/pose move away from each other), the computer system adds (806*b*) the second user interface object to the first set of one or more user interface objects that is in the selected state and being controlled by the first portion of the user of the computer system, including moving the first user interface object and the second user interface object (e.g., in the three-dimensional environment) in accordance with movement of the first portion of the user, such as adding object 708-4 to be controlled by hand 703*a* in FIGS. 7B-7C, but at the end of the long air pinch gesture described above. Adding the second user interface object to the first set of one or more user interface objects that is in the selected state optionally has one or more of the characteristics previously described with reference to adding the second user interface object to the first set of one or more user interface objects that is in the selected state in accordance with the one or more first criteria being satisfied. Thus, in some embodiments, the second object can be added to the first set of objects in response to a quick pinch or a long pinch with little movement. Adding the second user interface object to the first set of user interface objects in response to the first input that satisfies the one or more third criteria reduces the number of inputs needed to select user interface objects.

In some embodiments, while the second user interface object is being controlled based on the second portion of the user (e.g., in accordance with the determination that the first input satisfies the one or more second criteria), including moving the second user interface object (e.g., in the three-dimensional environment) in accordance with movement of the second portion of the user while maintaining the selected state of the first set of user interface objects and the control of the first set of one or more user interface objects based on the first portion of the user of the computer system, such as in FIG. 7D, the computer system detects (808a) the end of the respective gesture, such as an end of the input from hand 703b in FIG. 7D (e.g., when the computer system detects that the fingers (e.g., thumb and index finger) of the second portion of the user that were making the "pinching" handshape/pose move away from each other). In some embodiments, in response to detecting the end of the respective gesture, the computer system places (808b) the second user interface object at a location (e.g., in the three-dimensional environment) corresponding to a current location of the second portion of the user, such as placing object 708-4 at such a location at the end of the input of hand 703b in FIG. 7D. The second user interface object, after the end of the respective gesture, is optionally no longer controlled by the second portion of the user, and remains not controlled by the first portion of the user. In some embodiments, the second user interface object remains in a selected state after being placed at the location corresponding to the current location of the second portion of the user. In some embodiments, the second user interface object transitions to the unselected state after being placed at the location corresponding to the current location of the second portion of the user. Placing the second user interface object in response to detecting an end of the respective gesture reduces the number of inputs needed to place user interface objects at target locations.

In some embodiments, after detecting the first input and while the first set of one or more user interface objects is in the selected state and being controlled by the first portion (e.g., first hand) of the user of the computer system (e.g., while the second user interface object is included in the first set of user interface objects, or while the second user interface object is not included in the first set of user interface objects), the computer system detects (810a), via the one or more input devices, a second input directed to a third user interface object (e.g., the second user interface object or a user interface object different from the first or second user interface objects) that includes the respective gesture performed by the second portion of the user of the computer system, such as after the input in FIG. 7B directed to object 708-4, the computer system 101 detects an input directed to object 708-6 (e.g., the second input optionally has one or more of the characteristics of the first input while an attention of the user is directed to the third user interface object, such as an air pinch gesture performed by the respective portion of the user, as previously described). In some embodiments, in response to detecting the second input (810b), in accordance with a determination that the second input satisfies the one or more first criteria, the computer system adds (810c) the third user interface object to the first set of one or more user interface objects that is in the selected state and being controlled by the first portion of the user of the computer system, including moving the first user interface object and the third user interface object (e.g., in the three-dimensional environment) in accordance with movement of the first portion of the user, such as controlling object 708-6 based on hand 703a in FIG. 7C in addition to the other objects being controlled by hand 703a. Adding the third user interface object to the first set of one or more user interface objects optionally has one or more of the characteristics of adding the second user interface object to the first set of one or more user interface objects described previously.

In some embodiments, in accordance with a determination that the second input satisfies the one or more second criteria (810d), the computer system updates (810e) the third user interface object to be in the selected state. In some embodiments, the computer system controls (8100 the third user interface object based on the second portion of the user, including moving the third user interface object (e.g., in the three-dimensional environment) in accordance with movement of the second portion of the user while maintaining the selected state of the first set of user interface objects and the control of the first set of one or more user interface objects based on the first portion of the user of the computer system, such as controlling object 708-6 based on hand 703b, similar to as described in FIG. 7D with reference to object 708-4. Updating the third user interface object and controlling the third user interface object optionally have one or more of the characteristics of updating the second user interface object and controlling the second user interface object described previously. Thus, in some embodiments, multiple different objects can be added to the first set of user interface objects or separately controlled based on characteristics of input directed to those objects, as described above. Adding a respective user interface object to a set of user interface objects that are being selected and controlled by a first portion of the user or selecting the respective user interface object independently from the first set of user interface objects based on a gesture performed by a second portion of the user reduces the number of inputs needed to select user interface objects.

In some embodiments, displaying the second user interface object in the selected state includes displaying, via the display generation component, a visual indication that the second user interface object is in the selected state (812), such as the selection box around selected objects in FIGS. 7A-7G and/or a drop shadow displayed for selected objects in FIGS. 7A-7G. For example, displaying a border around the second user interface object that is not displayed while the second user interface object is in the unselected state, changing one or more visual characteristics (e.g., size, brightness, color, and/or transparency) of the second object as compared to when the second object is in the unselected state, and/or displaying the second user interface object with a glow or highlighting effect that does not exist when the second object is in the unselected state. Displaying a visual indication that the second user interface object is in the selected state automatically conveys the selection state of the second user interface object.

In some embodiments, while the first set of objects is in the selected state and being controlled by the first portion of the user while the first portion of the user maintains a respective pose (e.g., while the first portion of the user remains in a pinch hand shape in which the index finger and thumb of the first portion of the user are touching), the computer system detects (814*a*) the first portion of the user no longer maintaining the respective pose, such as in FIG. 7C detecting that the hand 703*a* stops maintaining the pinch hand shape. For example, detecting that the index finger and the thumb of the user move apart. In some embodiments, in response to detecting the first portion of the user no longer maintaining the respective pose, the computer system ceases (814*b*) control of the first set of objects by the first portion of the user while maintaining the first set of objects in the selected state, such as maintaining selection of objects 708-1, 708-2 and 708-4 in FIG. 7C in response to detecting hand 703*a* no longer maintaining the pinch hand shape. For example, the first set of objects has been dropped at its current location in the three-dimensional environment and will no longer be moved in response to movement of the first portion of the user. However, the first set of objects optionally remains in the selected state in response to detecting the first portion of the user no longer maintaining the pose and after the first set of objects is dropped at the current location (e.g., such that further inputs directed to the first set of objects will be responded to by the computer system in the manners described herein with respect to selected objects). Maintaining the first set of objects in the selected state reduces the number of inputs needed to subsequently interact with selected objects.

In some embodiments, while the first set of objects is in the selected state and being controlled by the first portion of the user while the first portion of the user maintains a respective pose (e.g., while the first portion of the user remains in a pinch hand shape in which the index finger and thumb of the first portion of the user are touching), the computer system detects (816*a*), via the one or more input devices, the first portion of the user no longer maintaining the respective pose, such as in FIG. 7C detecting that the hand 703*a* stops maintaining the pinch hand shape. For example, detecting that the index finger and the thumb of the user move apart. In some embodiments, in response to detecting the first portion of the user no longer maintaining the respective pose, the computer system ceases (816*b*) control of the first set of objects by the first portion of the user and updating the first set of objects to be in an unselected state, such as not maintaining selection of objects 708-1, 708-2 and 708-4 in FIG. 7C in response to detecting hand 703*a* no longer maintaining the pinch hand shape. For example, the first set of objects has been dropped at its current location in the three-dimensional environment and will no longer be moved in response to movement of the first portion of the user. Further, the first set of objects optionally transitions to the unselected state in response to detecting the first portion of the user no longer maintaining the pose and after the first set of objects is dropped at the current location (e.g., such that further inputs directed to the first set of objects will be responded to by the computer system in the manners described herein with respect to unselected objects). In some embodiments, if two sets of one or more virtual objects are being controlled by different hands of the user, the selection states of the objects in the two sets of objects are optionally determined by the respective hands that are controlling those two sets of objects (e.g., the selection states of the objects in the first set of objects are controlled by the left hand of the user in one or more of the ways described above, and the selection states of the objects in the second set of objects are controlled by the right hand of the user in one or more of the ways described above). Ceasing the selected state for the first set of objects reduces the number of inputs needed to select a different set of one or more objects for subsequent interaction.

In some embodiments, the computer system detects (818*a*), via the one or more input devices, a second input directed to a location that does not include a user interface object that includes a first gesture performed by the first portion of the user, such as the input from hand 703*a* corresponding to gaze 720*a* in FIG. 7A. In some embodiments, the second input has one or more of the characteristics of the first input. In some embodiments, the first gesture (e.g., an air gesture) has one or more of the characteristics of the respective gesture. In some embodiments, the attention of the user (e.g., as part of the second input) is directed to an area and/or location in the three-dimensional environment that is empty (e.g., does not include any objects) or a location in the three-dimensional environment that includes an object that is not selected.

In some embodiments, in response to detecting the second input, in accordance with a determination that the second input satisfies one or more third criteria, including a third criterion that is satisfied when an initiation of the first gesture (e.g., when the computer system detects that the first portion of the user is in the "pinch" handshape/pose, as previously described above. In some embodiments, the initiation of the first gesture is detected when two or more fingers of the first hand of the user move to make contact with one another) is followed by movement of the first portion of the user (e.g., optionally greater than the previously described movement threshold; optionally irrespective of whether the movement is greater than the previously described movement threshold) followed by an end of the first gesture (e.g., when the computer system detects that the fingers (e.g., thumb and index finger) of the first portion of the user that were making the "pinching" handshape/pose move away from each other), such as the gesture and/or movement of hand 703*a* from the lower left to the upper right as shown in FIG. 7A, wherein the movement of the first portion of the user defines an area that includes a plurality of user interface objects (818*b*), such as the rectangular area defined by hand 703*a* in FIG. 7A (e.g., the second input is a pinch and drag input; optionally, a pinch input directed to an empty portion of the three-dimensional environment, followed by movement of the first portion of the user while holding/maintaining the pinch hand shape, followed by release of the pinch hand shape by the first portion of the user), in accordance with a determination that a third user interface object of the plurality of user interface objects is in the selected state, the computer system updates (818*c*) the third user interface object to be in an unselected state, such as if object 708-2 was in a selected state when the rectangular area of FIG. 7A was defined, computer system 101 would optionally put object 708-2 in an unselected state. In some embodiments, the location to which the attention of the user was directed at the initiation of the first gesture defines a first vertex of a rectangle in the three-dimensional environment, and the movement of the first portion of the user while maintaining the pinch hand shape defines/controls the location of a second, diagonally opposite vertex of the rectangle in the three-dimensional environment. The rectangle at the time of detecting the end of the first gesture optionally defines the above-referenced area. The plurality of user interface objects are optionally those objects that are contained within the boundaries of that rectangle at the end of the first gesture. The plurality of user interface objects are not necessarily in the same plane as the rectangle but are included within a representative volume that would result from extruding the rectangle towards or away from the viewpoint of the user along a direction normal to the plane of the rectangle.

In some embodiments, in accordance with a determination that the third user interface object is in the unselected state, such as if object 708-2 was in a selected state when the rectangular area of FIG. 7A was defined, the computer system updates (818*d*) the third user interface object to be in the selected state, such as putting object 708-2 in the selected state. In some embodiments, in accordance with a determination that a fourth user interface object of the plurality of user interface objects is in the selected state, the computer system updates (818*e*) the fourth user interface object to be in the unselected state. In some embodiments, in accordance with a determination that the fourth user interface object is in the unselected state, the computer system updates (8180 the fourth user interface object to be in the selected state. Thus, the computer system optionally toggles the selection state of a plurality of user interface objects that are targeted by the area defined by the second input. In some embodiments, after performing the selection based on the second input, individual object elements are displayed for the individual objects in the plurality of objects that have transitioned to the selected state and/or a group element is displayed for the plurality of objects that are in the selected state, the respective elements selectable to manage their respective object(s) (e.g., to cut the object(s), copy the object(s), and/or duplicate the object(s)). In some embodiments, detecting attention being directed outside of the area defined by the second input and pinching causes deselection of the objects that were selected based on the second input, while detecting attention being directed outside of the area defined by the second input and pinching causes the computer system to display a contextual menu associated with the selected objects (e.g., to cut the object(s), copy the object(s), and/or duplicate the object(s)). Toggling the selection state of multiple objects based on the second input reduces the number of inputs needed to toggle the selection state of multiple objects.

In some embodiments, while the plurality of user interface objects is in the selected state in response to detecting the second input, such as objects 708-1 and 708-2 being in the selected state in FIG. 7B, the computer system detects (820*a*), via the one or more input devices, a third input directed to a third user interface object that is not included in the plurality of user interface objects and that is in the unselected state, wherein the third input includes a second gesture performed by a respective portion of the user, such as the input from hand 703*b* directed to object 708-4 in FIG. 7B. In some embodiments, the third input and/or second gesture (e.g., an air gesture) include one or more of the characteristics of the first input, the second input, the first gesture and/or the respective gesture. In some embodiments, the attention of the user is directed to the third user interface object when the third input is detected. In some embodiments, in response to detecting the third input, in accordance with a determination that the third input satisfies the one or more first criteria (e.g., a quick pinch air gesture as previously described), the computer system updates (820*b*) the third user interface object to be in the selected state while maintaining the plurality of user interface objects in the selected state, such as shown in FIG. 7B with object 708-4 being in the selected state in addition to objects 708-1 and 708-2 being in the selected state. For example, the third user interface object is added to the group of selected objects that were selected based on the second input.

In some embodiments, while the third user interface object and the plurality of user interface objects are in the selected state, the computer system detects (820*c*) a fourth input corresponding to movement of the third user interface object and the plurality of user interface objects, such as an input from hand 703*a* in FIG. 7B directed to object 708-1 via gaze 720*a*. For example, a pinch and drag input directed to at least one of the selected objects, including the attention of the user directed to the at least one of the selected objects and a pinch and drag gesture performed by the first or second portion of the user. The pinch and drag air gesture optionally has one or more of the characteristics of the pinch and drag input(s) previously described.

In some embodiments, while detecting the fourth input, the computer system moves (820*d*) the third user interface object and the plurality of user interface objects in accordance with the fourth input, such as moving object 708-1, 708-2 and 708-4 in accordance with the movement of hand 703*a* in FIG. 7C (e.g., including movement of the first or second portion of the user). In some embodiments, moving the third user interface object and the plurality of user interface objects in the three-dimensional environment in accordance with movement of the first portion of the user includes moving those objects based on a magnitude and/or direction of the movement of the first portion of the user. For example, if the first portion of the user moves upward and rightward, moving those objects upward and rightward—or if the first portion of the user moves leftward, moving those objects leftward. The amount/magnitude of the movement of those objects is optionally also controlled by the magnitude of the movement of the first portion of the user. For example, if the amount of movement of the first portion of the user is 12 cm, those objects are moved a first amount (e.g., proportional to the movement of the first portion of the user (e.g., 12 cm)), and if the amount of movement of the first portion of the user is 24 cm, those objects are moved a second amount (e.g., proportional to the movement of the first portion of the user (e.g., 24 cm)), greater than the first amount.

In some embodiments, in response to detecting an end of the fourth input (e.g., when the computer system detects that the fingers (e.g., thumb and index finger) of the first or second portion of the user that were making the "pinching" handshape/pose move away from each other), the computer system updates (820*e*) the third user interface object to be in the unselected state while maintaining the plurality of user interface objects in the selected state, such as if computer system 101 detects an and of the input from hand 703*a* in FIG. 7C, which would optionally result in objects 708-1 and 708-2 remaining selected while object 708-4 becomes unselected (e.g., and dropping or placing the plurality of user interface objects and the third user interface object at their current location in the three-dimensional environment). Returning the third user interface object to the unselected state in response to the end of the fourth input reduces the number of inputs needed to interact with the third user interface object in the unselected state.

In some embodiments, the computer system detects (822*a*), via the one or more input devices, a second input directed to a location that includes a third user interface object that is in the selected state, wherein the second input includes a first gesture performed by the first portion of the user, such as an input from hand 703*a* in FIG. 7B directed to object 708-1 via gaze 720*a* (e.g., In some embodiments, the second input has one or more of the characteristics of the first input. In some embodiments, the first gesture (e.g., an air gesture) has one or more of the characteristics of the respective gesture. In some embodiments, the attention of the user (e.g., as part of the second input) is directed to an area and/or location in the three-dimensional environment that includes a user interface object that is in the selected state), and one or more user interface objects, including the third user interface object, are in the selected state when the second input is detected, such as objects 708-1, 708-2 and 708-4 being in the selected state in FIG. 7B when such an input from hand 703*a* is detected. For example, at the time the second input is detected, one or more user interface objects are already in the selected state, and the second input is directed to one of those user interface objects.

In some embodiments, in response to detecting the second input, in accordance with a determination that the second input satisfies one or more third criteria, including a third criterion that is satisfied when an initiation of the first gesture is followed by movement of the first portion of the user followed by an end of the first gesture (822*b*), such as movement of hand 703*a* from FIG. 7B to FIG. 7C (e.g., the one or more third criteria have one or more of the characteristics of the one or more third criteria corresponding to a pinch and drag input described previously), the computer system moves (822*c*) the one or more user interface objects in accordance with the movement of the first portion of the user, such as the movement of objects 708-1, 708-2 and 708-4 based on the movement of hand 703*a* from FIG. 7B to FIG. 7C. For example, even though the input is directed to one of the selected objects, other (or, optionally, all) of the selected objects are moved in accordance with the movement of the first portion of the user. In some embodiments, moving the one or more user interface objects in the three-dimensional environment in accordance with movement of the first portion of the user includes moving those objects based on a magnitude and/or direction of the movement of the first portion of the user. For example, if the first portion of the user moves upward and rightward, moving those objects upward and rightward—or if the first portion of the user moves leftward, moving those objects leftward. The amount/magnitude of the movement of those objects is optionally also controlled by the magnitude of the movement of the first portion of the user. For example, if the amount of movement of the first portion of the user is 12 cm, those objects are moved a first amount (e.g., proportional to the movement of the first portion of the user (e.g., 12 cm)), and if the amount of movement of the first portion of the user is 24 cm, those objects are moved a second amount (e.g., proportional to the movement of the first portion of the user (e.g., 24 cm)), greater than the first amount. Moving the one or more selected user interface objects in response to the same second input reduces the number of inputs needed to move selected objects.

In some embodiments, the computer system detects (824*a*), via the one or more input devices, a second input directed to a third user interface object that is in the selected state (e.g., the second input optionally has one or more of the characteristics of the first input), wherein the second input satisfies the one or more second criteria (e.g., the second input is a quick pinch input, as previously described) while an attention (e.g., gaze, torso orientation and/or shoulder orientation) of the user is directed to the third user interface object, such as the input from hand 703*a* and/or gaze 720 directed to object 708-7 in FIG. 7F. In some embodiments, in response to detecting the second input, the computer system displays (824*b*), via the display generation component, a contextual menu associated with the third user interface object, such as menu 722 shown in FIG. 7G. For example, displaying a menu that includes selectable options for cutting, copying and/or duplicating the third user interface object. The menu optionally has one or more of the characteristics of menus and contextual menus described with reference to method 1000. Displaying a contextual menu associated with a selected user interface object in response to the second input reduces the number of inputs needed to perform one or more operations associated with the selected user interface object.

In some embodiments, the first input is detected while the computer system is operating in a first mode of operation in which user interface objects are placed in the selected or unselected states in one or more first manners (826*a*) (e.g., in accordance with the one or more first criteria or the one or more second criteria being satisfied, as previously described, additionally or alternatively to other methods for selecting objects described above). In some embodiments, the computer system displays (826*b*), via the display generation component, a selectable option that is selectable to initiate a second mode of operation of the computer system in which user interface objects are placed in the selected or unselected states in one or more second manners, different from the one or more first manners, such as option 714-5 shown in FIG. 7A. In some embodiments, in response to detecting selection of the selectable option, the computer system transitions from the first mode to the second mode of operation. The selectable option is optionally displayed in a user interface element or palette associated with the objects (selected or unselected) displayed via the display generation component. In the second mode of operation, user interface objects are optionally selected or deselected in different ways than when in the first mode of operation, as will be described below. The selectable option is optionally selectable in response to detecting a quick pinch air gesture, as previously described, performed by either hand of the user while the attention of the user is directed to the selectable option. In some embodiments, the palette additionally includes one or more selectable options for performing undo operations, redo operations or cancel operations. In some embodiments, the palette additionally or alternatively includes a "done" selectable option to transition out of the second mode and into the first mode. In some embodiments, while in the second mode of operation, the "done" selectable option includes an indication of the number of user interface objects currently selected pursuant to the second mode of operation. Providing different modes of operation for selecting objects in different manners provides for more robust and flexible selection of objects.

In some embodiments, the computer system detects (828*a*), via the one or more input devices, a second input directed to a third user interface object that is in the unselected state, wherein the second input satisfies the one or more second criteria while an attention of the user is directed to the third user interface object, such as the input from hand 703*b* in FIG. 7B directed to object 708-4 while objects 708-1, 708-2 and 708-4 were not selected (e.g., the second input is a quick pinch input, as previously described). In some embodiments, in response to detecting the second input, in accordance with a determination that the computer system is operating in the first mode of operation, the computer system displays (828*c*), via the display generation component, content associated with the third user interface object, such as displaying content associated with object 708-4 in response to the second input (e.g., without putting the third user interface object in the selected state). For example, "opening" the third user interface object to display a user interface of a photos application or messaging application, as previously described.

In some embodiments, in accordance with a determination that the computer system is operating in the second mode of operation, such as the mode of operation in FIGS. 7E-7F, the computer system updates (828*d*) the third user interface object to be in the selected state, such as shown with object 708-7 in FIG. 7F (e.g., without displaying content associated with the third user interface object). In some embodiments, in the second mode of operation, quick pinch inputs directed to different user interface objects toggle the selection state of those user interface objects (e.g., selected to unselected, or unselected to selected). Performing different operations with respect to the third user interface object depending on the mode of operation enables selection of the object or display of content associated with the object to be performed without displaying additional controls.

In some embodiments, one or more user interface objects are displayed within a container user interface object (830*a*), such as object 710 (e.g., a container or canvas object, such as described with reference to methods 1000 and/or 1200). In some embodiments, the computer system detects (830*b*), via the one or more input devices, a second input that includes movement of a respective portion (e.g., left or right hand) of the user, wherein the second input satisfies the one or more second criteria, such as the input/movement from hand 703*a* from FIG. 7B to 7C. For example, the second input is a pinch and drag input, such as described previously. In some embodiments, the attention of the user is directed to a user interface object (e.g., selected or unselected) of the one or more user interface objects when the second input is detected. In some embodiments, the attention of the user is not directed to a user interface object (e.g., directed to an empty portion of the container user interface object) of the one or more user interface objects when the second input is detected.

In some embodiments, in response to detecting the second input (830*c*), in accordance with a determination that the computer system is operating in the first mode of operation, the computer system moves (830*d*) the one or more user interface objects relative to the container user interface object in accordance with the movement of the respective portion of the user, such as the movement of objects 708-1, 708-2 and 708-4 from FIGS. 7B to 7C. For example, moving the one or more user interface objects (e.g., those user interface objects that are selected, including a selected user interface object to which the attention of the user is directed) within the container user interface object, without scrolling through the container user interface object. In some embodiments, moving the one or more user interface objects causes the relative placement of those one or more user interface objects relative to other user interface objects contained within the container to change in accordance with the movement of the respective portion of the user. In some embodiments, moving the one or more user interface objects in accordance with movement of the respective portion of the user includes moving the objects based on a magnitude and/or direction of the movement of the respective portion of the user. For example, if the respective portion of the user moves upward and rightward, moving those objects upward and rightward—or if the respective portion of the user moves leftward, moving those objects leftward. The amount/magnitude of the movement of those objects is optionally also controlled by the magnitude of the movement of the respective portion of the user. For example, if the amount of movement of the respective portion of the user is 12 cm, those objects are moved a first amount (e.g., proportional to the movement of the respective portion of the user (e.g., 12 cm)), and if the amount of movement of the respective portion of the user is 24 cm, those objects are moved a second amount (e.g., proportional to the movement of the respective portion of the user (e.g., 24 cm)), greater than the first amount.

In some embodiments, in accordance with a determination that the computer system is operating in the second mode of operation, the computer system scrolls (830*d*) through the container user interface object without moving the one or more user interface objects relative to the container user interface object, such as scrolling through object 710 based on the input from hand 703*a* from FIGS. 7E to 7F. Scrolling through the container user interface object optionally reveals one or more user interface objects that were not previously displayed in the container (e.g., scrolled onto the visible part of the container) and/or causes one or more user interface objects that were previously displayed to become hidden (e.g., scrolled off of the visible part of the container). In some embodiments, scrolling through the container user interface object does not cause the relative placements of user interface objects contained within the container to change relative to one another. The container user interface object optionally displays a portion of a canvas that is larger than the container user interface object and scrolling through the container user interface object optionally causes the container user interface object to display different portions of the canvas than were previously displayed. In some embodiments, scrolling through the container in accordance with movement of the respective portion of the user includes scrolling through the container based on a magnitude and/or direction of the movement of the respective portion of the user. For example, if the respective portion of the user moves rightward, scrolling through the container in a rightward direction (e.g., to reveal portions of the canvas on the left side of the container, and hide portions of the canvas on the right side of the container)—or if the respective portion of the user moves leftward, scrolling through the container in a leftward direction (e.g., to reveal portions of the canvas on the right side of the container, and hide portions of the canvas on the left side of the container). The amount/magnitude of the scrolling is optionally also controlled by the magnitude of the movement of the respective portion of the user. For example, if the amount of movement of the respective portion of the user is 12 cm, the container is scrolled by a first amount (e.g., proportional to the movement of the respective portion of the user (e.g., 12 cm)), and if the amount of movement of the respective portion of the user is 24 cm, the container is scrolled by a second amount (e.g., proportional to the movement of the respective portion of the user (e.g., 24 cm)), greater than the first amount. Performing different operations with respect to the one or more user interface objects depending on the mode of operation enables moving of the user interface objects or scrolling of the container to be performed without displaying additional controls.

It should be understood that the particular order in which the operations in method 800 have been described is merely exemplary and is not intended to indicate that the described order is the only order in which the operations could be performed. One of ordinary skill in the art would recognize various ways to reorder the operations described herein.

FIGS. 9A-9F illustrate examples of a computer system placing objects at locations in a displayed region based on attention of a user in accordance with some embodiments.

Figure 9A:
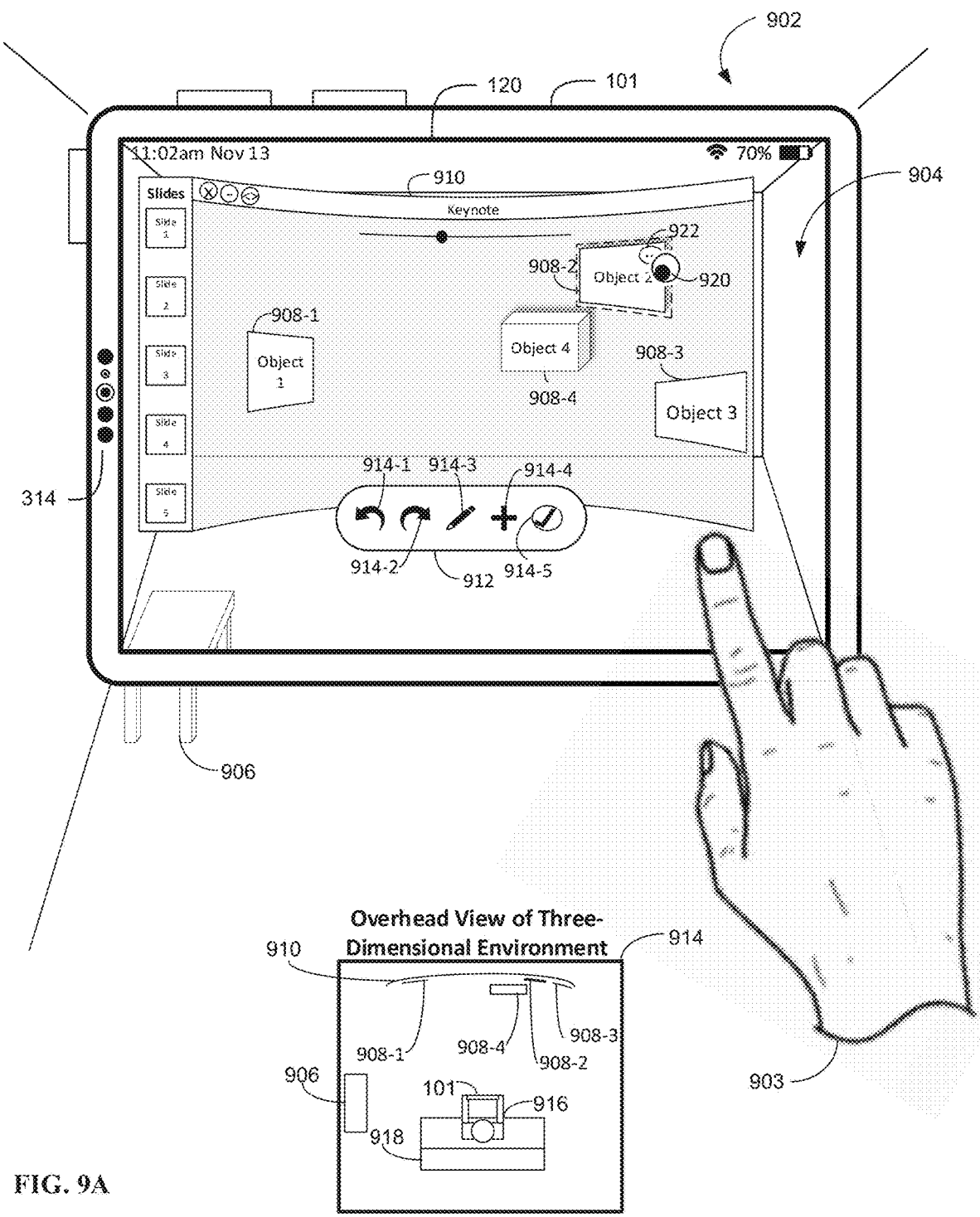
FIGS. 9A-9F illustrate examples of a computer system placing objects at locations in a displayed region based on attention of a user in accordance with some embodiments.

FIG. 9A illustrates a three-dimensional environment 904 visible via a display generation component (e.g., display generation component 120 of FIG. 1) of a computer system 101, the three-dimensional environment 904 visible from a viewpoint 916 of a user illustrated in the overhead view 914

(e.g., facing the back wall of the physical environment in which computer system 101 is located, and near the back left corner of the physical environment). As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or gaze of the user (e.g., internal sensors facing inwards towards the face of the user).

As shown in FIG. 9A, computer system 101 captures one or more images of the physical environment 902 around computer system 101 (e.g., operating environment 100), including one or more objects in the physical environment around computer system 101. In some embodiments, computer system 101 displays representations of the physical environment in three-dimensional environment 904 and/or the physical environment 902 is visible in the three-dimensional environment 904 via the display generation component 120. For example, three-dimensional environment 904 visible via display generation component 120 includes representations of the physical floor and back and side walls of the room in which computer system 101 is located. Three-dimensional environment 904 also includes table 906 (shown via display generation component 120 and in the overhead view 914).

In FIG. 9A, three-dimensional environment 904 also includes virtual objects 908-1 through 908-4, virtual object 910 and virtual object 912. Virtual objects 908-1 through 908-4 are optionally one or more of user interfaces of applications (e.g., messaging user interfaces, content browsing user interfaces, etc.), three-dimensional objects (e.g., virtual clocks, virtual balls, virtual cars, etc.) or any other element displayed by computer system 101 that is not included in the physical environment of computer system 101. Virtual object 910 is optionally a container or canvas object that contains virtual objects 908-1 through 908-4 in a compose region of object 910, as described in more detail with reference to methods 800, 1000 and/or 1200. Virtual object 912 is optionally a tool palette object for performing operations relating to virtual objects 908-1 through 908-4 and/or 910. For example, object 912 includes selectable option 914-1 that is selectable to undo a last operation that was performed relating to virtual objects 908-1 through 908-4 and/or 910, selectable option 914-2 that is selectable to redo a last operation that was canceled or undone relating to virtual objects 908-1 through 908-4 and/or 910, selectable option 914-3 that is selectable to edit a currently selected object(s) of virtual objects 908-1 through 908-4, selectable option 914-4 that is selectable to add a new virtual object to object 910, and selectable option 914-5 that is selectable to cause computer system 101 and/or object 910 to transition to a selection mode, which is described in more detail with reference to method 800.

As described in more detail with reference to method 800, one or more of objects 908-1 through 908-4 are selectable and/or highlightable to designate those objects as targets for further operations (e.g., movement operations, copy operations or cut operations). For example, in FIG. 9A, object 908-2 is selected as indicated by the dashed-line boundaries around it. Objects that are selected are shown in overhead view 914 with a bold appearance, to differentiate from objects that are not selected, which are shown without the bold appearance. In some embodiments, two-dimensional objects that are selected are separated from object 910 (e.g., indicated by the drop shadow shown for object 908-2), and two-dimensional objects that are not selected are not separated from object 910 or are separated less from object 910 (e.g., indicated by no drop shadow shown for objects 908-1 and 908-3). In some embodiments, three-dimensional objects are separated from object 910 whether or not they are selected (e.g., indicated by the drop shadow shown for object 908-4). In some embodiments, three-dimensional objects separate more from object 910 when they are selected as compared with when they are not selected; in some embodiments, the separation of three-dimensional objects from object 910 does not change based on whether they are selected.

In FIG. 9A, while object 908-2 is selected, computer system 101 detects gaze 920 directed to object 908-2 while hand 903 is in a ready state. In response, computer system 101 displays option 922 (e.g., over object 908-2) that is selectable to cause computer system to display a contextual menu for object 908-2. In response to selection of option 922, computer system 101 displays contextual menu 924a in FIG. 9B. Selection of option 922 optionally occurs in response to computer system 101 detecting gaze 920 of the user directed to option 922 while hand 903 performs an air pinch gesture in which the thumb and index finger of hand 903 come together and touch, and subsequently move apart from each other.

Figure 9B:
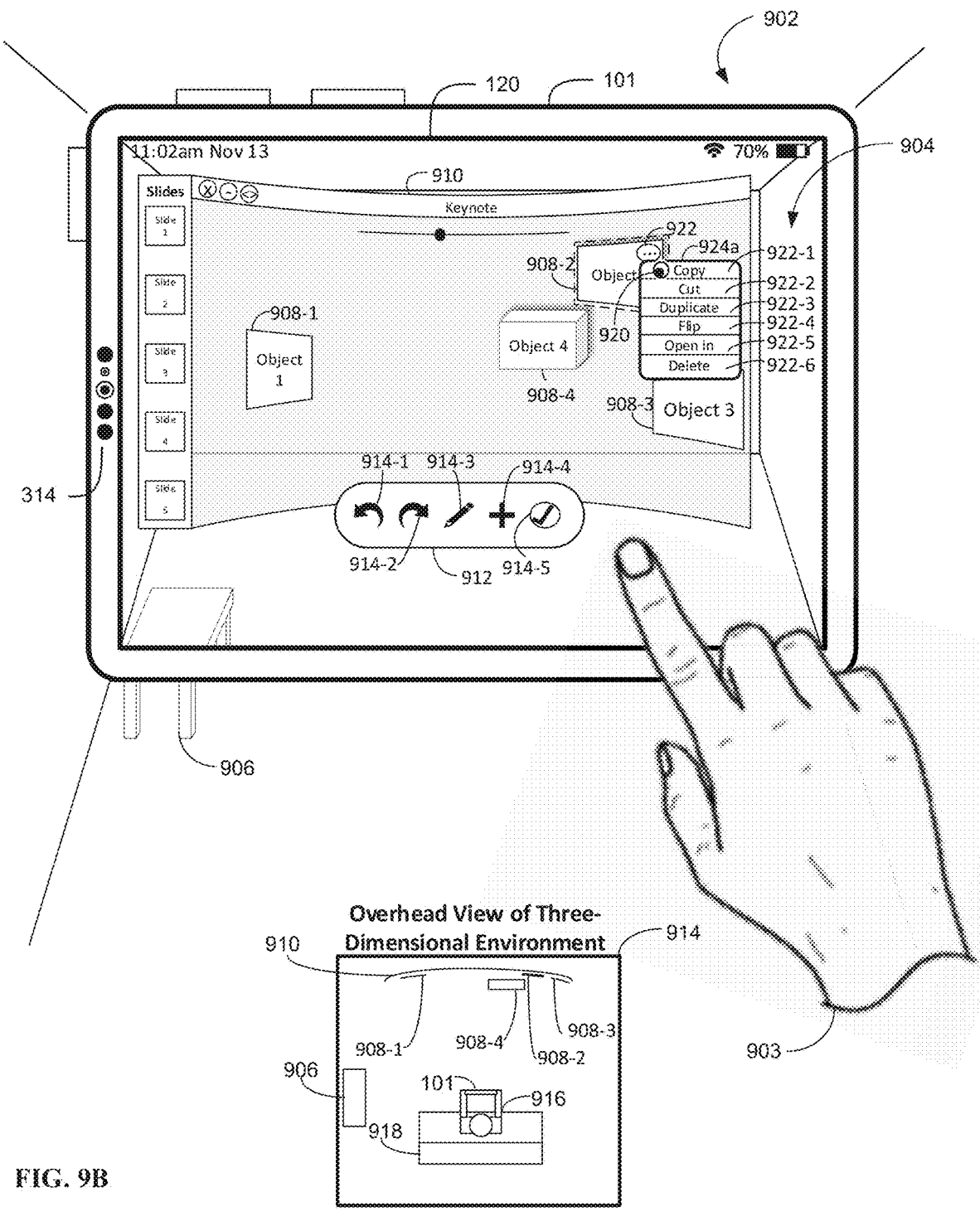

As shown in FIG. 9B, object 908-2 optionally remains selected in response to the selection of option 922. Further, contextual menu 924a in FIG. 9B includes option 922-1 that is selectable to copy object 908-2 (e.g., for later pasting, as described in more detail with reference to method 1000), option 922-2 that is selectable to cut object 908-2 (e.g., for later pasting, as described in more detail with reference to method 1000), option 922-3 that is selectable to duplicate object 908-2 (e.g., as described in more detail with reference to method 1000), option 922-4 that is selectable to flip (e.g., horizontally and/or vertically) object 908-2, option 922-5 that is selectable to open object 908-2 (e.g., in a designated application to display content associated with object 908-2), and option 922-6 that is selectable to delete object 908-2.

In FIG. 9B, computer system 101 detects an input selecting option 922-1. Selection of option 922-1 optionally occurs in response to computer system 101 detecting gaze 920 of the user directed to option 922-1 while hand 903 performs an air pinch gesture, as described above.

Figure 9C:
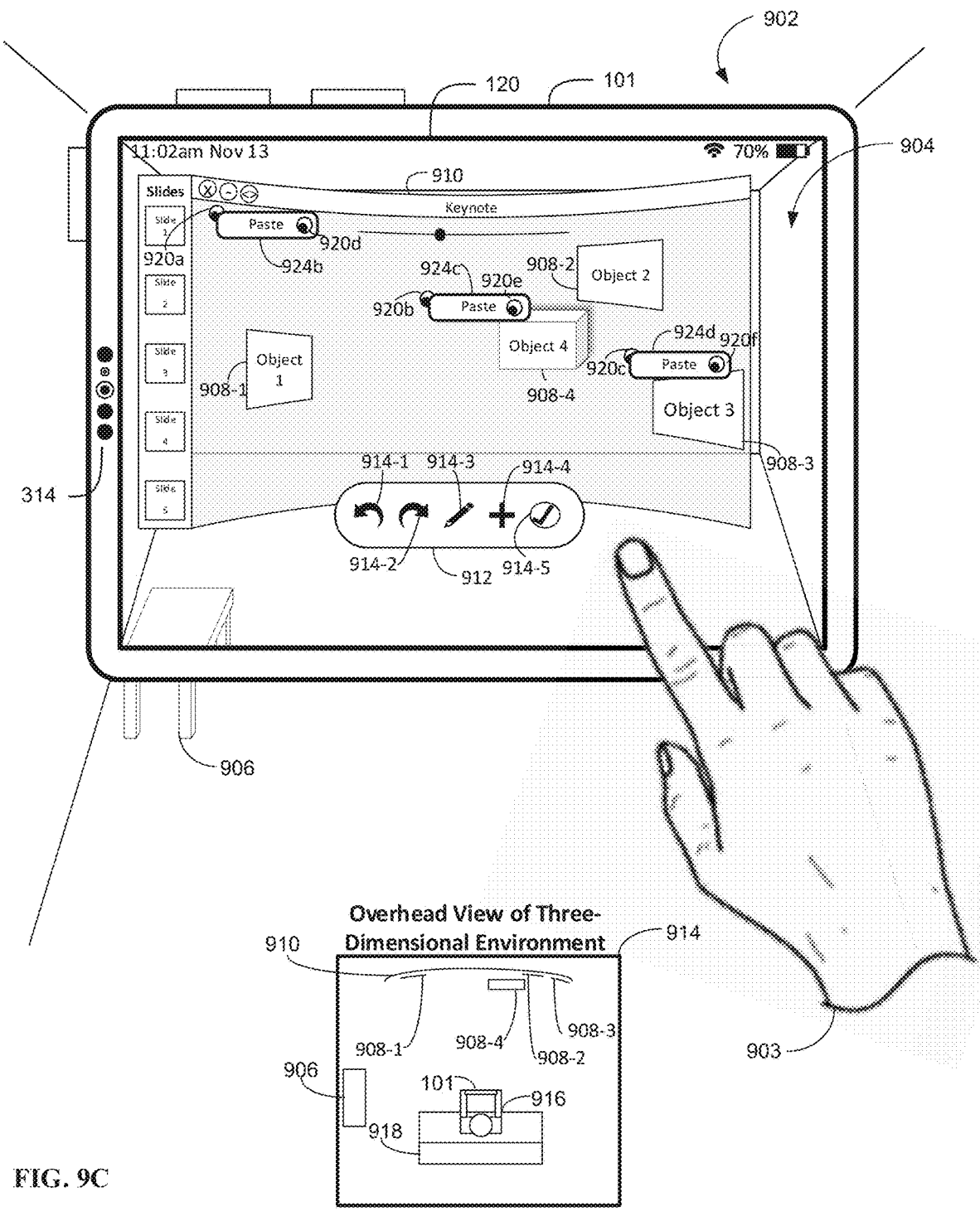

After detecting the input in FIG. 9B, in FIG. 9C, computer system 101 detects inputs for displaying different contextual menus associated with object 910, as will now be described. The different inputs and resulting contextual menus that are illustrated in FIG. 9C are optionally alternative scenarios or scenarios that occur sequentially. In particular, in response to detecting an air pinch gesture performed by hand 903, as described above, while the gaze of the user is directed to empty space in object 910, computer system 101 displays a contextual menu at a location corresponding to the location of the gaze of the user when the air pinch gesture was detected. For example, in response to detecting an air pinch gesture from hand 903 while gaze 920a is directed to the upper-left portion of object 910, computer system displays contextual menu 924b at or adjacent to the location of gaze 920a. Contextual menu 924b includes a paste option that is selectable to paste a copy of object 908-2, which was copied in response to the input in FIG. 9B. Computer system 101 optionally similarly displays contextual menu 924c in response to detecting an air pinch gesture from hand 903 while gaze 920b is directed to the central portion of object 910, and contextual menu 924d in response to detecting an air pinch gesture from hand 903 while gaze 920c is directed to the middle-right portion of object 910. Contextual menus 924c and 924d also include paste options, as described above.

In response to detecting selection of the respective paste options in menus 924b, 924c and 924d, computer system 101 optionally initiates processes to display the copy of object 908-2 at the location of the gaze of the user when the paste options were selected. The paste option in menu 924b is optionally selected in response to detecting an air pinch gesture from hand 903 while gaze 920d is directed to the paste option, the paste option in menu 924c is optionally selected in response to detecting an air pinch gesture from hand 903 while gaze 920e is directed to the paste option, and the paste option in menu 924d is optionally selected in response to detecting an air pinch gesture from hand 903 while gaze 920f is directed to the paste option.

Figure 9D:
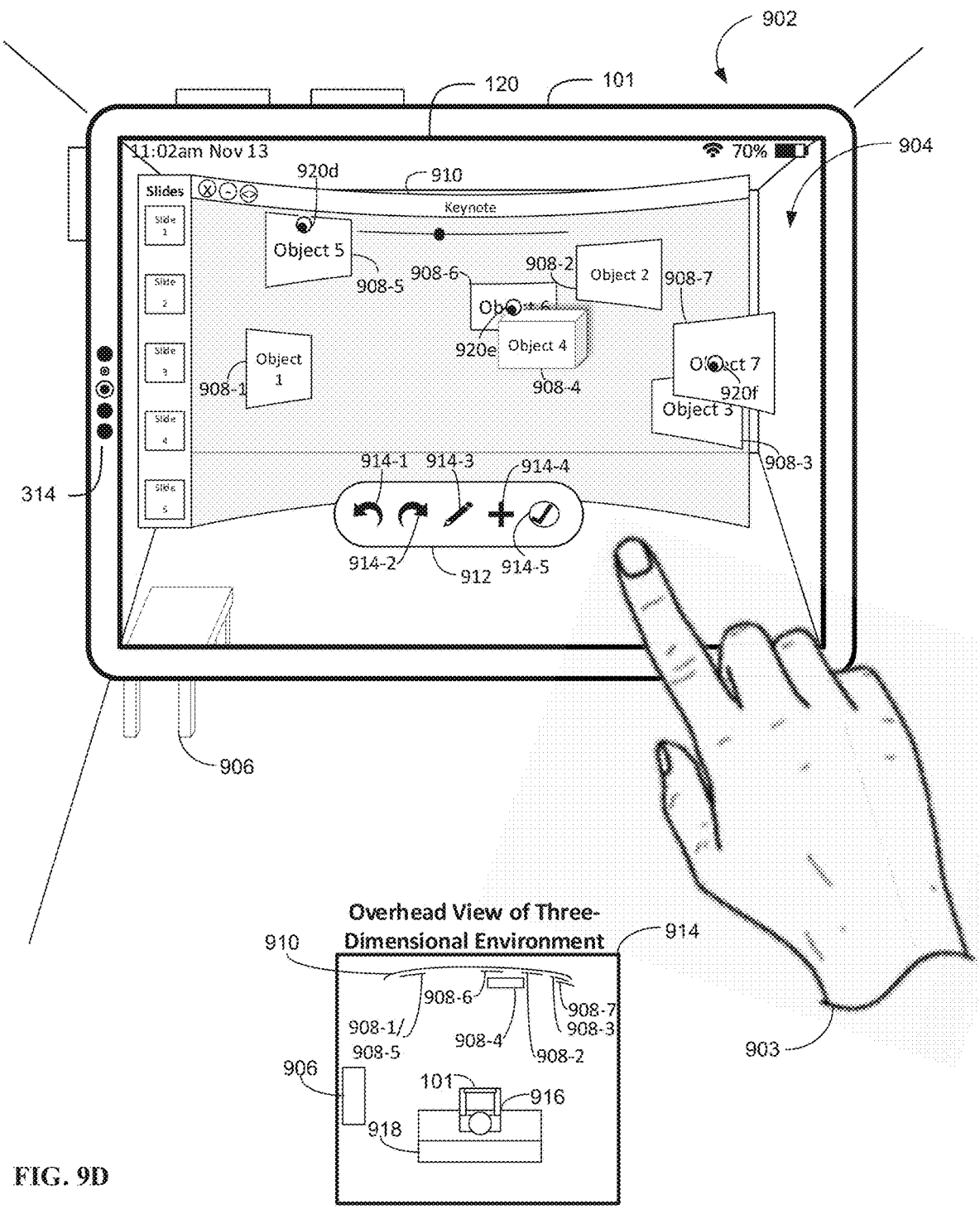

FIG. 9D illustrates the responses of computer system 101 to the selections of the paste options in FIG. 9C. For example, with reference to gaze 920e, computer system 101 displays object 908-6 (a copy of object 908-2) at the location of gaze 920e in response to the input in FIG. 9C. In some embodiments, gaze 920e defines the center point of object 908-6, as shown. Further, computer system 101 displays object 908-6 behind object 908-4, because object 908-4 is a three-dimensional object, and two-dimensional objects such as object 908-6 are pasted behind three-dimensional objects such as object 908-4. In contrast, with reference to gaze 920f, computer system displays object 908-7 (a copy of object 908-2) in front of object 908-3 in response to the input in FIG. 9C, which is a two-dimensional object, because object 908-7 was placed in object 910 while object 908-3 was already in object 910. Further, because computer system 101 placed object 908-7 at the location of gaze 920f and gaze 920f was relatively close to the right boundary of object 910, object 908-7 is displayed as partially extending beyond the right boundary of object 910. In some embodiments, computer system 101 allows such placement of objects that extend beyond the right or left boundaries of object 910, and does not automatically reposition such objects within object 910. In some embodiments, computer system 101 adjusts the visual appearance of portions of object 908-7 that extend beyond the right or left boundaries of object 910 (e.g., increases the translucency of portions more the further those portions extend beyond the boundary and/or decrease the brightness of portions more the further those portions extend beyond the boundary).

In contrast to the placement of objects beyond the left and right boundaries of object 910, computer system 101 optionally does not allow objects to be placed in object 910 such that they extend beyond the top and bottom boundaries of object 910. For example, with reference to gaze 920d, if computer system had displayed object 908-5 (a copy of object 908-2) centered on gaze 920d in response to the input in FIG. 9C, object 908-5 would have optionally extended beyond the top boundary of object 910. Instead, in response to the input in FIG. 9C, computer system 101 has automatically shifted the location for the placement of object 908-5 away from the top boundary, towards the interior of object 910, and placed object 908-5 at that shifted location—different from the location defined by gaze 920d—such that while displayed at that location, object 908-5 does not extend beyond the top boundary of object 910. In some embodiments, computer system 101 shifts the location for object 908-5 to the closest location (e.g., direction and/or distance) at which object 908-5 will not extend beyond the top boundary of object 910. Computer system 101 optionally performs analogous operations to prevent objects from extending beyond the bottom boundary of object 910.

Figure 9E:
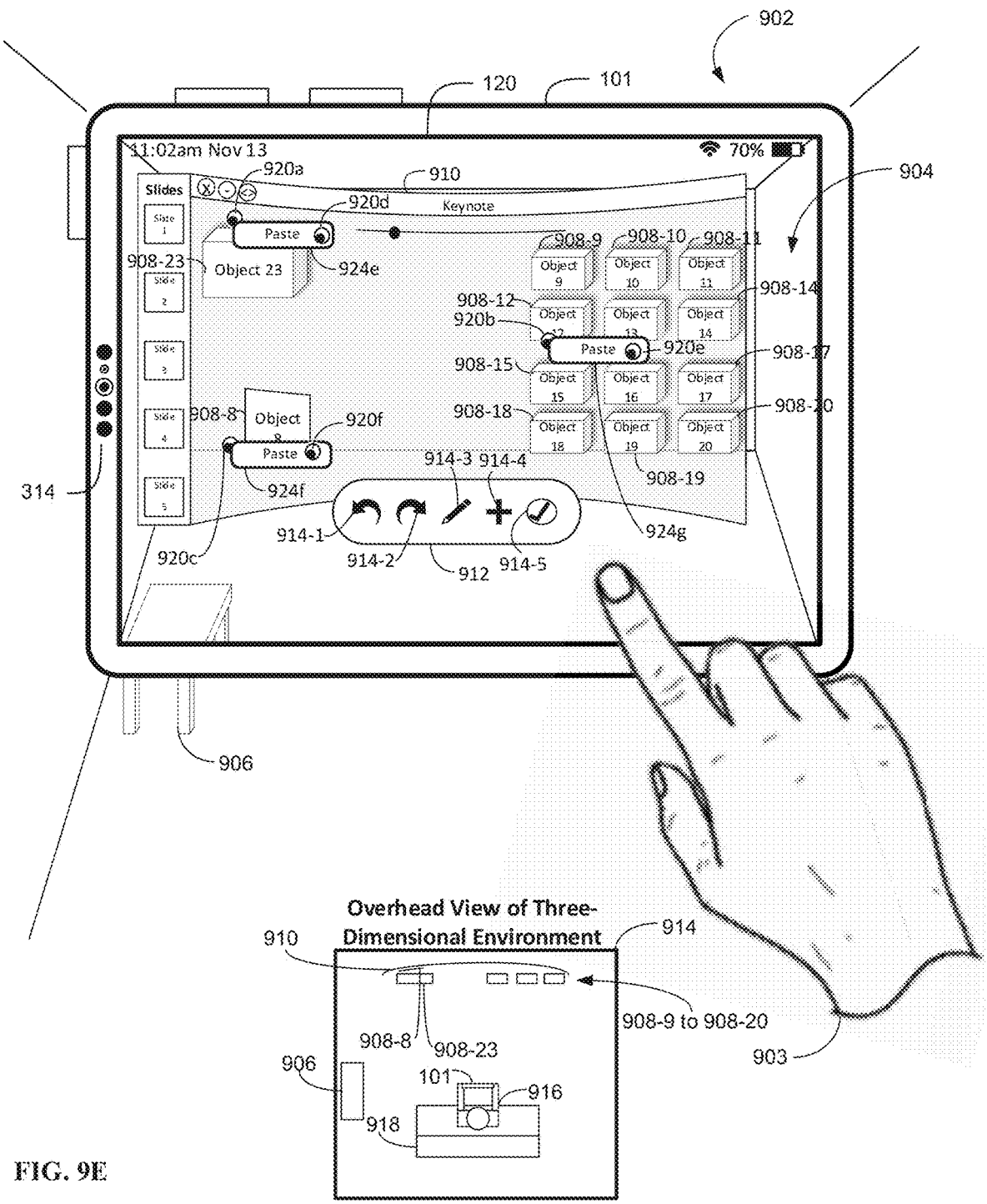

The inserting of three-dimensional objects into object 910 will now be described with reference to FIGS. 9E-9F. In FIG. 9E, a three-dimensional object has already been copied or cut as described with reference to object 908-2 in FIGS. 9A-9B—for example, object 908-4 in FIG. 9B has been copied or cut. Further, object 910 is displaying different objects than in FIGS. 9A-9D—for example, object 910 has been scrolled through to a different portion of object 910 than shown in FIGS. 9A-9D, such as described with reference to method 800. Additionally, computer system 101 is displaying menu 924e based on gaze 920a, menu 924f based on gaze 920c, and menu 924g based on gaze 920b (e.g., in response to the same or similar inputs as described with reference to FIG. 9C), which are optionally alternatives as described previously. In FIG. 9E, computer system 101 detects air pinch selection inputs of the paste options in menus 924e, 924f and 924g based on gazes 920a, 920c and 920e, respectively, as described previously.

In response to the inputs detected in FIG. 9E, computer system 101 optionally places the pasted three-dimensional object differently as described with reference to FIG. 9F. For example, with reference to gaze 920f, computer system 101 displays object 908-22 (a copy of object 908-4) at the location of gaze 920f in response to the input in FIG. 9E. In some embodiments, gaze 920f defines the center point of object 908-22, as shown. Further, computer system 101 displays object 908-22 in front of/obscuring object 908-8, because object 908-8 is a two-dimensional object, and because object 908-22 was placed in object 910 while object 908-8 was already in object 910.

In contrast, computer system 101 optionally does not allow three-dimensional object to be placed in object 910 such that they obscure or collide with other three-dimensional objects. For example, with reference to gaze 920d, if computer system had displayed object 908-24 (a copy of object 908-4) centered on gaze 920d in response to the input in FIG. 9E, object 908-24 would have optionally been obscuring and/or colliding with object 908-23, which is a three-dimensional object. Instead, in response to the input in FIG. 9E, computer system 101 has automatically shifted the location for the placement of object 908-24 away from object 908-23, and placed object 908-24 at that shifted location—different from the location defined by gaze 920d—such that while displayed at that location, object 908-24 does not collide with or obscure object 908-23. In some embodiments, computer system 101 shifts the location (e.g., direction and/or distance) for object 908-24 to the closest location at which object 908-24 will not collide with or obscure object 908-23. In some embodiments, computer system 101 additionally avoids object 908-24 extending beyond the top or bottom boundaries of object 910, as described previously with reference to FIG. 9D.

In some embodiments, computer system 101 does not shift the location at which to display an inserted three-dimensional object if no location exists within a threshold distance (e.g., 0.1, 0.3, 0.5, 1, 3, 5, 10, 20, 50 or 100 cm) of the gaze of the user at which the three-dimensional object will not collide with or obscure another three-dimensional object. For example, with reference to gaze 920e, which is positioned in the midst of a number of three-dimensional objects 908-9 to 908-20, computer system 101 has displayed object 908-21 (a copy of object 908-4) centered on gaze 920e in response to the input in FIG. 9E. While displayed at the location of gaze 920e, object 908-21 is optionally colliding with and/or obscuring one or more of objects 908-9 to 908-20. However, computer system 101 has not shifted the location at which to display object 908-21, because no location exists within the above-described threshold distance of gaze 920e at which object 908-21 can be displayed without colliding with or obscuring one or more of objects 908-9 to 908-20.

FIGS. 10A-10J is a flowchart illustrating a method 1000 of placing objects at locations in a displayed region based on attention of a user in accordance with some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In some embodiments, method 1000 is performed at a computer system (e.g., 101) in communication with a display generation component (e.g., 120) and one or more input devices. In some embodiments, the computer system is the same as or similar to the computer system described above with reference to method 800. In some embodiments, the one or more input devices are the same as or similar to the one or more input devices described above with reference to method 800. In some embodiments, the display generation component is the same as or similar to the display generation component described above with reference to method 800.

In some embodiments, (e.g., while a three-dimensional environment (e.g., such as the three-dimensional environment described in methods 800 and/or 1200) is visible via the display generation component) while displaying, via the display generation component, a compose region, such as the region of object 910 (e.g., a two-dimensional or three-dimensional region of the three-dimensional environment and/or of a container or canvas user interface object as described with reference to methods 800, 1000 and/or 1200), the computer system receives (1002a), via the one or more input devices, a first input corresponding to a request to insert a first (e.g., two-dimensional or three-dimensional) virtual object into the compose region, such as one of the inputs described with reference to gazes 920d, 920e and 920f FIG. 9C (e.g., add the first virtual object to the three-dimensional environment. In some embodiments, the first input and/or other inputs described with reference to method 1000 are or include air gesture inputs. In some embodiments, the first input is detected after performing an operation associated with another virtual object, such as an operation for copying at least a portion of the other virtual object that is then being pasted as the first virtual object). For example, after "cutting" or "copying" the other virtual object, the computer system receives a request to "paste" the first virtual object. In some embodiments, the first and/or other virtual objects described in method 1000 are displayed at or within the first virtual object described in method 1200. Similarly, in some embodiments, displaying the first virtual object includes displaying the first virtual object at or within the first virtual object described in method 1200. In some embodiments, the computer system ceases display of the other virtual object after performing the first operation (e.g., if the first operation corresponds to a request "cut" the other virtual object). Alternatively, in some embodiments, the computer system maintains display of the other virtual object after performing the first operation (e.g., if the first operation corresponds to a request to "copy" the other virtual object). In some embodiments, if the first operation corresponds to a request to "cut" the other virtual object, performing the first operation optionally includes storing the other virtual object in memory and ceasing display of the other virtual object. In some embodiments, if the first operation corresponds to a request to "copy" the other virtual object, performing the first operation optionally includes creating a copy of the other virtual object and storing the copy of the other virtual object in memory without modifying/altering the display and/or location of the other virtual object in the three-dimensional environment. In some embodiments, the first virtual object (e.g., the newly displayed virtual object) corresponds to (e.g., has the same characteristics, such as size, shape, color, area, and/or volume, as) the user interface object that was last "cut" or "copied" by the computer system.

In some embodiments, in response to receiving the first input (1002b), in accordance with a determination that attention of a user of the computer system was directed to a first location in the compose region (e.g., in the three-dimensional environment) when the first input was received, such as defined by gaze 920e in FIG. 9C (e.g., in some embodiments, an eye tracking device of the one or more input devices determines that the gaze of the user was directed at the first location (e.g., in the three-dimensional environment) when the first input was received), the computer system displays (1002c) the first virtual object at the first location, such as shown with object 908-6 in FIG. 9D (e.g., in the three-dimensional environment). For example, the first virtual object is displayed at the first location in the three-dimensional environment (e.g., in the lower-right portion of the three-dimensional environment relative to viewpoint of the user) because the attention of the user was directed to the first location in the three-dimensional environment when the first input was received (e.g., the gaze of the user was directed to the lower-right portion of the three-dimensional environment relative to viewpoint of the user when the first input was received). In some embodiments, the first location in the three-dimensional environment corresponds to an X location (e.g., horizontal location relative to the viewpoint of the user), Y location (e.g., vertical location relative to the viewpoint of the user), and/or Z location (e.g., distance relative to the viewpoint of the user) in the three-dimensional environment. In some embodiments, if the gaze of the user was directed to the first location in the three-dimensional environment when the first input was received, the second virtual object is displayed at an X location in the three-dimensional that is offset (e.g., 1, 3, 5, 7, 10, 20, or 30 centimeters) from the first location in the three-dimensional environment, displayed at a Y location in the three-dimensional that is offset (e.g., 1, 3, 5, 7, 10, 20, or 30 centimeters) from the first location in the three-dimensional environment, and/or displayed at a Z location in the three-dimensional that is offset (e.g., 1, 3, 5, 7, 10, 20, or 30 centimeters) from the first location in the three-dimensional environment. In some embodiments, displaying the first virtual object at the first location includes displaying the center of the first virtual object at the first location in the three-dimension environment.

In some embodiments, in accordance with a determination that the attention of the user of the computer system was directed to a second location in the compose region, different from the first location, (e.g., in the three-dimensional environment) when the first input was received, such as defined by gaze 920*f* in FIG. 9C (e.g., in some embodiments, an eye tracking device of the one or more input devices determines that the gaze of the user was directed at the second location in the three-dimensional environment when the first input was received), the computer system displays (1002*d*) the first virtual object at the second location, such as shown with object 908-7 in FIG. 9D (e.g., in the three-dimensional environment). For example, the first virtual object is displayed at the second location in the three-dimensional environment (e.g., in the upper-left portion of the three-dimensional environment relative to viewpoint of the user) because the attention of the user was directed to the second location in the three-dimensional environment when the first input was received (e.g., the gaze of the user was directed to the upper-left portion of the three-dimensional environment relative to viewpoint of the user when the first input was received). In some embodiments, displaying the first virtual object at the second location includes displaying the center of the first virtual object at the second location in the three-dimension environment. In some embodiments, displaying the first virtual object at the second location has one or more of the characteristics described above with respect to displaying the first virtual object at the first location. Adding the first virtual object to the three-dimensional environment based on the attention of the user causes the computer system to automatically determine the appropriate location of the first virtual object in the three-dimensional environment.

In some embodiments, while displaying the compose region, the computer system detects (1004*a*), via the one or more input devices, a second input that includes a respective portion of the user performing a respective gesture while the attention of the user is directed to an empty portion of the compose region, such as one of the inputs described with reference to gazes 920*a*, 920*b* and 920*c* FIG. 9C (e.g., a portion of the compose region that does not include a (or any) virtual objects). In some embodiments, the second input is a pinch air gesture input (e.g., a long pinch or a quick pinch) as described with reference to method 800. In some embodiments, in response to detecting the second input, the computer system displays (1004*b*), via the display generation component, a contextual menu associated with the compose region, such as menus 924*a*, 924*b*, 924*c* or 924*d*. The contextual menu optionally includes one or more selectable options for performing operations, as described below, with respect to the compose region. Displaying the contextual menu in response to the second input reduces the number of inputs needed to access one or more operations associated with the compose region.

In some embodiments, the contextual menu includes a selectable option that is selectable to paste a virtual object into the compose region (1006), such as shown with menus 924*b*, 924*c* and 924*d*. In some embodiments, the first input includes selection of the selectable option. In some embodiments, selection of the selectable option occurs in response to the computer system detecting a pinch air gesture (e.g., quick pinch or long pinch), as previously described with reference to method 800, while the attention of the user is directed to the selectable option. In some embodiments, selection of the selection option occurs in response to the computer system detecting a direct input selecting the selectable option (e.g., the finger of the user reaching out and touching the selectable option). In some embodiments, the virtual object to be pasted into the compose region was previously copied or cut. Displaying an option to paste a virtual object in the contextual menu reduces the number of inputs needed to paste a virtual object into the compose region.

In some embodiments, the contextual menu includes one or more selectable options other than a selectable option that is selectable to paste a virtual object into the compose region (1008), such as options 922-1 to 922-6 in menu 924*a* in FIG. 9B. In some embodiments, selection of the selectable options occurs as described previously with reference to selection of the selectable option for pasting a virtual object into the compose region. In some embodiments, the one or more selectable options include one or more of: a selectable option to cut one or more selected virtual objects (e.g., as described with reference to method 800), a selectable option to duplicate one or more selected virtual objects (e.g., as described with reference to method 800), a selectable option to rotate one or more selected virtual objects, a selectable option to flip horizontally one or more selected virtual objects, a selectable option to flip vertically one or more selected virtual objects, a selectable option to group together one or more selected virtual objects, a selectable option to specify an application within which to open one or more selected virtual objects, a selectable option to delete one or more selected virtual objects and/or a selectable option to temporarily display content associated with one or more selected virtual objects. Displaying various options for performing one or more various operations associated with the compose region in the contextual menu reduces the number of inputs needed to perform the various operations associated with the compose region.

In some embodiments, while displaying, via the display generation component, a second virtual object in the compose region, the computer system detects (1010*a*) the attention of the user directed to the second virtual object, such as gaze 920 directed to object 908-2 in FIG. 9A (e.g., the gaze, head and/or torso of the user directed to the second virtual object). In some embodiments, in response to detecting the attention of the user directed to the second virtual object, in accordance with a determination that a respective portion of the user (e.g., a hand of the user) is in a predefined pose, such as with respect to hand 903 in FIG. 9A (e.g., a ready state of the hand of the user, as previously described), the computer system displays (1010*b*), via the display generation component, a selectable option that is selectable to display a menu associated with the second virtual object, such as option 922 in FIG. 9A. For example, a button that is selectable to display a contextual menu associated with the second virtual object is displayed in response to the computer system detecting the attention of the user directed to the second virtual object and the hand of the user in the ready state. In some embodiments, the button is selected in one or more of the above-described manners of selecting selectable options. In some embodiments, the button is not displayed unless the ready state and the attention of the user are detected. In some embodiments, the button is displayed overlaid on the second virtual object. Displaying the selectable option for accessing the menu associate with the second virtual object reduces display clutter.

In some embodiments, while displaying the selectable option that is selectable to display the menu associated with the second virtual object, the computer system detects (1012*a*) a second input that includes the respective portion of the user (e.g., hand of the user) performing a respective gesture while the attention of the user is directed to the selectable option, such as the input from hand 903 directed to option 922 in FIG. 9A. In some embodiments, the second input is a pinch air gesture input (e.g., a long pinch or a quick pinch) as described with reference to method 800. In some embodiments, in response to detecting the second input, the computer system displays (1012*b*), via the display generation component, the menu associated with the second virtual object, wherein the menu associated with the second virtual object includes one or more selectable options that are selectable to perform one or more operations associated with the second virtual object, such as menu 924*a* in FIG. 9B. In some embodiments, the selectable options included in the menu are selected in one or more of the above-described manners of selecting selectable options. In some embodiments, the one or more selectable options include one or more of: a selectable option to cut the second virtual object, a selectable option to copy the second virtual object, and/or a selectable option to paste a previously copied or cut virtual object at the location of the second virtual object. Displaying the selectable options for performing one or more operations associated with the second virtual object reduces the number of inputs needed to access those one or more operations.

In some embodiments, displaying the menu associated with the second virtual object includes (1014*a*), in accordance with a determination that the computer system has previously detected an input to copy at least a portion of a respective virtual object (e.g., prior to the second input—in some embodiments, within a time threshold such as 1, 3, 5, 20, 45, 60, 120, 240 or 480 minutes prior to the second input. In some embodiments, the input to copy at least the portion of the respective virtual object is an input to cut at least the portion of the respective virtual object), displaying, in the menu, a first selectable option that is selectable to paste the at least the portion of the respective virtual object in the compose region (1014*b*), such as if menu 924*a* included a paste option in FIG. 9B. In some embodiments, in accordance with a determination that the computer system has not previously detected an input to copy at least a portion of a respective virtual object, the forgoing displaying, in the menu, the first selectable option (1014*c*), such as menu 924 in FIG. 9B not including a paste option. Thus, in some embodiments, the contextual menu for the second virtual object only includes the option to paste if the computer system has previously (recently) detected an input to cut or copy a virtual object. Displaying the first selectable option based on whether the computer system has previously detected an input to copy a virtual object causes the computer system to automatically include or not include relevant operations to be performed in the contextual menu.

In some embodiments, while displaying, via the display generation component, the compose region (e.g., a two-dimensional or three-dimensional region of the three-dimensional environment and/or of a container or canvas user interface object as described with reference to methods 800, 1000 and/or 1200), the computer system receives (1016*a*), via the one or more input devices, a second input corresponding to a request to insert a plurality of virtual objects into the compose region, such as an input to insert objects 908-9 to 908-20 into object 910 before those objects are displayed in FIG. 9E. The second input is optionally selection of a paste option to paste the previously copied or cut plurality of virtual objects. In some embodiments, the plurality of virtual objects have previously been grouped together (e.g., in response to a grouping operation as previously described). In some embodiments, the plurality of virtual objects had previously been in the selected state together (e.g., as described with reference to method 800) without having been grouped together.

In some embodiments, in response to receiving the second input (1016*b*), in accordance with a determination that the attention of the user of the computer system was directed to a third location in the compose region (e.g., in the three-dimensional environment) when the second input was received, the computer system displays (1016*c*) the plurality of virtual objects in a spatial arrangement in the compose region (e.g., the spatial arrangement of the plurality of virtual objects is optionally the same spatial arrangement of the corresponding plurality of virtual objects that were copied and on which the plurality of virtual objects are based), wherein a particular portion of the spatial arrangement is at the third location in the compose region, such as inserting objects 908-9 to 908-20 into object 910, resulting in the display of objects 908-9 to 908-20 like that shown in FIG. 9E, such that the center of the arrangement of those objects coincides with the third location. In some embodiments, the particular portion of the spatial arrangement is the center (and/or centroid) of the spatial arrangement. In some embodiments, the particular portion of the spatial arrangement is a different portion of the spatial arrangement. Placing the plurality of virtual objects in the compose region based on user attention optionally has one or more of the characteristics of placing the first virtual object in the compose region based on user attention.

In some embodiments, in accordance with a determination that the attention of the user of the computer system was directed to a fourth location, different from the third location, in the compose region (e.g., in the three-dimensional environment) when the second input was received, the computer system displays (1016*d*) the plurality of virtual objects in the spatial arrangement in the compose region (e.g., the same spatial arrangement as when the attention of the user was directed to the third location), wherein the particular portion of the spatial arrangement is at the fourth location in the compose region, such as inserting objects 908-9 to 908-20 into object 910, resulting in the display of objects 908-9 to 908-20 like that shown in FIG. 9E, such that the center of the arrangement of those objects coincides with the fourth location. Thus, in some embodiments, the attention of the user controls the location of the particular portion of the spatial arrangement of the plurality of virtual objects. Adding the plurality of virtual objects to the compose region based on the attention of the user causes the computer system to automatically determine the appropriate location for the plurality of virtual objects.

In some embodiments, while displaying, via the display generation component, the compose region, the computer system receives (1018*a*), via the one or more input devices, a second input corresponding to a request to insert a second virtual object into the compose region, such as the input associated with gaze 920*d* in FIG. 9C. In some embodiments, the second input has one or more of the characteristics of the first input, as previously described. In some embodiments, in response to receiving the second input (1018*b*), in accordance with a determination that the attention of the user of the computer system was directed to a third location in the compose region (e.g., in the three-dimensional environment) when the second input was received, wherein the third location is within a threshold distance (e.g., 0.1, 0.2, 0.5, 1, 2, 3, 5, 10 or 20 cm) of a lower boundary of the compose region, such as if gaze 920d in FIG. 9C were within the threshold distance of the lower boundary of object 910 (e.g., the lower edge of the compose region, optionally corresponding to a boundary across which the compose region does not extend downward), the computer system displays (1018c) the second virtual object at a fourth location in the compose region, the fourth location further than the threshold distance from the lower boundary of the compose region, similar to how computer system 101 displays object 908-5 at a location further than the threshold distance from the upper boundary of object 910 when gaze 920d was within the threshold distance of the upper boundary. For example, the computer system optionally displays the second virtual object further upward than the location of the attention of the user (e.g., the computer system shifts the second virtual object upward away from the lower boundary so that the second virtual object does not extend beyond the lower boundary). In some embodiments, the threshold distance is based on the dimensions of the second virtual object (e.g., different for different sized virtual objects). In some embodiments, the threshold distance corresponds to, is based on or is the same as the vertical dimension of the second virtual object. In some embodiments, the horizontal position of the fourth location is the same as the horizontal position of the third location (e.g., the second virtual object is only shifted vertically away from the location of the attention).

In some embodiments, in accordance with a determination that the attention of the user of the computer system was directed to a fifth location in the compose region (e.g., in the three-dimensional environment) when the second input was received, wherein the fifth location is outside of the threshold distance of the lower boundary of the compose region, such as the input associated with gaze 920e in FIG. 9C, the computer system displays (1018d) the second virtual object at the fifth location in the compose region, including displaying the second virtual object within the lower boundary of the compose region without displaying a portion of the second virtual object outside of the lower boundary of the compose region, such as the display of object 908-6 in FIG. 9D. In some embodiments, when displayed at the fifth location, the second virtual object is fully within the compose region, and not partially outside of the compose region (e.g., outside of the lower boundary of the compose region). Shifting the location of the second virtual object causes the computer system to automatically position the second virtual object at an appropriate location in the compose region.

In some embodiments, in response to receiving the second input (1019a), in accordance with a determination that the attention of the user of the computer system was directed to a sixth location in the compose region (e.g., in the three-dimensional environment) when the second input was received, wherein the sixth location is within the threshold distance (e.g., 0.1, 0.2, 0.5, 1, 2, 3, 5, 10 or 20 cm) of an upper boundary of the compose region, such as the input associated with gaze 920d in FIG. 9C (e.g., the upper edge of the compose region, optionally corresponding to a boundary across which the compose region does not extend upward), the computer system displays (1019b) the second virtual object at a seventh location in the compose region, the seventh location further than the threshold distance from the upper boundary of the compose region, such as shown with object 908-5 in FIG. 9D. For example, the computer system optionally displays the second virtual object further downward than the location of the attention of the user (e.g., the computer system shifts the second virtual object downward away from the upper boundary so that the second virtual object does not extend beyond the upper boundary). In some embodiments, the horizontal position of the seventh location is the same as the horizontal position of the sixth location (e.g., the second virtual object is only shifted vertically away from the location of the attention). Shifting the location of the second virtual object causes the computer system to automatically position the second virtual object at an appropriate location in the compose region.

In some embodiments, while displaying, via the display generation component, the compose region (e.g., a two-dimensional or three-dimensional region of the three-dimensional environment and/or of a container or canvas user interface object as described with reference to methods 800, 1000 and/or 1200), the computer system receives (1020a), via the one or more input devices, a second input corresponding to a request to insert a second virtual object into the compose region. In some embodiments, the second input has one or more of the characteristics of the first input, as previously described. In some embodiments, in response to receiving the second input (1020b), in accordance with a determination that the attention of the user of the computer system was directed to a third location in the compose region (e.g., in the three-dimensional environment) when the second input was received, wherein the third location is within a threshold distance (e.g., 0.1, 0.2, 0.5, 1, 2, 3, 5, 10 or 20 cm) of a lateral (e.g., left or right) boundary of the compose region, such as the input associated with gaze 920f in FIG. 9C, the computer system displays (1020c) the second virtual object at the third location in the compose region, including displaying at least a portion of the second virtual object outside of the lateral boundary of the compose region, such as shown with object 908-7 in FIG. 9D. In some embodiments, the threshold distance is based on the dimensions of the second virtual object (e.g., different for different sized virtual objects). In some embodiments, the threshold distance corresponds to, is based on or is the same as the horizontal or lateral dimension of the second virtual object. In some embodiments, when displayed at the third location, the second virtual object is partially within the compose region, and partially outside of the compose region (e.g., outside of the left or right boundary of the compose region).

In some embodiments, in accordance with a determination that the attention of the user of the computer system was directed to fourth location in the compose region (e.g., in the three-dimensional environment) when the second input was received, wherein the fourth location is outside of the threshold distance of the lateral boundary of the compose region, such as the input associated with gaze 920e in FIG. 9C, the computer system displays (1020d) the second virtual object at the fourth location in the compose region, including displaying the second virtual object within the lateral boundary of the compose region without displaying a portion of the second virtual object outside of the lateral boundary of the compose region, such as shown with object 908-6 in FIG. 9D. In some embodiments, when displayed at the fourth location, the second virtual object is fully within the compose region, and not partially outside of the compose region (e.g., outside of the left or right boundary of the compose region). Thus, in some embodiments, the computer system does not shift the second virtual object away from the attention location even if displaying the second virtual object at the attention location would cause the second virtual object to extend beyond the lateral boundary of the compose region. This is optionally in contrast to the upper or lower boundaries of the compose region, as described previously. Not shifting the location of the second virtual object away from the lateral boundaries of the compose region provides feedback to the user that the compose region can be scrolled horizontally to scroll to other portions of the compose region, as described with reference to method 800.

In some embodiments, displaying the first virtual object at the first location in the compose region includes (1022*a*), in accordance with a determination that the first location included a three-dimensional virtual object when the first input was received and that the first virtual object is a two-dimensional virtual object, displaying the first virtual object behind the three-dimensional virtual object at the first location in the compose region (1022*b*), such as shown with objects 908-6 and 908-7 in FIG. 9D. Thus, in some embodiments, three-dimensional objects are always displayed in front of two-dimensional objects. Displaying different types of virtual objects in different display order provides feedback to the user about the types of objects that are being displayed.

In some embodiments, while displaying, via the display generation component, the compose region, the computer system receives (1024*a*), via the one or more input devices, a second input corresponding to a request to insert a second virtual object into a third location in the compose region, such as the input associated with gaze 920*d* in FIG. 9E. In some embodiments, the second input has one or more of the characteristics of the first input, as previously described. In some embodiments, the attention of the user is directed to the third location when the second input is detected. In some embodiments, in response to receiving the second input (1024*b*), in accordance with a determination that the second virtual object is a first three-dimensional object and the third location in the compose region included a second three-dimensional object when the second input was received, such as object 908-23 in FIG. 9E, the computer system displays (1024*c*) the second virtual object at a fourth location, different from the third location, in the compose region, wherein while displayed at the fourth location, the second virtual object does not overlap with the second three-dimensional object, such as shown with object 908-24 in FIG. 9F. For example, the computer system optionally shifts the location of the second virtual object away from the attention location to avoid or reduce overlap and/or collision between the second virtual object and the second three-dimensional object. In some embodiments, the fourth location is the closest point in the compose region to the third location at which overlap and/or collision between the second virtual object and the second three-dimensional object is avoided or reduced. In some embodiments, the distance and/or relative location between the third location and the fourth location are based on the dimensions of the second virtual object and the second three-dimensional object. Shifting the location of the second virtual object causes the computer system to automatically position the second virtual object at an appropriate location in the compose region.

In some embodiments, in response to receiving the second input (1026*a*), in accordance with a determination that the second virtual object is a two-dimensional object and the respective location in the compose region included the second three-dimensional object when the second input was received, such as object 908-4 in FIG. 9C, the computer system displays (1026*b*) the second virtual object at the third location in the compose region, wherein while displayed at the third location, the second virtual object overlaps with the second three-dimensional object, such as shown with object 908-6 behind object 908-4 in FIG. 9D. Thus, the computer system optionally does not shift the location of a two-dimensional object that is being pasted into the compose region away from the location of the attention of the user. The two-dimensional object is optionally pasted behind the three-dimensional object, as previously described. Not shifting the location of the two-dimensional object avoids excess and/or unnecessary movement of the two-dimensional object when that movement is not provided by the user.

In some embodiments, while displaying, via the display generation component, the compose region, the computer system receives (1028*a*), via the one or more input devices, a second input corresponding to a request to insert a second virtual object into a third location in the compose region, such as the input associated with gaze 920*d* or 920*e* in FIG. 9E, wherein the second virtual object is a first three-dimensional object. In some embodiments, the second input has one or more of the characteristics of the first input, as previously described. In some embodiments, the attention of the user is directed to the third location when the second input is detected. In some embodiments, in response to receiving the second input and in accordance with a determination that the third location in the compose region included a second three-dimensional object when the second input was received (1028*b*), such as object 908-23 in FIG. 9E, in accordance with a determination that a fourth location, different from the third location, within a threshold distance (e.g., 0.1, 0.3, 0.5, 1, 3, 5, 10, 20 or 50 cm) of the third location does not include a three-dimensional object (e.g., there is a location in the compose region within the threshold distance of the location of the attention of the user that is available for displaying the second virtual object because it is not occupied by a three-dimensional object and/or will not result in collision/overlap between the second virtual object and another three-dimensional object in the compose region), the computer system displays (1028*c*) the second virtual object at the fourth location in the compose region, such as shown with object 908-24 in FIG. 9F (e.g., the computer system shifts the second virtual object away from the location of the attention of the user). In some embodiments, the fourth location is the closest location to the third location at which display of the second virtual object will not cause collision and/or overlap between the second virtual object and another three-dimensional object in the compose region.

Figure 9F:
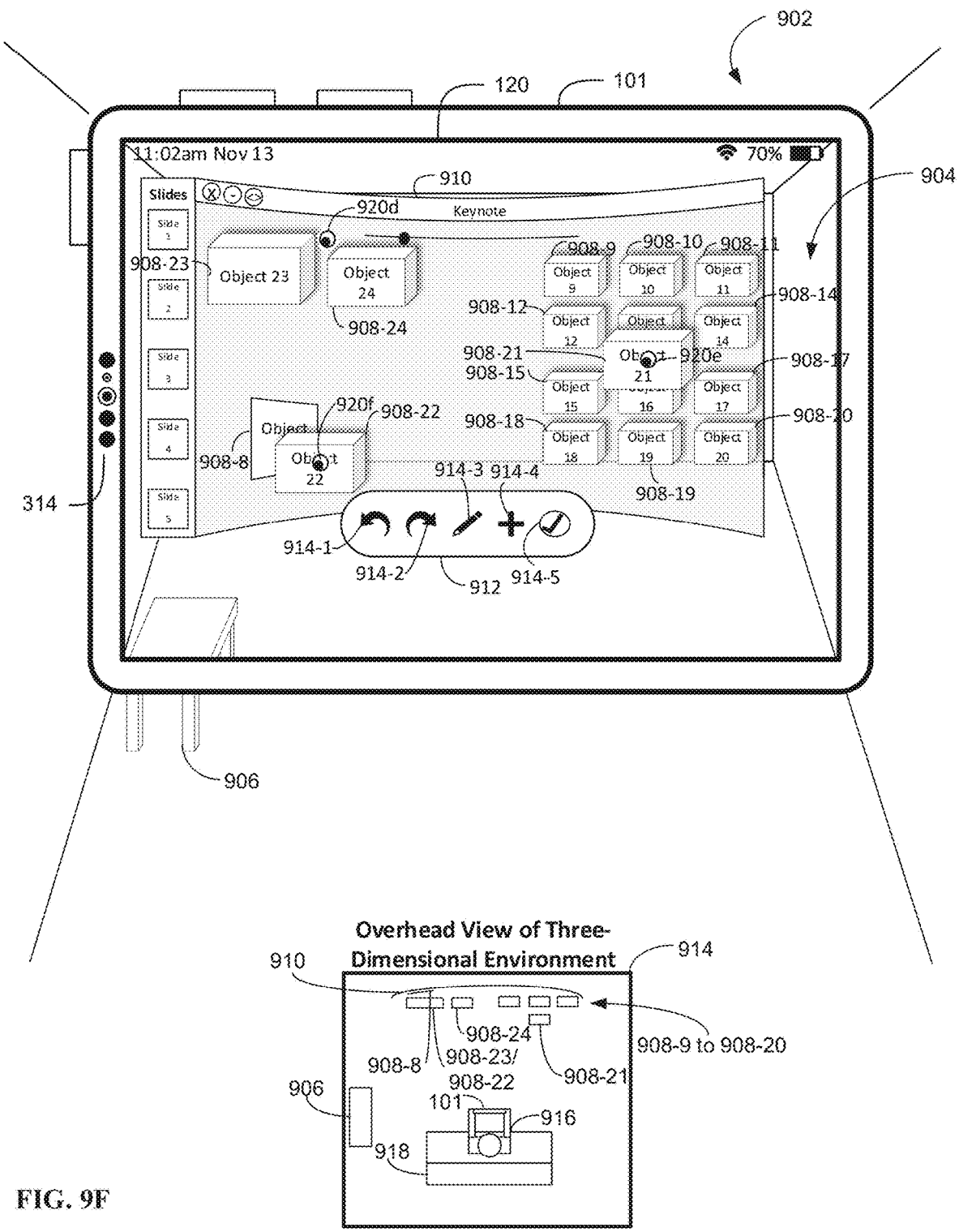
Figure 10A:
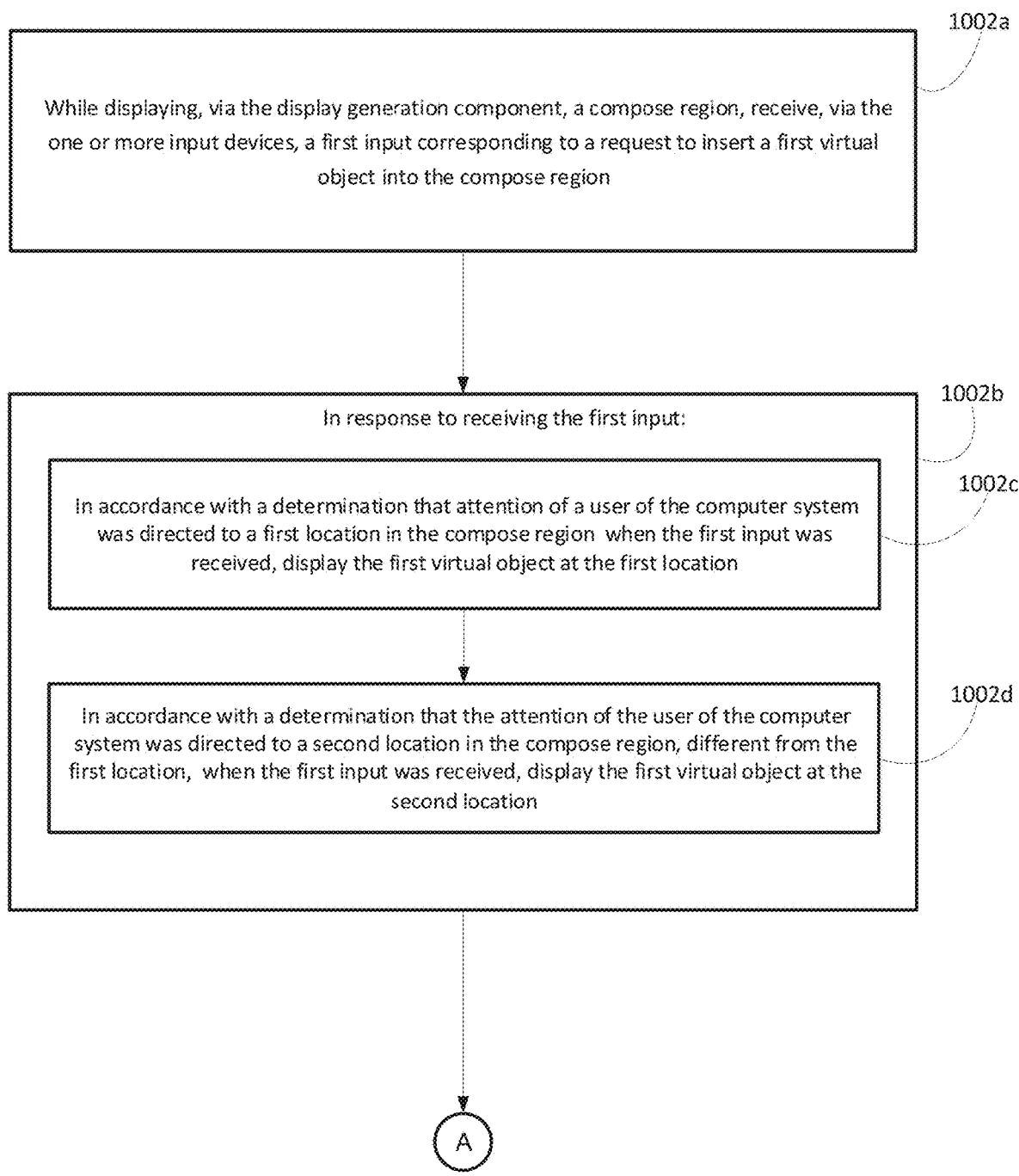
FIGS. 10A-10J is a flowchart illustrating a method of placing objects at locations in a displayed region based on attention of a user in accordance with some embodiments.
Figure 10B:
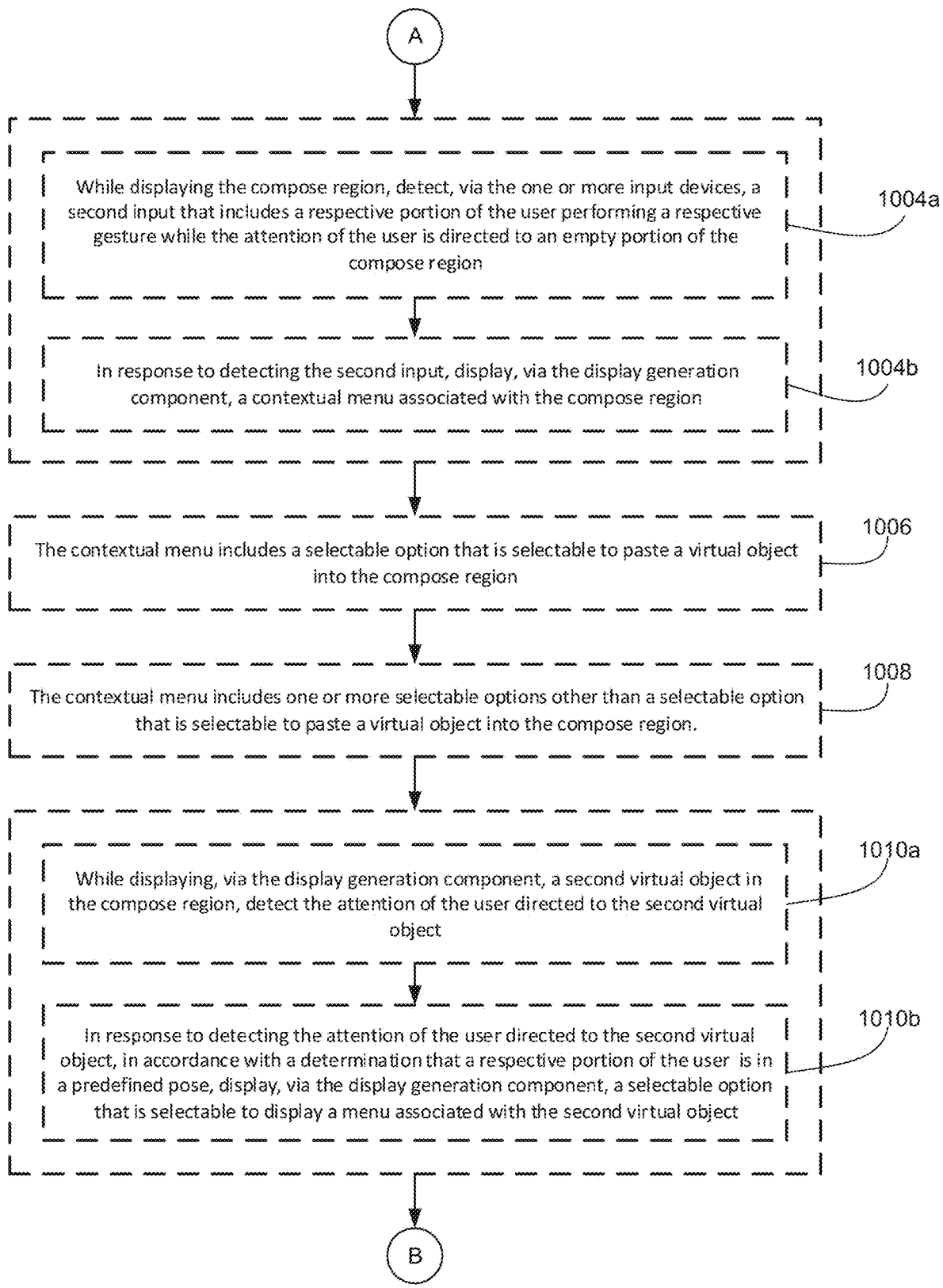
Figure 10C:
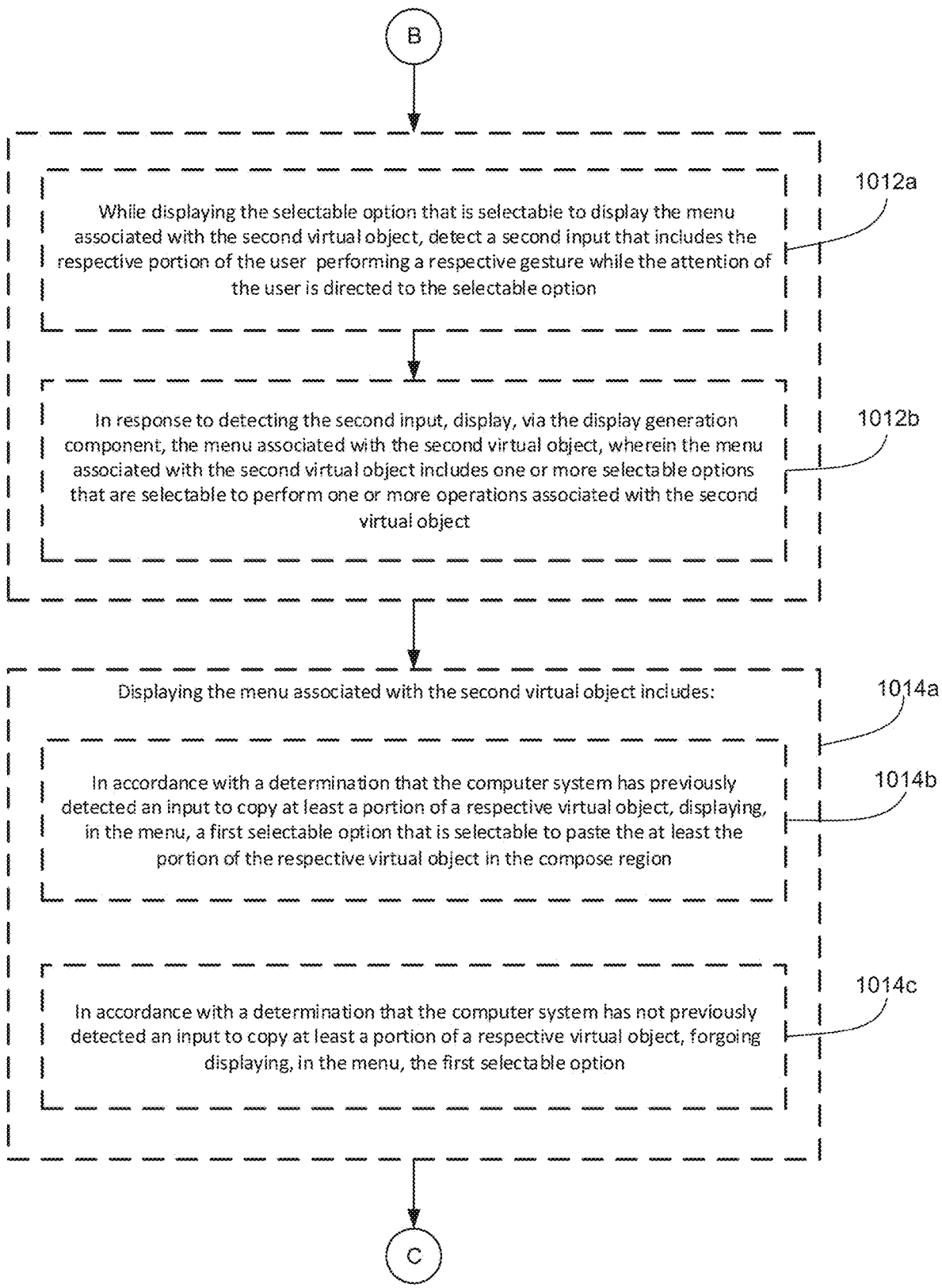
Figure 10D:
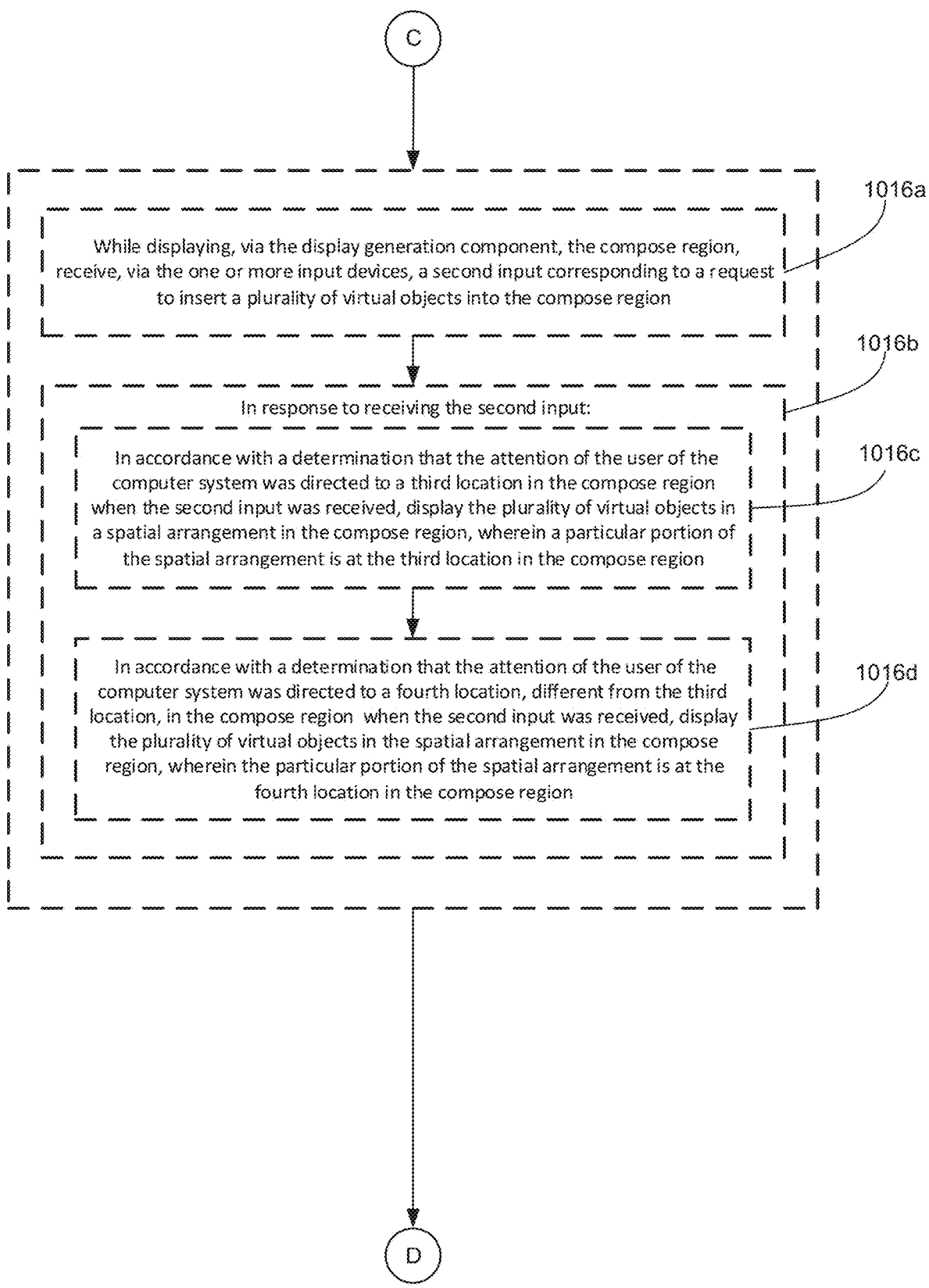
Figure 10E:
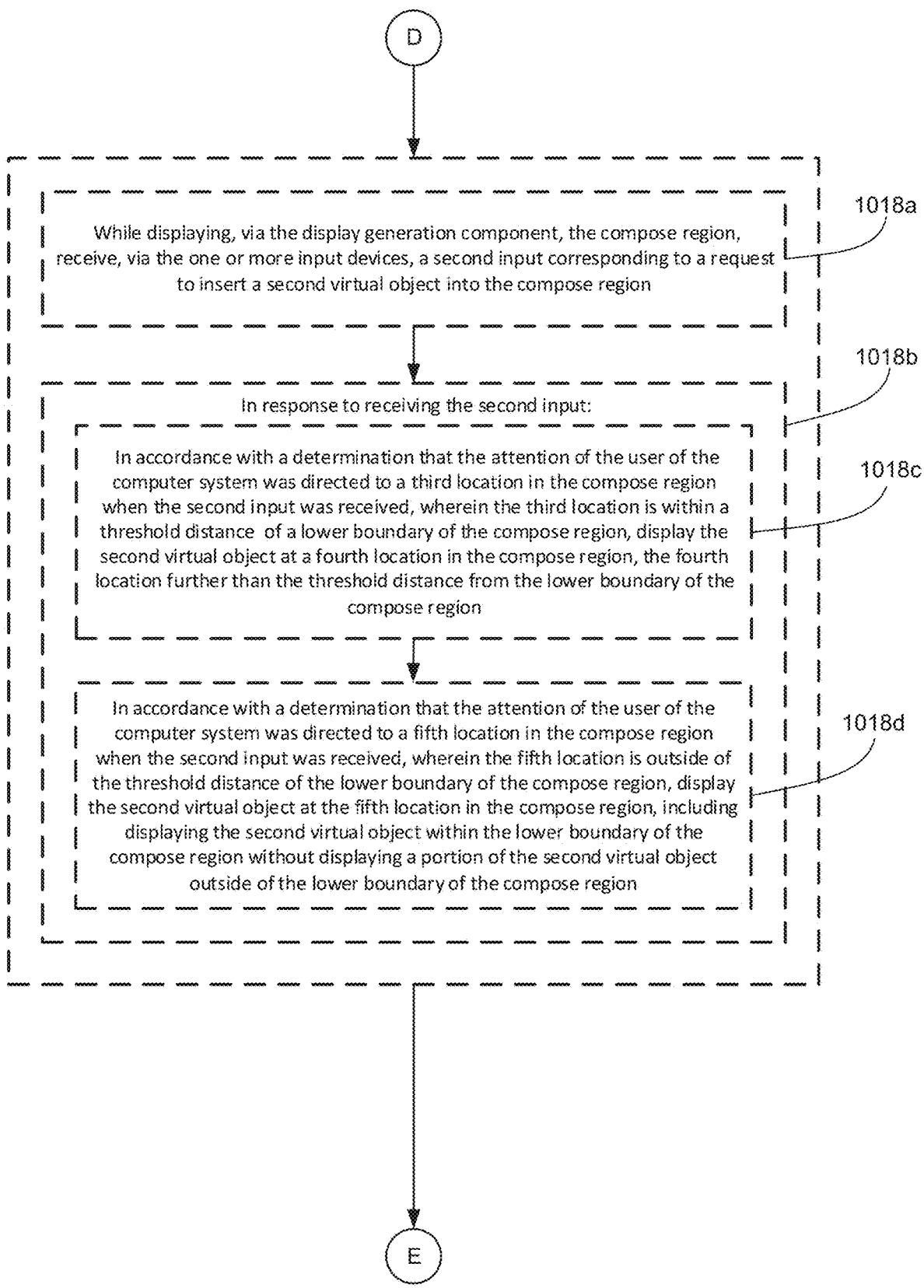
Figure 10F:
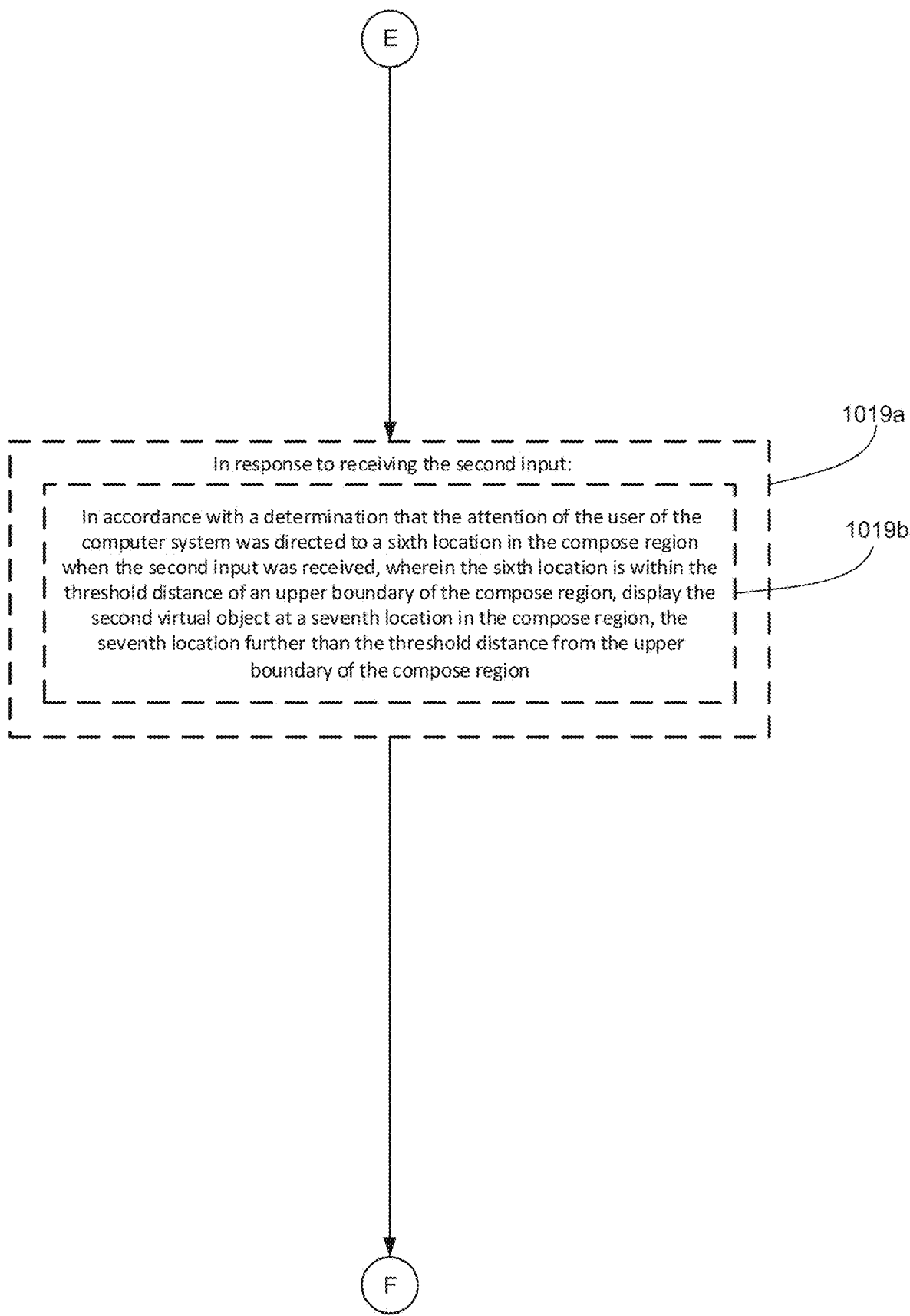
Figure 10G:
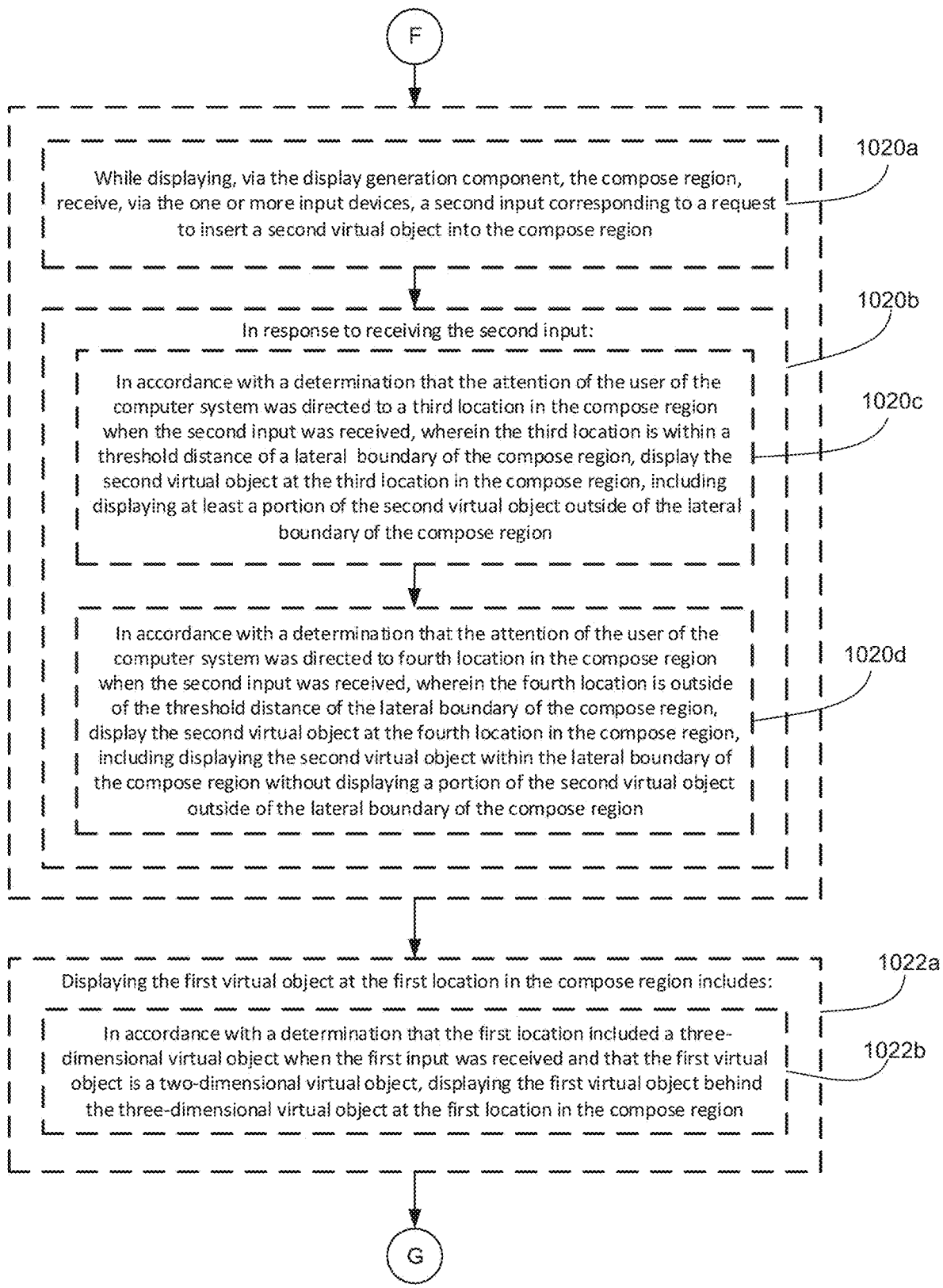
Figure 10H:
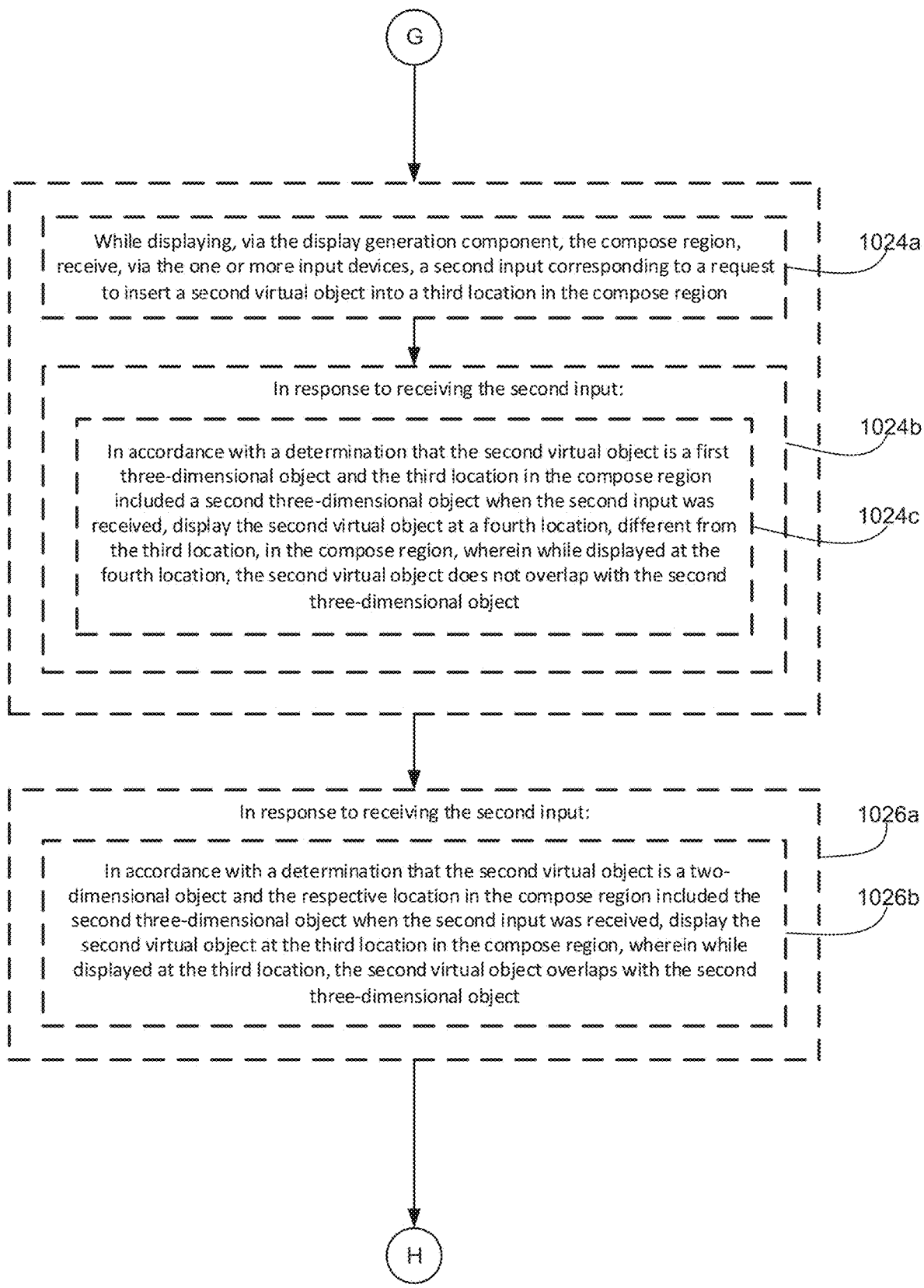
Figure 10I:
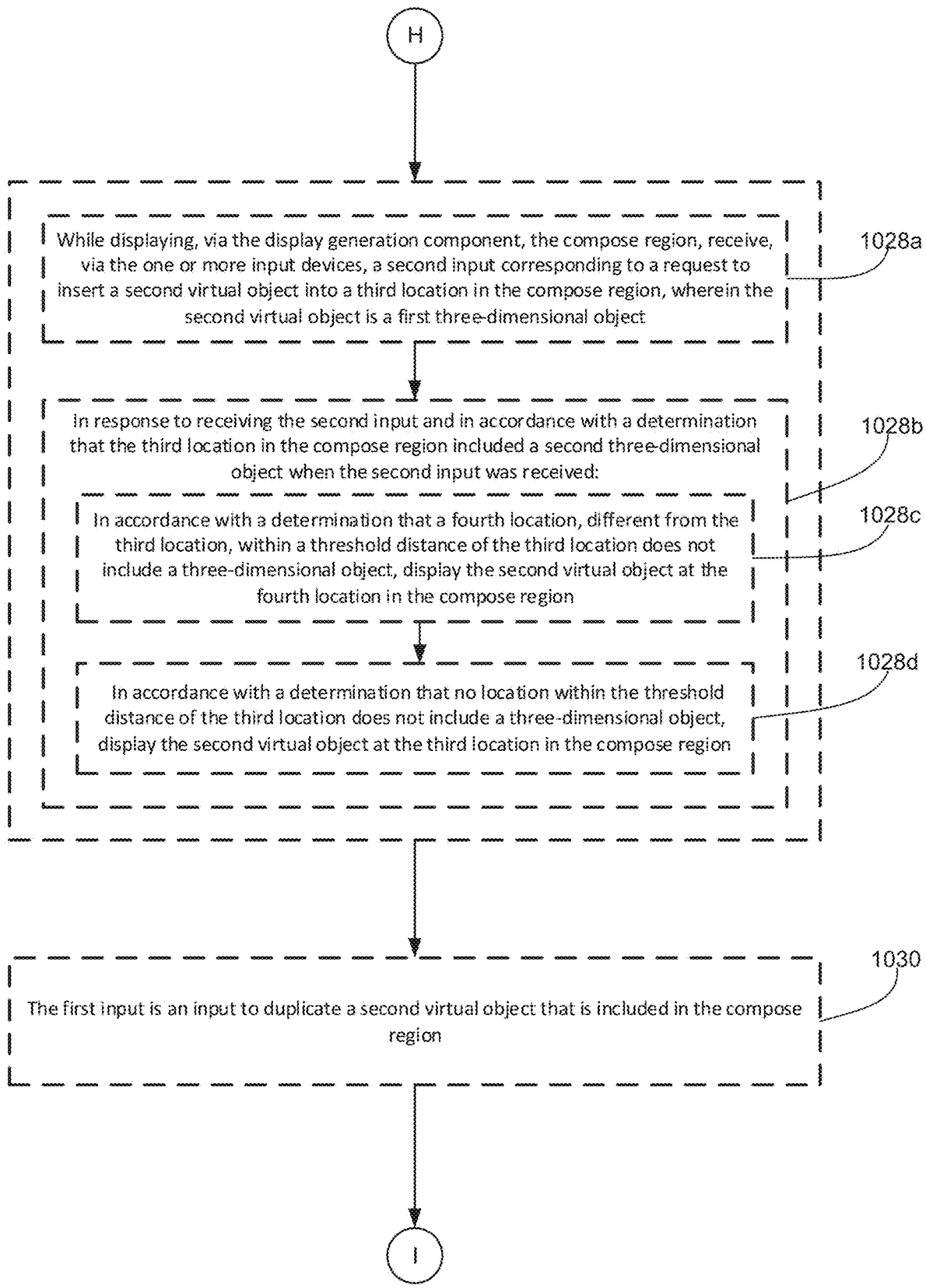
Figure 10J:
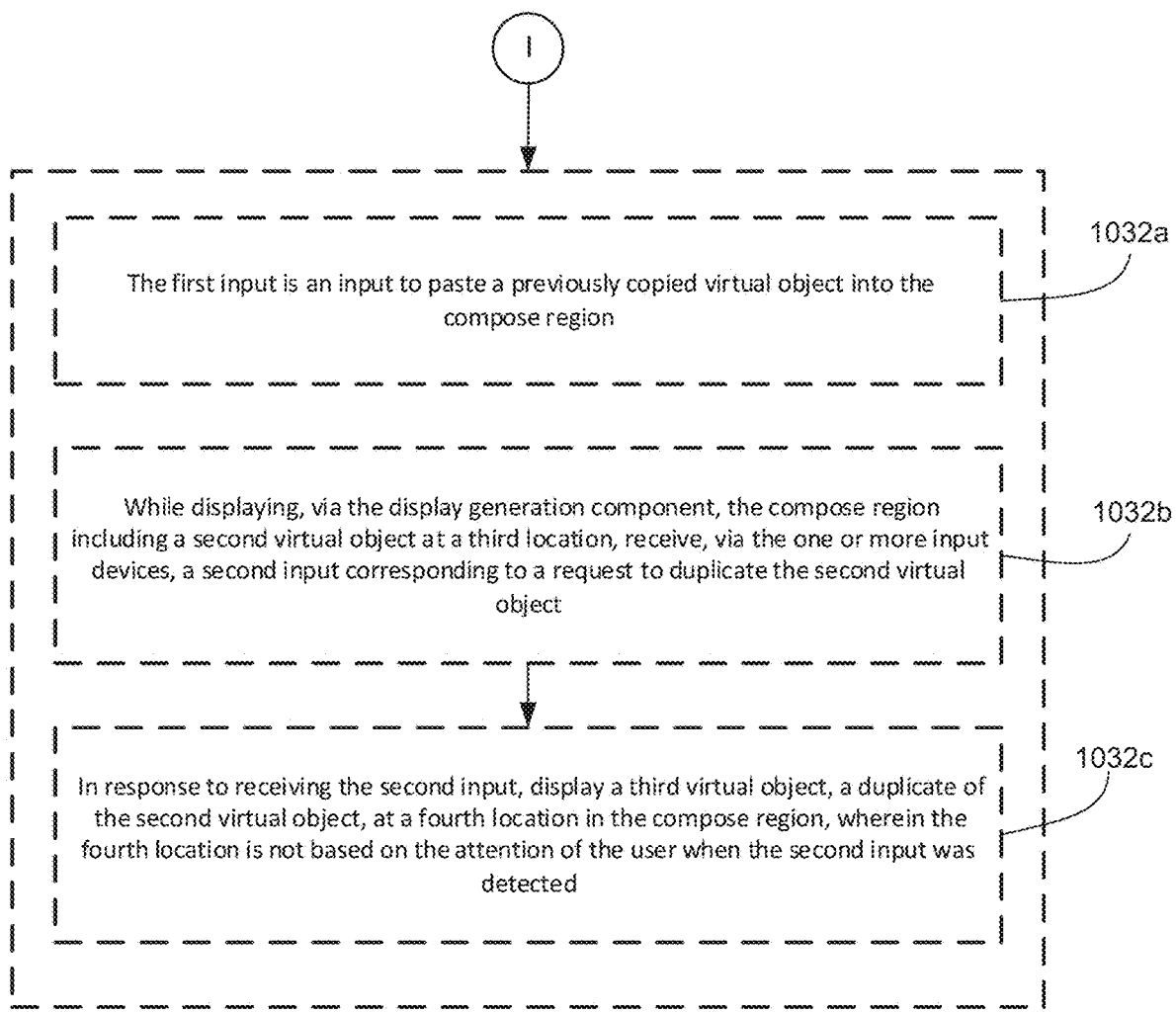

In some embodiments, in accordance with a determination that no location within the threshold distance of the third location does not include a three-dimensional object, such as is the case with gaze 920*e* in FIG. 9E (e.g., there is no location in the compose region within the threshold distance of the location of the attention of the user that is available for displaying the second virtual object, because every location within the threshold distance will result in collision/overlap between the second virtual object and another three-dimensional object in the compose region), the computer system displays (1028*d*) the second virtual object at the third location in the compose region, such as shown with object 908-21 in FIG. 9F (e.g., the computer system does not shift the second virtual object away from the location of the attention of the user). In some embodiments, the second virtual object is displayed in front of the second three-dimensional object. Shifting the location of the second virtual object causes the computer system to automatically position the second virtual object at an appropriate location in the compose region while avoiding shifting of the second virtual object by relatively large amounts.

In some embodiments, the first input is an input to duplicate a second virtual object that is included in the compose region (1030), such as via selection of option 922-3 in menu 924a in FIG. 9B. In some embodiments, the input to duplicate the second virtual object is an input selecting a "duplicate" selectable option displayed in a contextual menu for the second virtual object. The first virtual object (e.g., which is the duplicate of the second virtual object) is optionally placed at a location in the compose region to which the attention of the user is directed when the "duplicate" selectable option is selected, such as described previously with reference to the first input. Thus, in some embodiments, duplicating a virtual object and pasting a virtual object (e.g., different from duplicating a virtual object) optionally both place the inserted virtual object into the compose region at a location that is based on the attention of the user. Duplicating a virtual object to a location based on the attention of the user causes the computer system to automatically determine the appropriate location of the duplicated virtual object.

In some embodiments, the first input is an input to paste a previously copied virtual object into the compose region (1032a), such as selection of the paste options in menus 924b, 924c or 924d in FIG. 9C (e.g., different from duplicating a virtual object—when pasting a virtual object into the compose region, the computer system optionally places the pasted virtual object based on the location of the attention of the user, as described previously). In some embodiments, while displaying, via the display generation component, the compose region including a second virtual object at a third location, the computer system receives (1032b), via the one or more input devices, a second input corresponding to a request to duplicate the second virtual object, such as via selection of option 922-3 in menu 924a in FIG. 9B (e.g., selection of a "duplicate" option for the second virtual object, as previously described).

In some embodiments, in response to receiving the second input, the computer system displays (1032c) a third virtual object, a duplicate of the second virtual object, at a fourth location in the compose region, wherein the fourth location is not based on the attention of the user when the second input was detected, such as if the computer system 101 were to duplicate object 908-2 in FIG. 9B and place it in object 910 at a location that is not based on the location of gaze 920 (e.g., the computer system does not consider the location of the attention of the user in placing the duplicate virtual object). In some embodiments, the fourth location is a predetermined distance or orientation from the location of the virtual object being duplicated (e.g., 5 cm away from the virtual object being duplicated, diagonally downward and rightward). In some embodiments, the amount and/or direction by which the fourth location is separated from the virtual object to be duplicated is based on the dimensions and/or shape of the virtual object to be duplicated. Thus, in some embodiments, the computer system places objects differently for pasting operations and duplication operations. Duplicating a virtual object to a location not based on the attention of the user causes the computer system to automatically place the duplicated virtual object near the virtual object being duplicated for easy access.

It should be understood that the particular order in which the operations in method 1000 have been described is merely exemplary and is not intended to indicate that the described order is the only order in which the operations could be performed. One of ordinary skill in the art would recognize various ways to reorder the operations described herein.

FIGS. 11A-11G illustrate examples of a computer system displaying a container virtual object with curvature in a three-dimensional environment in accordance with some embodiments.

Figure 11A:
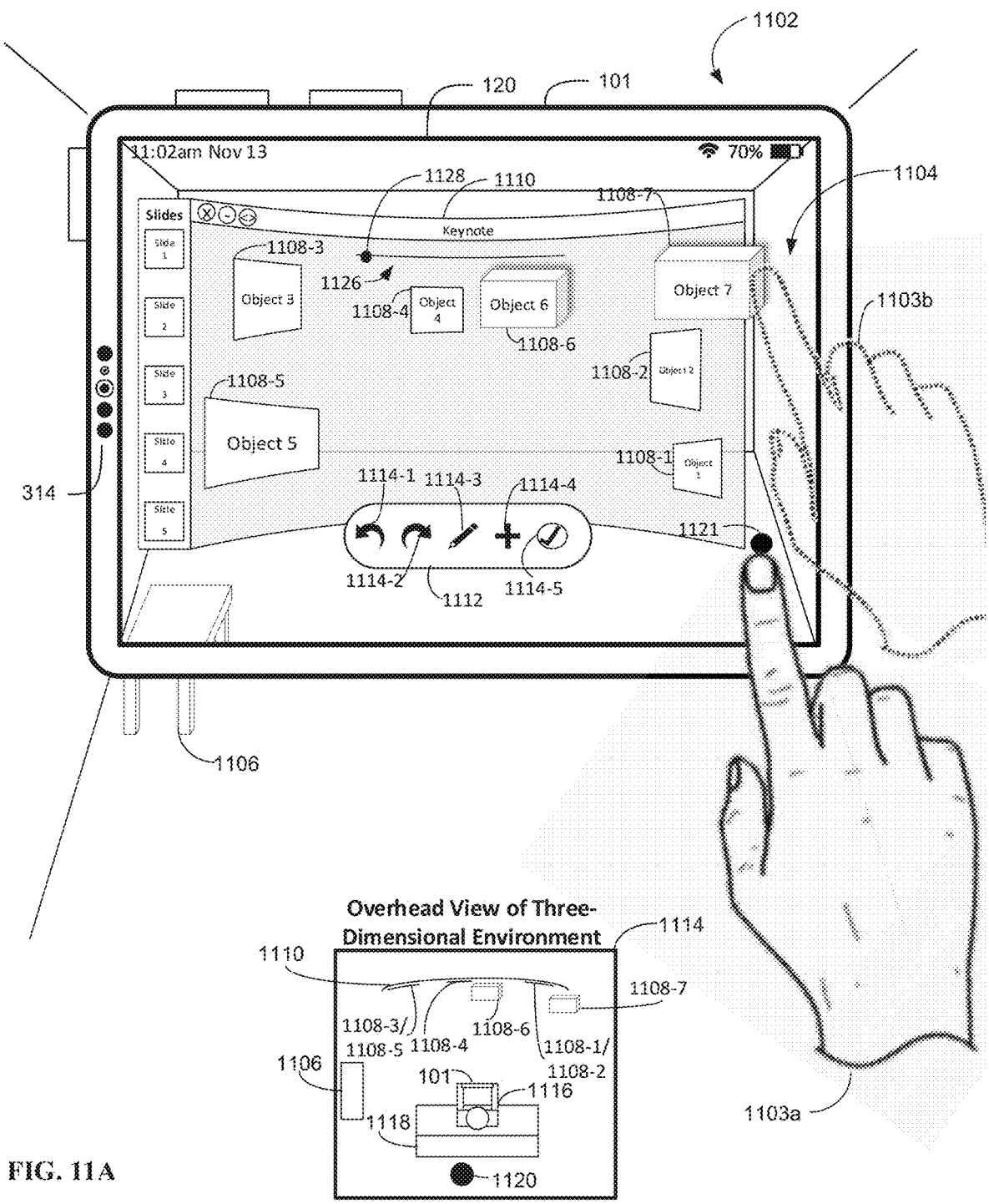
FIGS. 11A-11G illustrate examples of a computer system displaying a container virtual object with curvature in a three-dimensional environment in accordance with some embodiments.

FIG. 11A illustrates a three-dimensional environment 1104 visible via a display generation component (e.g., display generation component 120 of FIG. 1) of a computer system 101, the three-dimensional environment 1104 visible from a viewpoint 1116 of a user illustrated in the overhead view 1114 (e.g., facing the back wall of the physical environment in which computer system 101 is located, and near the back left corner of the physical environment). As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component (e.g., a touch screen) and sensors to detect the physical environment and/or movements of the user's hands (e.g., external sensors facing outwards from the user), and/or gaze of the user (e.g., internal sensors facing inwards towards the face of the user).

As shown in FIG. 11A, computer system 101 captures one or more images of the physical environment 1102 around computer system 101 (e.g., operating environment 100), including one or more objects in the physical environment around computer system 101. In some embodiments, computer system 101 displays representations of the physical environment in three-dimensional environment 1104 and/or the physical environment 1102 is visible in the three-dimensional environment 1104 via the display generation component 120. For example, three-dimensional environment 1104 visible via display generation component 120 includes representations of the physical floor and back and side walls of the room in which computer system 101 is located. Three-dimensional environment 1104 also includes table 1106 (shown via display generation component 120 and in the overhead view 1114).

In FIG. 11A, three-dimensional environment 1104 also includes virtual objects 1108-1 through 1108-7, virtual object 1110 and virtual object 1112. Virtual objects 1108-1 through 1108-7 are optionally one or more of user interfaces of applications (e.g., messaging user interfaces, content browsing user interfaces, etc.), three-dimensional objects (e.g., virtual clocks, virtual balls, virtual cars, etc.) or any other element displayed by computer system 101 that is not included in the physical environment of computer system 101. Virtual object 1110 is optionally a container or canvas object that contains virtual objects 1108-1 through 1108-7, as described in more detail with reference to methods 800, 1000 and/or 1200. Virtual object 1110 is optionally horizontally (e.g., right/left) scrollable as will be described in more detail later. Further, virtual object 1110 in FIG. 11A includes a scrolling indicator 1126 (e.g., a scroll bar) that includes scroll position indicator 1128; the position of scroll position indicator 1128 within scrolling indicator 1126 optionally corresponds to the current scroll position within object 1110.

Virtual object 1112 is optionally a tool palette object for performing operations relating to virtual objects 1108-1 through 1108-7 and/or 1110. For example, object 1112 includes selectable option 1114-1 that is selectable to undo a last operation that was performed relating to virtual objects 1108-1 through 1108-7 and/or 1110, selectable option 1114-2 that is selectable to redo a last operation that was canceled or undone relating to virtual objects 1108-1 through 1108-7 and/or 1110, selectable option 1114-3 that is selectable to edit a currently selected object(s) of virtual objects 1108-1 through 1108-7, selectable option 1114-4 that is selectable to add a new virtual object to object 1110, and selectable option 1114-5 that is selectable to cause computer system 101 and/or object 1110 to transition to a selection mode, which is described in more detail with reference to method 800.

As shown in FIG. 11A, in some embodiments, object 1110 is translucent such that virtual and/or physical objects that are behind object 1110 are at least partially visible through object 1110 (e.g., the back wall and the floor of the physical room). Further, in some embodiments, two-dimensional objects that are contained within object 1110 have a curvature that is based on the curvature of object 1110 (e.g., have a curvature that is the same as the curvature of object 1110). For example, object 1108-5, while included in object 1110, optionally has the came curvature of object 1110 and/or the portion of object 1110 on/over which object 1108-5 is located. Objects 1108-1, 1108-2, 1108-3 and 1108-4 in FIG. 11A are also two-dimensional objects, and therefore also have curvatures based on object 1110. Scrolling indicator 1126 optionally also has a curvature based on the curvature of object 1110.

Three-dimensional objects, on the other hand, optionally do have shapes, curvatures, profiles or other dimensional attributes based on the curvature of object 1110. For example, three-dimensional objects optionally do not change in shape, curvature, profile, volume, or other dimensional attributes when they are added or removed from object 1110. In FIG. 11A, objects 1108-6 and 1108-7 are three-dimensional objects, and the shapes, curvatures, profiles, volumes, or other dimensional attributes of those objects are not based on the curvature of object 1110.

As mentioned previously, object 1112 is optionally a control palette for object 1110. Object 1112 is optionally displayed separately from object 1110; for example, closer to the viewpoint of the user than object 1110 (e.g., visually separated from object 1110), and partially overlapping and/or obscuring a portion (e.g., the bottom portion) of object 1110 from the viewpoint of the user. In some embodiments, computer system 101 displays object 1112 according to the above-described rules for displaying two-dimensional objects (e.g., object 1112 is displayed with a curvature that is based on the curvature of object 1110). In some embodiments, computer system 101 displays object 1112 according to the above-described rules for displaying three-dimensional objects (e.g., object 1112 is flat and/or is not displayed with a curvature that is based on the curvature of object 1110).

In some embodiments, objects cannot be placed at positions in object 1110 such that those objects will extend beyond the top or bottom boundaries of object 1110 (e.g., as described in more detail with reference to method 1000). In some embodiments, objects can be placed at such positions, but those objects will be cut-off at the top or bottom boundaries of object 1110 such that portions of those objects that would otherwise extend beyond the top of bottom boundaries of object 1110 are not displayed by computer system 101. In contrast, in some embodiments, objects can be placed at positions in object 1110 such that those objects will extend beyond the left or right boundaries of object 1110 (e.g., as described in more detail with reference to method 1000). Further, computer system 101 will optionally display those portions of such objects that are extending beyond the left or right boundaries of object 1110 as hanging or extending outside of those boundaries. For example, in FIG. 11A, object 1108-7 has been placed by hand 1103b (e.g., in ways described with reference to methods 800 and/or 1000) in object 1110, and the right portion of object 1108-7 is extending beyond the right boundary of object 1110 and is displayed by computer system 101.

In some embodiments, the curvature of object 1110 is optionally based on the number and/or positions of viewpoints of the users with whom three-dimensional environment 1104 is concurrently shared, whether computer system 101 alone, or computer system 101 and one or more other computer systems (e.g., having one or more of the characteristics of computer system 101). For example, computer system 101 is optionally included in a communication session with the one or more other computer systems, as described in more detail in method 1200. Computer system 101 optionally displays object 1110 with more curvature the fewer viewpoints there are, the closer the viewpoints are together and/or the closer the viewpoints are to object 1110, and displays object 1110 with less curvature the more viewpoints there are, the further the viewpoints are from each other and/or the further the viewpoints are from object 1110, as described in more detail with reference to method 1200. In this way, the visibility of object 1110 and/or the objects included in object 1110 is improved for the one or more viewpoints.

Figure 11B:
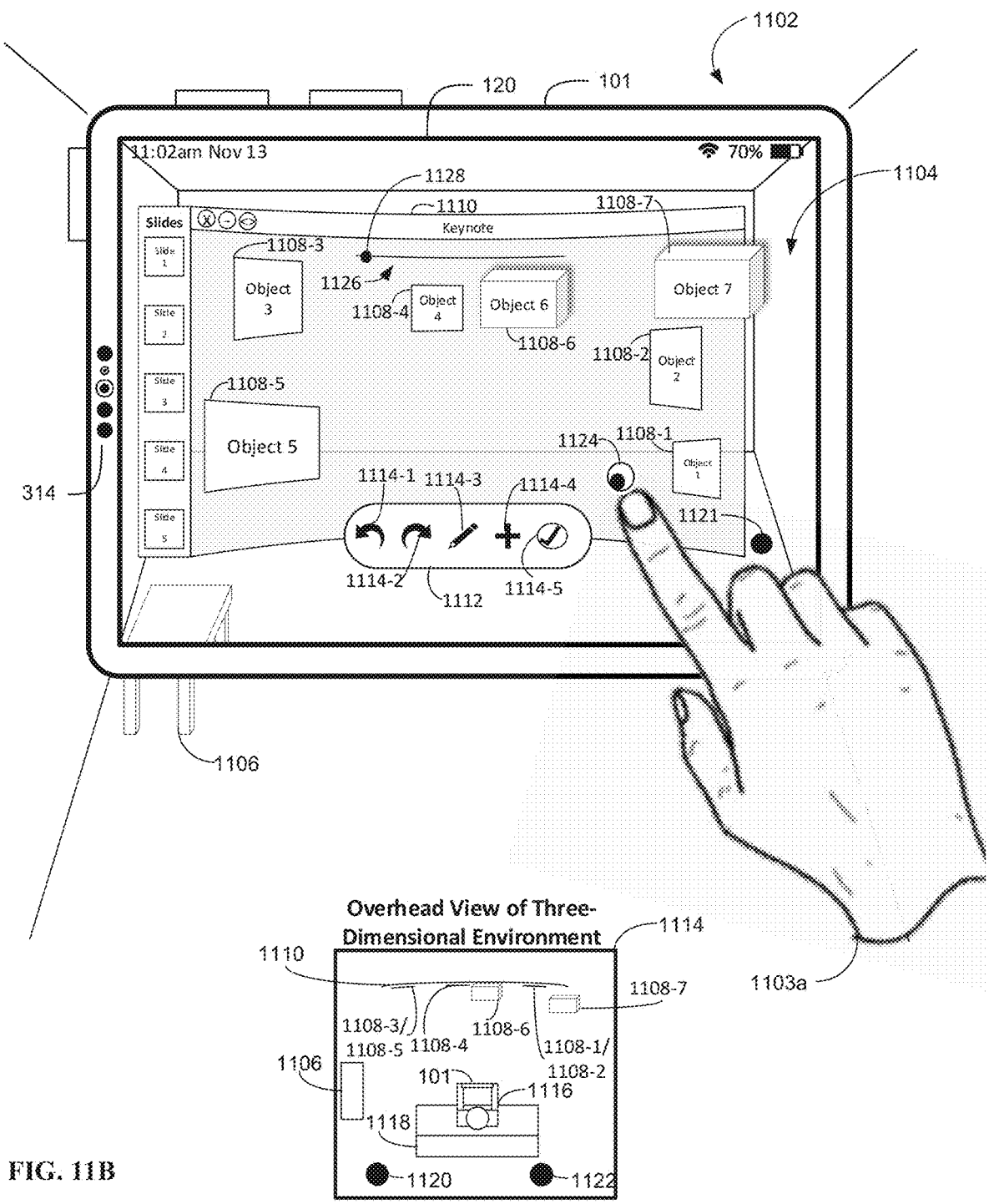

For example, in FIG. 11A, three-dimensional environment 1104 is concurrently shared by viewpoint 1116 and viewpoint 1120 at the locations illustrated in the overhead view 1114, and has the curvature illustrated in FIG. 11A. In FIG. 11B, object 1110 is now additionally concurrently shared by viewpoint 1122 in addition to viewpoints 1120 and 1116 at the locations illustrated in the overhead view 1114. Because three-dimensional environment 1104 that includes object 1110 is now concurrently shared by more viewpoints than in FIG. 11A and/or because viewpoints 1120 and 1122 are relatively spaced apart from one another, computer system 101 displays object 1110 with less curvature than in FIG. 11A. The curvatures of objects that are based on the curvature of object 1110, as previously described, are also optionally reduced as a result of the decrease in curvature of object 1110. The location of object 1110 (e.g., the location of a particular point of object 1110, such as the center point) in three-dimensional environment 1104 optionally does not change in response to the change in the curvature of object 1110.

Returning to FIG. 11A, object 1110 is displayed in association with selectable option 1121. Option 1121 is optionally separate from object 1110, displayed outside of object 1110, and/or displayed adjacent to a corner of object 1110. Option 1121 is optionally selectable to initiate a process to resize object 1110 without changing the curvature of object 1110. For example, an air pinch and drag input (e.g., the thumb and index finger of hand 1103a coming together and touching, followed by movement of hand 1103a while remaining in the pinch hand shape) directed to option 1121 optionally initiates a process to resize object 1110. Horizontal movements of hand 1103a optionally increase or decrease the lateral dimension of object 1110 without changing the vertical dimension of object 1110. For example, horizontal movement of hand 1103a towards the interior of object 1110 (e.g., leftward) optionally reduces the horizontal dimension of object 1110; optionally equally from both the left and right sides of object 1110, optionally only from the right side of object 1110. A horizontal movement of hand 1103*a* away from the interior of object 1110 (e.g., rightward) optionally analogously increases the horizontal dimension of object 1110. Such resizing optionally does not change the curvature of object 1110.

Vertical movements of hand 1103*a* optionally increase or decrease both the lateral and vertical dimensions of object 1110, optionally while maintaining the aspect ratio of object 1110. For example, upward movement of hand 1103*a* optionally reduces the lateral and vertical dimensions of object 1110; optionally equally from the left and right and the top and bottom sides of object 1110, optionally only from side(s) or corner(s) of object 1110 to which option 1121 is adjacent (e.g., the bottom and right sides, in FIG. 11A). Downward movement of hand 1103*a* optionally analogously increases the lateral and vertical dimensions of object 1110. Such resizing optionally does not change the curvature of object 1110.

Figure 11C:
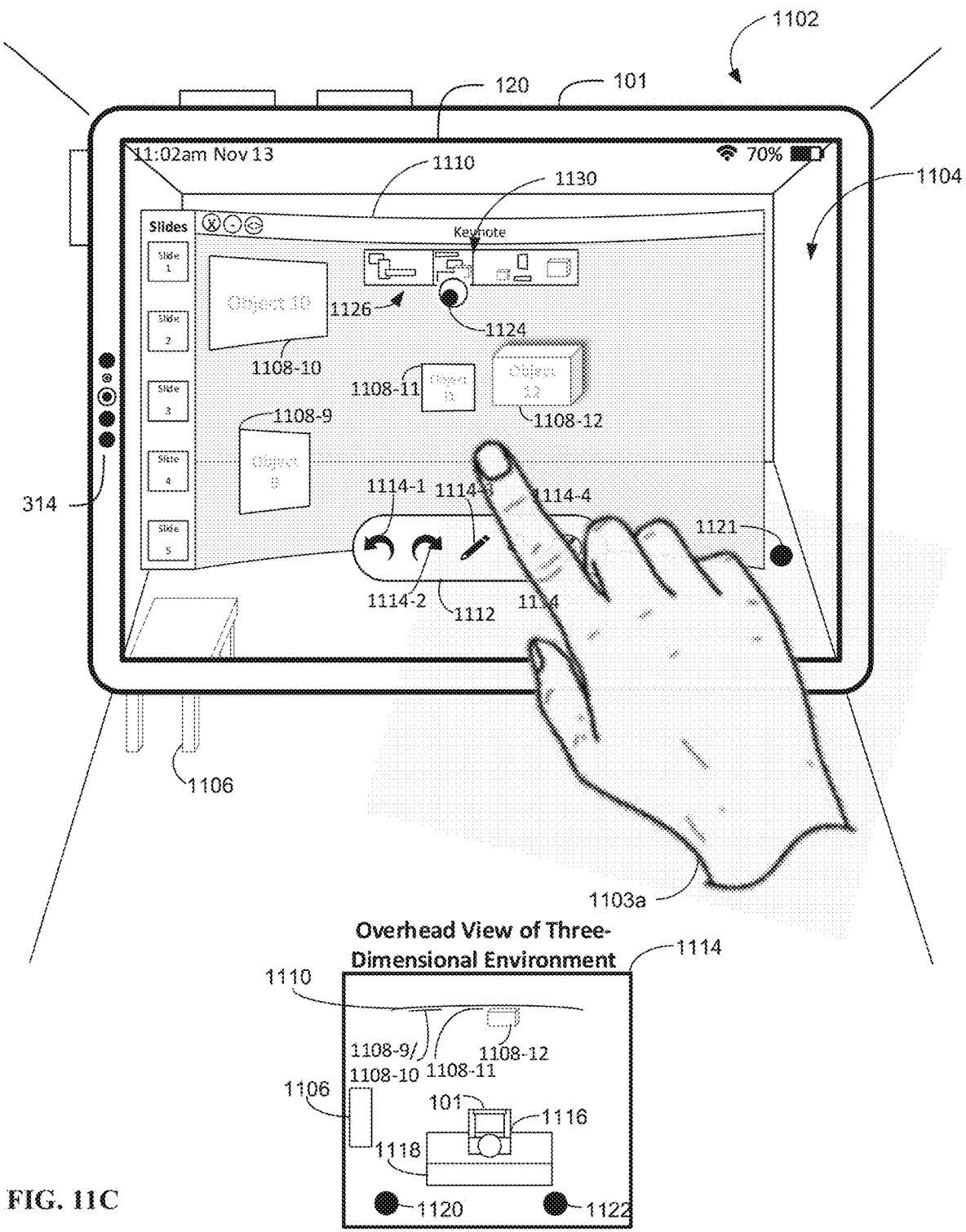

For example, in FIG. 11A, computer system 101 optionally detects hand 1103*a* perform a horizontal and leftward air pinch and drag gesture directed to option 1121. In response, computer system 101 reduces the horizontal dimension of object 1110 in accordance with the movement of hand 1103*a* (e.g., from both the left and right sides of object 1110), without adjusting a vertical dimension of object 1110, as shown in FIG. 11G. The curvature of object 1110 in FIG. 11G is optionally the same as the curvature of object 1110 in FIG. 11A. The resizing of object 1110 optionally does not cause resizing of objects included in object 1110, as shown in FIG. 11G. Further, objects included in object 1110 that are no longer located within the updated boundaries of object 1110 are optionally no longer displayed by computer system 101 (e.g., objects 1108-1, 1108-2, 1108-7, 1108-3 and 1108-5). In FIG. 11G, objects 1108-4 and 1108-6 are located within the updated boundaries of object 1110, and are therefore still displayed by computer system 101 as they were displayed in FIG. 11A (e.g., at the same locations, with the same orientations and/or with the same sizes in three-dimensional environment 1104).

Returning to FIG. 11B, in some embodiments, an air pinch and drag gesture (e.g., as previously described) directed to an empty region of object 1110 causes computer system 101 to scroll through object 1110 in accordance with the movement of the hand of the user, as described in more detail with reference to method 1200. For example, in FIG. 11B, computer system 101 detects hand 1103*a* perform an air pinch and drag gesture leftward while gaze 1124 of the user is directed to an empty region of object 1110. In response, computer system 101 scrolls through object 1110 leftward such that objects 1108-1 through 1108-7 are scrolled leftward and off of the currently visible portion of object 1110, and objects 1108-9 through 1108-12 are scrolled onto the currently visible portion of object 1110 from the right, as shown in FIG. 11C. Computer system 101 optionally updates scrolling indicator 1126 to indicate the updated current scroll position, accordingly.

In some embodiments, during scrolling of object 1110, computer system 101 changes the visual appearances of objects included in object 1110. For example, as shown in FIG. 11C, computer system 101 optionally displays objects included in object 1110 with increased translucency, decreased brightness and/or decreased color saturation during scrolling (e.g., as the objects are displayed as moving across, onto and/or off of object 1110). In some embodiments, the magnitude of the above-described change in visual appearances of the objects included in object 1110 is based on the magnitude (e.g., speed and/or amount) of scrolling. For example, computer system 101 optionally changes the visual appearances of objects more the greater the magnitude of the scrolling, and less the lower the magnitude of the scrolling. In some embodiments, upon detecting the end of the scrolling (e.g., the movement of hand 1103*a* stopping or hand 1103*a* releasing the air pinch gesture, such as the thumb and index finger of hand 1103*a* moving apart from one another), computer system 101 optionally reverts the visual appearances of objects included in object 1110 to the visual appearances they had prior to the scrolling input.

In some embodiments, such as shown in FIG. 11C, in response to detecting gaze 1124 of the user directed to scrolling indicator 1126, computer system 101 updates display of scrolling indicator 1126 to include a snapshot or preview or map of the content (e.g., objects) included in object 1110 (e.g., a snapshot or preview of the entire canvas of object 1110), including portions of object 1110 that correspond to scroll positions other than the current scroll position in object 1110 (e.g., portions of the canvas of object 1110 that are not currently displayed). Further, scrolling indicator 1126 includes a current scroll position indicator 1130 that indicates which portion of the snapshot or preview or map is currently being displayed within object 1110. Current scroll position indicator 1130 is optionally any visual indication that indicates a particular portion of the snapshot or preview or map, such as an outline, a glow, and/or a highlighting of that particular portion.

Object 1110 is optionally also scrollable in response to an air pinch and drag input directed to current scroll position indicator 1130, which moves current scroll position indicator 1130 within scrolling indicator 1126 in accordance with the movement of the hand of the user and scrolls object 1110 to the scroll position corresponding to the current position of current scroll position indicator 1130 within scrolling indicator 1126. Object 1110 is optionally also scrollable in response to an air pinch and release input (e.g., without movement of the hand of the user) directed to a particular portion of scrolling indicator 1126, which causes computer system 101 to scroll object 1110 to the scroll position corresponding to that particular portion of scrolling indicator 1126. Additional details of the above-described scrolling operations are described with reference to method 1200.

Figure 11D:
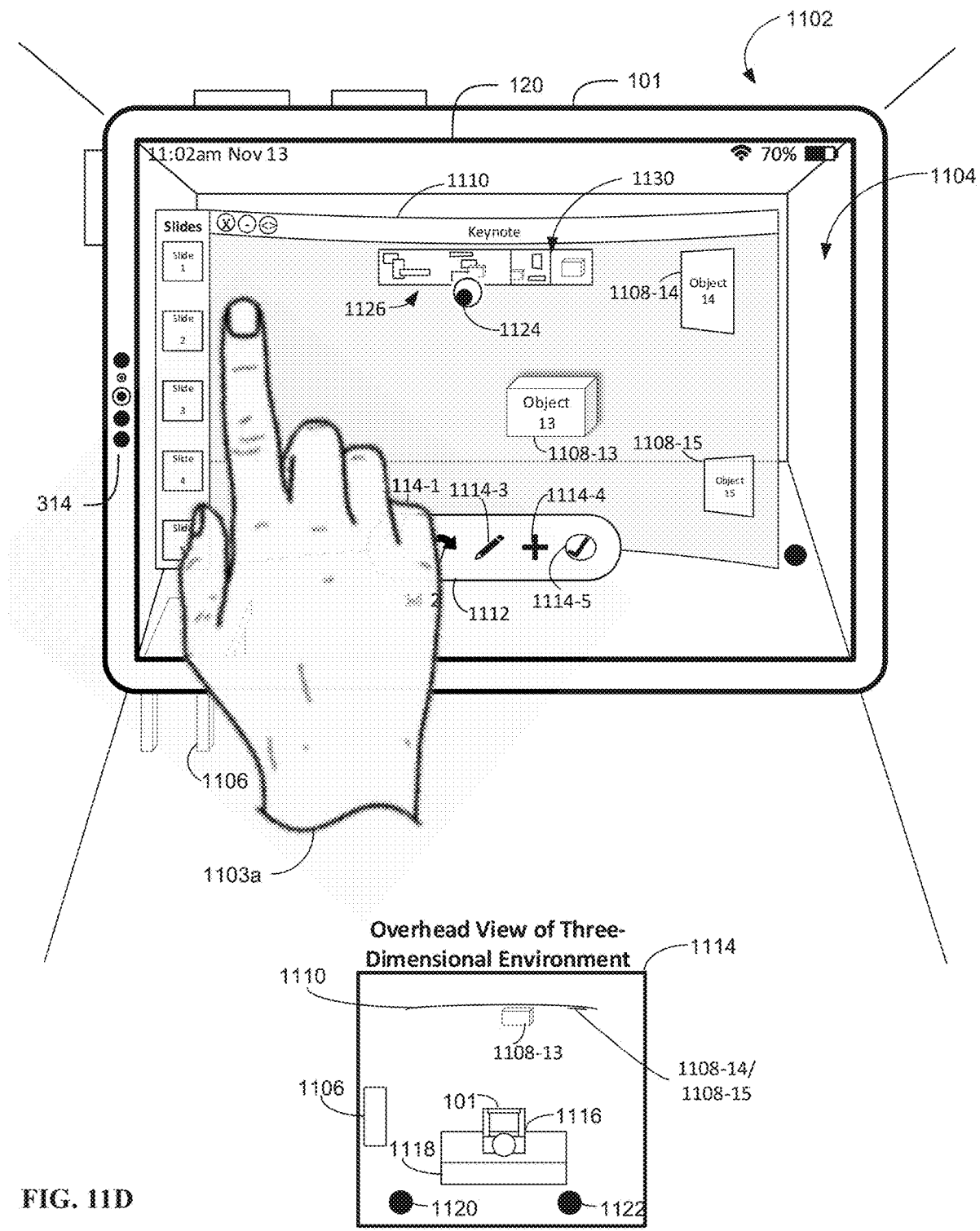

From FIG. 11C to 11D, computer system 101 detects further leftward movement of hand 1103*a* while in the pinch hand shape, and as a result, further scrolls object 1110 leftward as shown in FIG. 11D. As shown in FIG. 11D, computer system 101 has also updated the position of current scroll position indicator 1130 within scrolling indicator 1126 accordingly.

Figure 11E:
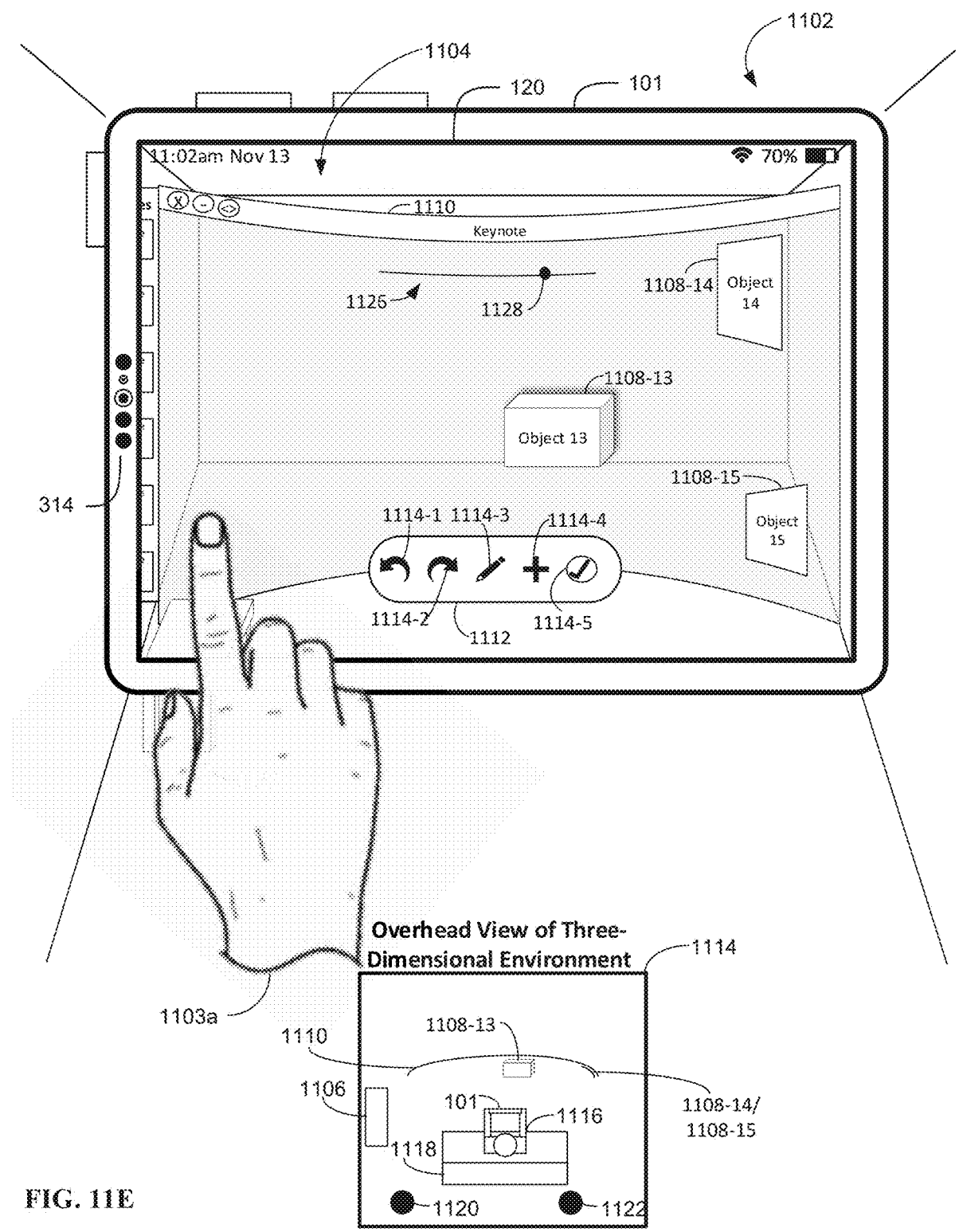

In some embodiments, computer system 101 moves object 1110 closer to or further away from viewpoint 1116 in response to particular inputs. For example, an air pinch and drag input directed to an empty region of object 1110 optionally results in object 1110 moving towards or away from viewpoint 1116 in three-dimensional environment 1104 in accordance with the drag input. In FIG. 11D, computer system 101 detects hand 1103*a* perform an air pinch input directed to an empty region of object 1110, followed by movement of hand 1103*a* in the pinch hand shape towards the user. In response, as shown in FIG. 11E, computer system 101 moves object 1110 towards viewpoint 1116 by an amount corresponding to the magnitude of the movement of hand 1103*a* towards the user. Computer system 101 optionally does not scale object 1110 in three-dimensional environment 1104 in response to the input in FIG. 11D. However, for the reasons previously described, because object 1110 has now moved closer to viewpoints 1116, 1120 and/or 1122, computer system 101 is displaying object 1110 with greater curvature in FIG. 11E than in FIG. 11D. Therefore, the curvatures of objects 1108-14 and 1108-15 have increased, the shape/profile/curvature of object 1108-13 has not changed, and the orientations of objects 1108-14 and/or 1108-15 relative to viewpoint 1116 have changed (e.g., have become more parallel relative to the normal of the viewpoint) as a result of the input detected in FIG. 11D.

Figure 11F:
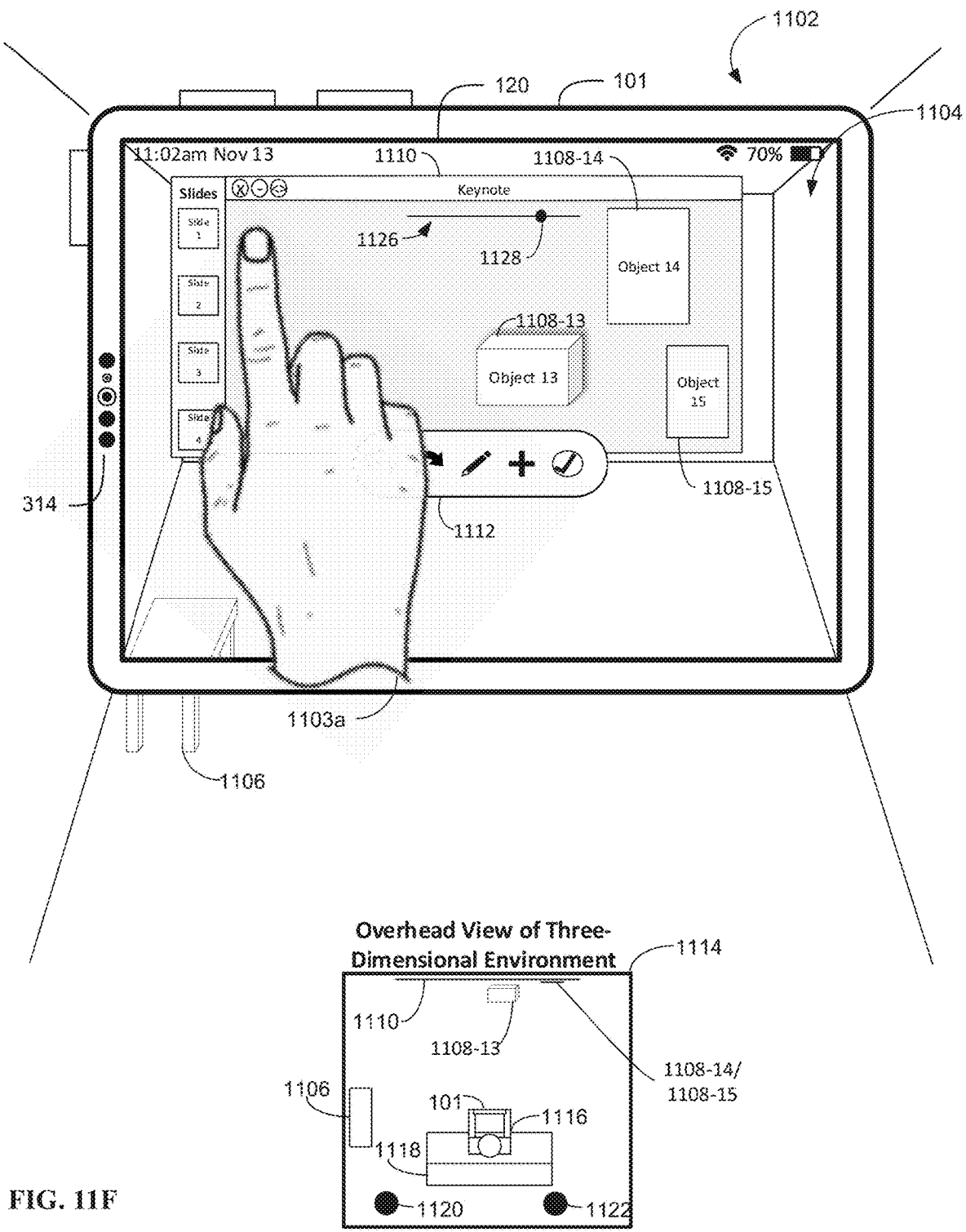
Figure 11G:
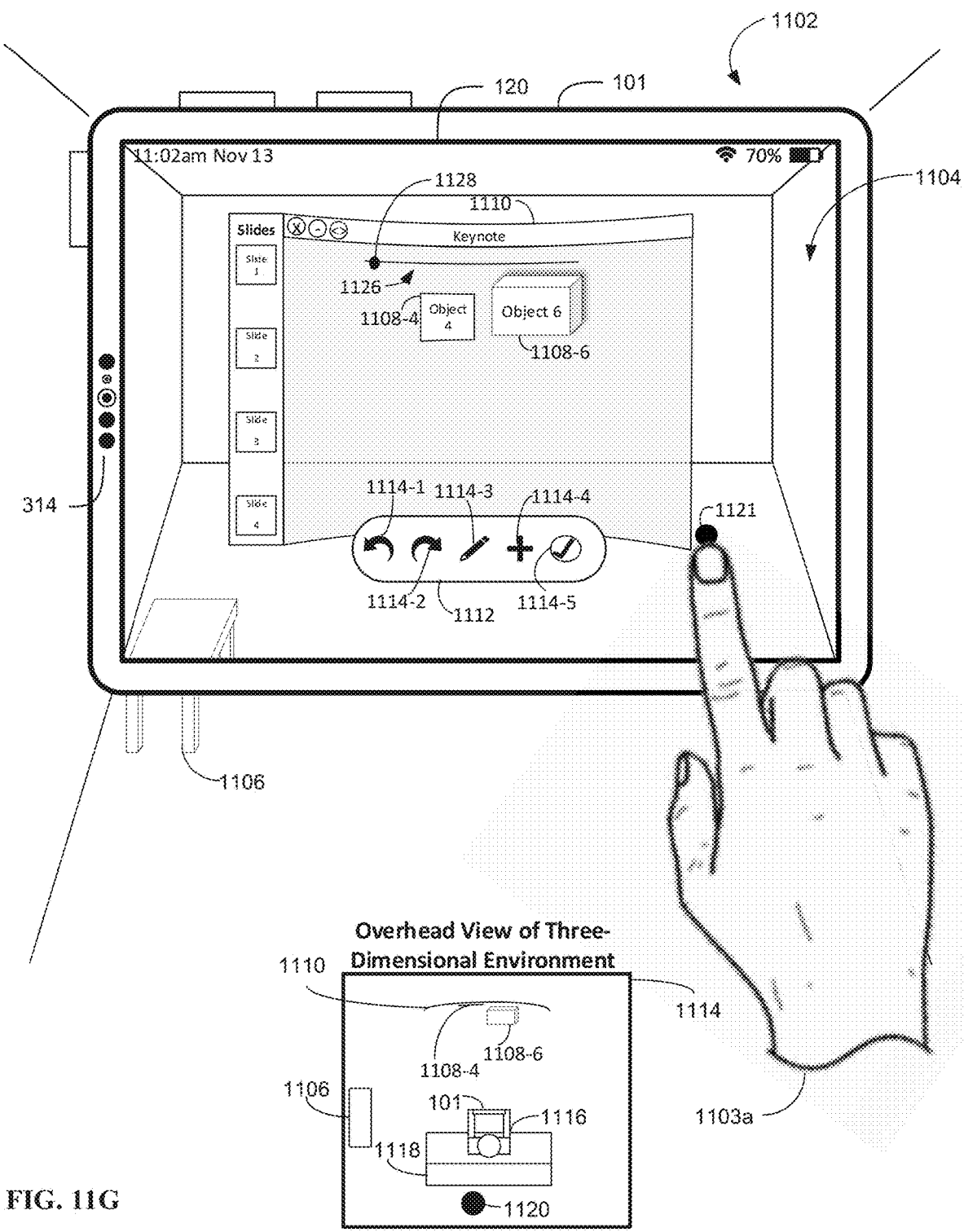
Figure 12B:
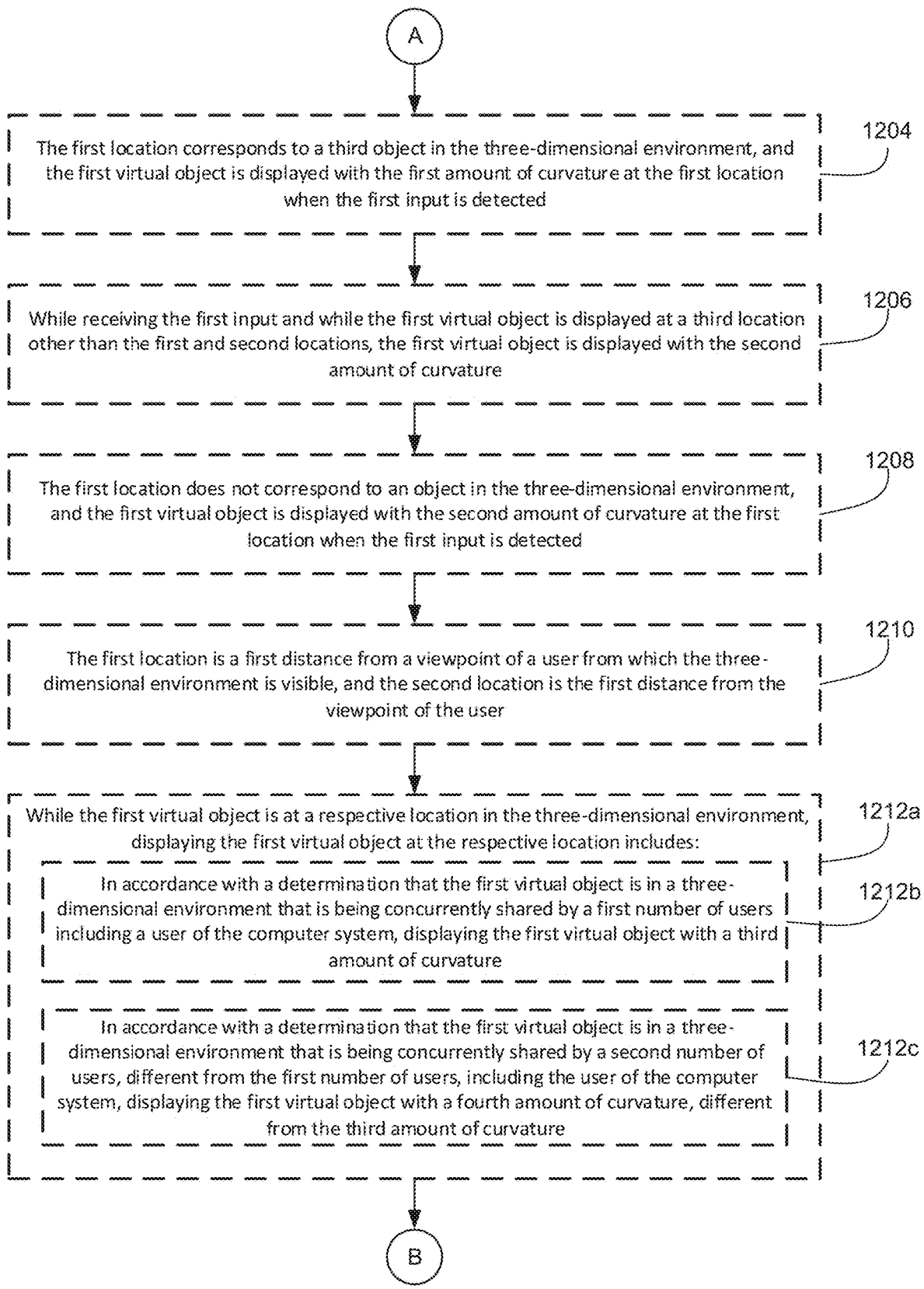
Figure 12C:
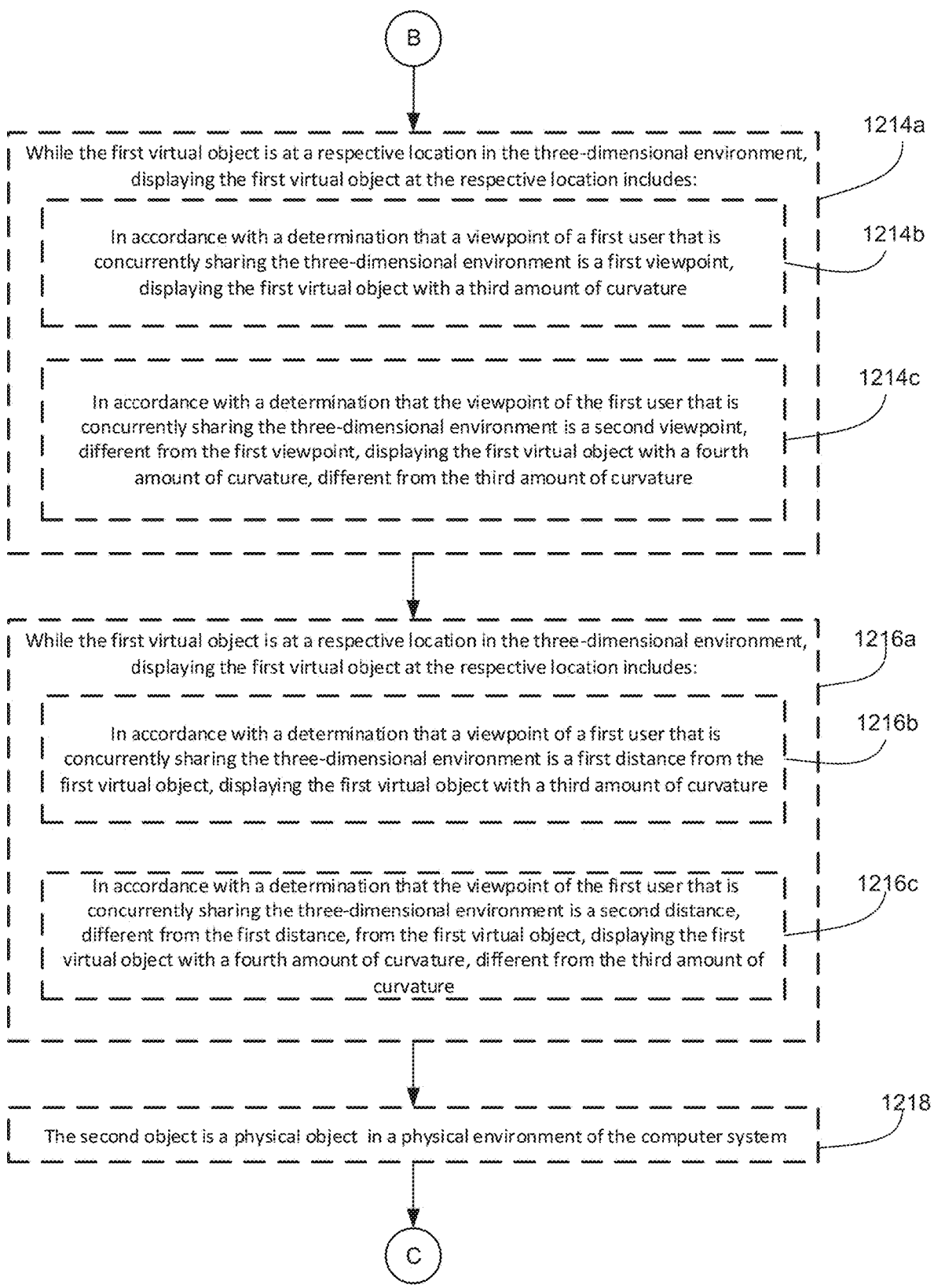
Figure 12D:
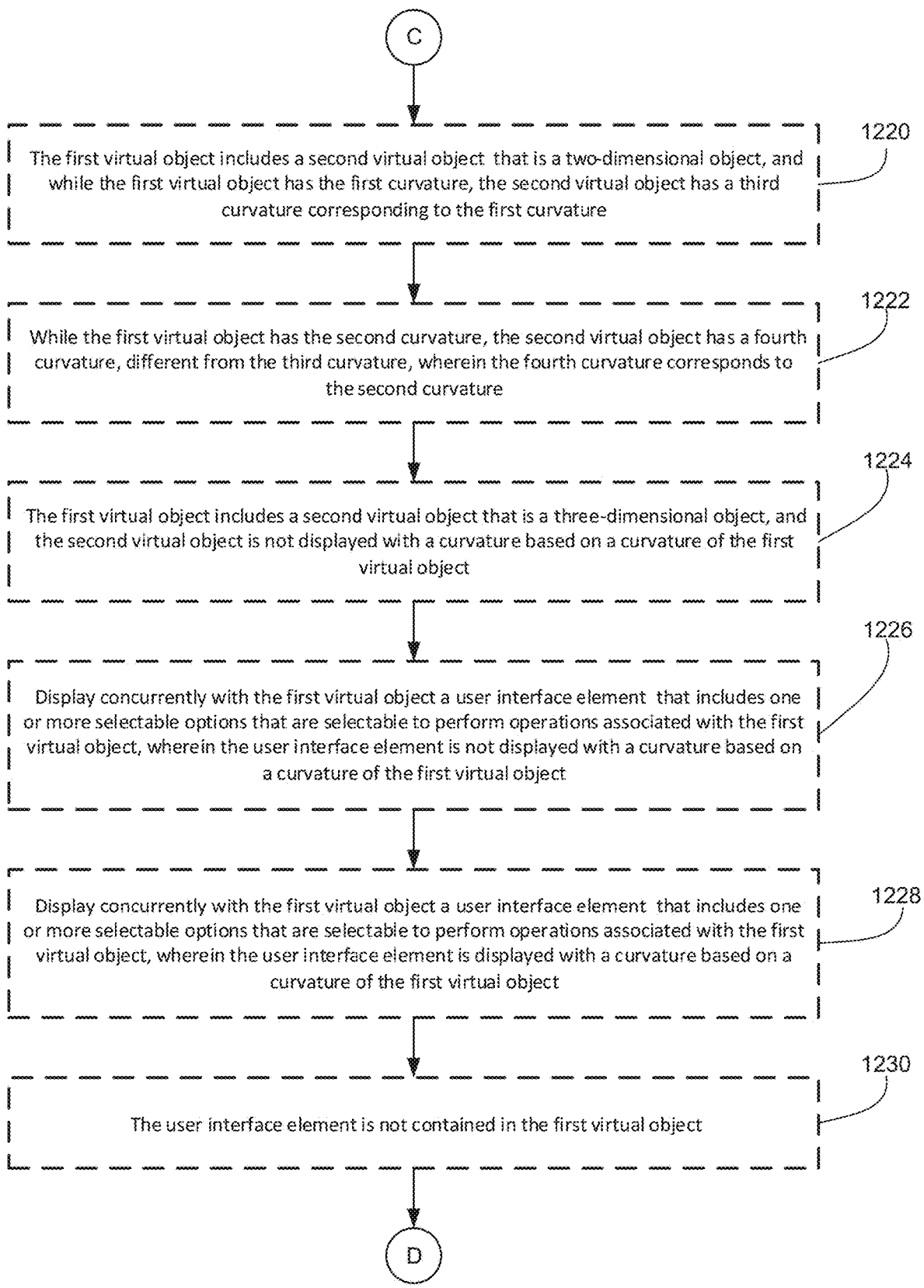
Figure 12E:
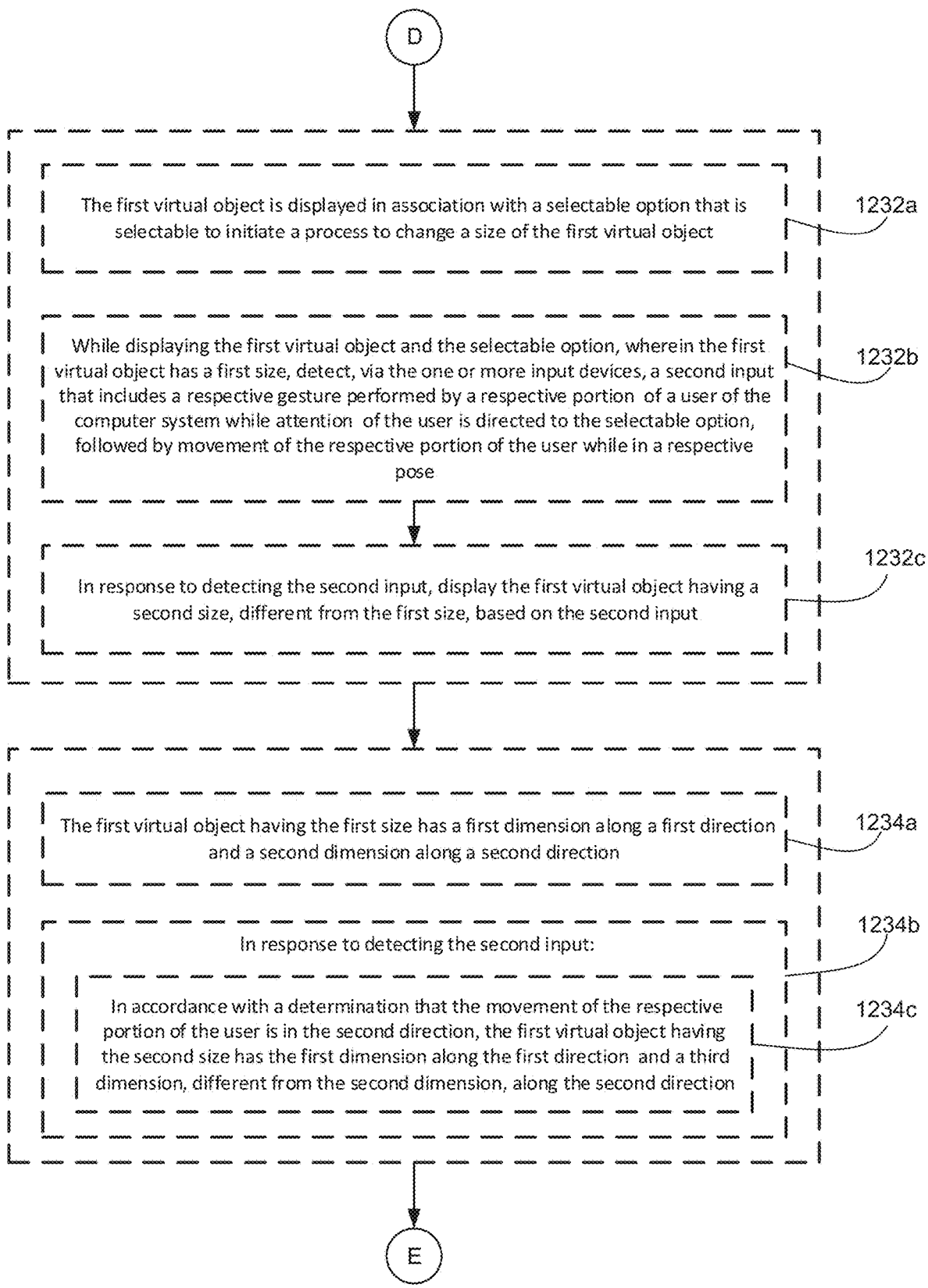
Figure 12F:
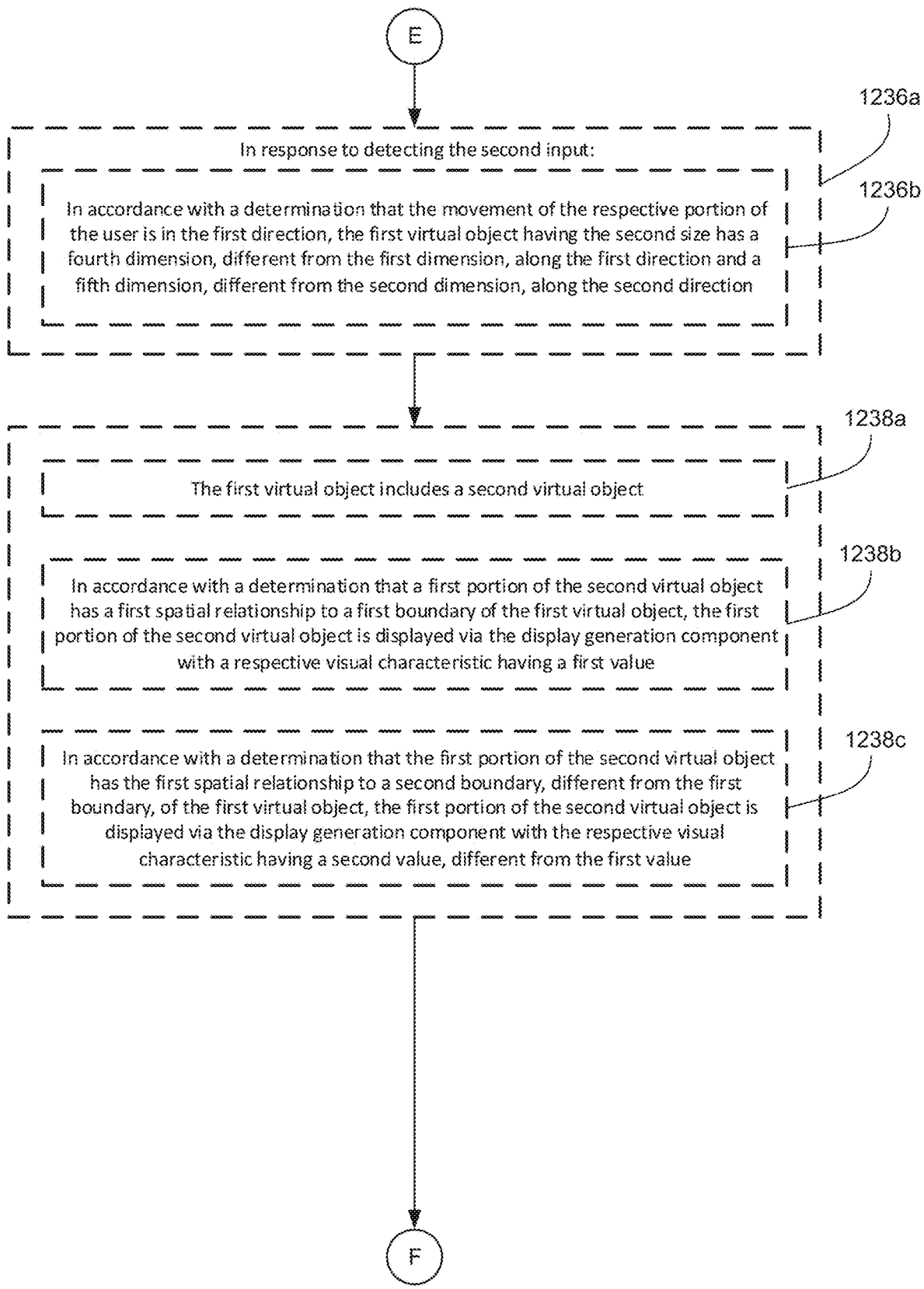
Figure 12G:
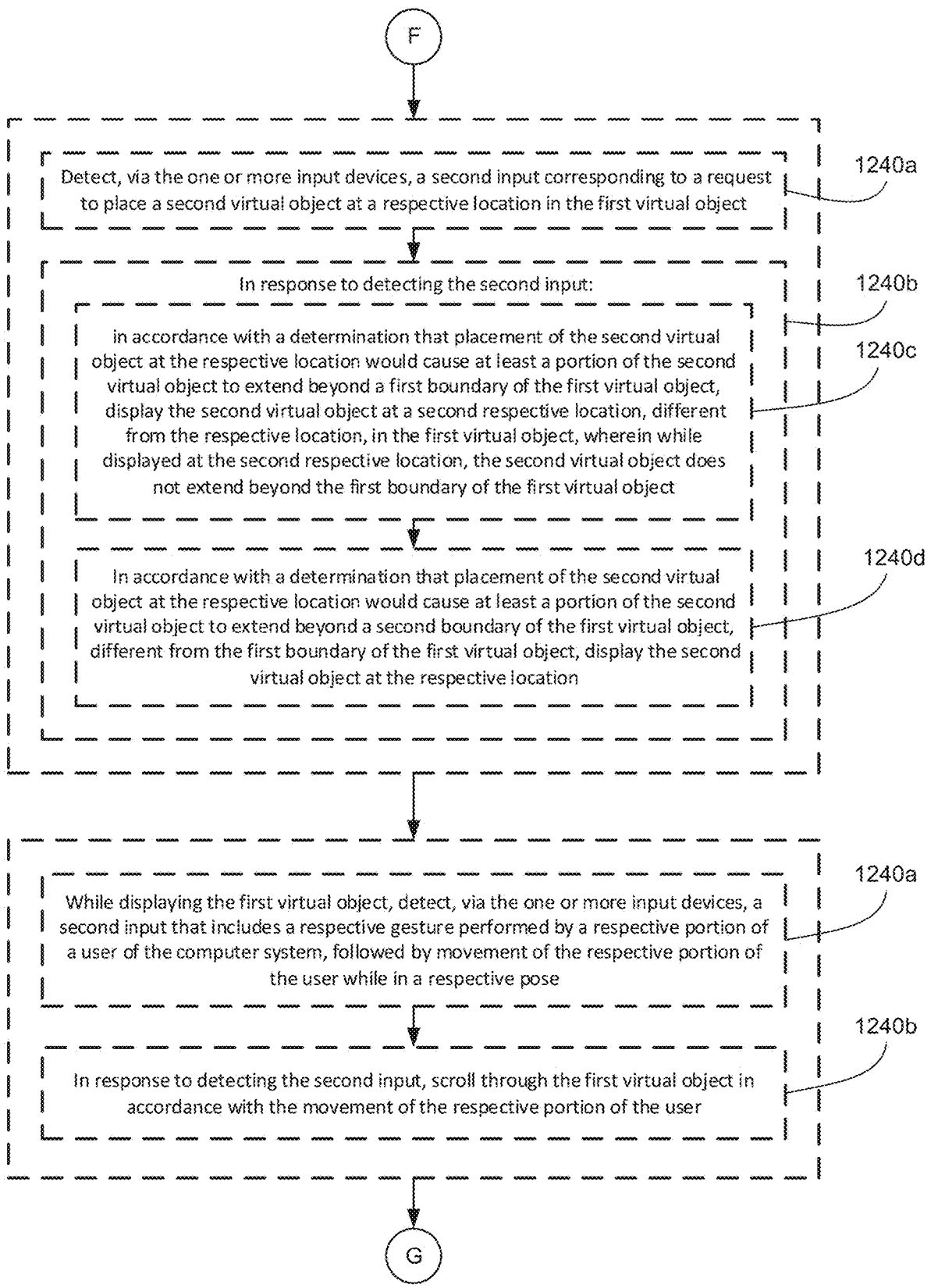
Figure 12H:
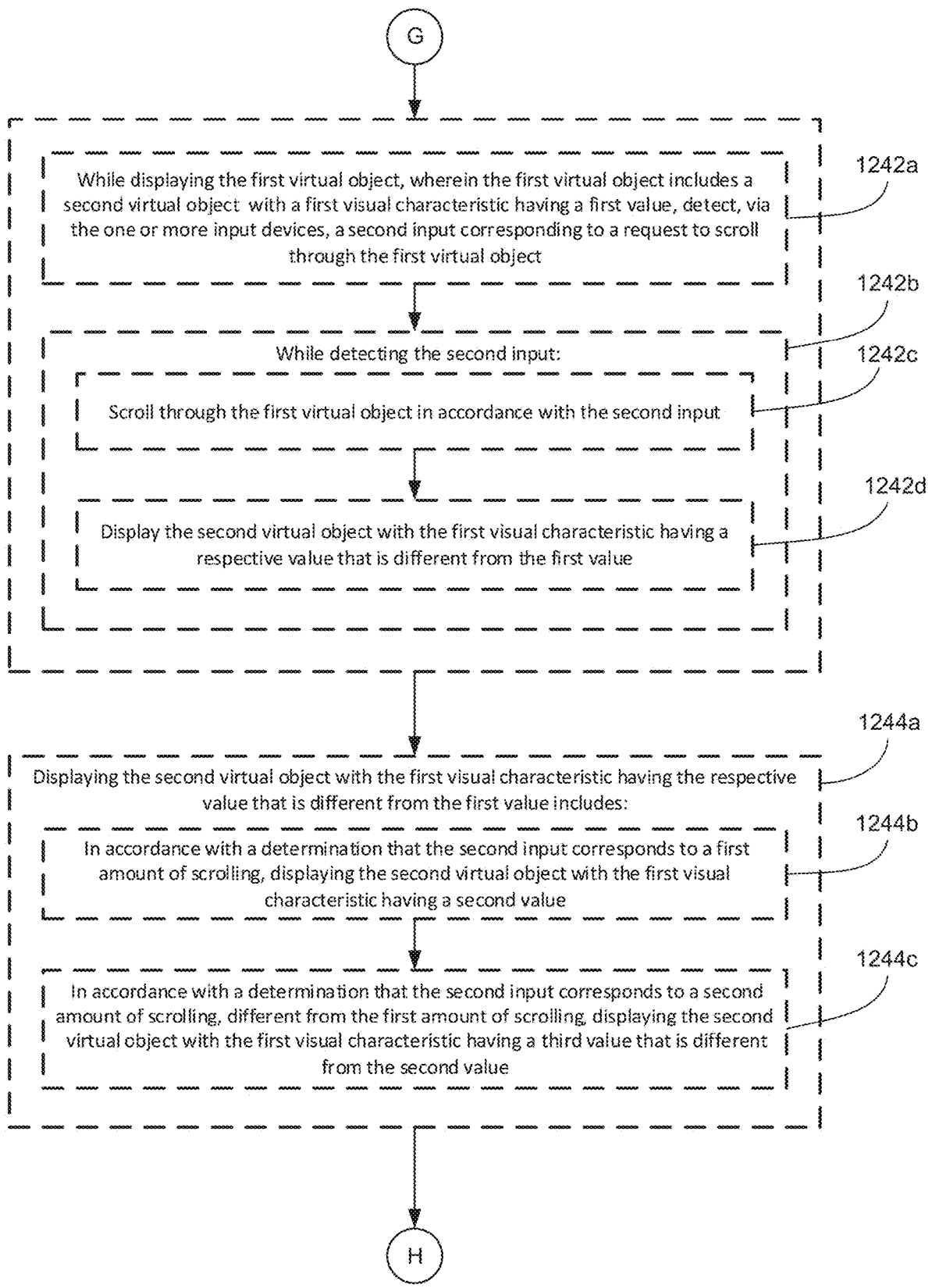
Figure 12I:
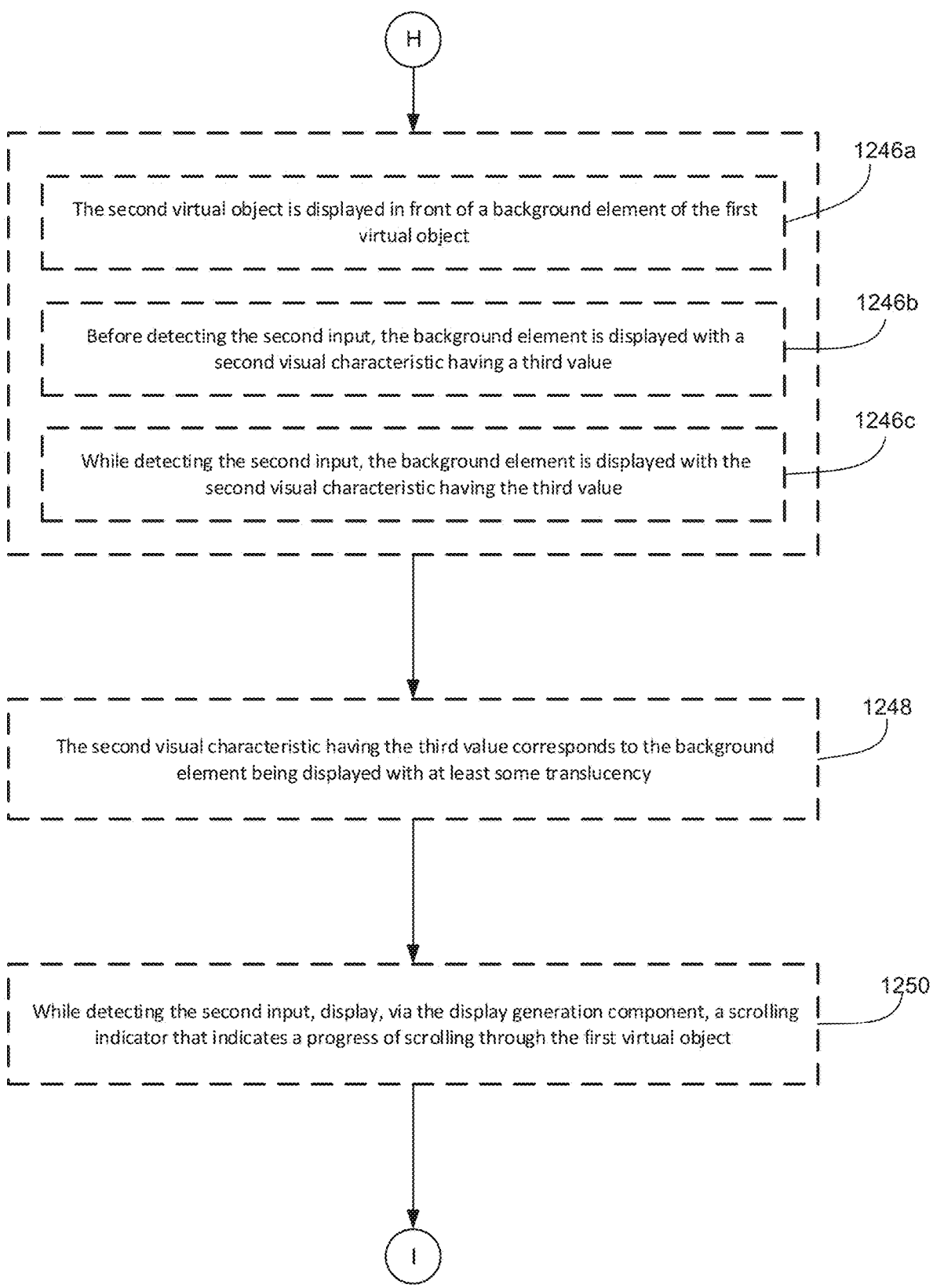
Figure 12J:
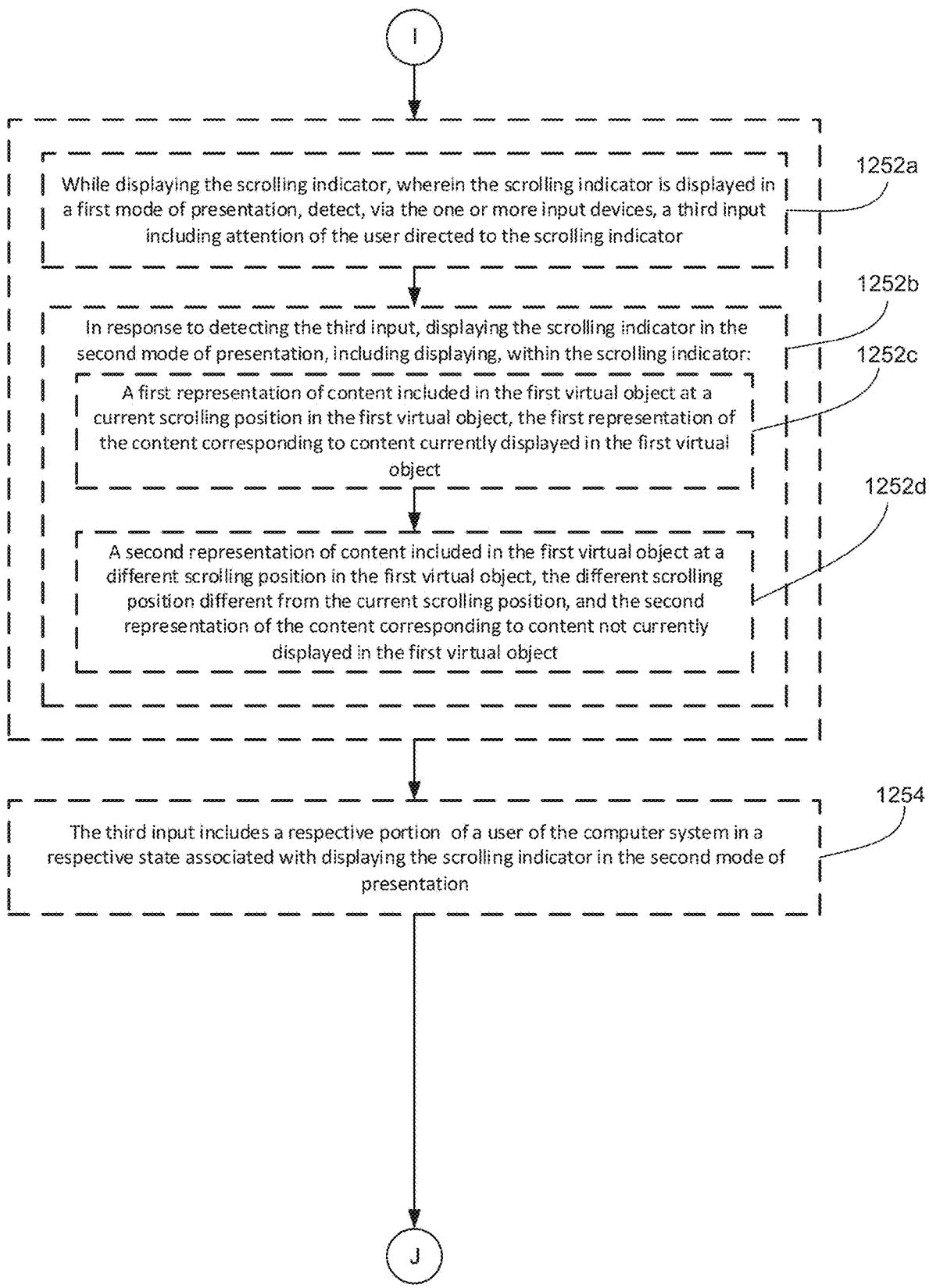
Figure 12K:
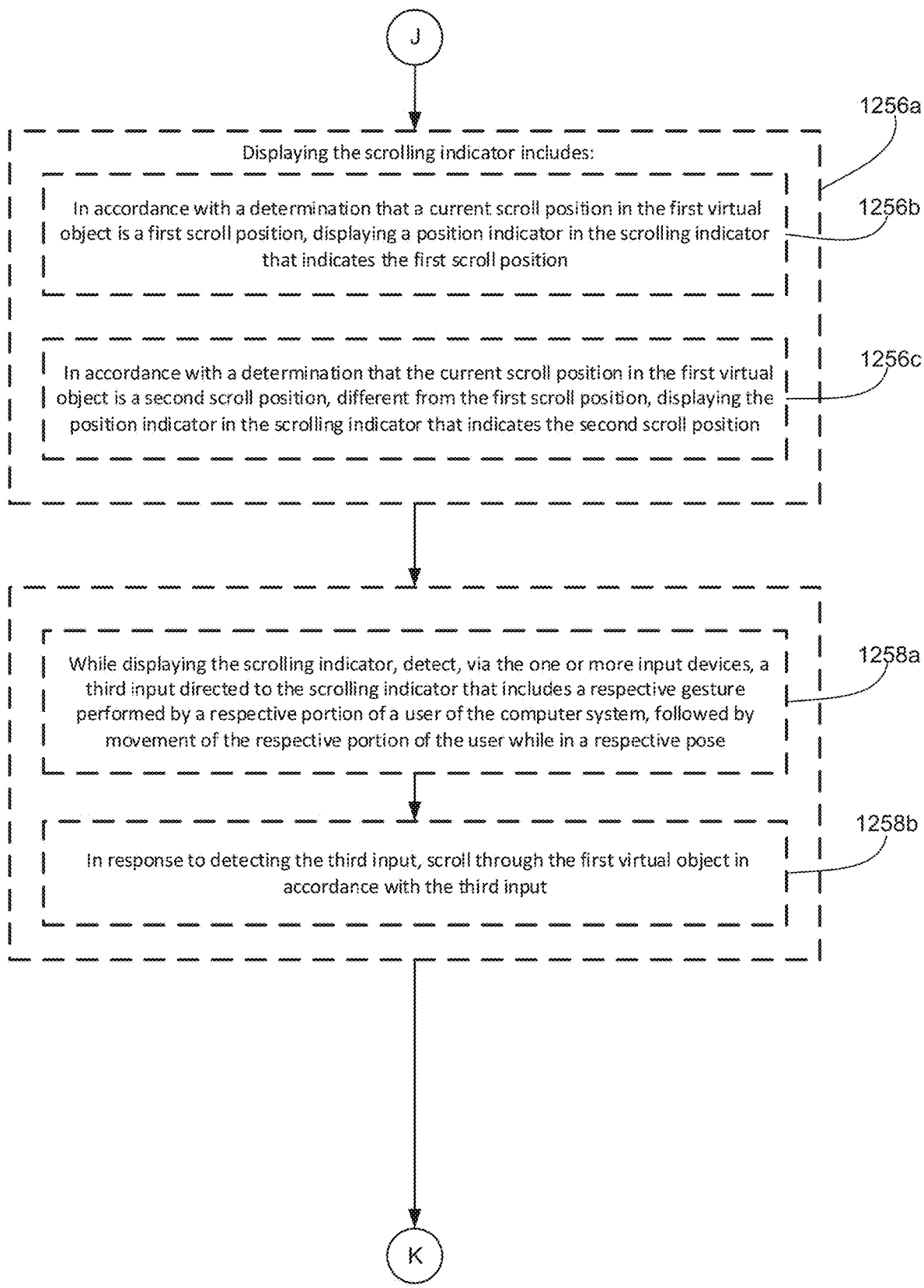
Figure 12L:
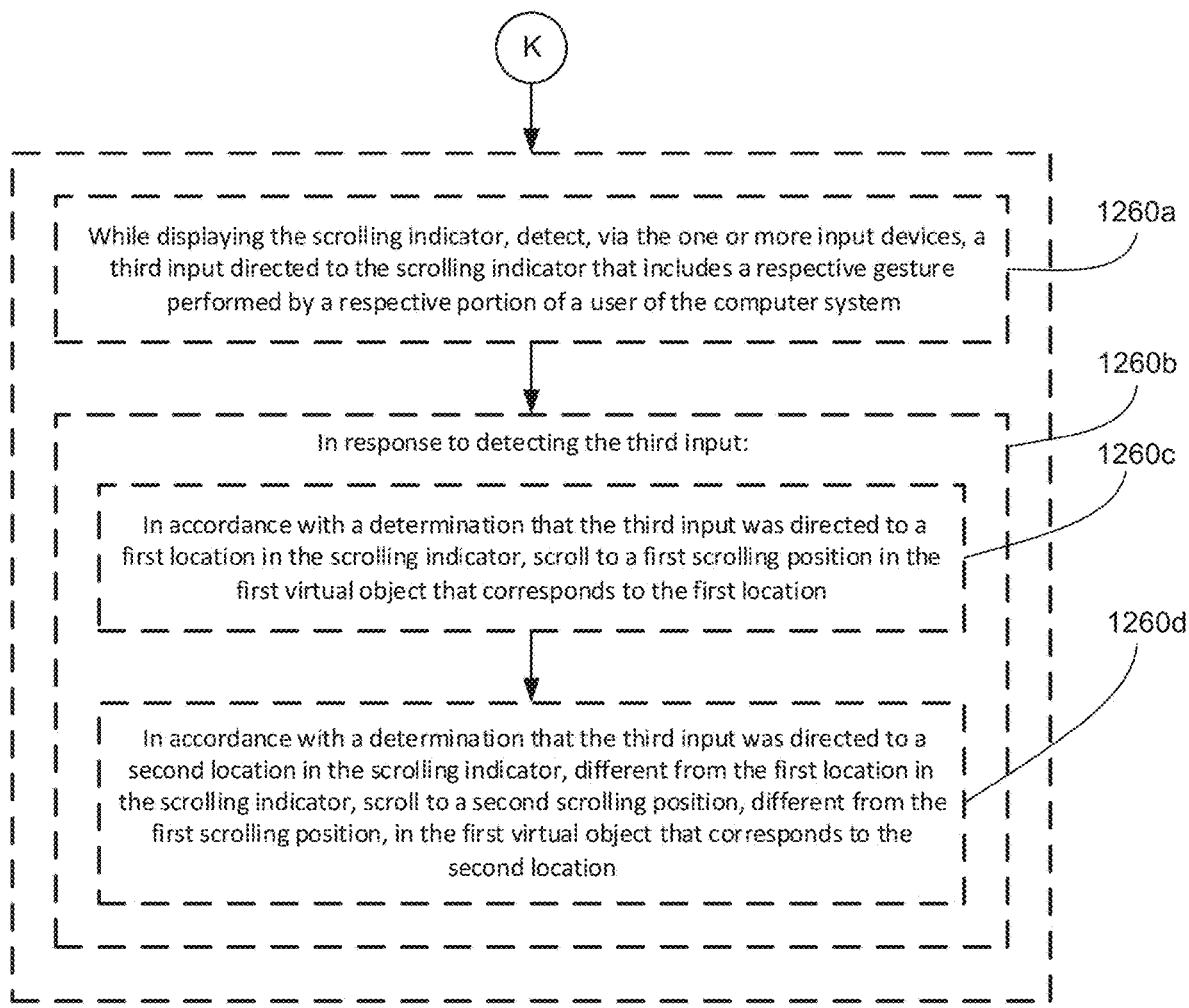

In some embodiments, computer system 101 snaps object 1110 to another object or surface (e.g., whether physical or virtual) in response to object 1110 being moved to within a threshold distance (e.g., 0.1, 0.3, 0.5, 1, 3, 5, or 10 cm) of that object or surface. When object 1110 is snapped to another object or surface, computer system 101 optionally displays object 1110 with no curvature (e.g., flat) or with a curvature (or flat) based on the curvature (or lack of curvature) of the object or surface. For example, in FIG. 11E, computer system 101 detects hand 1103a perform an air pinch input directed to an empty region of object 1110, followed by movement of hand 1103a in the pinch hand shape away from the user. In response, as shown in FIG. 11F, computer system 101 moves object 1110 away from viewpoint 1116 by an amount corresponding to the magnitude of the movement of hand 1103a away from the user. Computer system 101 optionally does not scale object 1110 in three-dimensional environment 1104 in response to the input in FIG. 11E. The movement of hand 1103a away from the user from FIGS. 11E to 11F is sufficient to move object 1110 to within the threshold distance of the back wall of the physical room in which computer system 101 is located. Therefore, computer system 101 has snapped object 1110 to the back wall of the physical room, and is displaying object 1110 with no curvature and/or with a curvature based on the curvature of the wall, as shown in FIG. 11F. Therefore, the curvatures of objects 1108-14 and 1108-15 have decreased (e.g., to zero), the shape/profile/curvature of object 1108-13 has not changed, and the orientations of objects 1108-14 and/or 1108-15 relative to viewpoint 1116 have changed (e.g., have become more perpendicular relative to the normal of the viewpoint) as a result of the input detected in FIG. 11E. The curvature of object 1110 in FIG. 11F is optionally less than the curvature of object 1110 in FIGS. 11D and 11E.

FIGS. 12A-12L is a flowchart illustrating a method 1200 of displaying a container virtual object with curvature in a three-dimensional environment in accordance with some embodiments. In some embodiments, the method 1200 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1200 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1200 are, optionally, combined and/or the order of some operations is, optionally, changed.

In some embodiments, method 1200 is performed at a computer system (e.g., 101) in communication with a display generation component (e.g., 120) and one or more input devices. In some embodiments, the computer system is the same as or similar to the computer system described above with reference to methods 800 and/or 1000. In some embodiments, the one or more input devices are the same as or similar to the one or more input devices described above with reference to methods 800 and/or 1000. In some embodiments, the display generation component is the same as or similar to the display generation component described above with reference to methods 800 and/or 1000.

In some embodiments, the computer system displays (1202a), via the display generation component, a first virtual object, such as object 1110, that is a virtual object at a first location in a three-dimensional environment that includes a second object, such as other objects in three-dimensional environment 1104 (e.g., a different virtual object or a physical object). In some embodiments, the three-dimensional environment has one or more of the characteristics of the three-dimensional environments of methods 800 and/or 1000. In some embodiments, the first object includes or contains one or more objects, such as virtual objects or user interface objects described with reference to methods 800 and/or 1000. In some embodiments, the first virtual object is a virtual object that has dynamic curvature as described below.

In some embodiments, while displaying the first virtual object in the three-dimensional environment, the computer system receives (1202b), via the one or more input devices, a first input corresponding to a request to move the first virtual object from the first location to a second location, different from the first location, in the three-dimensional environment, such as the input from hand 1103a in FIG. 11D (in some embodiments, the first input and/or other inputs described with reference to method 800 are or include air gesture inputs.). In some embodiments, the computer system detected the request to move the first virtual object from the first location to the second location in response to the computer system detecting that a hand of the user performed a gesture to select the first virtual object and that the hand of the user moved to a location in the physical environment corresponding to the second location while the first virtual object was still being selected by the hand of the user. For example, the computer system received the request to move the first virtual object from the first location to the second location in response to the computer system detecting that the hand of the user selected the first virtual object by performing a pinch gesture as described above (optionally while the attention of the user was directed to the first virtual object) and that the hand of the user moved to a location in the physical environment corresponding to the second location while maintaining the pinch gesture. In some embodiments, the computer system receives the request to move the first virtual object from the first location to the second location in response to the computer system detecting that the hand of the user is moving the first virtual object via a dragging/movement gesture on a touch screen of the computer system (e.g., if the display generation component is a touch screen).

In some embodiments, in response to receiving the first input (1202c), the computer system displays (1202d) the first virtual object at the second location in the three-dimensional environment (e.g., and ceasing display of the first virtual object at the first location), including, in accordance with a determination that the second location in the three-dimensional environment corresponds to (e.g., the first virtual object is within a threshold distance from, is snapped to, and/or has a predefined pose relative to) the second object in the three-dimensional environment, such as the input to move object 1110 to the back wall in three-dimensional environment 1104 in FIG. 11F (e.g., the first virtual object is within a threshold distance from a first portion (e.g., surface) of the second object, such as anchored/snapped to a surface of a physical object in the physical environment of the user, such as a surface of a wall or table, and/or to a surface of a virtual object in a three-dimensional environment), displaying, via the display generation component, the first virtual object with a first amount of curvature (1202e), such as the amount of curvature (or lack thereof) of object 1110 in FIG. 11F. For example, if the computer system is displaying the first virtual object "snapped" or "anchored" to the first portion of the respective object, the first virtual object is being displayed with a curvature that corresponds to the curvature of the first portion of the respective object (e.g., the first virtual object has no curvature (e.g., is flat) if the first portion of the respective object has no curvature (e.g., is flat) and/or has 1, 2, 3, 4, or 10 degrees of curvature if the first portion of the respective object has 1, 2, 3, 4, or 10 degrees of curvature). In some embodiments, the respective object includes the above-mentioned first portion (e.g., a top surface), a second portion (e.g., a bottom surface), and a third portion (e.g., a side surface), and the first virtual object becomes anchored to the either the first, second, or third portion in response to the computer system detecting a request to move the first virtual object within a threshold distance (e.g., 0.1, 0.3, 0.5, 1, 3, 5, 10, 20, 30 or 50 cm) of the first, second, or third portion of the respective object, respectively. When the first virtual object is anchored to the second portion of the respective object, the first virtual object is optionally displayed with a different amount of curvature than when the first virtual object is anchored to the first portion of the respective object if the first portion and second portion of the respective correspond to different amounts of curvature. Similarly, when the first virtual object is anchored to the third portion of the respective object, the first virtual object is optionally displayed with a different amount of curvature than when the first virtual object is anchored to the first and/or second portion of the respective object if the third portion of the respective object has a different curvature than the curvature of the first and/or second portion of the respective object. In some embodiments, if the first virtual object is "snapped" or "anchored" to the first portion of the respective object, the orientation of the first virtual object corresponds to the orientation of the first portion of the respective object.

In some embodiments, in accordance with a determination that the second location in the three-dimensional environment does not correspond to (e.g., the first object is not within the threshold distance from, is not snapped to, and/or does not have the predefined pose relative to—optionally, the second location does not correspond to any object in the three-dimensional environment and/or the physical environment) the second object in the three-dimensional environment, such as the location to which object 1110 is moved in FIG. 11E, the first virtual object is displayed, via the display generation component, with a second amount of curvature, different from the first amount of curvature (1202f), such as the curvature with which object 1110 is displayed in FIG. 11E. For example, if the movement of the first virtual object to the second location in the three-dimensional environment did not cause the first virtual object to be "snapped" or "anchored" to the respective object or any other object in the three-dimensional or the physical environment of the computer system (e.g., was not moved within a threshold distance (e.g., 0.1, 0.3, 0.5, 1, 3, 5, 10, 20, 30 or 50 cm) of the second object)), the computer system displays the first virtual object with an amount of curvature that is different than if the first virtual object had been anchored/snapped to a respective object in the three-dimensional or physical environment of the computer system. In some embodiments, when the first virtual object is being displayed with the second amount of curvature, the first virtual object has a non-zero amount of curvature (e.g., is not flat). In some embodiments, when the movement of the first virtual object to the second location in the three-dimensional environment does not cause the first virtual object to be anchored/snapped to a surface in the three-dimensional or physical environment of the computer system, the first virtual object has an amount of curvature that is optionally based on the number of users in the three-dimensional environment and/or the location of the users in the three-dimensional environment, as will be described in more detail below. In some embodiments, while the first virtual object is not being anchored/snapped to a particular object in the three-dimensional or physical environment of the computer system, the computer system displays the first virtual object with a higher degree of curvature as to compared to when the first virtual object is being anchored/snapped to a particular object in the three-dimensional or physical environment of the computer system. Displaying the first virtual object with different amounts of curvature based on whether the first virtual object is snapped to an object in the three-dimensional environment or physical environment of the computer system causes the computer system to automatically display the first virtual object with an appropriate amount of curvature.

In some embodiments, the first location corresponds to a third object in the three-dimensional environment (e.g., in the same or similar ways that the second location corresponds to the second object), such as if in FIG. 11D object 1110 had been snapped to another wall of three-dimensional environment 1104, and the first virtual object is displayed with the first amount of curvature at the first location when the first input is detected (1204), such as if object 1110 had been displayed with no curvature in FIG. 11D (e.g., in the same or similar ways the first virtual object is displayed at the second location when the second location corresponds to the second object). For example, the first virtual object is snaped to a surface and/or object when the first input is detected. Displaying the first virtual object with the first amount of curvature at the first location provides feedback that the first virtual object is snapped to another object in the three-dimensional environment.

In some embodiments, while receiving the first input and while the first virtual object is displayed at a third location other than the first and second locations (e.g., the third location not corresponding to any object in the three-dimensional environment), the first virtual object is displayed with the second amount of curvature (1206), such as if object 1110 has the second amount of curvature while it is being moved between FIGS. 11D and 11E and/or between FIGS. 11E and 11F (e.g., in the same or similar ways the first virtual object is displayed at the second location when the second location does not correspond to the second object). For example, while the first virtual object is being moved in empty space in the three-dimensional environment (e.g., while being moved between two different surfaces), the first virtual object is displayed with the second amount of curvature. When the first virtual object is moved away from the first location the computer system optionally updates the curvature of the first virtual object to be the second curvature. Displaying the first virtual object with the second amount of curvature at the third location provides feedback that the first virtual object is not snapped to another object in the three-dimensional environment while it is being moved.

In some embodiments, the first location does not correspond to an object in the three-dimensional environment (e.g., the first location is empty space in the three-dimensional environment), such as in FIG. 11D or 11E, and the first virtual object is displayed with the second amount of curvature at the first location when the first input is detected (1208), such as in FIG. 11D or 11E (e.g., in the same or similar ways the first virtual object is displayed at the second location when the second location does not correspond to the second object). For example, the first virtual object optionally maintains the second curvature until reaching the second location, and if the second location corresponds to the second object, the computer system snaps the first virtual object to the second object and updates the curvature of the first virtual object to be the second curvature. Displaying the first virtual object with the second amount of curvature when the first input is detected provides feedback that the first virtual object is not snapped to another object in the three-dimensional environment when the first input is received.

In some embodiments, the first location is a first distance from a viewpoint of a user from which the three-dimensional environment is visible (e.g., the viewpoint from which the computer system displays and/or makes visible the three-dimensional environment, including the first virtual object and the second object), and the second location is the first distance from the viewpoint of the user (1210), such as if object 1110 was the same distance from viewpoint 1116 in FIG. 11F as it was at the beginning of the input to move object 1110 to the back wall of the room in three-dimensional environment 1104. Thus, in some embodiments, both the first and second locations are the same distance from the viewpoint of the user. In some embodiments, the curvature of the first virtual object (other factors described below being equal) is based on the distance of the first virtual object from the viewpoint of the user and is the same curvature for the same distance even if the relative location of the first virtual object relative to the viewpoint of the user is different (e.g., relatively left of the viewpoint vs. relatively right of the viewpoint). Thus, for a given distance from the viewpoint of the user, differences in curvature of the first virtual object optionally indicate other relevant factors relating to the first virtual object (e.g., whether it is snapped to another object, the number of users viewing and/or to which the first virtual object is accessible and/or with which the three-dimensional environment/first virtual object is concurrently shared, etc., as described below). Displaying the first virtual object with different curvatures for a given distance from the viewpoint of the user depending on whether a location of the first virtual object corresponds to another object provides feedback about whether the first virtual object is snapped to another object in the three-dimensional environment.

In some embodiments, while the first virtual object is at a respective location in the three-dimensional environment, displaying the first virtual object at the respective location includes (1212a), in accordance with a determination that the first virtual object is in a three-dimensional environment that is being concurrently shared by a first number of users including a user of the computer system, such as the two users sharing three-dimensional environment 1104 in FIG. 11A (e.g., the computer system is engaged in a communication session with at least one other computer system associated with at least one other user. In some embodiments, as part of the communication session, the first virtual object is displayed or displayable by the computer system and the one or more other computer systems. In some embodiments, as part of the communication session, the first virtual object is interactable by the user of the computer system and the one or more other users associated with the other computer systems), displaying the first virtual object with a third amount of curvature (1212b), such as the curvature of object 1110 in FIG. 11A (e.g., the same as the first amount of curvature, the same as the second amount of curvature, or different from the first and second amounts of curvature).

In some embodiments, in accordance with a determination that the first virtual object is in a three-dimensional environment that is being concurrently shared by a second number of users, different from the first number of users, including the user of the computer system, such as the three users sharing three-dimensional environment 1104 in FIG. 11B, the first virtual object is displayed with a fourth amount of curvature, different from the third amount of curvature (1212c), such as the curvature of object 1110 in FIG. 11B. In some embodiments, other factors described herein being equal, the more users with which the first virtual object and/or three-dimensional environment is concurrently shared, the less curvature with which the computer system displays the first virtual object—thereby facilitating viewing and/or interaction with the first virtual object by more users. Similarly, other factors described herein being equal, the fewer users with which the first virtual object and/or three-dimensional environment is concurrently shared, the more curvature with which the computer system displays the first virtual object—thereby focusing viewing and/or interaction with the first virtual object to the fewer number of users. Displaying the first virtual object with different curvatures based on the number of users with which the three-dimensional environment/first virtual object is shared causes the computer system to automatically facilitate viewing or interaction with the first virtual object for the relevant users.

In some embodiments, while the first virtual object is at a respective location in the three-dimensional environment, displaying the first virtual object at the respective location includes (1214a), in accordance with a determination that a viewpoint of a first user (e.g., the user of the computer system, or a user of another computer system in the communication session) that is concurrently sharing the three-dimensional environment (e.g., pursuant to the communication session as previously described) is a first viewpoint, such as the viewpoints of users shown in FIG. 11B (e.g., at a particular location in the three-dimensional environment, such as a particular location relative to the location of the first virtual object including one or more of relative orientation or relative distance), displaying the first virtual object with a third amount of curvature (1214b), such as the curvature of object 1110 in FIG. 11B (e.g., the same as the first amount of curvature, the same as the second amount of curvature, or different from the first and second amounts of curvature). In some embodiments, in accordance with a determination that the viewpoint of the first user that is concurrently sharing the three-dimensional environment is a second viewpoint (e.g., at a different particular location or relative location in the three-dimensional environment), different from the first viewpoint, such as if thew viewpoints of users shown in FIG. 11B were different, the first virtual object is displayed with a fourth amount of curvature, different from the third amount of curvature (1214c), such as a different curvature of object 1110 than is shown in FIG.

11B. In some embodiments, other factors described herein being equal, the location(s) of user(s) viewing and/or interacting with the first virtual object contribute to different curvatures of the first virtual object—thereby facilitating viewing and/or interaction with the first virtual object by those users. For example, if the users are generally centered on the first virtual object, the computer system optionally displays the first virtual object with more curvature, and if the users are generally off centered from the first virtual object, the computer system optionally displays the first virtual object with less curvature. In some embodiments, the more off centered the location(s) of the user(s) are, the less curvature with which the first virtual object is displayed. In some embodiments, the curvature of the first virtual object is set when the first virtual object is placed and/or moved in the three-dimensional environment based on the average location of the users that are concurrently sharing the first virtual object when the first virtual object is placed and/or moved. In some embodiments, the curvature of the first virtual object does not change after such a curvature is set for the first virtual object even if those users subsequently move relative to the first virtual object, unless and/or until the first virtual object is placed or moved again. In some embodiments, the curvature of the first virtual object is updated based on the (e.g., average) location of the users with which the first virtual object is shared when (optionally whenever) a user joins in the sharing or a user ceases participating in the sharing of the first virtual object. Displaying the first virtual object with different curvatures based on the location(s) of the user(s) with which the three-dimensional environment/first virtual object is shared causes the computer system to automatically facilitate viewing or interaction with the first virtual object for the relevant users.

In some embodiments, while the first virtual object is at a respective location in the three-dimensional environment, displaying the first virtual object at the respective location includes (1216a), in accordance with a determination that a viewpoint of a first user (e.g., the user of the computer system, or a user of another computer system in the communication session) that is concurrently sharing the three-dimensional environment (e.g., pursuant to the communication session as previously described) is a first distance from the first virtual object, such as the distance of object 1110 from the viewpoints of users shown in FIG. 11D, displaying the first virtual object with a third amount of curvature (1216b), such as the curvature of object 1110 in FIG. 11D (e.g., the same as the first amount of curvature, the same as the second amount of curvature, or different from the first and second amounts of curvature). In some embodiments, in accordance with a determination that the viewpoint of the first user that is concurrently sharing the three-dimensional environment is a second distance, different from the first distance, from the first virtual object, such as the distance of object 1110 from the viewpoints of users shown in FIG. 11E, the first virtual object is displayed with a fourth amount of curvature, different from the third amount of curvature (1216c), such as the curvature of object 1110 in FIG. 11E. In some embodiments, other factors described herein being equal, the distance(s) of user(s) viewing and/or interacting with the first virtual object contribute to different curvatures of the first virtual object—thereby facilitating viewing and/ or interaction with the first virtual object by those users. For example, the closer the user(s) are to the first virtual object, the computer system optionally displays the first virtual object with more curvature, and the further the user(s) are from the first virtual object, the computer system optionally displays the first virtual object with less curvature. In some embodiments, the curvature of the first virtual object is set when the first virtual object is placed and/or moved in the three-dimensional environment based on the average distance of the users that are concurrently sharing the first virtual object when the first virtual object is placed and/or moved. In some embodiments, the curvature of the first virtual object does not change after such a curvature is set for the first virtual object even if those users subsequently move relative to the first virtual object, unless and/or until the first virtual object is placed or moved again. In some embodiments, the curvature of the first virtual object is updated based on the (e.g., average) distance of the users with which the first virtual object is shared when (optionally whenever) a user joins in the sharing or a user ceases participating in the sharing of the first virtual object. Displaying the first virtual object with different curvatures based on the distance(s) of the user(s) with which the first virtual object is shared causes the computer system to automatically facilitate viewing or interaction with the first virtual object for the relevant users.

In some embodiments, the second object is a physical object (e.g., a wall, a table, a door, a window, a dresser or any other physical object) in a physical environment of the computer system (1218), such as the back wall of three-dimensional environment 1104. Thus, in some embodiments, the first virtual object can be snapped to a (surface of a) physical object in the three-dimensional environment, which causes the curvature of the first virtual object to change (e.g., to match or correspond to the curvature of the (surface of the) physical object. As previously described, in some embodiments, the physical object is visible via the display generation component in the three-dimensional environment via passive passthrough (e.g., via a translucent or transparent display generation component). In some embodiments, the physical object is visible and/or displayed via the display generation component in the three-dimensional environment via active passthrough (e.g., the computer system captures one or more images of the physical object and displays photorealistic or otherwise representation(s) of the physical object in the three-dimensional environment). Allowing the first virtual object to be snapped to a physical object provides consistent interaction to the user with objects in the three-dimensional environment, regardless of whether the objects are physical or virtual objects.

In some embodiments, the first virtual object includes a second virtual object (e.g., the second virtual object is contained within and/or has been snapped to the first virtual object in the same or similar ways as described with reference to the first virtual object being snapped to the second object) that is a two-dimensional object (e.g., an object that has no thickness in the three-dimensional environment or has thickness less than a threshold amount such as 0.01, 0.05, 0.1, 0.3, 0.5, 1, 3, 5 or 10 cm, to be differentiated from a three-dimensional object such as a three-dimensional model of a car or a building, as referenced below), and while the first virtual object has the first curvature, the second virtual object has a third curvature corresponding to the first curvature (1220), such as the curvature of object 1108-14 included in object 1110 in FIG. 11D (e.g., the same as or based on the first curvature). In some embodiments, the curvature of two-dimensional objects included in the first virtual object is based on the curvature of the first virtual object. In some embodiments, if the computer system were to detect input to remove the second virtual object from the first virtual object, the computer system would remove the second virtual object from the first virtual object, and the curvature of the second virtual object would be different from the third curvature (e.g., would have no curvature, or would have a curvature inherent to the second virtual object not based on the curvature of the first virtual object). Basing the curvature of two-dimensional objects on the curvature of the first virtual object provides feedback that the two-dimensional objects are included in the first virtual object.

In some embodiments, while the first virtual object has the second curvature, the second virtual object has a fourth curvature, different from the third curvature, wherein the fourth curvature corresponds to the second curvature (1222), such as the curvature of object 1108-14 included in object 1110 in FIG. 11E. In some embodiments, the curvature of two-dimensional objects included in the first virtual object changes as the curvature of the first virtual object changes. For example, in response to an input to increase or decrease the curvature of the first virtual object, the curvature of the first virtual object and the curvature of two-dimensional objects included in the first virtual object increases or decreases, respectively, in accordance with the input. In some embodiments, the curvature of the two-dimensional objects is the same as or corresponds to the curvature of the first virtual object. Changing the curvature of two-dimensional objects as the curvature of the first virtual object changes provides feedback that the two-dimensional objects are included in the first virtual object.

In some embodiments, the first virtual object includes a second virtual object (e.g., the second virtual object is contained within and/or has been snapped to the first virtual object in the same or similar ways as described with reference to the first virtual object being snapped to the second object) that is a three-dimensional object (e.g., an object that has thickness in the three-dimensional environment greater than a threshold amount such as 0.01, 0.05, 0.1, 0.3, 0.5, 1, 3, 5 or 10 cm, to be differentiated from a two-dimensional object such as described above), and the second virtual object is not displayed with a curvature based on a curvature of the first virtual object (1224), such as the shape, profile, etc. of object 1108-13 not being based on the curvature of object 1110 and/or not changing between FIGS. 11D and 11E. In some embodiments, the shapes or curvature of three-dimensional objects included in the first virtual object are not based on the curvature of the first virtual object. For example, the shapes of three-dimensional objects (e.g., a model of a car, a model of a building, etc.) are optionally inherent to those objects, and do not change based on the curvature of the first virtual object (e.g., do not change as the curvature of the first virtual object changes). In some embodiments, three-dimensional objects included in the first virtual object are visually separated/offset from the first virtual object by a threshold amount (e.g., 0.1, 0.3, 0.5, 1, 3, 5, 10 or 20 cm). In some embodiments, if the computer system were to detect input to remove the second virtual object from the first virtual object, the computer system would remove the second virtual object from the first virtual object, and the shape and/or curvature of the second virtual object would remain the same. Maintaining three-dimensional object shape to be independent of the curvature of the first virtual object provides feedback that the objects are three-dimensional objects.

In some embodiments, the computer system displays (1226) concurrently with the first virtual object a user interface element (e.g., a tool palette) that includes one or more selectable options that are selectable to perform operations associated with the first virtual object, such as element 1112 (e.g., one or more selectable options that are selectable to perform operations such as cut operations, copy operations, paste operations, resizing operations, or selection operations, such as described with reference to methods 800 and/or 1000), wherein the user interface element is not displayed with a curvature based on a curvature of the first virtual object, such as shown with element 1112 in FIGS. 11A-11G. For example, the shape or curvature of the tool palette is not based on the curvature of the first virtual object, similar to three-dimensional objects described above. In some embodiments, the tool palette is included in the first virtual object (e.g., similar to two-dimensional and three-dimensional objects described previously). In some embodiments, the tool palette is separate from the first virtual object, displayed at a separate location in the three-dimensional environment than the tool palette. Maintaining the tool palette shape to be independent of the curvature of the first virtual object facilitates consistent interaction with the tool palette regardless of the curvature of the first virtual object.

In some embodiments, the computer system displays (1228) concurrently with the first virtual object a user interface element (e.g., the above-described tool palette) that includes one or more selectable options that are selectable to perform operations associated with the first virtual object, such as element 1112 (e.g., the above-described operations associated with the tool palette), wherein the user interface element is displayed with a curvature based on a curvature of the first virtual object, such as if element 1112 were displayed with a curvature based on the curvature of object 1110. For example, the shape or curvature of the tool palette is based on the curvature of the first virtual object and/or changes based on changes to the curvature of the first virtual object, similar to two-dimensional objects described above. In some embodiments, the tool palette is included in the first virtual object (e g, similar to two-dimensional and three-dimensional objects described previously). In some embodiments, the tool palette is separate from the first virtual object, displayed at a separate location in the three-dimensional environment than the tool palette. Displaying the tool palette with curvature based on the curvature of the first virtual object indicates that the tool palette and/or the selectable options included in the tool palette are associated with the first virtual object.

In some embodiments, the user interface element is not contained in the first virtual object (1230), such as shown with element 1112 in FIGS. 11A-11G. For example, the tool palette is optionally displayed at a different location in the three-dimensional environment than the location of the first virtual object. In some embodiments, the tool palette is separately movable in the three-dimensional environment from the first virtual object. In some embodiments, the tool palette is displayed at a different separation from and/or relative location to the first virtual object than two-dimensional or three-dimensional virtual objects that are included in the first virtual object. Displaying the tool palette separately from the first virtual object facilitates individualized placement or interaction with the tool palette.

In some embodiments, the first virtual object is displayed in association with a selectable option that is selectable to initiate a process to change a size of the first virtual object (1232*a*), such as option 1121 shown in FIG. 11A (e.g., for example, a selectable option that is displayed in a lower-right corner of the first virtual object, within the boundary of the first virtual object or outside of the boundary of the first virtual object). In some embodiments, while displaying the first virtual object and the selectable option, wherein the first virtual object has a first size (e.g., a first area, a first width and/or a first height in the case of a first virtual object that is a rectangular shape, whether or not curved), the computer system detects (1232*b*), via the one or more input devices, a second input that includes a respective gesture performed by a respective portion (e.g., hand) of a user of the computer system while attention (e.g., gaze) of the user is directed to the selectable option, followed by movement of the respective portion of the user while in a respective pose, such as the input from hand 1103*a* in FIG. 11A. For example, the second input is a pinch and drag input (e.g., an air gesture) described with reference to method 800.

In some embodiments, in response to detecting the second input, the computer system displays (1232*c*) the first virtual object having a second size, different from the first size, based on the second input, such as shown in FIG. 11G. For example, movement of the selectable option towards the horizontal and/or vertical center of the first virtual object optionally causes the first virtual object to be decreased in size based on the amount of such movement (e.g., the more movement, the more the size is decreased), and movement of the selectable option away from the horizontal and/or vertical center of the first virtual object optionally causes the first virtual object to be increased in size based on the amount of such movement (e.g., the more movement, the more the size is increased). In some embodiments, the movement of the selectable option is related to the movement of the respective portion of the user such as described with reference to the movement of objects based on the movement of the hand(s) of the user in method 800. In some embodiments, resizing the first virtual object as described does not cause the virtual objects included in the first virtual object to change in size (e.g., they remain at their current sizes). Upon detecting an end of the pinch and drag input (e.g., upon detecting the fingers making the pinch hand shape move apart from one another), the size of the first virtual object is no longer controlled by the movement of the hand of the user. In some embodiments, the size of the first virtual object referenced here is the size of the first virtual object in the three-dimensional environment (e.g., the size of the first virtual object relative to the three-dimensional environment). The size at which the first virtual object is displayed via the display generation component (e.g., an amount of the field of view of the user consumed by the first virtual object) is optionally based on the size of the first virtual object relative to the three-dimensional environment, and changes based on changes to the relative location of the first virtual object relative to the viewpoint of the user (e.g., as the viewpoint moves and/or as the first virtual object moves). In some embodiments, the size of the first virtual object relative to the three-dimensional environment does not change based on changes to the relative location of the first virtual object relative to the viewpoint of the user. Resizing the first virtual object as described reduces the number of inputs needed to resize the first virtual object.

In some embodiments, the first virtual object having the first size has a first dimension along a first direction (e.g., a height of the first virtual object along a vertical axis) and a second dimension along a second direction (1234*a*) (e.g., a width of the first virtual object along a horizontal axis), such as the height and width of object 1110 in FIG. 11A. In some embodiments, in response to detecting the second input (1234*b*), in accordance with a determination that the movement of the respective portion of the user is in the second direction (e.g., movement of the selectable option leftward or rightward, or within a threshold angle such as 0.5, 1, 5, 10, 20 or 30 degrees of being leftward or rightward), the first virtual object having the second size has the first dimension along the first direction (e.g., the height of the first virtual object does not change) and a third dimension, different from the second dimension, along the second direction (1234*c*), such as shown with object 1110 in FIG. 11G (e.g., only the width of the first virtual object changes in response to leftward or rightward movements of the respective portion of the user). In some embodiments, the amount of change of the width of the first virtual object is based on the amount of movement of the respective portion of the user, as previously described. In some embodiments, the height of the first virtual object does not change (and optionally cannot change) in response to movement of the respective portion of the user in the second direction. In some embodiments, the height of the first virtual object is not resizable in response to input directed to the selectable option, or otherwise. Resizing one dimension of the first virtual object as described facilitates controlled resizing of the first virtual object.

In some embodiments, in response to detecting the second input (1236*a*), in accordance with a determination that the movement of the respective portion of the user is in the first direction (e.g., movement of the selectable option upward or downward, or within a threshold angle such as 0.5, 1, 5, 10, 20 or 30 degrees of being upward or downward), such as if the input from hand 1103*a* from FIG. 11A to 11G instead included movement of hand 1103*a* upward or downward, the first virtual object having the second size has a fourth dimension, different from the first dimension, along the first direction and a fifth dimension, different from the second dimension, along the second direction (1236*b*), such as if object 1110 were scaled in both height and width from FIG. 11A to 11G. For example, both the height and width of the first virtual object optionally change in response to upward or downward movements of the respective portion of the user. In some embodiments, upward movements cause the height and width to increase (or in some embodiments, decrease), and downward movements cause the height and width to decrease (or in some embodiments, increase). In some embodiments, the amount of change of the height and width of the first virtual object is based on the amount of movement of the respective portion of the user, as previously described. In some embodiments, the proportion of the height to the width of the first virtual object remains constant in response to upward or downward movements of the respective portion of the user. Resizing two dimensions of the first virtual object as described facilitates flexible resizing of the first virtual object.

In some embodiments, the first virtual object includes a second virtual object (1238*a*) (e.g., a two- or three-dimensional object, as previously described), and, in accordance with a determination that a first portion of the second virtual object has a first spatial relationship to a first boundary of the first virtual object (e.g., the first portion of the second object is a particular distance from an upper or lower boundary of the first virtual object), the first portion of the second virtual object is displayed via the display generation component with a respective visual characteristic having a first value (1238*b*), such as the way computer system 101 would displays portions of object 1108-1 that were approaching and/or extending beyond the bottom boundary of object 1110 in FIG. 11A (e.g., the first portion of the second object is displayed with a particular color, intensity, brightness, opacity or blurriness). In some embodiments, in accordance with a determination that the first portion of the second virtual object has the first spatial relationship to a second boundary, different from the first boundary, of the first virtual object (e.g., the first portion of the second object is the particular distance from a left side or right side boundary of the first virtual object), the first portion of the second virtual object is displayed via the display generation component with the respective visual characteristic having a second value, different from the first value (1238*c*), such as the way computer system 101 displays portions of object 1108-7 that are approaching and/or extending beyond the right boundary of object 1110 in FIG. 11A (e.g., the first portion of the second object is displayed with a different color, intensity, brightness, opacity or blurriness). For example, in some embodiments, virtual objects or portions of virtual objects near the top or bottom boundaries of the first virtual object are displayed with full color, intensity, brightness, opacity or no blurriness, independent of distance from the top or bottom boundaries (e.g., any portions of virtual objects hanging off or over a top or bottom boundary of the first virtual object are not displayed such as via a hard cut-off at those boundaries). In contrast, as portions of virtual objects are closer to the left or right boundaries of the first virtual object, those portions are optionally displayed with less and less color, intensity, brightness and/or opacity and/or more and more blurriness. In some embodiments, the relative placement of virtual objects relative to the above-described boundaries changes in response to input for moving those virtual objects relative to the first virtual object (e.g., as described with reference to method 800). In some embodiments, the relative placement of virtual objects relative to the above-described boundaries changes in response to input for resizing the first virtual object, as described above, which optionally brings the boundaries of the first virtual object closer to or further away from the virtual objects included in the first virtual object. Displaying portions of virtual objects differently depending on whether those portions are proximate to upper/lower boundaries or left/right boundaries indicates the direction(s) in which the first virtual object is scrollable (e.g., such as described with reference to method 800).

In some embodiments, the computer system detects (1240*a*), via the one or more input devices, a second input corresponding to a request to place a second virtual object at a respective location in the first virtual object, such as an input to place object 1108-7 in object 1110 in FIG. 11A. For example, a pinch and drag input, as described with reference to methods 800 and/or 1000, while attention of the user is directed to the second virtual object. The computer system optionally detects an end of the pinch and drag input (e.g., the fingers making the pinch hand shape moving apart) while the second virtual object is at the respective location in the first virtual object. In some embodiments, the computer system detects the end of the pinch and drag input while the second virtual object is within a snapping threshold distance, as described above, of the first virtual object. In some embodiments, the second virtual object was already included in and/or snapped to the first virtual object when the second input was detected. In some embodiments, the second virtual object was not included in and/or snapped to the first virtual object when the second input was detected.

In some embodiments, in response to detecting the second input (1240*b*), in accordance with a determination that placement of the second virtual object at the respective location would cause at least a portion of the second virtual object to extend beyond a first boundary of the first virtual object (e.g., an upper or lower boundary of the first virtual object, as described above), such as if the input to place object 1108-7 in FIG. 11A were to place it such that it extended beyond the bottom boundary of object 1110, the computer system displays (1240*c*) the second virtual object at a second respective location, different from the respective location, in the first virtual object, wherein while displayed at the second respective location, the second virtual object does not extend beyond the first boundary of the first virtual object. For example, the computer system shifts the location of the second virtual object towards a center of the first virtual object to avoid extension of the second virtual object beyond the first boundary, such as described with reference to method 1000.

In some embodiments, in accordance with a determination that placement of the second virtual object at the respective location would cause at least a portion of the second virtual object to extend beyond a second boundary of the first virtual object (e.g., a left or right boundary of the first virtual object), different from the first boundary of the first virtual object, such as an input to place object 1108-7 as shown in FIG. 11A with the right portion of object 1108-7 extending beyond the right boundary of object 1110, the computer system displays (1240*d*) the second virtual object at the respective location, such as the location at which object 1108-7 is displayed in FIG. 11A. For example, the computer system optionally allows the second virtual object to hang over and/or beyond the second boundary and does not shift the location of the second virtual object, such as described with reference to method 1000. In some embodiments, the computer system visually deemphasizes (e.g., reduces brightness, opacity, color, or intensity and/or increases blurriness of) portions of the second virtual object that are further beyond the second boundary more than portions of the second virtual object that are not as far beyond the second boundary. Not shifting the location of the second virtual object away from the lateral boundaries of the first virtual object provides feedback to the user that the first virtual object can be scrolled horizontally to scroll to other portions of the first virtual object, as described with reference to method 800.

In some embodiments, while displaying the first virtual object, the computer system detects (1240*a*), via the one or more input devices, a second input that includes a respective gesture performed by a respective portion of a user of the computer system, followed by movement of the respective portion of the user while in a respective pose, such as the input from hand 1103*a* from FIGS. 11B to 11C (e.g., a pinch and drag input (e.g., a pinch and drag air gesture), as described with reference to methods 800, 1000 and/or 1200, while attention of the user is directed to a portion of the first virtual object that does not include and/or correspond to a virtual object included in the first virtual object). In some embodiments, in response to detecting the second input, the computer system scrolls (1240*b*) through the first virtual object in accordance with the movement of the respective portion of the user, such as shown with respect to object 1110 from FIGS. 11B to 11C. For example, scrolling the first virtual object based on the direction and/or magnitude of the movement of the respective portion of the user, such as described with reference to method 800. Scrolling the first virtual object based on movement of the respective portion of the user reduces the number of inputs needed to scroll through the first virtual object.

In some embodiments, while displaying the first virtual object, wherein the first virtual object includes a second virtual object (e.g., the second virtual object is contained within and/or has been snapped to the first virtual object in the same or similar ways as described with reference to the first virtual object being snapped to the second object) with a first visual characteristic having a first value (e.g., a particular level of color, brightness, intensity, opacity and/or blurriness), the computer system detects (1242*a*), via the one or more input devices, a second input corresponding to a request to scroll through the first virtual object, such as the input from hand 1103*a* from FIGS. 11B to 11C (e.g., such as a pinch and drag input (e.g., an air gesture) as described above, or an input including a direct input interaction of a finger (e.g., index finger) of the user contacting the surface of the first virtual object, and while contacting the surface of the first virtual object, moving leftward or rightward relative to the first virtual object. In some embodiments, the second input is a gaze of the user directed to a portion of the first virtual object or the scroll bar for longer than a time threshold (e.g., 0.1, 0.3, 0.5, 1, 3, 5, 10 or 20 seconds), which optionally causes the computer system to scroll to the gazed—at portion of the first virtual object or scroll bar). In some embodiments, while detecting the second input (1242*b*) (e.g., while the hand of the user is maintaining the pinch hand shape as part of the scrolling input), the computer system scrolls (1242*c*) through the first virtual object in accordance with the second input, such as shown from FIGS. 11B to 11C (e.g., based on the direction and/or magnitude of the movement of the hand of the user, as described above).

In some embodiments, the computer system displays (1242*d*) the second virtual object with the first visual characteristic having a respective value that is different from the first value, such as shown with the changed visual appearances of objects 1108-9 to 1108-12 in FIG. 11C (e.g., visually deemphasizing the second virtual object, such as by decreasing the level of color, brightness, intensity and/or opacity and/or increasing the blurriness). In some embodiments, when the scrolling input ends (e.g., movement of the hand of the user stops and/or the hand releases the pinch hand shape as described above), the computer system reverts to displaying the second virtual object with the first visual characteristic having the first value. In some embodiments, the visual appearance (e.g., color, brightness, intensity, opacity and/or blurriness) of the first virtual object itself does not change based on and/or in response to the scrolling input. In some embodiments, the first virtual object is translucent. Visually deemphasizing the virtual object(s) included in the first virtual object during scrolling avoids obstruction of parts of the environment within which the first virtual object is displayed.

In some embodiments, displaying the second virtual object with the first visual characteristic having the respective value that is different from the first value includes (1244*a*), in accordance with a determination that the second input corresponds to a first amount of scrolling (e.g., a first speed of scrolling, a first magnitude of scrolling and/or a first acceleration of scrolling), displaying the second virtual object with the first visual characteristic having a second value (1244*b*). In some embodiments, in accordance with a determination that the second input corresponds to a second amount of scrolling (e.g., a second speed of scrolling, a second magnitude of scrolling and/or a second acceleration of scrolling), the second virtual object is displayed with the first visual characteristic having a third value that is different from the second value (1244*c*), such as if objects 1108-9 to 1108-12 in FIG. 11C are displayed with different visual appearances based on the amount of scrolling corresponding to the input from hand 1103*a*. In some embodiments, the second virtual object is visually deemphasized more the greater the amount of scrolling, and the second virtual object is visually deemphasized less the less the amount of scrolling. Visually deemphasizing the virtual object(s) included in the first virtual object based on the amount of scrolling avoids obstruction of parts of the environment within which the first virtual object is displayed in a manner appropriate to the degree of scrolling.

In some embodiments, the second virtual object is displayed in front of a background element of the first virtual object (1246*a*) (e.g., the plane and/or backplane and/or surface of the first virtual object), and, before detecting the second input, the background element is displayed with a second visual characteristic having a third value (1246*b*) (e.g., a particular level of color, brightness, intensity, opacity and/or blurriness). In some embodiments, while detecting the second input, the background element is displayed with the second visual characteristic having the third value (1246*c*), such as the background of object 1110 being displayed with the same visual appearance in FIGS. 11A-11G irrespective of scrolling through object 1110 (e.g., the particular level of color, brightness, intensity, opacity and/or blurriness). Thus, in some embodiments, the visual appearance of the first virtual object itself does not change based on scrolling of the first virtual object. Maintaining the visual appearance of the first virtual object maintains spatial context of the environment that is visible via the display generation component.

In some embodiments, the second visual characteristic having the third value corresponds to the background element being displayed with at least some translucency (1248), such as the background of object 1110 being displayed with some translucency in FIGS. 11A-11G irrespective of scrolling through object 1110 (e.g., such that parts of the environment (e.g., physical objects or virtual objects) behind the first virtual object are at least partially visible through the first virtual object). Displaying the first virtual object with at least some transparency provides spatial context of the environment of the user.

In some embodiments, while detecting the second input, the computer system displays (1250), via the display generation component, a scrolling indicator that indicates a progress of scrolling through the first virtual object, such as scrolling indicator 1126. For example, a scroll bar with a current scroll position indicator is displayed. The current scroll position indicator is optionally displayed at a position within the scroll bar, the position corresponding to the current scroll position within the first virtual object. The current scroll position indicator optionally moves accordingly within the scroll bar as the current scroll position changes during the scrolling. In some embodiments, the scroll bar including the current scroll position indicator is not displayed until the scrolling input, as previously described, is detected. In some embodiments, the scroll bar is displayed before and during the scrolling input. Displaying the scrolling indicator facilitates proper scrolling through the first virtual object.

In some embodiments, while displaying the scrolling indicator, wherein the scrolling indicator is displayed in a first mode of presentation, such as the mode of presentation of scrolling indicator 1126 shown in FIGS. 11A-11B (e.g., in the first mode of presentation, the scrolling indicator is a scroll bar with a current scroll position indicator, as described above, and the scrolling indicator does not include an indication or representation of the content of the first virtual object), the computer system detects (1252*a*), via the one or more input devices, a third input including attention of the user directed to the scrolling indicator, such as gaze 1124 directed to scrolling indicator 1126 in FIG. 11C (e.g., the computer system detects the gaze of the user directed to the scroll bar and/or current scroll position indicator). In some embodiments, in response to detecting the third input, the computer system displays the scrolling indicator in the second mode of presentation, including displaying, within the scrolling indicator (1252*b*), a first representation of content included in the first virtual object at a current scrolling position in the first virtual object, the first representation of the content corresponding to content currently displayed in the first virtual object (1252*c*), such as how scrolling indicator 1126 is displayed in FIGS. 11C-11D (e.g., a snapshot and/or preview of the portion of the content of the first virtual object that is currently displayed in the first virtual object). In some embodiments, a second representation of content is included in the first virtual object at a different scrolling position in the first virtual object, the different scrolling position different from the current scrolling position, and the second representation of the content corresponding to content not currently displayed in the first virtual object (1252*d*), such as how scrolling indicator 1126 is displayed in FIGS. 11C-11D (e.g., a snapshot and/or preview of the portion of the content of the first virtual object that is not currently displayed in the first virtual object, but that can be displayed in the first virtual object in response to scrolling to the different scrolling position in the first virtual object). In some embodiments, the first and second representations are a smaller scale/size than the portions of the first virtual object that correspond to the first and second representations. Displaying the representations of the portion of the first virtual object facilitates navigation through the first virtual object.

In some embodiments, the third input includes a respective portion (e.g., hand) of a user of the computer system in a respective state (e.g., a ready state or a pinch state) associated with displaying the scrolling indicator in the second mode of presentation (1254), such as the state of hand 1103*a* in FIG. 11C. Requiring the respective portion of the user to be in the respective state ensures that user intention for scrolling is present and unintentional scrolling operations are avoided.

In some embodiments, displaying the scrolling indicator includes (1256*a*), in accordance with a determination that a current scroll position in the first virtual object is a first scroll position (e.g., scrolled 5%, 10%, 25% or 40% of the way through the first virtual object from the left end of the first virtual object), displaying a position indicator in the scrolling indicator that indicates the first scroll position (1256*b*), such as position indicator 1130 shown at its location in FIG. 11C (e.g., a box, outline, highlighted area and/or other indicator that is displayed overlaid on and/or surrounding the portion of the scroll bar and/or previews or snapshots of the content of the first virtual object that corresponds to the content of the first virtual object displayed at the 25% scrolling position). In some embodiments, in accordance with a determination that the current scroll position in the first virtual object is a second scroll position (e.g., scrolled 60%, 75% or 90% of the way through the first virtual object from the left end of the first virtual object), different from the first scroll position, the position indicator is displayed in the scrolling indicator that indicates the second scroll position (1256*c*), such as position indicator 1130 shown at its location in FIG. 11D (e.g., a box, outline, highlighted area and/or other indicator that is displayed overlaid on and/or surrounding the portion of the scroll bar and/or previews or snapshots of the content of the first virtual object that corresponds to the content of the first virtual object displayed at the 60%, 75% or 90% scrolling position). In some embodiments, the position indicator visually differentiates the portion of the scroll bar corresponding to the current scroll position from other portions of the scroll bar that do not correspond to the current scroll position. Displaying the position indicator reduces the number of inputs needed to correctly scroll through the first virtual object.

In some embodiments, while displaying the scrolling indicator, the computer system detects (1258*a*), via the one or more input devices, a third input directed to the scrolling indicator that includes a respective gesture performed by a respective portion of a user of the computer system, followed by movement of the respective portion of the user while in a respective pose, such as an input from hand 1103*a* in FIG. 11C directed to indicator 1126 (e.g., a pinch and drag input (e.g., an air gesture) as described previously, optionally while attention of the user is directed to the scrolling indicator). In some embodiments, the third input must be directed to the position indicator described above; in some embodiments, the third input can be directed to any part of the scrolling indicator. In some embodiments, in response to detecting the third input, the computer system scrolls (1258*b*) through the first virtual object in accordance with the third input, such as the scrolling of object 1110 from FIG. 11C to 11D. For example, scrolling through the first virtual object in accordance with the direction and/or magnitude of the movement of the hand of the user, such as described with reference to method 800. Scrolling the first virtual object based on movement of the respective portion of the user directed to the scrolling indicator reduces the number of inputs needed to scroll through the first virtual object.

In some embodiments, while displaying the scrolling indicator, the computer system detects (1260*a*), via the one or more input devices, a third input directed to the scrolling indicator that includes a respective gesture performed by a respective portion of a user of the computer system, such as an input from hand 1103*a* directed to scrolling indicator 1126 in FIG. 11C. For example, a pinch air gesture performed by a hand of the user, such as previously described (e.g., an index finger and thumb of the hand of the user coming together and touching, optionally followed by movement of the index finger and thumb of the hand of the user moving apart within a time threshold (e.g., 0.1, 0.3, 0.5, 1, 3, 5 or 10 seconds) of touching). In some embodiments, in response to detecting the third input (1260*b*), in accordance with a determination that the third input was directed to a first location in the scrolling indicator, such as if the input from hand 1103*a* were a pinch air gesture directed to the first location in scrolling indicator 1126 (e.g., in accordance with a determination that attention of the user was directed to the first location in the scrolling indicator when the pinch input was detected), the computer system scrolls (1260*c*) to a first scrolling position in the first virtual object that corresponds to the first location. For example, if the third input was directed to a location within the scroll bar that corresponds to a 10%, 25% or 40% scroll position from the left end of the first virtual object, the computer system optionally scrolls the first virtual object to the 10%, 25% or 40% scroll position.

In some embodiments, in accordance with a determination that the third input was directed to a second location in the scrolling indicator (e.g., in accordance with a determination that attention of the user was directed to the second location in the scrolling indicator when the pinch input was detected), different from the first location in the scrolling indicator, such as if the input from hand 1103*a* were a pinch air gesture directed to the second location in scrolling indicator 1126, the computer system scrolls (1260*d*) to a second scrolling position, different from the first scrolling position, in the first virtual object that corresponds to the second location. For example, if the third input was directed to a location within the scroll bar that corresponds to a 60%, 75% or 90% scroll position from the left end of the first virtual object, the computer system optionally scrolls the first virtual object to the 60%, 75% or 90% scroll position. The third input optionally does not include a movement component (e.g., movement of the hand of the user during and/or after the pinch air gesture. Scrolling the first virtual object based on discrete input from the respective portion of the user directed to the scrolling indicator reduces the number of inputs needed to scroll through the first virtual object.

It should be understood that the particular order in which the operations in method 1200 have been described is merely exemplary and is not intended to indicate that the described order is the only order in which the operations could be performed. One of ordinary skill in the art would recognize various ways to reorder the operations described herein.

In some embodiments, aspects/operations of methods 800, 1000 and/or 1200 may be interchanged, substituted, and/or added between these methods. For example, the virtual objects of methods 800, 1000 and/or 1200, the environments of methods 800, 1000 and/or 1200, the inputs for repositioning virtual objects of methods 800, 1000 and/or 1200, the viewpoints of methods 800, 1000 and/or 1200, the inputs for selecting and/or controlling objects of methods 800, 1000 and/or 1200, the container objects of methods 800, 1000 and/or 1200, the scrolling inputs of methods 800, 1000 and/or 1200, the virtual object insertion inputs of methods 800, 1000 and/or 1200, and/or the communication sessions of methods 800, 1000 and/or 1200 are optionally interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can be generated by inferring preferences based on non-personal information data or a bare minimum amount of personal information, such as the content being requested by the device associated with a user, other non-personal information available to the service, or publicly available information.

The invention claimed is:

1. A method comprising:
at a computer system in communication with a display generation component and one or more input devices:
while displaying, via the display generation component, a first user interface object and a second user interface object:
while a first set of one or more user interface objects, including the first user interface object and not including the second user interface object, is in a selected state and being controlled by a first portion of a user of the computer system, detecting, via the one or more input devices, a first input directed to the second user interface object that includes a respective gesture performed by a second portion, different from the first portion, of the user of the computer system; and
in response to detecting the first input:
in accordance with a determination that the first input satisfies one or more first criteria, including a first criterion that is satisfied when an initiation of the respective gesture and an end of the respective gesture are performed within a threshold amount of time of one another, adding the second user interface object to the first set of one or more user interface objects that is in the selected state and being controlled by the first portion of the user of the computer system, including moving the first user interface object and the second user interface object in accordance with movement of the first portion of the user; and
in accordance with a determination that the first input satisfies one or more second criteria, different from the one or more first criteria, including a first criterion that is satisfied when the end of the respective gesture is not performed within the threshold amount of time of the initiation of the respective gesture, and a second criterion that is satisfied when the respective gesture includes movement of the second portion of the user more than a movement threshold after the initiation of the respective gesture:
updating the second user interface object to be in the selected state, and
controlling the second user interface object based on the second portion of the user, including moving the second user interface object in accordance with movement of the second portion of the user while maintaining the selected state of the first set of user interface objects and the control of the first set of one or more user interface objects based on the first portion of the user of the computer system.

2. The method of claim 1, further comprising:
while displaying, via the display generation component, the first user interface object and the second user interface object, wherein no user interface object displayed via the display generation component is in the selected state, detecting, via the one or more input devices, a second input directed to the first user interface object that includes the respective gesture performed by the second portion of the user; and
in response to detecting the second input, and in accordance with a determination that the second input satisfies the one or more first criteria, displaying, via the display generation component, content associated with the first user interface object.

3. The method of claim 1, further comprising:
in response to detecting the first input:
in accordance with a determination that the first input satisfies one or more third criteria, different from the one or more first criteria and the one or more second criteria, including the first criterion that is satisfied when the end of the respective gesture is not performed within the threshold amount of time of the initiation of the respective gesture and a third criterion that is satisfied when the respective gesture includes movement of the second portion of the user less than the movement threshold after the initiation of the respective gesture:
in response to detecting the end of the respective gesture, adding the second user interface object to the first set of one or more user interface objects that is in the selected state and being controlled by the first portion of the user of the computer system, including moving the first user interface object and the second user interface object in accordance with movement of the first portion of the user.

4. The method of claim 1, further comprising:
while the second user interface object is being controlled based on the second portion of the user, including moving the second user interface object in accordance with movement of the second portion of the user while maintaining the selected state of the first set of user interface objects and the control of the first set of one or more user interface objects based on the first portion of the user of the computer system, detecting the end of the respective gesture; and
in response to detecting the end of the respective gesture, placing the second user interface object at a location corresponding to a current location of the second portion of the user.

5. The method of claim 1, further comprising:
after detecting the first input and while the first set of one or more user interface objects is in the selected state and being controlled by the first portion of the user of the computer system, detecting, via the one or more input devices, a second input directed to a third user interface object that includes the respective gesture performed by the second portion of the user of the computer system; and
in response to detecting the second input:
in accordance with a determination that the second input satisfies the one or more first criteria, adding the third user interface object to the first set of one or more user interface objects that is in the selected state and being controlled by the first portion of the user of the computer system, including moving the first user interface object and the third user interface object in accordance with movement of the first portion of the user; and in accordance with a determination that the second input satisfies the one or more second criteria:
updating the third user interface object to be in the selected state; and
controlling the third user interface object based on the second portion of the user, including moving the third user interface object in accordance with movement of the second portion of the user while maintaining the selected state of the first set of user interface objects and the control of the first set of one or more user interface objects based on the first portion of the user of the computer system.

6. The method of claim 1, wherein displaying the second user interface object in the selected state includes displaying, via the display generation component, a visual indication that the second user interface object is in the selected state.

7. The method of claim 1, further comprising:
while the first set of objects is in the selected state and being controlled by the first portion of the user while the first portion of the user maintains a respective pose, detecting the first portion of the user no longer maintaining the respective pose; and
in response to detecting the first portion of the user no longer maintaining the respective pose, ceasing control of the first set of objects by the first portion of the user while maintaining the first set of objects in the selected state.

8. The method of claim 1, further comprising:
while the first set of objects is in the selected state and being controlled by the first portion of the user while the first portion of the user maintains a respective pose, detecting, via the one or more input devices, the first portion of the user no longer maintaining the respective pose; and
in response to detecting the first portion of the user no longer maintaining the respective pose, ceasing control of the first set of objects by the first portion of the user and updating the first set of objects to be in an unselected state.

9. The method of claim 1, further comprising:
detecting, via the one or more input devices, a second input directed to a location that does not include a user interface object that includes a first gesture performed by the first portion of the user; and
in response to detecting the second input:
in accordance with a determination that the second input satisfies one or more third criteria, including a third criterion that is satisfied when an initiation of the first gesture is followed by movement of the first portion of the user followed by an end of the first gesture, wherein the movement of the first portion of the user defines an area that includes a plurality of user interface objects:
in accordance with a determination that a third user interface object of the plurality of user interface objects is in the selected state, updating the third user interface object to be in an unselected state;
in accordance with a determination that the third user interface object is in the unselected state, updating the third user interface object to be in the selected state;

in accordance with a determination that a fourth user interface object of the plurality of user interface objects is in the selected state, updating the fourth user interface object to be in the unselected state; and
in accordance with a determination that the fourth user interface object is in the unselected state, updating the fourth user interface object to be in the selected state.

10. The method of claim 9, further comprising:
while the plurality of user interface objects is in the selected state in response to detecting the second input, detecting, via the one or more input devices, a third input directed to a third user interface object that is not included in the plurality of user interface objects and that is in the unselected state, wherein the third input includes a second gesture performed by a respective portion of the user;
in response to detecting the third input, in accordance with a determination that the third input satisfies the one or more first criteria, updating the third user interface object to be in the selected state while maintaining the plurality of user interface objects in the selected state;
while the third user interface object and the plurality of user interface objects are in the selected state, detecting a fourth input corresponding to movement of the third user interface object and the plurality of user interface objects;
while detecting the fourth input, moving the third user interface object and the plurality of user interface objects in accordance with the fourth input; and
in response to detecting an end of the fourth input, updating the third user interface object to be in the unselected state while maintaining the plurality of user interface objects in the selected state.

11. The method of claim 1, further comprising:
detecting, via the one or more input devices, a second input directed to a location that includes a third user interface object that is in the selected state, wherein the second input includes a first gesture performed by the first portion of the user, and one or more user interface objects, including the third user interface object, are in the selected state when the second input is detected; and
in response to detecting the second input:
in accordance with a determination that the second input satisfies one or more third criteria, including a third criterion that is satisfied when an initiation of the first gesture is followed by movement of the first portion of the user followed by an end of the first gesture:
moving the one or more user interface objects in accordance with the movement of the first portion of the user.

12. The method of claim 1, further comprising:
detecting, via the one or more input devices, a second input directed to a third user interface object that is in the selected state, wherein the second input satisfies the one or more second criteria while an attention of the user is directed to the third user interface object; and
in response to detecting the second input, displaying, via the display generation component, a contextual menu associated with the third user interface object.

13. The method of claim 1, wherein the first input is detected while the computer system is operating in a first mode of operation in which user interface objects are placed in the selected or unselected states in one or more first manners, the method further comprising:
    displaying, via the display generation component, a selectable option that is selectable to initiate a second mode of operation of the computer system in which user interface objects are placed in the selected or unselected states in one or more second manners, different from the one or more first manners.

14. The method of claim 13, further comprising:
    detecting, via the one or more input devices, a second input directed to a third user interface object that is in the unselected state, wherein the second input satisfies the one or more second criteria while an attention of the user is directed to the third user interface object; and
    in response to detecting the second input:
        in accordance with a determination that the computer system is operating in the first mode of operation, displaying, via the display generation component, content associated with the third user interface object; and
        in accordance with a determination that the computer system is operating in the second mode of operation, updating the third user interface object to be in the selected state.

15. The method of claim 13, wherein one or more user interface objects are displayed within a container user interface object, the method further comprising:
    detecting, via the one or more input devices, a second input that includes movement of a respective portion of the user, wherein the second input satisfies the one or more second criteria; and
    in response to detecting the second input:
        in accordance with a determination that the computer system is operating in the first mode of operation, moving the one or more user interface objects relative to the container user interface object in accordance with the movement of the respective portion of the user; and
        in accordance with a determination that the computer system is operating in the second mode of operation, scrolling through the container user interface object without moving the one or more user interface objects relative to the container user interface object.

16. A non-transitory computer-readable storage medium storing one or more programs configured to be executed by one or more processors of a computer system that is in communication with a display generation component and one or more input devices, the one or more programs including instructions for:
    while displaying, via the display generation component, a first user interface object and a second user interface object:
        while a first set of one or more user interface objects, including the first user interface object and not including the second user interface object, is in a selected state and being controlled by a first portion of a user of the computer system, detecting, via the one or more input devices, a first input directed to the second user interface object that includes a respective gesture performed by a second portion, different from the first portion, of the user of the computer system; and
        in response to detecting the first input:
            in accordance with a determination that the first input satisfies one or more first criteria, including a first criterion that is satisfied when an initiation of the respective gesture and an end of the respective gesture are performed within a threshold amount of time of one another, adding the second user interface object to the first set of one or more user interface objects that is in the selected state and being controlled by the first portion of the user of the computer system, including moving the first user interface object and the second user interface object in accordance with movement of the first portion of the user; and
            in accordance with a determination that the first input satisfies one or more second criteria, different from the one or more first criteria, including a first criterion that is satisfied when the end of the respective gesture is not performed within the threshold amount of time of the initiation of the respective gesture, and a second criterion that is satisfied when the respective gesture includes movement of the second portion of the user more than a movement threshold after the initiation of the respective gesture:
                updating the second user interface object to be in the selected state, and
                controlling the second user interface object based on the second portion of the user, including moving the second user interface object in accordance with movement of the second portion of the user while maintaining the selected state of the first set of user interface objects and the control of the first set of one or more user interface objects based on the first portion of the user of the computer system.

17. The non-transitory computer-readable storage medium of claim 16, the one or more programs further including instructions for:
    while displaying, via the display generation component, the first user interface object and the second user interface object, wherein no user interface object displayed via the display generation component is in the selected state, detecting, via the one or more input devices, a second input directed to the first user interface object that includes the respective gesture performed by the second portion of the user; and
    in response to detecting the second input, and in accordance with a determination that the second input satisfies the one or more first criteria, displaying, via the display generation component, content associated with the first user interface object.

18. The non-transitory computer-readable storage medium of claim 16, the one or more programs further including instructions for:
    in response to detecting the first input:
        in accordance with a determination that the first input satisfies one or more third criteria, different from the one or more first criteria and the one or more second criteria, including the first criterion that is satisfied when the end of the respective gesture is not performed within the threshold amount of time of the initiation of the respective gesture and a third criterion that is satisfied when the respective gesture includes movement of the second portion of the user less than the movement threshold after the initiation of the respective gesture:
            in response to detecting the end of the respective gesture, adding the second user interface object to the first set of one or more user interface objects that is in the selected state and being controlled by the first portion of the user of the computer system, including moving the first user interface object and the second user interface object in accordance with movement of the first portion of the user.

19. The non-transitory computer-readable storage medium of claim 16, the one or more programs further including instructions for:

while the second user interface object is being controlled based on the second portion of the user, including moving the second user interface object in accordance with movement of the second portion of the user while maintaining the selected state of the first set of user interface objects and the control of the first set of one or more user interface objects based on the first portion of the user of the computer system, detecting the end of the respective gesture; and in response to detecting the end of the respective gesture, placing the second user interface object at a location corresponding to a current location of the second portion of the user.

20. The non-transitory computer-readable storage medium of claim 16, the one or more programs further including instructions for:

after detecting the first input and while the first set of one or more user interface objects is in the selected state and being controlled by the first portion of the user of the computer system, detecting, via the one or more input devices, a second input directed to a third user interface object that includes the respective gesture performed by the second portion of the user of the computer system; and in response to detecting the second input:

in accordance with a determination that the second input satisfies the one or more first criteria, adding the third user interface object to the first set of one or more user interface objects that is in the selected state and being controlled by the first portion of the user of the computer system, including moving the first user interface object and the third user interface object in accordance with movement of the first portion of the user; and in accordance with a determination that the second input satisfies the one or more second criteria:

updating the third user interface object to be in the selected state; and controlling the third user interface object based on the second portion of the user, including moving the third user interface object in accordance with movement of the second portion of the user while maintaining the selected state of the first set of user interface objects and the control of the first set of one or more user interface objects based on the first portion of the user of the computer system.

21. The non-transitory computer-readable storage medium of claim 16, wherein displaying the second user interface object in the selected state includes displaying, via the display generation component, a visual indication that the second user interface object is in the selected state.

22. The non-transitory computer-readable storage medium of claim 16, the one or more programs further including instructions for:

while the first set of objects is in the selected state and being controlled by the first portion of the user while the first portion of the user maintains a respective pose, detecting the first portion of the user no longer maintaining the respective pose; and in response to detecting the first portion of the user no longer maintaining the respective pose, ceasing control of the first set of objects by the first portion of the user while maintaining the first set of objects in the selected state.

23. The non-transitory computer-readable storage medium of claim 16, the one or more programs further including instructions for:

while the first set of objects is in the selected state and being controlled by the first portion of the user while the first portion of the user maintains a respective pose, detecting, via the one or more input devices, the first portion of the user no longer maintaining the respective pose; and in response to detecting the first portion of the user no longer maintaining the respective pose, ceasing control of the first set of objects by the first portion of the user and updating the first set of objects to be in an unselected state.

24. The non-transitory computer-readable storage medium of claim 16, the one or more programs further including instructions for:

detecting, via the one or more input devices, a second input directed to a location that does not include a user interface object that includes a first gesture performed by the first portion of the user; and in response to detecting the second input:

in accordance with a determination that the second input satisfies one or more third criteria, including a third criterion that is satisfied when an initiation of the first gesture is followed by movement of the first portion of the user followed by an end of the first gesture, wherein the movement of the first portion of the user defines an area that includes a plurality of user interface objects:

in accordance with a determination that a third user interface object of the plurality of user interface objects is in the selected state, updating the third user interface object to be in an unselected state;

in accordance with a determination that the third user interface object is in the unselected state, updating the third user interface object to be in the selected state;

in accordance with a determination that a fourth user interface object of the plurality of user interface objects is in the selected state, updating the fourth user interface object to be in the unselected state; and in accordance with a determination that the fourth user interface object is in the unselected state, updating the fourth user interface object to be in the selected state.

25. The non-transitory computer-readable storage medium of claim 24, the one or more programs further including instructions for:

while the plurality of user interface objects is in the selected state in response to detecting the second input, detecting, via the one or more input devices, a third input directed to a third user interface object that is not included in the plurality of user interface objects and that is in the unselected state, wherein the third input includes a second gesture performed by a respective portion of the user;

in response to detecting the third input, in accordance with a determination that the third input satisfies the one or more first criteria, updating the third user interface object to be in the selected state while maintaining the plurality of user interface objects in the selected state;

while the third user interface object and the plurality of user interface objects are in the selected state, detecting a fourth input corresponding to movement of the third user interface object and the plurality of user interface objects;

while detecting the fourth input, moving the third user interface object and the plurality of user interface objects in accordance with the fourth input; and in response to detecting an end of the fourth input, updating the third user interface object to be in the unselected state while maintaining the plurality of user interface objects in the selected state.

26. The non-transitory computer-readable storage medium of claim 16, the one or more programs further including instructions for:

detecting, via the one or more input devices, a second input directed to a location that includes a third user interface object that is in the selected state, wherein the second input includes a first gesture performed by the first portion of the user, and one or more user interface objects, including the third user interface object, are in the selected state when the second input is detected; and in response to detecting the second input:
in accordance with a determination that the second input satisfies one or more third criteria, including a third criterion that is satisfied when an initiation of the first gesture is followed by movement of the first portion of the user followed by an end of the first gesture:
moving the one or more user interface objects in accordance with the movement of the first portion of the user.

27. The non-transitory computer-readable storage medium of claim 16, the one or more programs further including instructions for:

detecting, via the one or more input devices, a second input directed to a third user interface object that is in the selected state, wherein the second input satisfies the one or more second criteria while an attention of the user is directed to the third user interface object; and in response to detecting the second input, displaying, via the display generation component, a contextual menu associated with the third user interface object.

28. The non-transitory computer-readable storage medium of claim 16, wherein the first input is detected while the computer system is operating in a first mode of operation in which user interface objects are placed in the selected or unselected states in one or more first manners, the one or more programs further including instructions for:

displaying, via the display generation component, a selectable option that is selectable to initiate a second mode of operation of the computer system in which user interface objects are placed in the selected or unselected states in one or more second manners, different from the one or more first manners.

29. The non-transitory computer-readable storage medium of claim 28, the one or more programs further including instructions for:

detecting, via the one or more input devices, a second input directed to a third user interface object that is in the unselected state, wherein the second input satisfies the one or more second criteria while an attention of the user is directed to the third user interface object; and in response to detecting the second input:
in accordance with a determination that the computer system is operating in the first mode of operation, displaying, via the display generation component, content associated with the third user interface object; and in accordance with a determination that the computer system is operating in the second mode of operation, updating the third user interface object to be in the selected state.

30. The non-transitory computer-readable storage medium of claim 28, wherein one or more user interface objects are displayed within a container user interface object, the one or more programs further including instructions for:

detecting, via the one or more input devices, a second input that includes movement of a respective portion of the user, wherein the second input satisfies the one or more second criteria; and in response to detecting the second input:
in accordance with a determination that the computer system is operating in the first mode of operation, moving the one or more user interface objects relative to the container user interface object in accordance with the movement of the respective portion of the user; and in accordance with a determination that the computer system is operating in the second mode of operation, scrolling through the container user interface object without moving the one or more user interface objects relative to the container user interface object.

31. A computer system that is in communication with a display generation component and one or more input devices, the computer system comprising:

one or more processors; and
memory storing one or more programs configured to be executed by the one or more processors, the one or more programs including instructions for:
while displaying, via the display generation component, a first user interface object and a second user interface object:
while a first set of one or more user interface objects, including the first user interface object and not including the second user interface object, is in a selected state and being controlled by a first portion of a user of the computer system, detecting, via the one or more input devices, a first input directed to the second user interface object that includes a respective gesture performed by a second portion, different from the first portion, of the user of the computer system; and in response to detecting the first input:
in accordance with a determination that the first input satisfies one or more first criteria, including a first criterion that is satisfied when an initiation of the respective gesture and an end of the respective gesture are performed within a threshold amount of time of one another, adding the second user interface object to the first set of one or more user interface objects that is in the selected state and being controlled by the first portion of the user of the computer system, including moving the first user interface object and the second user interface object in accordance with movement of the first portion of the user; and in accordance with a determination that the first input satisfies one or more second criteria, different from the one or more first criteria, including a first criterion that is satisfied when the end of the respective gesture is not performed within the threshold amount of time of the initiation of the respective gesture, and a second criterion that is satisfied when the respective gesture includes movement of the second portion of the user more than a movement threshold after the initiation of the respective gesture:
  updating the second user interface object to be in the selected state, and
  controlling the second user interface object based on the second portion of the user, including moving the second user interface object in accordance with movement of the second portion of the user while maintaining the selected state of the first set of user interface objects and the control of the first set of one or more user interface objects based on the first portion of the user of the computer system.

32. The computer system of claim 31, the one or more programs further including instructions for:
  while displaying, via the display generation component, the first user interface object and the second user interface object, wherein no user interface object displayed via the display generation component is in the selected state, detecting, via the one or more input devices, a second input directed to the first user interface object that includes the respective gesture performed by the second portion of the user; and
  in response to detecting the second input, and in accordance with a determination that the second input satisfies the one or more first criteria, displaying, via the display generation component, content associated with the first user interface object.

33. The computer system of claim 31, the one or more programs further including instructions for:
  in response to detecting the first input:
    in accordance with a determination that the first input satisfies one or more third criteria, different from the one or more first criteria and the one or more second criteria, including the first criterion that is satisfied when the end of the respective gesture is not performed within the threshold amount of time of the initiation of the respective gesture and a third criterion that is satisfied when the respective gesture includes movement of the second portion of the user less than the movement threshold after the initiation of the respective gesture:
      in response to detecting the end of the respective gesture, adding the second user interface object to the first set of one or more user interface objects that is in the selected state and being controlled by the first portion of the user of the computer system, including moving the first user interface object and the second user interface object in accordance with movement of the first portion of the user.

34. The computer system of claim 31, the one or more programs further including instructions for:
  while the second user interface object is being controlled based on the second portion of the user, including moving the second user interface object in accordance with movement of the second portion of the user while maintaining the selected state of the first set of user interface objects and the control of the first set of one or more user interface objects based on the first portion of the user of the computer system, detecting the end of the respective gesture; and
  in response to detecting the end of the respective gesture, placing the second user interface object at a location corresponding to a current location of the second portion of the user.

35. The computer system of claim 31, the one or more programs further including instructions for:
  after detecting the first input and while the first set of one or more user interface objects is in the selected state and being controlled by the first portion of the user of the computer system, detecting, via the one or more input devices, a second input directed to a third user interface object that includes the respective gesture performed by the second portion of the user of the computer system; and
  in response to detecting the second input:
    in accordance with a determination that the second input satisfies the one or more first criteria, adding the third user interface object to the first set of one or more user interface objects that is in the selected state and being controlled by the first portion of the user of the computer system, including moving the first user interface object and the third user interface object in accordance with movement of the first portion of the user; and
    in accordance with a determination that the second input satisfies the one or more second criteria:
      updating the third user interface object to be in the selected state; and
      controlling the third user interface object based on the second portion of the user, including moving the third user interface object in accordance with movement of the second portion of the user while maintaining the selected state of the first set of user interface objects and the control of the first set of one or more user interface objects based on the first portion of the user of the computer system.

36. The computer system of claim 31, wherein displaying the second user interface object in the selected state includes displaying, via the display generation component, a visual indication that the second user interface object is in the selected state.

37. The computer system of claim 31, the one or more programs further including instructions for:
  while the first set of objects is in the selected state and being controlled by the first portion of the user while the first portion of the user maintains a respective pose, detecting the first portion of the user no longer maintaining the respective pose; and
  in response to detecting the first portion of the user no longer maintaining the respective pose, ceasing control of the first set of objects by the first portion of the user while maintaining the first set of objects in the selected state.

38. The computer system of claim 31, the one or more programs further including instructions for:
  while the first set of objects is in the selected state and being controlled by the first portion of the user while the first portion of the user maintains a respective pose, detecting, via the one or more input devices, the first portion of the user no longer maintaining the respective pose; and
  in response to detecting the first portion of the user no longer maintaining the respective pose, ceasing control of the first set of objects by the first portion of the user and updating the first set of objects to be in an unselected state.

39. The computer system of claim 31, the one or more programs further including instructions for:
detecting, via the one or more input devices, a second input directed to a location that does not include a user interface object that includes a first gesture performed by the first portion of the user; and
in response to detecting the second input:
in accordance with a determination that the second input satisfies one or more third criteria, including a third criterion that is satisfied when an initiation of the first gesture is followed by movement of the first portion of the user followed by an end of the first gesture, wherein the movement of the first portion of the user defines an area that includes a plurality of user interface objects:
in accordance with a determination that a third user interface object of the plurality of user interface objects is in the selected state, updating the third user interface object to be in an unselected state;
in accordance with a determination that the third user interface object is in the unselected state, updating the third user interface object to be in the selected state;
in accordance with a determination that a fourth user interface object of the plurality of user interface objects is in the selected state, updating the fourth user interface object to be in the unselected state; and
in accordance with a determination that the fourth user interface object is in the unselected state, updating the fourth user interface object to be in the selected state.

40. The computer system of claim 39, the one or more programs further including instructions for:
while the plurality of user interface objects is in the selected state in response to detecting the second input, detecting, via the one or more input devices, a third input directed to a third user interface object that is not included in the plurality of user interface objects and that is in the unselected state, wherein the third input includes a second gesture performed by a respective portion of the user;
in response to detecting the third input, in accordance with a determination that the third input satisfies the one or more first criteria, updating the third user interface object to be in the selected state while maintaining the plurality of user interface objects in the selected state;
while the third user interface object and the plurality of user interface objects are in the selected state, detecting a fourth input corresponding to movement of the third user interface object and the plurality of user interface objects;
while detecting the fourth input, moving the third user interface object and the plurality of user interface objects in accordance with the fourth input; and
in response to detecting an end of the fourth input, updating the third user interface object to be in the unselected state while maintaining the plurality of user interface objects in the selected state.

41. The computer system of claim 31, the one or more programs further including instructions for:
detecting, via the one or more input devices, a second input directed to a location that includes a third user interface object that is in the selected state, wherein the second input includes a first gesture performed by the first portion of the user, and one or more user interface objects, including the third user interface object, are in the selected state when the second input is detected; and
in response to detecting the second input:
in accordance with a determination that the second input satisfies one or more third criteria, including a third criterion that is satisfied when an initiation of the first gesture is followed by movement of the first portion of the user followed by an end of the first gesture:
moving the one or more user interface objects in accordance with the movement of the first portion of the user.

42. The computer system of claim 31, the one or more programs further including instructions for:
detecting, via the one or more input devices, a second input directed to a third user interface object that is in the selected state, wherein the second input satisfies the one or more second criteria while an attention of the user is directed to the third user interface object; and
in response to detecting the second input, displaying, via the display generation component, a contextual menu associated with the third user interface object.

43. The computer system of claim 31, wherein the first input is detected while the computer system is operating in a first mode of operation in which user interface objects are placed in the selected or unselected states in one or more first manners, the one or more programs further including instructions for:
displaying, via the display generation component, a selectable option that is selectable to initiate a second mode of operation of the computer system in which user interface objects are placed in the selected or unselected states in one or more second manners, different from the one or more first manners.

44. The computer system of claim 43, the one or more programs further including instructions for:
detecting, via the one or more input devices, a second input directed to a third user interface object that is in the unselected state, wherein the second input satisfies the one or more second criteria while an attention of the user is directed to the third user interface object; and
in response to detecting the second input:
in accordance with a determination that the computer system is operating in the first mode of operation, displaying, via the display generation component, content associated with the third user interface object; and
in accordance with a determination that the computer system is operating in the second mode of operation, updating the third user interface object to be in the selected state.

45. The computer system of claim 43, wherein one or more user interface objects are displayed within a container user interface object, the one or more programs further including instructions for:
detecting, via the one or more input devices, a second input that includes movement of a respective portion of the user, wherein the second input satisfies the one or more second criteria; and
in response to detecting the second input:
in accordance with a determination that the computer system is operating in the first mode of operation, moving the one or more user interface objects relative to the container user interface object in accordance with the movement of the respective portion of the user; and in accordance with a determination that the computer system is operating in the second mode of operation, scrolling through the container user interface object without moving the one or more user interface objects relative to the container user interface object.

\* \* \* \* \*